(12) United States Patent
Aoki et al.

(10) Patent No.: US 7,778,495 B2
(45) Date of Patent: Aug. 17, 2010

(54) SYSTEM AND DEVICE FOR IMAGE PROCESSING

(75) Inventors: Kazuma Aoki, Kasugai (JP); Makoto Matsuda, Aisai (JP); Masafumi Miyazawa, Nagoya (JP); Kiyotaka Ohara, Nagoya (JP); Satoru Yanagi, Nagoya (JP); Masatoshi Kokubo, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1122 days.

(21) Appl. No.: 11/266,586

(22) Filed: Nov. 4, 2005

(65) Prior Publication Data

US 2006/0176509 A1    Aug. 10, 2006

(30) Foreign Application Priority Data

| Nov. 5, 2004 | (JP) | ............................. 2004-322933 |
| Nov. 5, 2004 | (JP) | ............................. 2004-322939 |
| Nov. 5, 2004 | (JP) | ............................. 2004-322940 |
| Nov. 5, 2004 | (JP) | ............................. 2004-322943 |
| Nov. 5, 2004 | (JP) | ............................. 2004-322947 |
| Nov. 5, 2004 | (JP) | ............................. 2004-322949 |

(51) Int. Cl.
*G06K 9/00* (2006.01)
(52) U.S. Cl. .................................................. 382/307
(58) Field of Classification Search ................ 382/307; 358/1.15, 402, 408; 709/204, 205, 246
See application file for complete search history.

(56) References Cited

U.S. PATENT DOCUMENTS

| 5,751,922 | A | 5/1998 | Harada ........................ 395/112 |
| 5,909,602 | A | 6/1999 | Nakai et al. ..................... 399/8 |
| 5,946,457 | A | 8/1999 | Nakai et al. ................. 395/112 |
| 6,674,537 | B2 | 1/2004 | Kadowaki .................. 358/1.15 |
| 6,681,245 | B1 | 1/2004 | Sasagawa ................... 709/206 |
| 6,804,708 | B1 | 10/2004 | Jerding et al. ............... 709/220 |

(Continued)

FOREIGN PATENT DOCUMENTS

| EP | 0 782 326 A2 | 7/1997 |
| JP | 6-149490 A | 5/1994 |
| JP | 6-290090 A | 10/1994 |
| JP | 7-143270 A | 6/1995 |
| JP | 7-182220 A | 7/1995 |

(Continued)

OTHER PUBLICATIONS

JP Office Action dtd Oct. 21, 2008, JP APp. 2004-322940.

(Continued)

*Primary Examiner*—Andrew W Johns
(74) *Attorney, Agent, or Firm*—Banner & Witcoff, Ltd.

(57) ABSTRACT

An image processing system, which includes an image processing device including at least one of an image reading unit which reads an image and generates image data representing the image and an image printing unit which prints an image represented by image data, a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. The information supply unit includes a service storage unit that stores the information on services executable by the service supply unit, and a service information transmitting unit that transmits the stored information on services to the image processing device.

58 Claims, 83 Drawing Sheets

U.S. PATENT DOCUMENTS

| | | | |
|---|---|---|---|
| 6,973,619 B1 | 12/2005 | Hirose et al. | 715/530 |
| 7,013,052 B1* | 3/2006 | Takaoka | 382/307 |
| 7,154,618 B2 | 12/2006 | Kadowaki | 358/1.13 |
| 7,412,498 B2 | 8/2008 | Machida | 709/220 |
| 2001/0050782 A1 | 12/2001 | Niitsuma et al. | 358/1.15 |
| 2002/0007485 A1 | 1/2002 | Rodriguez et al. | 725/1 |
| 2002/0049804 A1 | 4/2002 | Rodriguez et al. | 709/200 |
| 2002/0049978 A1 | 4/2002 | Rodriguez et al. | 725/86 |
| 2003/0014603 A1 | 1/2003 | Sasaki et al. | 711/158 |
| 2003/0117642 A1 | 6/2003 | Haraguchi | 358/1.15 |
| 2003/0187965 A1 | 10/2003 | Enomoto et al. | 709/221 |
| 2004/0160630 A1 | 8/2004 | Iriyama et al. | 358/1.15 |
| 2004/0163114 A1 | 8/2004 | Rodriguez et al. | 725/173 |
| 2004/0163117 A1 | 8/2004 | Rodriguez et al. | 725/100 |
| 2004/0230500 A1 | 11/2004 | Imago | 705/27 |
| 2005/0027833 A1 | 2/2005 | Jerding et al. | 709/220 |
| 2005/0174592 A1* | 8/2005 | Iinuma et al. | 358/1.13 |
| 2005/0246635 A1 | 11/2005 | Hirose et al. | 715/530 |
| 2006/0209359 A1 | 9/2006 | Kadowaki | 358/474 |
| 2007/0053008 A1 | 3/2007 | Kadowaki | 358/448 |

FOREIGN PATENT DOCUMENTS

| | | |
|---|---|---|
| JP | 8-286877 A | 11/1996 |
| JP | 9-238215 A | 9/1997 |
| JP | 9-305473 A | 11/1997 |
| JP | 11-017862 A | 1/1999 |
| JP | 11-265400 A | 9/1999 |
| JP | 2000-082039 A | 3/2000 |
| JP | 2000-122832 A | 4/2000 |
| JP | 2001-14255 A | 1/2001 |
| JP | 2001-325275 A | 11/2001 |
| JP | 2001-333237 A | 11/2001 |
| JP | 2002-016733 A | 1/2002 |
| JP | 2002-101150 A | 4/2002 |
| JP | 2002-132652 A | 5/2002 |
| JP | 2002-182884 A | 6/2002 |
| JP | 2002-183486 A | 6/2002 |
| JP | 2002-248742 A | 9/2002 |
| JP | 2002-259266 A | 9/2002 |
| JP | 2002-342375 A | 11/2002 |
| JP | 2003-022211 A | 1/2003 |
| JP | 2003-288336 A | 10/2003 |
| JP | 2003-288437 A | 10/2003 |
| JP | 2003-532312 A | 10/2003 |
| JP | 2003-330675 A | 11/2003 |
| JP | 2004-134995 A | 4/2004 |
| JP | 2004-185464 A | 7/2004 |
| JP | 2004-228686 A | 8/2004 |
| JP | 2004-272888 A | 9/2004 |
| JP | 2004-282147 A | 10/2004 |
| JP | 2004-312302 A | 11/2004 |
| WO | WO 02/08860 A2 | 1/2002 |
| WO | WO 2004/091188 A1 | 10/2004 |

OTHER PUBLICATIONS

JP Office Action dtd Apr. 22, 2008, JP App 2004-322933.
JP Office Action dtd Apr. 22, 2008, JP App 2004-322939.
JP Office Action dtd Apr. 22, 2008, JP App 2004-322940.
IETF, RFC2165, Network Working Group, Service Location Protocol, J. Veizades et al., Jun. 1997, printed Apr. 22, 2008 from <http://tools.ietf.org.html/rfc2165>.
JP Office Action dtd Jul. 15, 2008, JP Appln. 2004-322940.
JP Office Action dtd Sep. 30, 2008, JP Appln. 2004-322943.

* cited by examiner

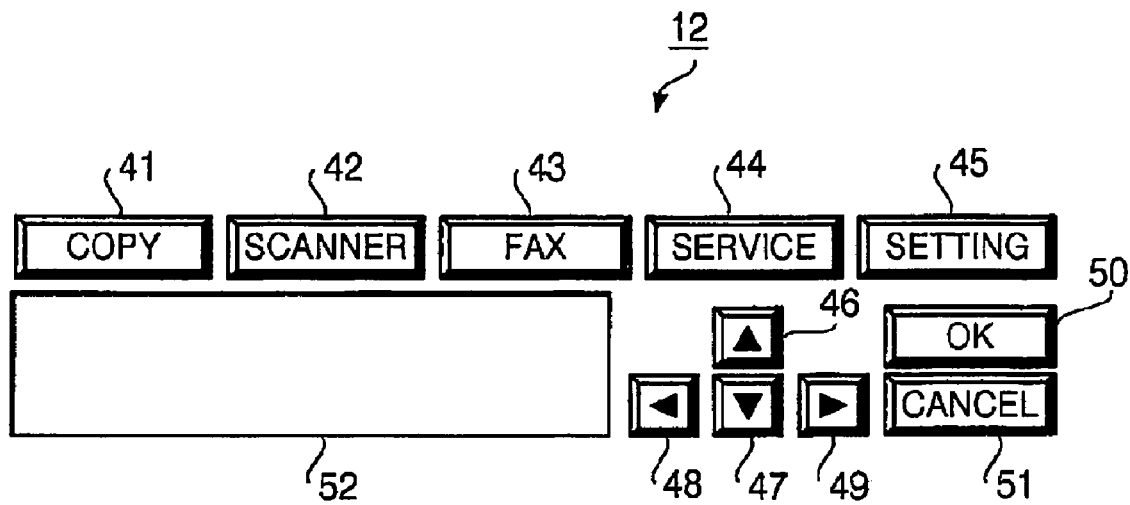

FIG. 2

```
<ID>11111110</ID>
<Title>DIRECTORY SERVICE</Title>
<Type>MENU</Type>
<Num_Link>3</Num_Link>
<Link>
  <Link_Title>DATA STORAGE SERVICE</Link_Title>
  <Link_Location>11111111</Link_Location>
  <Link_DevResource>SCAN,VOICE</Link_DevResorce>
</Link>
<Link>
  <Link_Title>PRINTING SERVICE </Link_Title>
  <Link_Location>11111112</Link_Location>
  <Link_DevResource>Print</Link_DevResorce>
 </Link>
<Link>
  <Link_Title>COPY APPLICATION SERVICE</Link_Title>
  <Link_Location>11111113</Link_Location>
  <Link_DevResource>PRINT,SCAN,VOICE</Link_DevResorce>
</Link>
```

FIG. 3

```
<ID>11111113</ID>
<Title>COPY APPLICATION SERVICE</Title>
<Type>MENU</Type>
<Num_Link>4</Num_Link>
<Link>
 <Link_Title>WATERMARK COPY</Link_Title>
<Link_Location>http://suk.example.co.jp/cgi_bin/suktop</Link_Location>
 <Link_DevResourece>PRINT,SCAN</Link_DevResource>
 <Link_payservice>100YEN</Link_payservice>
</Link>
<Link>
 <Link_Title>TRANSLATION COPY </Link_Title>
<Link_Location>http://hon.example.co.jp/cgi_bin/top</Link_Location>
 <Link_DevResourece>PRINT,SCAN</Link_DevResource>
 <Link_payservice>0YEN</Link_payservice>
</Link>
<Link>
 <Link_Title>ORIGINAL READING</Link_Title>
<Link_Location>http://example.yomiage.com/cgi_bin/yomi</Link_Location>
 <Link_DevResourece>SCAN,VOICE</Link_DevResource>
 <Link_payservice>0YEN</Link_payservice>
</Link>
<Link>
 <Link_Title>VOICE-TEXT CONVERSION</Link_Title>
<Link_Location>http://ototeki.com/cgi_bin/oo</Link_Location>
 <Link_DevResourece>PRINT,VOICE</Link_DevResource>
 <Link_payservice>0YEN</Link_payservice>
</Link>
```

FIG. 4

```
<ID>11111110</ID>
<GID>http://copy - svc.com//001</GID>
<Title>Translation Copy</Title>
<Type>FORM</Type>
<Action>
http://hon.example.co.jp/cgi_bin/service</Action>
<Num_Form_Elem>4</Num_Form_Elem>
<Form_Elem>
  <Form_Type>Select</Form_Type>
  <Form_Data>
    <Disp_Name>LANGUAGE SELECTION</Disp_Name>
    <Value_Name>lang</Value_Name>
    <Multi_Select>0</Multi_Select>
    <Num_Option>2</Num_Option>
    <Option>
      <Disp_Select>ENGLISH → JAPANESE</Disp_Select>
      <Disp_Value>en_ja</Disp_Value>
      <Default_Select>1</Disp_Select>
    </Option>
    <Option>
      <Disp_Select>JAPANESE → ENGLISH</Disp_Select>
      <Disp_Value>ja_en</Disp_Value>
      <Default_Select>0</Disp_Select>
    </Option>
  </Form_Data>
</Form_Elem>
(to be Continued)
```

FIG. 6

```
(Continued)
<Form_Elem>
 <Form_Type>Select</Form_Type>
 <Form_Data>
  <Disp_Name>SCANNER SETTING</Disp_Name>
  <Value_Name>scan_res</Value_Name>
  <Multi_Select>0</Multi_Select>
  <Num_Option>2</Num_Option>
  <Option>
   <Disp_Select>NORMAL CHARACTER</Disp_Select>
   <Disp_Value>300</Disp_Value>
   <Default_Select>1</Disp_Select>
  </Option>
  <Option>
   <Disp_Select>FINE CHARACTER</Disp_Select>
   <Disp_Value>600</Disp_Value>
   <Default_Select>0</Disp_Select>
  </Option>
 </Form_Data>
</Form_Elem>
(to be Continued)
```

FIG. 7

```
(Continued)
<Form_Elem>
  <Form_Type>Select</Form_Type>
  <Form_Data>
    <Disp_Name>PRINT SETTING</Disp_Name>
    <Value_Name>print_res</Value_Name>
    <Multi_Select>0</Multi_Select>
    <Num_Option>3</Num_Option>
    <Option>
      <Disp_Select>PRINT SPEED PRIORITY</Disp_Select>
      <Disp_Value>200</Disp_Value>
      <Default_Select>0</Disp_Select>
    </Option>
    <Option>
      <Disp_Select>NORMAL</Disp_Select>
      <Disp_Value>300</Disp_Value>
      <Default_Select>1</Disp_Select>
    </Option>
    <Option>
      <Disp_Select>FINE</Disp_Select>
      <Disp_Value>600</Disp_Value>
      <Default_Select>0</Disp_Select>
    </Option>
  </Form_Data>
</Form_Elem>
<Form_Elem>
  <Form_Type>Text</Form_Type>
  <Form_Data>
    <Disp_Name>COMMENT</Disp_Name>
    <Value_Name>comment<Value_Name>
    <Max_Byte>100</Max_Byte>
    <Default_String></Default_String>
  </Form_Data>
</Form_Elem>
```

FIG. 8

FIG.10A
FIG.10B

| URL | Group ID | Filename | Time |
|---|---|---|---|
| http://pibsb.com/main.html | http://pibsb.com/main.html | 00001.dat | 2004/09/18,11:11 |
| http://pibsb.com/access.html | http://pibsb.com/main.html/001 | 00002.dat | 2004/01/02,12:01 |
| http://pibsb.com/company.html | http://pibsb.com/main.html/001 | 00003.dat | 2004/09/02,09:56 |
| http://mctc.com/main.html | | 00004.dat | 2004/07/21,23:16 |
| http://sokuyo.com/main.html | http://sokuyo.com/main.html | 00005.dat | 2004/03/03,10:20 |
| http://sokuyo.com/access.html | http://sokuyo.com/main.html/001 | 00006.dat | 2004/08/03,10:21 |
| http://pibsb.com/company.html | http://sokuyo.com/main.html/002 | 00007.dat | 2004/09303,10:22 |

FIG.55

| URL | Group ID | Filename | Frequency |
|---|---|---|---|
| http://pibsb.com/main.html | http://pibsb.com/main.html | 00001.dat | 157 |
| http://pibsb.com/access.html | http://pibsb.com/main.html/001 | 00002.dat | 110 |
| http://pibsb.com/company.html | http://pibsb.com/main.html/001 | 00003.dat | 20 |
| http://mctc.com/main.html | | 00004.dat | 80 |
| http://sokuyo.com/main.html | http://sokuyo.com/main.html | 00005.dat | 180 |
| http://pibsb.com/access.html | http://sokuyo.com/main.html/001 | 00006.dat | 97 |
| http://pibsb.com/company.html | http://sokuyo.com/main.html/002 | 00007.dat | 65 |

FIG.56

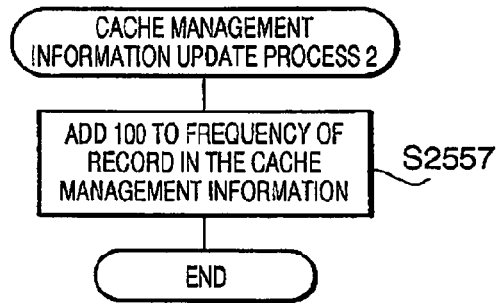

FIG.57

```
<HTML>
 <HEAD>
  <TITLE>MAIN PAGE</TITLE>
<META http-equiv="GROUPID" content="http://pibsb.com/main.html">
 </HEAD>
 <BODY>
 ..........
  <A HREF="http://pibsb.com/access.html">TRAFFIC GUIDANCE</A>

</BODY>
<HTML>
```

```
<HTML>
 <HEAD>
  <TITLE>TRAFFIC GUIDANCE</TITLE>
 <META http-equiv="GROUPID" content="http://pibsb.com/main.html//001">
 </HEAD>
 <BODY>
 ..........

</BODY>
<HTML>
```

FIG.64

| DIRECTORY SERVER NAME | DIRECTORY SERVER NAME | PRIORITY |
|---|---|---|
| DIRECTORY SERVER A | ADDRESS OF DIRECTORY SERVER A | 3 |
| DIRECTORY SERVER B | ADDRESS OF DIRECTORY SERVER B | 4 |
| DIRECTORY SERVER C | ADDRESS OF DIRECTORY SERVER C | 1 |
| DIRECTORY SERVER D | ADDRESS OF DIRECTORY SERVER D | 2 |

FIG.67

DATA RECEIVED FROM DIRECTORY SERVER R

```
TOP SERVICE DEFINITION INFORMATION
<ID>11111110</ID>
<Title>DIRECTORY SERVICE</Title>
<Type>MENU</Type>
<Num_Link>3</Num_Link>
<Link>
  <Language>Japanese</Lageuage>
  <Link_Title>DATA STORAGE SERVICE</Link_Title>
  <Link_Location>11111111</Link_Location>
</Link>
<Link>
  <Language>Japanese</Language>
  <Link_Title>PRINTING SERVICE </Link_Title>
  <Link_Location>11111112</Link_Location>
</Link>
<Link>
  <Language>Japanese</Language>
  <Link_Title>COPY APPLICATION SERVICE</Link_Title>
  <Link_Location>11111113</Link_Location>
</Link>
```

```
SERVICE DEFINITION INFORMATION DATA STORAGE SERVICE
<ID>11111111</ID>
<Title>DATA STORAGE SERVICE</Title>
<Type>MENU</Type>
<Num_Link>1</Num_Link>
<Link>
  <Link_Title>DATA STORAGE</Link_Title>
  <Link_Location>http://file.example.co.jp/cgi_bin/fltop</Link_Location>
</Link>
```

```
SERVICE DEFINITION INFORMATION PRINT SERVICE
<ID>11111112</ID>
<Title>PRINT SERVICE</Title>
<Type>MENU</Type>
<Num_Link>1</Num_Link>
<Link>
  <Link_Title>NEWSPAPER DELIVER</Link_Title>
  <Link_Location>http://file.example.co.jp/cgi_bin/nwstop</Link_Location>
</Link>
```

```
SERVICE DEFINITION INFORMATION COPY APPLICATION SERVICE
<ID>11111113</ID>
<Title>COPY APPLICATION SERVICE</Title>
<Type>MENU</Type>
<Num_Link>2</Num_Link>
<Link>
  <Link_Title>WATERMARK COPY</Link_Title>
  <Link_Location>http://file.example.co.jp/cgi_bin/suktop</Link_Location>
</Link>
<Link>
  <Link_Title>TRANSLATION COPY</Link_Title>
  <Link_Location>http://hon.example.co.jp/cgi_bin/hontop</Link_Location>
</Link>
```

FIG.68

DATA RECEIVED FROM DIRECTORY SERVER B

```
TOP SERVICE DEFINITION INFORMATION
<ID>11111110</ID>
<Title>DIRECTORY SERVICE</Title>
<Type>MENU</Type>
<Num_Link>2</Num_Link>
<Link>
 <Language>Japanese</Lageuage>
 <Link_Title>PRINT SERVICE</Link_Title>
 <Link_Location>11111111</Link_Location>
</Link>
<Link>
 <Language>Japanese</Language>
 <Link_Title>COPY APPLICATION SERVICE</Link_Title>
 <Link_Location>11111112</Link_Location>
</Link>
```

```
SERVICE DEFINITION INFORMATION PRINT SERVICE
<ID>11111111</ID>
<Title>PRINT SERVICE</Title>
<Type>MENU</Type>
<Num_Link>1</Num_Link>
<Link>
 <Link_Title>NEWSPAPER DELIVER</Link_Title>
 <Link_Location>http://file.example.co.jp/cgi_bin/nwstop</Link_Location>
</Link>
```

```
SERVICE DEFINITION INFORMATION COPY APPLICATION SERVICE
<ID>11111112</ID>
<Title>COPY APPLICATION SERVICE</Title>
<Type>MENU</Type>
<Num_Link>4</Num_Link>
<Link>
 <Link_Title>WATERMARK COPY</Link_Title>
 <Link_Location>http://file.example.co.jp/cgi_bin/suktop</Link_Location>
</Link>
 <Link_Title>TRANSLATION COPY</Link_Title>
 <Link_Location>http://hon.example.co.jp/cgi_bin/top</Link_Location>
</Link>
<Link>
 <Link_Title>ORIGINAL READING</Link_Title>
 <Link_Location>http://hon.example.co.jp/cgi_bin/yomi</Link_Location>
</Link>
<Link>
 <LinkLink_Location>VOICE-TEXT CONVERSION</LinkLink_Title>
 <Link_Location>http://ototeki.com/cgi_bin/oo</Link_Location>
</Link>
```

FIG.69

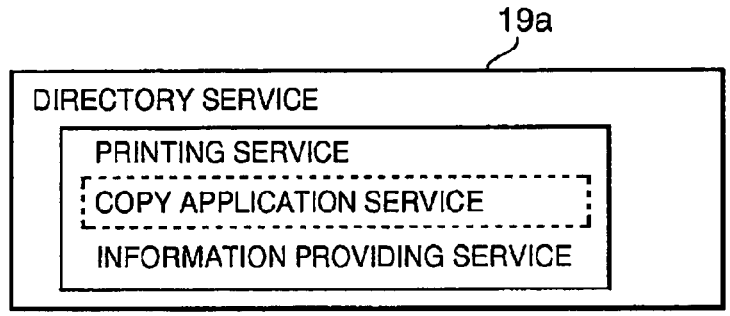

FIG.78A

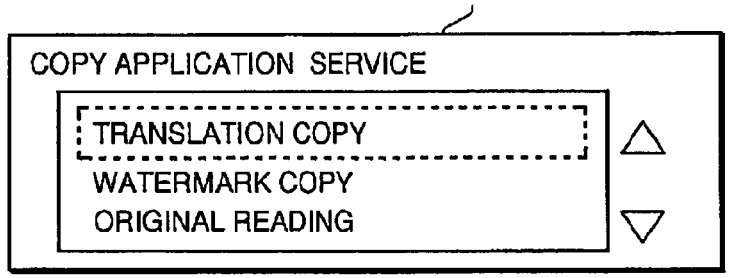

FIG.78B

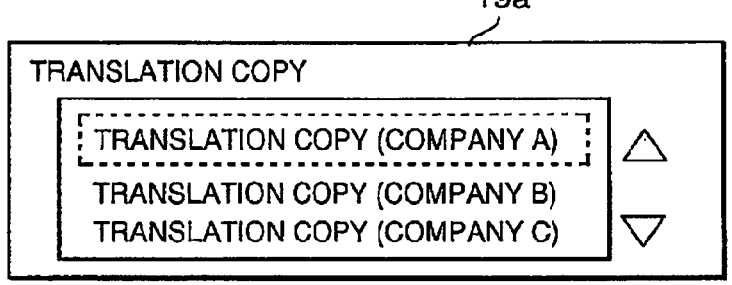

```
<ID>11111110</ID>
<Title>DIRECTORY SERVICE</Title>
<Type>MENU</Type>
<Num_Link>3</Num_Link>
<Link>
 <Link_Title>PRINTING SERVICE </Link_Title>
 <Link_Location>11111111</Link_Location>
</Link>
<Link>
 <Link_Title>COPY APPLICATION SERVICE</Link_Title>
 <Link_Location>11111112</Link_Location>
</Link>
<Link>
 <Link_Title>INFORMATION PROVIDING SERVICE</Link_Title>
 <Link_Location>1111113</Link_Location>
</Link>
```

```
<ID>11111112</ID>
<Title>COPY APPLICATION SERVICE</Title>
<Type>MENU</Type>
<Num_Link>10</Num_Link>
<Link>
  <Link_Title>TRANSLATION COPY </Link_Title>
  <Link_Location>21111111</Link_Location>
</Link>
<Link>
  <Link_Title>WATERMARK COPY</Link_Title>
  <Link_Location>21111112</Link_Location>
</Link>
<Link>
  <Link_Title>ORIGINAL READING</Link_Title>
  <Link_Location>21111113</Link_Location>
</Link>
<Link>
  <Link_Title>VOICE-TEXT CONVERSION</Link_Title>
  <Link_Location>21111114</Link_Location>
</Link>
<Link>
  <Link_Title>IMAGE CONVERSION</Link_Title>
  <Link_Location>21111115</Link_Location>
</Link>
```

```
<ID>21111111</ID>
<Title>TRANSLATION COPY</Title>
<Type>MENU</Type>
<Num_Link>4</Num_Link>
<Link>
  <Link_Title>TRANSLATION COPY(COMPANY A) </Link_Title>
  <Link_Location>http://hon. ***** .co.jp/cgi_bin/hona</Link_Location>
</Link>
<Link>
  <Link_Title>TRANSLATION COPY(COMPANY B) </Link_Title>
  <Link_Location>http://hon. ***** .co.jp/cgi_bin/honb</Link_Location>
</Link>
<Link>
  <Link_Title>TRANSLATION COPY(COMPANY C) </Link_Title>
  <Link_Location>http://hon. ***** .co.jp/cgi_bin/honc</Link_Location>
</Link>
<Link>
  <Link_Title>TRANSLATION COPY(COMPANY D) </Link_Title>
  <Link_Location>http://hon. ***** .co.jp/cgi_bin/hond</Link_Location>
</Link>
```

FIG.81

(USAGE HISTORY FILE)

```
<History>
<History_Title>TRANSLATION COPY(COMPANY A)</History_Title>
  <History_URL>http://hon. ***** .co.jp/cgi_bin/hona</History_URL>
  <History_Count>3</History_Count>
</History>
<History>
<History_Title>ORIGINAL READING (B)</History_Title>
  <History_URL>http://yomi. ***** .co.jp/cgi_bin/yomi b</History_URL>
  <History_Count>1</History_Count>
</History>
<History>
<History_Title>WATERMARK COPY (D)</History_Title>
  <History_URL>http://hon. ***** .co.jp/cgi_bin/sukd</History_URL>
  <History_Count>1</History_Count>
</History>
```

FIG.85

(BOOKMARK FILE)

```
<Bookmark>
  <Bookmark_Title>TRANSLATION COPY(COMPANY A)</Bookmark_Title>
  <Bookmark_URL>http://hon. ****.co.jp/cgi_bin/hona</Bookmark_URL>
</Bookmark>
<Bookmark>
  <Bookmark_Title>ORIGINAL READING(B)</Bookmark_Title>
  <Bookmark_URL>http://yomi. ****.co.jp/cgi_bin/yomi b</Bookmark_URL>
</Bookmark>
```

(SERVICE USAGE INFORMATION)

```
<ID>000001</ID>
<Num_Bookmark>2</Num_Bookmark>
<Bookmark>
  <Bookmark_Title>TRANSLATION COPY(COMPANY A)</Bookmark_Title>
  <Bookmark_URL>http://hon. ***** .co.jp/cgi_bin/hona</Bookmark_URL>
</Bookmark>
<Bookmark>
  <Bookmark_Title>ORIGINAL READING(B)</Bookmark_Title>
  <Bookmark_URL>http://yomi. ***** .co.jp/cgi_bin/yomi b</Bookmark_URL>
</Bookmark>
<Num_History>3</Num_History>
<History>
<History_Title>TRANSLATION COPY(COMPANY A)</History_Title>
  <History_URL>http://hon. ***** .co.jp/cgi_bin/hona</History_URL>
  <History_Count>3</History_Count>
</History>
<History>
<History_Title>ORIGINAL READING (B)</History_Title>
  <History_URL>http://yomi. ***** .co.jp/cgi_bin/yomi b</History_URL>
  <History_Count>1</History_Count>
</History>
<History>
<History_Title>WATERMARK COPY (D)</History_Title>
  <History_URL>http://hon. ***** .co.jp/cgi_bin/sukd</History_URL>
  <History_Count>1</History_Count>
</History>
```

FIG.89

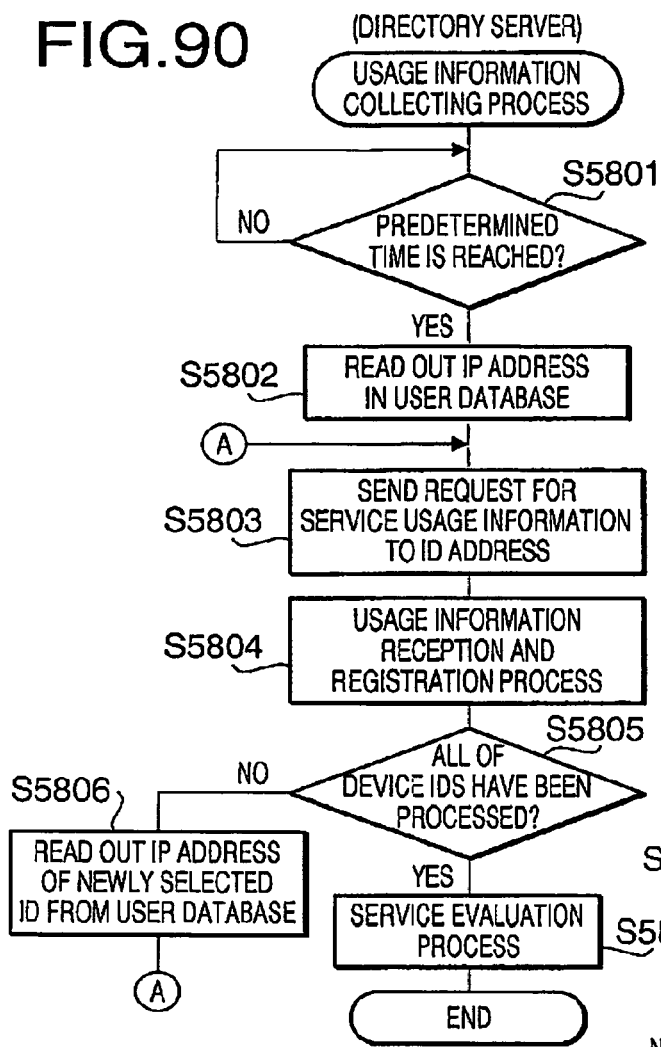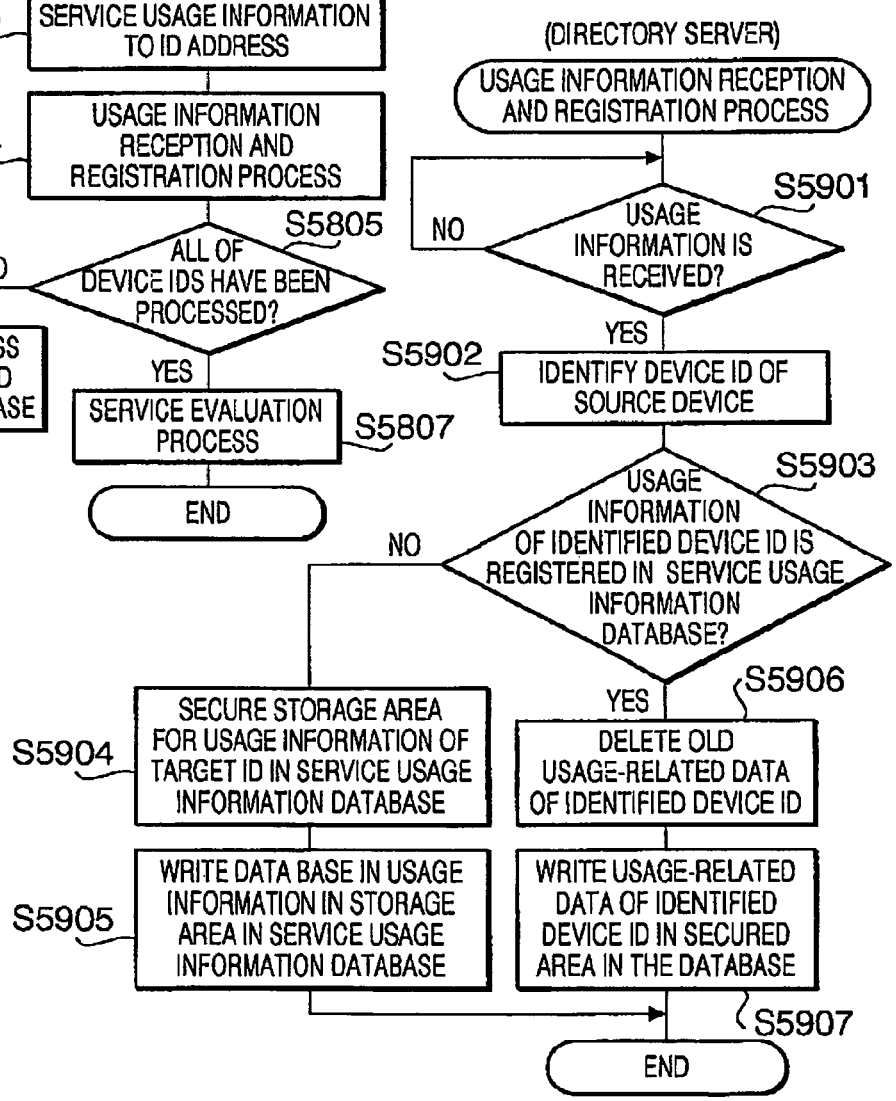

FIG. 92

| ID | BOOKMARK DATA | | USAGE HISTORY DATA | | | WEIGHTED USAGE COUNT | REPEAT COUNT |
|---|---|---|---|---|---|---|---|
| | SERVICE NAME | URL | SERVICE NAME | URL | USAGE COUNT | | |
| 000001 | TRANSLATION COPY (COMPANY A) | http://... | TRANSLATION COPY (COMPANY A) | http://... | 1 | 2 | 1 |
| | | | WATERMARK COPY (A) | / | 1 | 1 | 0 |
| | ORIGINAL READING (B) | http://... | ORIGINAL READING (B) | http://... | 0 | 1 | 1 |
| 000002 | TRANSLATION COPY (COMPANY B) | http://... | TRANSLATION COPY (COMPANY B) | http://... | 3 | 4 | 1 |
| | VOICE-TEXT CONVERSION(A) | http://... | VOICE-TEXT CONVERSION(A) | / | 1 | 2 | 1 |
| | | | IMAGE CONVERSION (C) | / | 1 | 1 | 0 |
| 000003 | TRANSLATION COPY (COMPANY A) | http://... | TRANSLATION COPY (COMPANY A) | http://... | 1 | 2 | 1 |
| | TRANSLATION COPY (COMPANY B) | http://... | TRANSLATION COPY (COMPANY B) | http://... | 4 | 5 | 1 |
| | ORIGINAL READING (B) | http://... | ORIGINAL READING (B) | http://... | 2 | 3 | 1 |
| | | | VOICE-TEXT CONVERSION(A) | / | 2 | 2 | 1 |
| ... | ... | | ... | ... | ... | ... | ... |

(PIECES OF BOOKMARK DATA) (PIECES OF USAGE HISTORY DATA) (SERVICE USAGE INFORMATION 27)

(EVALUATION TABLE 28)

| CATEGORY | SERVICE NAME | BOOKMARK TOTAL COUNT | TOTAL USAGE COUNT | TOTAL REPEAT COUNT | EVALUATION VALUE |
|---|---|---|---|---|---|
| ... | ... | ... | ... | ... | ... |
| TRANSLATION COPY | TRANSLATION COPY (COMPANY A) | *** | *** | *** | 30 |
| | TRANSLATION COPY (COMPANY B) | *** | *** | *** | 50 |
| | TRANSLATION COPY (COMPANY C) | *** | *** | *** | 10 |
| | TRANSLATION COPY (COMPANY D) | *** | *** | *** | 40 |
| WATERMARK COPY | WATERMARK COPY (A) | *** | *** | *** | *** |
| | WATERMARK COPY (B) | *** | *** | *** | *** |
| | ... | ... | ... | ... | ... |
| ORIGINAL READING | ORIGNAL READING (A) | *** | *** | *** | *** |
| | ORIGNAL READING (B) | *** | *** | *** | *** |
| | ... | ... | ... | ... | ... |
| ... | | ... | ... | ... | ... |

(SERVICE LIST)

FIG. 95

```
<ID>21111111</ID>
<Title>TRANSLATION COPY</Title>
<Type>MENU</Type>
<Num_Link>4</Num_Link>
<Link>
  <Link_Title>TRANSLATION COPY(COMPANY B)</Link_Title>
  <Link_Location>http://hon.****.co.jp/cgi_bin/honb</Link_Location>
</Link>
<Link>
  <Link_Title>TRANSLATION COPY(COMPANY D)</Link_Title>
  <Link_Location>http://hon.****.co.jp/cgi_bin/hond</Link_Location>
</Link>
<Link>
  <Link_Title>TRANSLATION COPY(COMPANY A)</Link_Title>
  <Link_Location>http://hon.****.co.jp/cgi_bin/hona</Link_Location>
</Link>
<Link>
  <Link_Title>TRANSLATION COPY(COMPANY C)</Link_Title>
  <Link_Location>http://hon.****.co.jp/cgi_bin/honc</Link_Location>
</Link>
```

FIG.97A

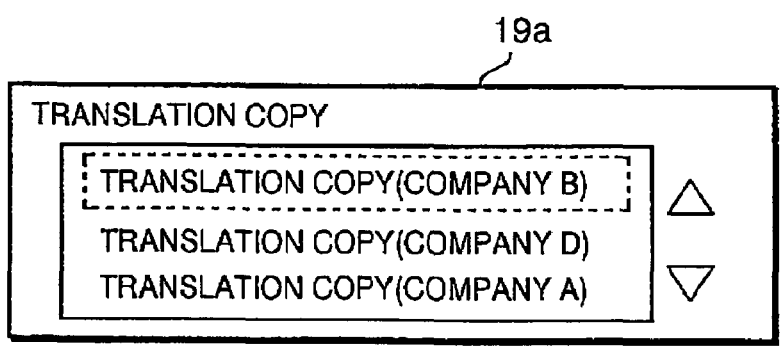

FIG.97B

```
<ID>21111111</ID>
<Title>TRANSLATION COPY</Title>
<Type>MENU</Type>
<Num_Link>4</Num_Link>
<Link>
  <Link_Evaluation>30</Link_Evaluation>
  <Link_Title>TRANSLATION COPY(COMPANY A)</Link_Title>
  <Link_Location>http://hon.*****.co.jp/cgi_bin/hona</Link_Location>
</Link>
<Link>
  <Link_Evaluation>50</Link_Evaluation>
  <Link_Title>TRANSLATION COPY(COMPANY B)</Link_Title>
  <Link_Location>http://hon.*****.co.jp/cgi_bin/honb</Link_Location>
</Link>
<Link>
  <Link_Evaluation>10</Link_Evaluation>
  <Link_Title>TRANSLATION COPY(COMPANY C)</Link_Title>
  <Link_Location>http://hon.*****.co.jp/cgi_bin/honc</Link_Location>
</Link>
<Link>
  <Link_Evaluation>40</Link_Evaluation>
  <Link_Title>TRANSLATION COPY(COMPANY D)</Link_Title>
  <Link_Location>http://hon.*****.co.jp/cgi_bin/hond</Link_Location>
</Link>
```
25b

FIG.99A

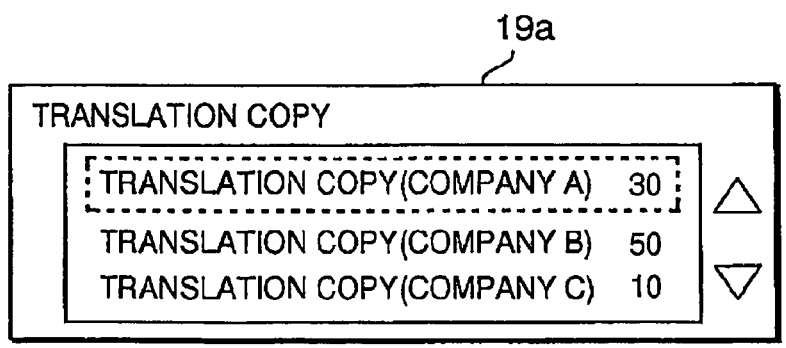

FIG.99B

SYSTEM AND DEVICE FOR IMAGE PROCESSING

CROSS-REFERENCE TO RELATED APPLICATION

This application claims priority under 35 U.S.C. §119 from Japanese Patent Applications Nos. 2004-322933, filed on Nov. 5, 2004, 2004-322939, filed on Nov. 5, 2004, 2004-322940, filed on Nov. 5, 2004, 2004-322943, filed on Nov. 5, 2004, 2004-322947, filed on Nov. 5, 2004, 2004-322949, filed on Nov. 5, 2004. The entire subject matters of the applications are incorporated herein by reference.

FIELD

Aspects of the present invention relates to an image processing system for processing images.

BACKGROUND

A network based image processing system has been used. An example of network based image processing system is disclosed in Japanese Patent Provisional Publication No. HEI 9-238215. In the system disclosed in the publication, a digital copying device is connected to a host computer having the function that the digital copying device does not have. The digital copying device sends a control command code and the density of an image to the host computer, while the host computer analyzes the received control command code and executes image processing by using an image editing function associated with image data to be processed.

The image data processed by the host computer is then sent back to the digital copying device, and is printed by the digital copying device. In the system, if new functions are added to the host computer, data indicating the new function is provided from the host computer to the digital copying device, and the digital copying device operates to request a user to select a new function to be added to the digital copying device. In other words, in the system, a new function, which the user wants to use, is made available when the new function is selected and registered by the user in the digital copying device.

However, the above system is unsuitable for environments in which the number of services randomly increases and decreases from day to day (like general servers on the Internet).

Specifically, since each function added to the host computer becomes available to the user when the user registers the function in the digital copying device in the system explained above, in environments (like general servers on the Internet) in which various types of services are added and removed frequently, the user has to conduct the registration of functions in the digital copying device very often, with an increasing amount of information to be registered.

SUMMARY

Aspects of the present invention are advantageous in that they provide at least one of a system and device for processing images adapted to a network environment in which the types of services and the number of services of a server frequently change.

BRIEF DESCRIPTION OF THE ACCOMPANYING DRAWINGS

FIG. 2 is a schematic diagram showing an operation panel of an MFP (Multi Function Peripheral) in the image processing system in accordance with aspects of the invention.

FIG. 3 is an explanatory drawing showing an example of a data structure of top service definition information in accordance with aspects of the invention.

FIG. 4 is an explanatory drawing showing an example of a data structure of service definition information regarding a copy application service in accordance with aspects of the invention.

FIGS. 6 to 8 are explanatory drawings showing an example of a data structure of service I/F information corresponding to a translation copy service in accordance with aspects of the invention.

FIGS. 10A and 10B are schematic diagrams for explaining resolutions that can generally be set to the MFP in accordance with aspects of the invention.

FIGS. 55 and 56 show examples of cache management information.

FIG. 57 is a flowchart illustrating a cache management information update process 2.

FIG. 64 shows an example of an HTML file of a traffic guidance page.

FIG. 67 illustrates an example of a directory server list.

FIG. 68 illustrates an example of top service definition information.

FIG. 69 illustrates an example of category service definition information.

FIGS. 78A, 78B and 78C illustrate examples of service selection screens respectively corresponding to pieces of service definition information.

FIGS. 79 to 81 show examples of the service definition information in FIGS. 78A, 78B and 78C, respectively.

FIG. 85 shows an example of a data structure of a usage history file.

FIG. 89 shows an example of service usage information generated by the service usage information generating process.

FIG. 90 is a flowchart illustrating a usage information collecting process.

FIG. 91 is a flowchart illustrating a usage information reception and registration process.

FIG. 92 illustrates an example of a service usage information database.

FIG. 95 illustrates an example of an evaluation table.

FIG. 97A illustrates an example of the service definition information updated by the service definition information update process.

FIG. 97B illustrates an example of a service selection screen based on updated service definition information.

FIG. 99A is a flowchart illustrating an example of service definition information generated by the service definition information update process of FIG. 98.

FIG. 99B is an example of a service selection screen of the service definition information shown in FIG. 99A.

DETAILED DESCRIPTION

General Overview

Figure 1:
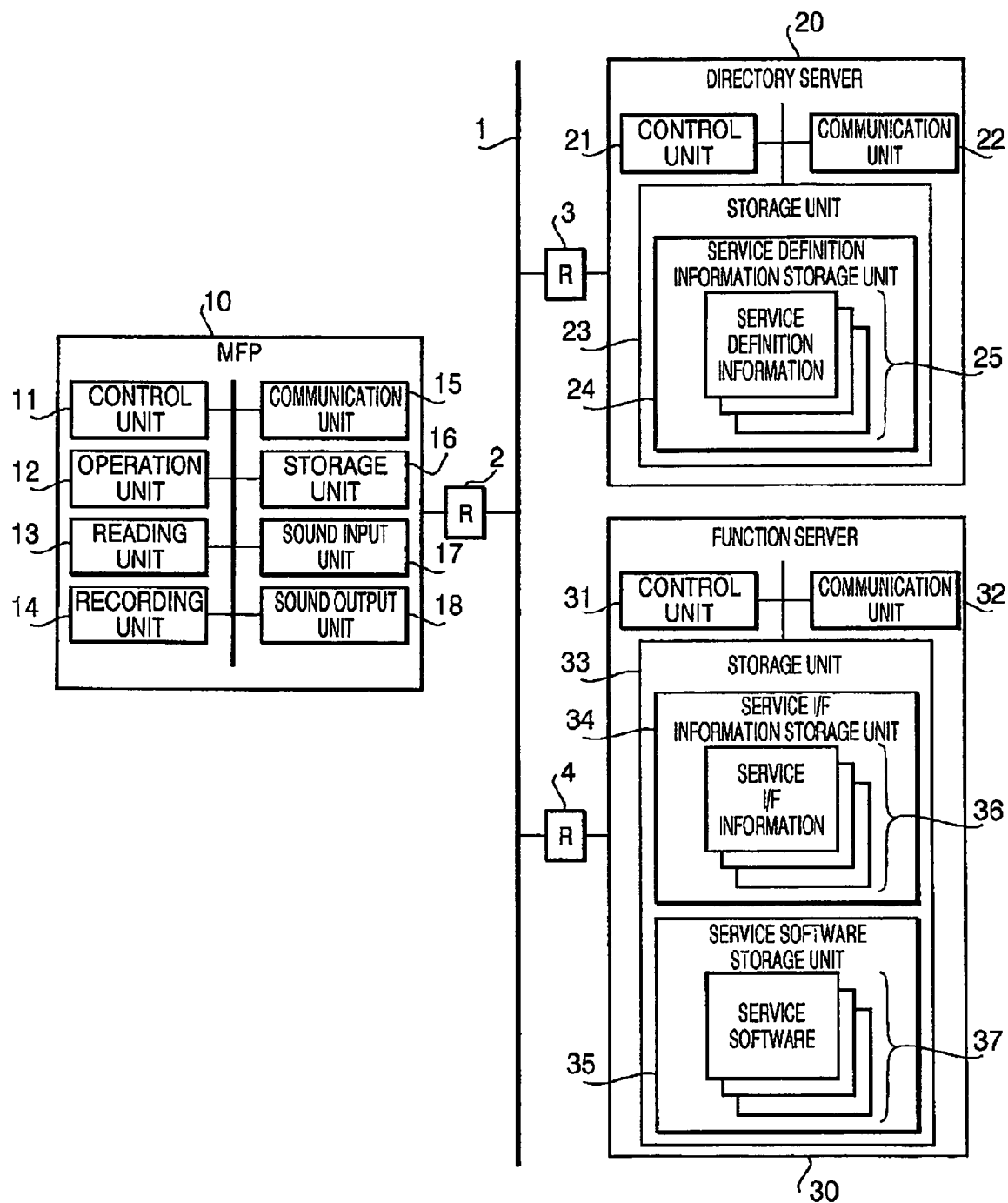
FIG. 1 is a block diagram showing the overall composition of an image processing system in accordance with aspects of the invention.

It is noted that various connections are set forth between elements in the following description. It is noted that these connections in general and unless specified otherwise, may be direct or indirect and that this specification is not intended to be limiting in this respect.

According to an aspect of the invention, there is provided an image processing system, which includes an image processing device including at least one of an image reading unit which reads an image and generates image data representing the image and an image printing unit which prints an image represented by image data, a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. In this system, the information supply unit includes a service storage unit that stores the information on services executable by the service supply unit, and a service information transmitting unit that transmits the information on services stored in the service storage unit to the image processing device. The image processing device includes: a service determination unit which presents the information on services transmitted from the information supply unit to a user, allows the user to select a service from the presented information, and determines that the selected service is to be requested from the service supply unit; and a service requesting unit which requests the service supply unit to execute the service determined by the service determination unit. The service supply unit includes a service execution unit that executes the service requested by the image processing device.

According to the image processing system described above, the image processing device (such as a multifunction peripheral) is allowed to select a desirable service to be requested from the service supply unit based on the information on services transmitted from the information supply unit. Therefore, it is not necessary for the image processing device to save information regarding the types and the locations of available services even if the number of available services increases enormously. It is understood that the image processing system is suitable for environments in which the number of available services randomly increases and decreases from day to day (like general servers on the Internet).

Optionally, the image processing device may include a service information request unit that sends a request for the information on services to the information supply unit. The service information transmitting unit may transmit the information on services to the image processing device in response to receiving the request from the service information request unit.

Still optionally, the image processing device may include a service request judgment unit that judges whether the image processing device is in a state where the image processing device should request a service from the service supply unit. The service information request unit may send the request for the information on services to the information supply unit if the service request judgment system judges that the image processing device is in the state where the image processing device should request a service from the service supply unit.

Still optionally, the service determination unit may determine the service to be requested from the service supply unit by displaying the information on services and accepting a user input for selecting the service.

Still optionally, the service supply unit may include a service notification unit that transmits the information on services executable by the service supply unit to the information supply unit. The information supply unit may include a service information update unit that updates the information on services stored in the service storage unit based on the information on services transmitted from the service supply unit.

Still optionally, if a service executable by the service supply unit is modified, the service notification unit may transmit information on the modified service to the information supply unit.

Still optionally, the image processing system may include a parameter setting information transmission unit that transmits parameter setting information for requesting parameters necessary for execution of services to the image processing device. In this case, the image processing device may include a parameter setting unit that sets parameters using the parameter setting information, and a parameter transmission unit that transmits the parameters set by the parameter setting unit to the service supply unit. The service execution unit may execute the service requested by the image processing device in accordance with the parameters transmitted from the parameter transmission unit.

Still optionally, the information supply unit and the service supply unit may be implemented on a computer.

Still optionally, the image processing system may include image processing devices each of which functions as the image processing device. In this case, at least a part of functions of the information supply unit may be incorporated in a part of the image processing devices.

Still optionally, the image processing system may include image processing devices each of which functions as the image processing device. In this case, at least a part of functions of the information supply unit and the service supply unit may be incorporated in a part of the image processing devices.

Still optionally, the image processing device may include a function execution unit that executes a function of the image processing device in response to the image processing device receives the service from the service supply unit. The information supply unit may include an environment selection unit that selects a service suitable for a usage environment of the image processing device from among the services executable by the service supply unit. Further, the service information transmitting unit may transmit the information regarding a service selected by the environment selection unit.

Since the environment selection unit selects a service suitable for the usage environment of the image processing device, the image processing device is able to securely select a service matching the device's own usage environment.

Still optionally, the usage environment may relate to performance of the function of the image processing device.

Still optionally, the image processing device may include an environment notification unit that supplies the environment selection unit with the usage environment. The environment selection unit may select the service in accordance with the usage environment supplied by the environment notification unit.

Still optionally, the image processing device may include a user identification unit that identifies users who use the image processing device, an information extraction unit that extracts permission information corresponding to a user identified by the user identification unit from a database in which pieces of permission information are respectively associated with users (the permission information representing services which the user has permitted), and a permission notification unit that identifies the permission information extracted by the information extraction unit to the information supply unit. In this case, the environment selection unit may select a service from services indicated in the permission information provided by the permission notification unit.

Still optionally, the service information transmitting unit may transmit the information regarding which language matches a language setting of the image processing device to which the information on services is to be provided.

Still optionally, the image processing device may includes a service information request unit that sends a request for the information on services to the information supply unit, and a language notification unit that identifies the language setting to the information supply unit. In this case, the service information transmitting unit may transmit the information of which language matches the language setting identified by the language notification unit in response to the information supply unit receives the request from the service information request unit.

Still optionally, the information transmitted from the service information transmitting unit to the image processing device may have a data structure enabling the information to be displayed on a display unit of the image processing device regardless of specifications of the display unit.

Such a configuration enables the image processing device to properly and easily generate a screen based on the information on services.

Still optionally, the information may have a hierarchical structure in which items used for selection of services are layered in a predetermined order.

Still optionally, the information supply unit may have display language information used to generate the information on services in one of multiple different languages. The information supply unit may generate the information on services corresponding to a designated language designated by the image processing device in accordance with the display language information and transmits the information on services through the service information transmitting unit. Further, the image processing device may operate to transmit the designated language, by which information is displayed on the image processing device, to the information supply unit before the information on services is transmitted from the information supply unit to the image processing device, so as to obtain the information on services matching the designated language.

Still optionally, the information processing device may include a list generation unit that generates a list of services specified by the information on services provided by the service information transmitting unit, and a list display unit that displays the list on a display of the image processing device. In this case, the service determination unit may operate to allow the user to select a service from the services in the list.

With this configuration, a user of the image processing device is allowed to select a service through the displayed list. Such a configuration allows the user to easily and reliably select a desirable service.

Still optionally, the list generation unit may generate the list so that the services in the list are different from each other.

Still optionally, the list generation unit may generate the list so that the services are sorted according to a predetermined rule.

Still optionally, the image processing system may include information supply units each of which functions as the information supply unit. In this case, the list generation unit may generate the list according to the information on services provided to one of the plurality of information supply units satisfying a predetermined generation condition.

Still optionally, the image processing device may include a notification request unit which sends a request for the information on services to the information supply unit. The information supply unit may operate to supply the information on services to the image processing device in response to the information supply unit receives the request from the notification request unit.

Still optionally, the image processing system may include image processing devices each of which functions as the image processing device, and service supply units each of which functions as the service supply unit. In this case, each image processing device may include a history generation unit which generates history information concerning user operations for receiving services from the service supply units. The image processing system may further include a history acquisition unit which obtains the history information from each image processing device, and an evaluation unit which performs an evaluation on the services of the service supply units based on the history information obtained by the history acquisition unit.

With this configuration, it becomes possible to rapidly and properly evaluate each service in view of popularity with users in comparison with the case where each service is evaluated based on a questionnaire on the services.

Still optionally, the image processing system may include an evaluation result providing unit which sends an evaluation result made by the evaluation unit to each image processing device.

Still optionally, the service information transmitting unit may include a list transmission unit which transmits service list information representing a list of services executable by the service supply units and an evaluation result made by the evaluation unit to an image processing device in response to the service information transmitting unit receives a request signal requesting the list of services.

Still optionally, the image processing system may include a list generation unit which generates service list information in which identification of the services is arranged in a predetermined rule and an evaluation result made by the evaluation unit is contained, and a list transmission unit which transmits the service list information made by the list generation unit to one of the image processing devices in response to the list transmission unit receiving a request signal requesting the list of services from the one of the image processing devices.

Still optionally, each image processing device may be configured to transmit the history information to the history acquisition unit in response to receiving a request for the history information. In this case, the history acquisition unit may send the request for history information to each image processing device to obtain the history information from each image processing device.

Still optionally, each image processing device may be configured to transmit the history information to the history acquisition unit. In this case, the history acquisition unit may be configured to receive the history information transmitted from each image processing device.

Still optionally, the history generation unit may include a bookmark registration unit which generates bookmark information in which an identification of a registration target service is associated with destination information used for sending a request signal for a service to the service supply unit by which the registration target service is to be provided, in response to a user command for service registration being input, and stores the bookmark information in a storage unit. In this case, each image processing device may operate to transmit the bookmark information to the history acquisition unit as the history information, to obtain the destination information corresponding to the identification of a service requested by a user from the storage unit in response to receiving a usage command for the service from the user, to send a request for a service to the service supply unit corresponding to the service designated by the usage command.

Still optionally, the history generation unit may include a usage count recording unit which generates usage count information representing the number of times that the image processing device requests a service, and stores the usage count information in a storage unit thereof, the usage count information being generated for each service. In this case, each image processing device may be configured to transmit the usage count information generated by the usage count recording unit to the history acquisition unit as the history information.

According to another aspect of the invention, there is provided an image processing system, which includes an image processing device including at least one of an image reading unit which reads an image and generates image data representing the image and an image printing unit which prints an image represented by image data, a service supply unit configured to execute a service regarding at least one of image data generated by the image reading unit and image data representing an image to be printed by the image printing unit, in response to a request from the image processing device, and a parameter setting information transmission unit that transmits parameter setting information for requesting parameters for execution of services to the image processing device. In this system, the image processing device includes a service determination unit which allows a user to select a service and determines that the selected service is to be requested from the service supply unit, a service requesting unit which requests the service supply unit to execute the service determined by the service determination unit, a parameter setting unit that sets parameters using the parameter setting information, and a parameter transmission unit that transmits the parameters set by the parameter setting unit to the service supply unit. The service supply unit includes a service execution unit that executes the service requested by the image processing device in accordance with the parameters transmitted from the parameter transmission unit.

According to the image processing system described above, the image processing device is allowed to set the parameters using the parameter setting information transmitted from the parameter setting information transmission unit. It is not necessary for the image processing device to save information concerning parameter setting. It is understood that the image processing system is suitable for environments in which the number of available services randomly increases and decreases from day to day (like general servers on the Internet).

Optionally, the image processing device may include a parameter setting information request unit that requests the parameter setting information transmission unit to transmit the parameter setting information. In this case, the parameter setting information transmission unit may transmit the parameter setting information to the image processing device in response to the parameter setting information transmission unit being requested to transmit the parameter setting information by the image processing device.

Still optionally, the parameter setting information request unit may request the parameter setting information from the parameter setting information transmission unit in response to the service requesting unit requesting the service supply unit to execute the service.

Still optionally, the parameter setting unit may set the parameters by displaying the parameter setting information and accepting a user input for setting the parameters.

Still optionally, the parameter setting information may relate to setting of parameters concerning one of the image reading unit and the image printing unit.

Still optionally, the parameters requested through the parameter setting information may be a part of parameters settable in the image processing device.

Still optionally, the image processing device may include at least one of a sound input unit used to input sound and a sound output unit used to output sound. In this case, the service supply unit may be configured to execute a service regarding at least one of the sound inputted through the sound input unit and the sound to be outputted through the sound output unit.

Still optionally, the image processing system may include image processing devices each of which functions as the image processing device. In this case, at least a part of functions of the service supply unit may be incorporated in a part of the image processing devices.

Still optionally, the image processing system may include image processing devices each of which functions as the image processing device. In this case, at least a part of functions of the parameter setting information transmission unit may be incorporated in a part of the image processing devices.

Still optionally, the image processing system may include an information supply unit which supplies the image processing device with information on services executable by the service supply unit. In this case, the service determination unit may present the information on services transmitted from the information supply unit to a user, allow the user to select a service from the presented information, and determine that the selected service is to be requested from the service supply unit.

Still optionally, the parameter setting information transmitted from the parameter setting information transmission unit to the image processing device may have a data structure enabling the parameter setting information to be displayed on a display unit of the image processing device regardless of specifications of the display unit.

Such a configuration enables the image processing device to properly and easily generate a screen based on the parameter setting information on services.

Still optionally, the parameter setting information may have a hierarchical structure in which items used for input of parameters are layered in a predetermined order.

Still optionally, the information supply unit may have display language information used to generate the information on services in one of multiple different languages. The information supply unit may generate the information on services corresponding to a designated language designated by the image processing device in accordance with the display language information and transmits the information on services through the service information transmitting unit. Further, the image processing device may operate to transmit the designated language, by which information is displayed on the image processing device, to the information supply unit before the information on services is transmitted from the information supply unit to the image processing device, so as to obtain the information on services matching the designated language.

Still optionally, the image processing system may include a server including the parameter setting information transmission unit. In this case, the server may include a server side storage unit which stores the parameter setting information while associating the parameter setting information with grouping information. The parameter setting information transmission unit may transmit the parameter setting information along with the corresponding grouping information to the image processing device. In this case, the image processing device may include a device side storage unit which stores the parameter setting information while associating the parameter setting information with the grouping information, and a device control unit which operates to judge whether required information is stored in the device side storage unit, to use the required information in the device side storage unit if the required information is stored in the device side storage unit, to request the requested information from the server if the requested information is not stored in the device side storage unit, and to store the requested information supplied by the server in the device side storage unit while associating the requested information with the corresponding grouping information. Further, the device control unit may operate to judge whether an amount of stored information of the device side storage unit reaches a predetermined upper limit, to search the device side storage unit for information corresponding to the grouping information matching a predetermined condition, to delete the information corresponding to the grouping information matching the predetermined condition if the information is searched, while storing information newly provided by the server in the device side storage unit while associating the newly provided information with corresponding grouping information, and to store the newly provided information in the device side storage unit without deleting information in the device side storage unit if the amount of stored information does not reach the predetermined upper limit.

According to the configuration as described above, the judgment as to whether to delete a file is performed in accordance with the grouping information. Therefore, the possibility, that a file (information) having a high possibility of being used again is deleted, decreases. Therefore, the possibility of accessing to obtain such a file also decreases. The processing burden on a server (which provides the image processing device with the file) decreases. The usability of the image processing device can be enhanced.

Still optionally, the grouping information may be categorized into a first type grouping information and a second type grouping information. The first type grouping information may consist of main grouping information, and the second type grouping information may include the main grouping information and sub-grouping information. In this case, the device control unit may operate to judge whether information related to the second type grouping information having main grouping information equal to main grouping information of the first type grouping information judged to satisfy the predetermined condition in the searching is stored in the device side storage unit, to remove the first type grouping information from judgment conducted according to the predetermined condition, and to conduct the searching again.

Still optionally, the device control unit may operate to obtain time information when acquisition of information is required, to store the time information while associating the time information with the corresponding grouping information or the corresponding information, and to search for the information satisfying the predetermined condition using the time information as the predetermined condition.

Still optionally, the device control unit may operate to obtain frequency of occurrence of requests for information, store the frequency in the device side storage unit while associating the frequency with the corresponding information or the grouping information, and to search for the information satisfying the predetermined condition using the frequency as the predetermined condition.

According to another aspect of the invention, there is provided an image processing device forming an image processing system. The image processing device includes at least one of an image reading unit which reads an image and generates image data representing the image and an image printing unit which prints an image represented by image data. The image processing system includes a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. In this structure, the image processing device includes a service determination unit which presents the information on services transmitted from the information supply unit to a user, allows the user to select a service from the presented information, and determines the selected service as a service to be requested from the service supply unit, and a service requesting unit which requests the service supply unit to execute the service determined by the service determination unit.

According to the image processing system described above, the image processing device (such as a multifunction peripheral) is allowed to select a desirable service to be requested from the service supply unit based on the information on services transmitted from the information supply unit. Therefore, it is not necessary for the image processing device to save information regarding the types and the locations of available services even if the number of available services increases substantially. The image processing device suitable for environments in which the number of available services randomly increases and decreases from day to day (like general servers on the Internet) can be provided.

According to another aspect of the invention, there is provided an image processing device forming an image processing system. The image processing device includes at least one of an image reading unit which reads an image and generates image data representing the image and an image printing unit which prints an image represented by image data. The image processing system includes a service supply unit configured to execute a service regarding at least one of image data generated by the image reading unit and image data representing an image to be printed by the image printing unit, in response to a request from the image processing device, and a parameter setting information transmission unit that transmits parameter setting information for requesting parameters for execution of services to the image processing device. In this structure, the image processing device includes a service determination unit which allows a user to select a service and determines that the selected service is to be requested from the service supply unit, a service requesting unit which requests the service supply unit to execute the service determined by the service determination unit, a parameter setting unit that sets parameters using the parameter setting information, and a parameter transmission unit that transmits the parameters set by the parameter setting unit to the service supply unit.

According to the image processing system described above, the image processing device is allowed to set the parameters using the parameter setting information transmitted from the parameter setting information transmission unit. It is not necessary for the image processing device to save information concerning parameter setting. The image processing device suitable for environments in which the number of available services randomly increases and decreases from day to day (like general servers on the Internet) can be provided.

According to another aspect of the invention, there is provided a server forming an image processing system. The image processing system includes an image processing device including at least one of an image reading unit which reads an image and generates image data representing the image and an image printing unit which prints an image represented by image data, and an information supply unit which supplies the image processing device with information on services executable by the service supply unit, In this structure, the server includes a service supply unit configured to execute a service regarding at least one of image data generated by the image reading unit and image data representing an image to be printed by the image printing unit, in response to a request from the image processing device. The information supply unit includes a service storage unit that stores the information on services executable by the service supply unit, and a service information transmitting unit that transmits the information on services stored in the service storage unit to the image processing device. The image processing device includes a service determination unit which presents the information on services transmitted from the information supply unit to a user, allows the user to select a service from the presented information, and determines that the selected service is to be requested from the service supply unit, and a service requesting unit which requests the service supply unit to execute the service determined by the service determination unit. The service supply unit includes a service execution unit that executes the service requested by the image processing device.

The server allows the image processing device (such as a multifunction peripheral) is to select a desirable service to be requested from the service supply unit based on the information on services transmitted from the information supply unit. Therefore, it is not for the image processing device to save information regarding the types and the locations of available services even if the number of available services increases enormously. The server suitable for environments in which the number of available services randomly increases and decreases from day to day (like general servers on the Internet) can be provided.

According to another aspect of the invention, there is provided a server forming an image processing system. The image processing system includes an image processing device including at least one of an image reading unit which reads an image and generates image data representing the image and an image printing unit which prints an image represented by image data, and a service supply unit configured to execute a service regarding at least one of image data generated by the image reading unit and image data representing an image to be printed by the image printing unit, in response to a request from the image processing device. In this structure, the server includes an information supply unit which supplies the image processing device with information on services executable by the service supply unit. The information supply unit includes a service storage unit that stores the information on services executable by the service supply unit, and a service information transmitting unit that transmits the information on services stored in the service storage unit to the image processing device. The image processing device includes a service determination unit which presents the information on services transmitted from the information supply unit to a user, allows the user to select a service from the presented information, and determines that the selected service is to be requested from the service supply unit, and a service requesting unit which requests the service supply unit to execute the service determined by the service determination unit. The service supply unit includes a service execution unit that executes the service requested by the image processing device.

The server allows the image processing device to set the parameters using the parameter setting information transmitted from the parameter setting information transmission unit. It is not necessary for the image processing device to save information concerning parameter setting. The server is suitable for environments in which the number of available services randomly increases and decreases from day to day (like general servers on the Internet) can be provided.

According to another aspect of the invention, there is provided an image processing device forming an image processing system. The image processing device includes at least one of an image reading unit which reads an image and generates image data representing the image and an image printing unit which prints an image represented by image data. The image processing system includes a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. In this structure, the image processing device includes an environment notification unit that supplies the information supply unit with usage environment of the image processing device, a service determination unit which presents the information on services transmitted from the information supply unit to a user, allows the user to select a service from the presented information, and determines that the selected service is to be requested from the service supply unit, a service requesting unit which requests the service supply unit to execute the service determined by the service determination unit, and a function execution unit which executes a function of the image processing device in response to the image processing device receives the service from the service supply unit. The information on services provided by the information supply unit relates to services suitable for the usage environment of the image processing device.

Since the environment selection unit selects a service suitable for the usage environment of the image processing device, the image processing device is able to securely select a service matching the device's own usage environment.

According to another aspect of the invention, there is provided a server forming an image processing system. The image processing system includes the image processing device having at least one of an image reading unit which reads an image and generates image data representing the image and an image printing unit which prints an image represented by image data, and a service supply unit configured to execute a service regarding at least one of image data generated by the image reading unit and image data representing an image to be printed by the image printing unit, in response to a request from the image processing device. In this structure, the server includes an environment selection unit that selects a service suitable for a usage environment of the image processing device from among the services executable by the service supply unit, and an information supply unit which supplies the image processing device with information on services executable by the service supply unit. The information supplied by the information supply unit relates to the service selected by the environment selection unit.

Since the environment selection unit selects a service suitable for the usage environment of the image processing device, the image processing device is able to securely select a service matching the device's own usage environment.

According to another aspect of the invention, there is provided an image processing device forming an image processing system. The image processing device includes at least one of an image reading unit which reads an image and generates image data representing the image and an image printing unit which prints an image represented by image data. The image processing system includes a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. In this structure, the information supply unit includes a service storage unit that stores the information on services executable by the service supply unit, and a service information transmitting unit that transmits the information on services stored in the service storage unit to the image processing device. The image processing device includes a service determination unit which presents the information on services transmitted from the information supply unit to a user, allows the user to select a service from the presented information, and determines that the selected service is to be requested from the service supply unit, and a service requesting unit which requests the service supply unit to execute the service determined by the service determination unit. The information on services transmitted from the service information transmitting unit to the image processing device has a data structure enabling the information to be displayed on a display unit of the image processing device regardless of specifications of the display unit.

Such a configuration enables the image processing device to properly and easily generate a screen based on the information on services.

According to another aspect of the invention, there is provided a server forming an image processing system. The image processing system includes the image processing device having at least one of an image reading unit which reads an image and generates image data representing the image and an image printing unit which prints an image represented by image data, and a service supply unit configured to execute a service regarding at least one of image data generated by the image reading unit and image data representing an image to be printed by the image printing unit, in response to a request from the image processing device. The server includes an information supply unit which supplies the image processing device with information on services executable by the service supply unit. The information on services transmitted to the image processing device has a data structure enabling the information on services to be displayed on a display unit of the image processing device regardless of specifications of the display unit.

Such a configuration enables the image processing device to properly and easily generate a screen based on the information on services.

According to another aspect of the invention, there is provided an image processing device forming an image processing system. The image processing device includes at least one of an image reading unit which reads an image and generates image data representing the image and an image printing unit which prints an image represented by image data. The image processing system may include a service supply unit configured to execute a service regarding at least one of image data generated by the image reading unit and image data representing an image to be printed by the image printing unit, in response to a request from the image processing device, a server including a parameter setting information transmission unit that transmits parameter setting information for requesting parameters for execution of services to the image processing device. In this structure, the image processing device includes a device side storage unit which stores the parameter setting information while associating the parameter setting information with grouping information, and a device control unit which operates to judge whether required information is stored in the device side storage unit, to use the required information in the device side storage unit if the required information is stored in the device side storage unit, to request the requested information from the server if the requested information is not stored in the device side storage unit, and to store the requested information supplied by the server in the device side storage unit while associating the requested information with the corresponding grouping information. The device control unit operates to judge whether an amount of stored information of the device side storage unit reaches a predetermined upper limit, to search the device side storage unit for information corresponding to the grouping information matching a predetermined condition, to delete the information corresponding to the grouping information matching the predetermined condition if the information is searched, while storing information newly provided by the server in the device side storage unit while associating the newly provided information with corresponding grouping information, and to store the newly provided information in the device side storage unit without deleting information in the device side storage unit if the amount of stored information does not reach the predetermined upper limit.

According to the configuration as described above, the judgment as to whether to delete a file is performed in accordance with the grouping information. Therefore, the possibility, that a file (information) having a high possibility of being used again is deleted, decreases. Therefore, the possibility of accessing memory to obtain such a file also decreases. The processing burden on a server (which provides the image processing device with the file) decreases. The usability of the image processing device can be enhanced.

According to another aspect of the invention, there is provided an image processing device forming an image processing system, the image processing device including at least one of an image reading unit which reads an image and generates image data representing the image and an image printing unit which prints an image represented by image data. The image processing system includes a service supply unit configured to execute a service regarding at least one of image data generated by the image reading unit and image data representing an image to be printed by the image printing unit, in response to a request from the image processing device, and an information supply unit which supplies the image processing device with information on services executable by the service supply unit. In this structure, the image processing device includes a service determination unit which presents the information on services transmitted from the information supply unit to a user, allows the user to select a service from the presented information, and determines that the selected service is to be requested from the service supply unit, and a service requesting unit which requests the service supply unit to execute the service determined by the service determination unit, a list generation unit that generates a list of services specified by the information on services provided by the service information transmitting unit, and a list display unit that displays the list on a display of the image processing device. The service determination unit operates to allow the user to select a service from the services in the list.

With this configuration, a user of the image processing device is allowed to select a service through the displayed list. Such a configuration allows the user to easily and reliably select a desirable service.

According to another aspect of the invention, there is provided a server forming an image processing system. The image processing system includes the image processing device having at least one of an image reading unit which reads an image and generates image data representing the image and an image printing unit which prints an image represented by image data, and a service supply unit configured to execute a service regarding at least one of image data generated by the image reading unit and image data representing an image to be printed by the image printing unit, in response to a request from the image processing device. In this structure the server includes a history acquisition unit which obtains history information, concerning user operations for receiving services operated on the image processing device, from the image processing device, and an evaluation unit which performs an evaluation on the services based on the history information obtained by the history acquisition unit.

With this configuration, it becomes possible to rapidly and properly evaluate each service in view of its popularity with users in comparison with the case where each service is evaluated based on a questionnaire on the services.

Aspects of the invention may be implemented in computer software as programs storable on computer-readable media including but not limited to RAMS, ROMs, flash memory, EEPROMs, CD-media, DVD-media, temporary storage, hard disk drives, floppy disks, permanent storage, and the like.

ILLUSTRATIVE EMBODIMENTS

Hereafter, illustrative embodiments according to the invention will be described with reference to the accompanying drawings.

First Embodiment

FIG. 1 is a block diagram of an image processing system 100 according to a first illustrative embodiment of the invention. As shown in FIG. 1, the image processing system 1 includes MFP (multifunction peripheral) 10, a directory server 20, and a function server 30 which are capable of communicating with each other via a wide area network 1 (e.g., the Internet). The MFP 10, the directory server 20, and the function server 30 are connected to the wide area network 1 via respective routers 2, 3 and 4. The router 2 is, for example, a broadband router which operates to close all of the ports in a normal state and to pass only a packet matching a request which is output by an internal device (e.g., the MFP 10) to connect with an external device (e.g., the function server 30).

More specifically, with regard to packets to be sent to the internal devils (e.g., the MFP 10) in a sub-network, the router 2 passes only packets, which are judged to be a response to a request from the internal device, and blocks the other packets. That is, the router 2 serves as a fire wall that blocks unauthorized accesses to the MFP 10 from the wide area network 1.

The MFP 10 has a telephone (voice communication) function, a scanner function, a printing function, a copying function, and a facsimile function. The MFP 10 is able to use various services relating to these functions through the network 1. Specifically, the function server 30 executes a service corresponding to one of the functions of the MFP 10 in response to a request from the MFP 10. In the system 100, the directory server 20 provides information to the MFP 10 regarding services that the function server 30 is able to provide.

Hereafter, configurations of the MFP 10, the directory server 20 and the function server 30 will be explained. As shown in FIG. 1, the MFP 10 includes a control unit 11, an operation unit 12, a reading unit 13, a recording unit 14, a communication unit 15, a storage unit 16, a sound input unit 17, a sound output unit 18, and a display unit 19. The control unit 11 includes a CPU (central processing unit), a ROM (read only memory) and a RAM (random access memory) not shown in FIG. 1, and controls various components in the MFP 10. In the ROM of the control unit 11, programs (see FIGS. 12 and 14 to 18) to be executed by the CPU are stored.

FIG. 2 illustrates an operation panel 12a of the operation unit 12. The operation unit 12 operates to accept a user operation and to provide a notification to a user through the operation panel 12a. Specifically, the operation panel 12a includes a copy key 41, a scanner key 42, a FAX key 43, a service key 44, a setting key 45, direction keys 46, 47, 48 and 49, an OK key 50, and a cancel key 51. Further, the operation panel 12a includes a display 52.

The reading unit 13 which serves as a scanner reads an image formed on (printed on) a sheet type recording medium (e.g. a sheet of paper) and generates image data corresponding to the read image. The recording unit 14 which serves as a printer forms an image corresponding to image data on a sheet.

The communication unit 15 controls the communication through the network 1. The storage unit 16 includes a non-volatile RAM in which various types of data are stored.

The sound input unit 17 includes a microphone installed in a handset (not shown) of the MFP 10. The sound input unit 17 generates sound data (e.g. PCM data) representing the sound obtained by the microphone. The sound output unit 18 outputs sound via a speaker installed in the handset or a speaker installed in a main body of the MFP 10.

Hereafter, the configuration of the directory server 20 will be described. The directory server 20 includes a control unit 21, a communication unit 22, and a storage unit 23. The control unit 21 includes a CPU, a ROM and a RAM not shown in FIG. 1, and controls various components in the directory server 20. In the ROM of the control unit 21, programs to be executed by the CPU of the control unit 21 are stored.

The communication unit 22 controls the communication through the network 1. The storage unit 23 includes an HDD (hard disk drive) in which various types of information are stored. Specifically, the storage unit 23 has a service definition information storage unit 24 in which pieces of service definition information 25 are stored.

The service definition information 25 is information regarding services (e.g., the type of each service, and a destination of each service) which the function server 30 is able to provide. If the service definition information is received by the MFP 10, the MFP 10 displays a service selection screen (see FIG. 5) on the display 52 to request a user of the MFP 10 to select a service.

In this embodiment, the services that the function server 30 are able to provide are categorized into three categories including a "data storage service", "print service" and "copy application service". Using the service selection screen, the MFP 10 displays the three service categories first to request the user to select one of the categories, and displays the services belonging to the selected categories to request the user to select one of the services. In the service definition information storage unit 24, the service definition information (hereafter, frequently referred to as top service definition information) corresponding to the service selection screen for selecting a category and the service definition information corresponding to the service selection screen for selecting a service are stored.

FIG. 3 shows an example of the top service definition information 25. FIG. 4 shows an example of the service definition information 25 corresponding to the "copy application service". As shown in FIGS. 3 and 4, the service definition information is described by XML (eXtensible Markup Language). Explanations about tags used in the XML data shown in FIGS. 3 and 4 are shown in a TABLE 1 below.

TABLE 1

|  | DATA NAME | DATA TYPE | REMARKS |
|---|---|---|---|
| Basic data | ID | integer | identification of service definition information |
|  | Title | string | title to be displayed |
|  | Type | 'MENU' or 'FORM' | Type of the body data. If the type is 'MENU', a link list to other information is defined. If the type is 'FORM', a data input form is defined. The type is 'MENU' for the service definition information. |
| Body data (If Type is 'MENU') | Num_Link | integer | the number of pieces of Link data |
|  | Link[ ] |  | Link data |
| Link data | Link_Title | string | string about service or information regarding a destination of link |
|  | Link_Location | string | URL for designating a service, or ID of another service definition information |

If the MFP 10 receives the top service definition information, the MFP 10 displays the service selection screen (see FIG. 5A) on the display 52. In the service selection screen, a string "DIRECTORY SERVICE" is displayed as a display title "Title" at an upper position on the display 52. Under the title "DIRECTORY SERVICE", strings "DATA STORAGE SERVICE", "PRINT SERVICE", and "COPY APPLICATION SERVICE" are displayed. In this stage, if one of the upward and downward direction keys 46 and 47 is operated, a cursor (a box indicated by a dashed line in FIGS. 5A to 5C) moves upward or downward. If the OK key 50 is pressed, selection of an item designated by the cursor is confirmed.

Each item in the service selection screen is associated with an ID of the service definition information 25 corresponding to each category by "Link_Location". If selection of an item is confirmed, the service definition information 25 of the ID corresponding to the selected item is provided to the MFP 10.

Figure 5A:
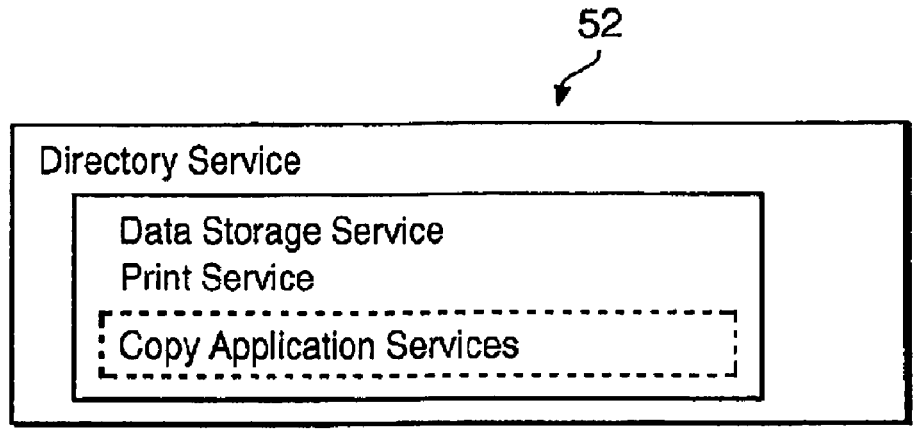
FIGS. 5A to 5C are schematic diagrams showing examples of service selection screens in accordance with aspects of the invention.
Figure 5B:
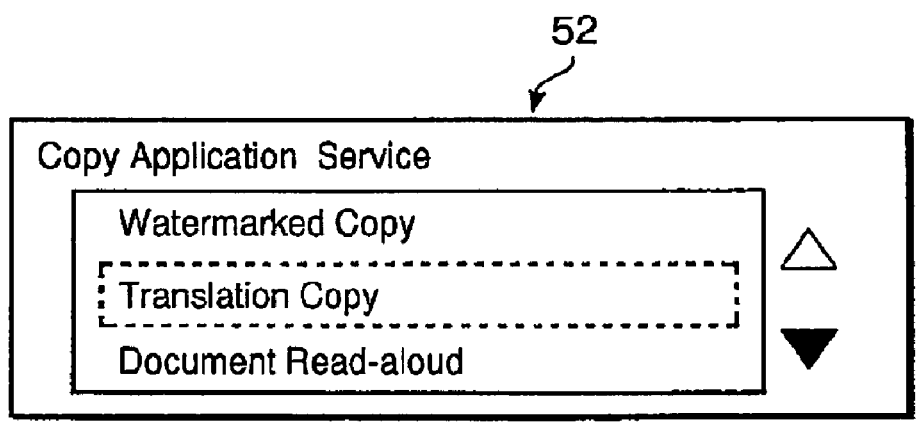

For example, if "COPY APPLICATION SERVICE" is selected in the service selection screen shown in FIG. 5A, the MFP 10 receives the service definition information shown in FIG. 4, the MFP 10 receives the service definition information shown in FIG. 4, and then the service selection screen shown in FIG. 5B is displayed on the display 52. Specifically, words "COPY APPLICATION SERVICE" is displayed on the upper portion of the display 52 as a "Title". Under the title, words "WATERMARK COPY", "TRANSLATION COPY", "ORIGINAL READING" and "VOICE-TEXT CONVERSION" are displayed.

As shown in FIG. 5B, upward and downward arrowheads are provided on the right side of the display 25a so as to scroll up or down these items if all of these items can not be displayed on the display 52 simultaneously. In the screen, if one or more items are hidden from the display 52, an arrowhead pointing in a direction in which the hidden items exist is colored black. An arrowhead is colored white if no item is hidden from the display 52 in a direction in which the arrowhead points. Therefore, a user is able to notice the presence or absence of hidden items. Since the arrowhead pointing in the downward direction is colored black in the screen shown in FIG. 5B, the user is able to notice that one or more items exist under the item "ORIGINAL READING". If the user operates the downward direction key 47 in the state of FIG. 5B, the items are scrolled down and an item "VOICE-TEXT CONVERSION" appears under the item "ORIGINAL READING" as shown in FIG. 5C.

Figure 5C:
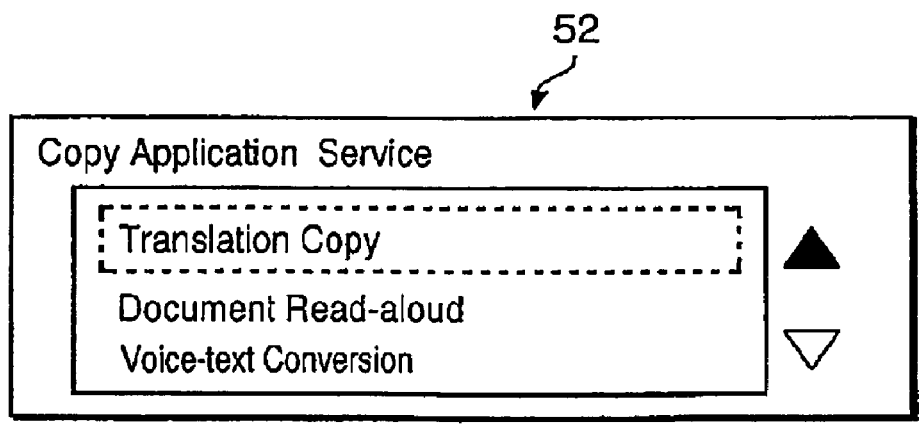

Similarly to the case of FIG. 5A, selection of an item is confirmed in the service selection screens shown in FIGS. 5B and 5C. Each item is associated with a URL ("Link_Location") for calling each service. If selection of an item is confirmed, a service at a URL corresponding to the selected item is called.

Next, the configuration of the function server 30 will be explained. The function server 30 includes a control unit 31, a communication unit 32 and a storage unit 33. The control unit 31 includes a CPU, a ROM and a RAM not shown in FIG. 1, and controls various components in the function server 30. In the ROM of the control unit 31, programs to be executed by the CPU are stored. The control unit 31 has performance much higher than that of the control unit 11 of the MFP 10. Therefore, the function server is able to execute complicated processing which is difficult for the MFP 10 to execute.

The communication unit 32 controls data communication through the network 1. The storage unit 33 includes an HDD (hard disk drive) in which various type of information is stored. Specifically, the storage unit 23 has a service I/F (interface) information area 34 for storing pieces of service I/F (interface) information 36, and a service software area 35 for storing pieces of service software 37.

Pieces of service software 37 are stored in the service software area 35, and the pieces of service software 37 correspond to the respective services that the function server 30 can provide. Specifically, the services that the function server 30 is able to provide include a service regarding image data generated by the reading unit 13 of the MFP 10, a service regarding sound data generated by the sound input unit 17 of the MFP 10, a service regarding image data to be printed by the recording unit 14 of the MFP 10, and a service regarding sound data representing sound output by the sound output unit 18 of the MFP 10. The processes described below in FIGS. 22 to 26 are attained by the pieces of service software 37.

The service I/F information 36 is used to obtain parameters necessary for execution of services from the MFP 10. Specifically, if the service I/F information 36 is received by the MFP 10, a parameter input screen (see FIGS. 9A to 9E) is displayed on the display 52 to request a user of the MFP 10 to set parameters. In the service I/F (interface) information area 34, pieces of service I/F information 34 respectively corresponding to the services that the function server 30 can provide are stored.

FIGS. 6 to 8 show an example of the service I/F information 36. The service I/F information 36 shown in FIGS. 6 to 8 is used for a translation copy service in which text data is recognized from an image generated by the reading unit 13 by an OCR (optical character recognition) processing, image data representing data corresponding to translation of the text data is generated, and the image data is printed by the recording unit 14. The service I/F information 36 is also described by the same mark-up language as the service definition information 25. Definitions of the tags used in FIGS. 6 to 8 are shown in Table 2. In Table 2, the basic data is equivalent to those shown in Table 1.

TABLE 2

|  | DATA NAME | DATA TYPE | EXPLANATION |
|---|---|---|---|
| Basic data | ID | integer | identification of service I/F information |
|  | Title | string | title to be displayed |
|  | Type | 'MENU' or 'FORM' | Type of the body data If the type is 'MENU', a link list to other information is defined. If the type is 'FORM', a data input form is defined. The type is 'FORM' for the service I/F information. |
| Body data (IF TYPE IS 'FORM') | Action | URL string | URL of a program to be processed using input data |
|  | Num_Form_Elem | integer | the number of "Form_Elem"s |
|  | Form_Elm[ ] | — | Form element data depending on Type |
| Form_Elem data (Form element data) | Form_Type | 'Text' or 'Password' or 'Select' | Type of Form elements |
|  | Form_Data | — | Data depending on Type |
| Form_Data data ('Text' or 'Password') | Disp_Name | string | explanation about input item |
|  | Value_Name | string | A name of a variable used to send as data |
|  | Max_Byte | integer | The maximum number of bytes of a string |
|  | Default_String | string | A string to be initially displayed on a input area |
| Form_Data data (Select) | Disp_Name | string | explanation about input item |
|  | Value_Name | string | A name of a variable used to send as data |
|  | Multi_Select | 0 or 1 | 0: multiple selection is not allowed 1: multiple selection is allowed |
|  | Num_Option | integer | the number of selection items |
|  | Option[ ] | — | information about selection items |
| Option data | Disp_Select | string | string representing options |
|  | Disp_Value | string | value to be sent as data when it is selected |
|  | Default_Select | 0 or 1 | 0: Not selected in an initial state 1: selected in an initial state |

Figure 9A:
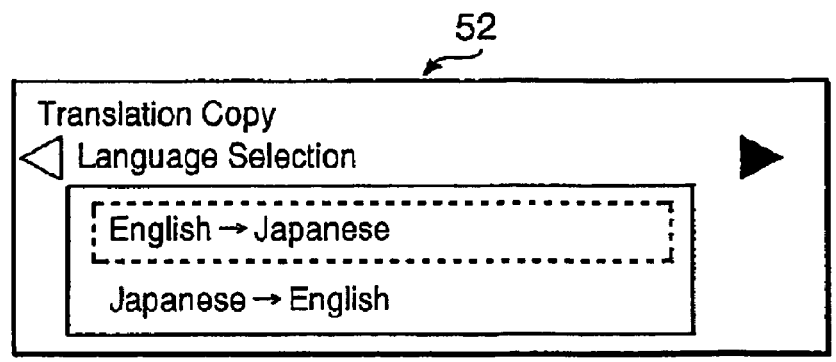
FIGS. 9A to 9E are schematic diagrams showing examples of parameter input screens in accordance with aspects of the invention.

If the service I/F information 36 shown in FIGS. 6 to 8 is received by the MFP 10, the parameter input screen shown in FIG. 9A is displayed on the display 52 of the operation panel 12a. In the parameter input screen, a string "TRANSLATION COPY" is displayed at the upper portion on the display 52 as a "Title". Under the title, words "LANGUAGE, SELECTION" are displayed as an input item ("Disp_Name"). Under the input item, words "ENGLISH→JAPANESE" and "JAPANESE→ENGLISH" are displayed as items ("Disp_Select") corresponding to selectable parameters In this stage, a cursor for selecting an item moves upward or downward by operating one of the upward or downward direction keys 46, 47.

Input items "SCANNER SETTING", "PRINT SETTING" and "COMMENTS" are also available in the parameter input screen in addition to "LANGUAGE SELECTION".

As shown in FIG. 9A, rightward and leftward arrowheads are provided on the right and left end portions on the display 52 so as to laterally scroll input items if all of the input items can not be displayed on the display 52 simultaneously. In the screen, if one or more input items are hidden from the display 52, an arrowhead pointing in a direction in which the hidden input items exist is colored black. An arrowhead is colored white if no input item is hidden from the display 52 in a direction in which the arrowhead points. Therefore, a user is able to notice the presence or absence of hidden items. Since the arrowhead pointing in the rightward direction is colored black in the screen shown in FIG. 9A, the user is able to notice that one or more input items exist on the right side of the input item "LANGUAGE SELECTION". If the user operates the rightward direction key 49 in the state of FIG. 9A, onscreen representation is changed to one for the input item of "SCANNER SETTING" as shown in FIG. 9B.

Figure 9B:
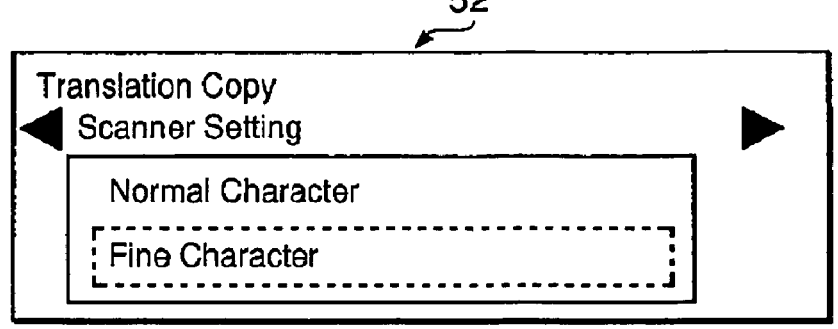

As shown in FIG. 9B, under the words "TRANSLATION COPY", the words "SCANNER SETTING" are displayed as an input item ("Disp_Name"). Under the input item, words "NORMAL CHARACTER" "SMALL CHARACTER" are displayed as items ("Disp_Select") corresponding to selectable parameters.

The "NORMAL CHARACTER" indicates that the reading resolution is set to 300×300 dpi. The "SMALL CHARACTER" indicates that the reading resolution is set to 600×600 dpi. In this illustrative embodiment, available resolutions in the scanner setting are limited to a part of the resolutions that the MFP 10 supports.

Normally, the MFP 10 provides three resolutions of 200×200 dpi, 300×300 dpi, and 600×600 dpi as shown in FIG. 10A. The setting screen shown in FIG. 10A is displayed when a user instructs the MFP 10 to start reading an image formed on an original. On the setting screen shown in FIG. 10A, the user is allowed to select one of the three resolutions.

By contrast, in the case of the translation copy service, the lowest resolution 200×200 is made unavailable because the reading accuracy of the OCR process decreases when the resolution of the image is low. The reading function may be set to monochrome reading to enhance the reading accuracy of the OCR process.

If the rightward direction key 49 is pressed in the state where the parameter input screen shown in FIG. 9B is displayed, the onscreen representation is changed to one having "PRINT SETTING" as an input item.

Figure 9C:
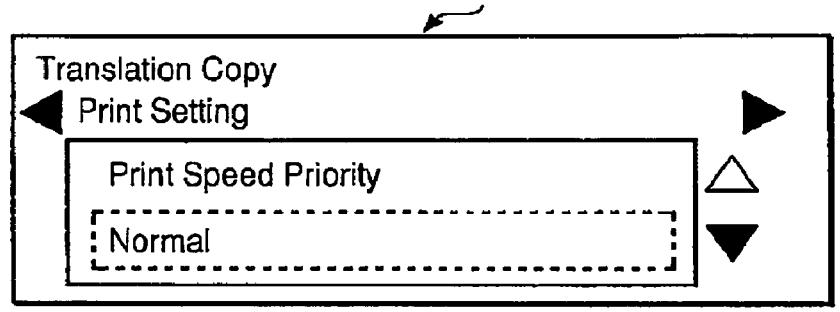

As shown in FIG. 9C, under the words "TRANSLATION COPY", the words "PRINT SETTING" are displayed as an input item ("Disp_Name"). Under the input item, words "PRINTING SPEED PRIORITY" "NORMAL" and "FINE" are displayed as items ("Disp_Select") corresponding to selectable parameters.

As shown in FIG. 9C, upward and downward arrowheads are provided on the right side of the display 52 so as to vertically scroll items if all of the items can not be displayed on the display 52 simultaneously. In the screen, if one or more items are hidden from the display 52, an arrowhead pointing in a direction in which the hidden input items exist is colored black. An arrowhead is colored white if no item is hidden from the display 52 in a direction in which the arrowhead points. Therefore, a user is able to notice the presence or absence of hidden items.

Figure 9D:
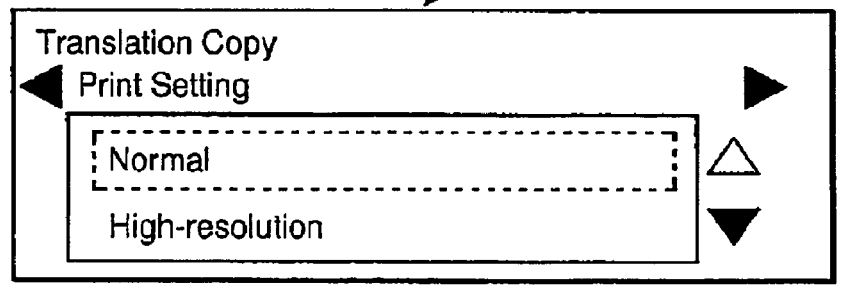

For example, if the downward direction key 47 is operated to move downward the cursor in the state of FIG. 9C, the items are scrolled down and the words "FINE" appears under the words "NORMAL" as shown in FIG. 9D.

The item "PRINTING SPEED PRIORITY" indicates that the printing resolution of the recording unit 14 is set to 200×200 dpi. The item "NORMAL" indicates that the printing resolution of the recording unit 14 is set to 300×300 dpi. The item "FINE" indicates that the printing resolution of the recording unit 14 is set to 600×600 dpi. In this illustrative embodiment, the resolutions available in the print setting are limited to a part of the resolutions that the MFP 10 supports. Normally, the MFP 10 provides four printing resolutions of 200×200 dpi, 300×300 dpi, 600×600 dpi and 1200×1200 dpi as shown in FIG. 10B. The setting screen shown in FIG. 11A is displayed when a print command is inputted, for example an external computer to the MFP 10. On the setting screen shown in FIG. 10B, the user is allowed to select one of the four resolutions.

By contrast, in the translation copy service, the printing resolution 1200×1200 dpi is made unavailable because the printing resolution higher than the highest reading resolution in the scanner setting is of no use. It should be noted that low resolution is made selectable in the print setting so as to respond to the needs of quickly printing images at the expense of resolution. In this illustrative embodiment, the print setting is limited to monochrome printing because the scanner setting is limited to a monochrome image.

Figure 9E:
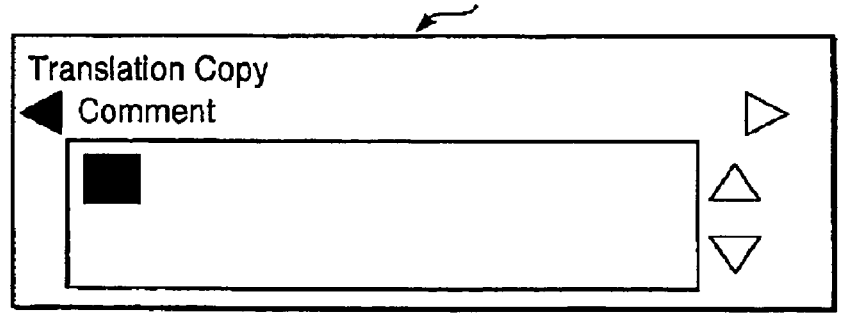

If the rightward direction key 49 is pressed in the state of FIG. 9C or 9D, the on screen representation is changed to one having the input item "COMMENTS" as shown in FIG. 9E.

As shown in FIG. 9E, under the words "TRANSLATION COPY", the words "COMMENTS" are displayed as an input item ("Disp_Name"). Under the input item, an input field for the comments is displayed. A black box in FIG. 9E is a cursor for inputting comments. The comments inputted by a user through the input screen of FIG. 9E are used, for example, as a header or footer of the printed image.

As described above, the user selects parameters for the input items of "LANGUAGE SELECTION", "SCANNER SETTING", and "PRINT SETTING" and inputs comments through the input screens shown in FIGS. 9A to 9E. By pressing the OK key 50 on the operation panel 12a, selection of each item which is designated by the cursor is confirmed, and the input of the comments is also confirmed. The selected parameters are sent to a URL of the program that processes the inputted parameters.

In the above mentioned setting process, available parameters in a setting item may be changed based on a selected parameter belonging to another input item. For example, if "NORMAL CHARACTER" is selected as a parameter relating to the scanner setting, the parameter "FINE" relating to the print setting may be made unselectable so that the printing resolution is undesirably set to 600×600 dpi in spite of the fact that the reading resolution is set to 300×300 dpi.

Hereafter, communication performed in the image processing system 1100 will be described. In the image processing system 100, the MFP 10, the directory server 20 and the function server 30 communicate with each other based on an HTTP 1.1 (HyperText Transfer Protocol). In the image processing system 100, the devices exchange commands and responses with one another by using a message on an HTTP request or a response for the HTTP request.

Each of the command instructed from the MFP 10 to the server 20 or 30 and the command instructed from the server 20 or 30 to the MFP 10 is exchanged such that the MFP 10 operates as a client device. Therefore, it becomes possible to prevent the command from the server 20 or 30 to the MFP 10 from being blocked by the broadband router 2 even if the broadband router 2 is used in normal settings.

More specifically, the MFP 10 sends a command to the server 20 or 30 by using a message accompanying a POST command of an HTTP request. In the case where the server 20 or 30 receives an inquiry about a multifunction device control command from the MFP 10 as a message accompanying the POST command of an HTTP request, the server 20 or 30 sends a message of an HTTP response accompanied by a multifunction peripheral command (MFP command) back to the MFP 10 if the server has the MFP command.

Figure 11:
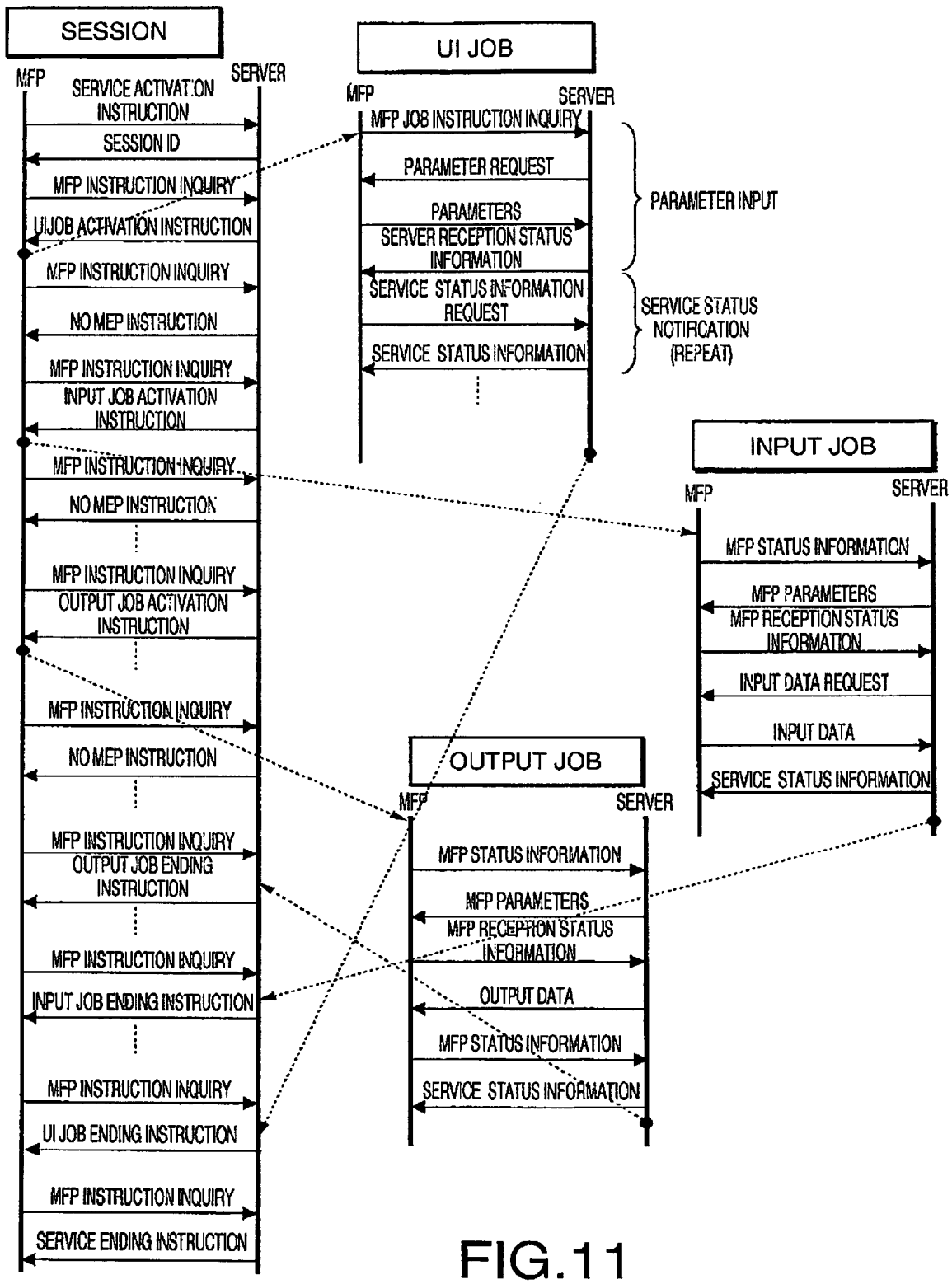
FIG. 11 is a ladder chart showing an example of a communication executed between the MFP and a function server in the image processing system in accordance with aspects of the invention.

Hereafter, an example of communication between the MFP 10 and the function server 30 will be described with reference to FIG. 11 which shows a rudder chart of the communication between the MFP 10 and the function server 30. As shown in FIG. 11, a session is established between the function server 30 and the MFP 10 from the beginning of a service to finish of the service. In the session, first, the MFP 10 requests the function server 30 to initiate a service. Then, the function server 30 sends a session ID back to the MFP 10. The session ID is used as an identifier for specifying the session in the function server 30. After the session ID is identified to the MFP 10, the MFP 10 sends the session ID along with a request, while the function server 30 specifies the session based on the received session ID. Such a configuration enables the function server 30 to process multiple sessions concurrently.

After the session ID is received, the MFP 10 issues periodically an MFP command inquiry for requesting a command of the function server 30 to be instructed to the MFP 10. If the function server 30 does not have a command to be sent to the MFP 110, the function server 30 sends information back to the MFP 10 indicating that the function server has no command.

In this illustrative embodiment, the function server 30 sends a UI (user interface) job activation command to the MFP 10 first. The UI job command is used to notify the MFP 10 of the start of use of a UI device (e.g., the operation panel 12a). After the UI job command is sent to the MFP 10, the communication for the UI job starts. It should be noted that the UI job communication is executed concurrently with the session.

With the UI job activation command, a job ID, which is used to identify a job in the session, is sent to the function server 30. In communications of the UI job, the MFP 10 sends a session ID and a job ID along with a request to the function server 30, while the function server 30 specifies the job based on the received session ID and the job ID. The function server 30 thus becomes able to process multiple jobs concurrently. The UI job will be described in detail later.

Then, the function server 30 sends an input job activation command at a predetermined time to the MFP 10. The input job activation command is used to notify the MFP 10 of the start of an inputting device (e.g. the reading unit 13 or the sound input unit 17). Communications of the input job are thus started between the MFP 10 and the function server 30. Similarly to the UI job, the input job is executed concurrently with the session. The job ID is sent from the function server 30 to the MFP 10 along with the input job activation command. The MFP 10 sends a request accompanied by the session ID and the job ID to the function server 30, while the function server 30 specifies a job based on the received session ID and the job LID. The input job will be described in detail later.

Next, the function server 30 sends an output job activation command to the MFP 10 at a predetermined time. The output job command is used to notify the MFP 10 of the start of an outputting device (e.g., the recording unit 14 or the sound output unit 18). Communications of the output job are thus started between the MFP 10 and the function server 30. Similarly to the UI job and the input job, the output job is executed concurrently with the session. The job ID is sent from the function server 30 to the MFP 10 along with the output job activation command. The MFP 10 sends a request accompanied by the session ID and the job ID to the function server 30, while the function server 30 specifies a job based on the received session ID and the job ID. The output job will be described in detail later.

Thereafter, the function server 30 sends a notification indicating termination of the output job to the MFP 10 at a predetermined time. Then, the function server 30 sends a notification indicating termination of the input job to the MFP 10 at a predetermined time. Next, the function server 30 sends a notification indicating termination of the UT job to the MFP 10 at a predetermined time. Then, the function server 30 sends a notification indicating termination of the service to the MFP 10 at a predetermined time.

Hereafter, the communications in the UI job will be described with reference to FIG. 11. In the UI job, the MFP 10 sends an MFP job command inquiry to the function server 30 first. The MFP job command inquiry is used to inquire of the function server 30 about a command to be instructed to the MFP 10. Then, the function server 30 sends a parameter request to the function server 30. The parameter request is used to request a user of the MFP 10 to set the parameters necessary for the execution of the service. The service I/F information 36 is sent from the function server 30 to the MFP 10 together with the parameter request.

When the MFP 10 receives the parameter request from the function server 30, the MFP 10 displays a parameter input screen based on the received service I/F information 36 on the display 52 (see FIG. 9). Then, the MFP 10 sends the parameters set by the user to the function server 30.

When the function server 30 receives the parameters from the MFP 10, the function server 30 sends a server reception status, which is a notification indicating whether the function server 30 successfully receives the parameters from the MFP 10, to the MFP 10.

After the MFP 10 ascertains that the function server 30 has successfully received the parameters by using the server reception status, the function server 30 sends a service status request, requesting information regarding a status of the service, to the function server 30.

When the function server 30 receives the service status request, the function server 30 sends service status information representing the status of the function server 30 and the service to the MFP 10. Thereafter, the service status request and the service status information are exchanged between the function server 30 and the MFP 10.

Hereafter, the input job will be described in detail with reference to FIG. 11. In the input job, the MFP 10 sends first a multifunction peripheral status information (MFP status information), representing a status of the MFP 10 to the function server 30. Then, the function server 30 sends MFP parameters to the MFP 10. The MFP parameters mean the parameters of the inputting device designated by a user in the UI job.

When the MFP 10 receives the MFP parameters, the MFP 10 sends a multifunction device reception status to the function server 30 indicating that the MFP 10 has successfully received data from the function server 30.

If the function server 30 ascertains that the MFP 10 has successfully received the data by using the multifunction device reception status, the function server 30 sends an input-data request, which requests the MFP 10 to send input-data corresponding to the job, to the MFP 10. The input-data corresponding to the job means image data generated by the reading unit 13 if the job is a scan job (i.e., a job executed in a service concerning image data generated by the reading unit 13), or PCM data if the job is a sound input job (i.e., a job executed in a service concerning sound data generated by the sound input unit 17).

When the MFP 10 receives the input-data request, the MFP 10 requests a user to conduct an input operation (e.g., an operation for reading an image or an operation for inputting sound) through a user interface, and sends the obtained input-data to the function server 30. When the function server 30 receives the input-data from the MFP 10, the function server 30 sends the service status information representing the status of the function server 30 and the service to the MFP 10.

Hereafter, the output job will be described with reference to FIG. 11. First, the MFP 10 sends MFP status information representing a status of the MFP 10 to the function server 30. Then, the function server 30 sends MFP parameters to the MFP 10. The MFP parameters mean the parameters of the outputting device designated by a user in the UT job.

When the MFP 10 receives the MFP parameters, the MFP 10 sends a multifunction device reception status to the function server 30 indicating that the MFP 10 has successfully received data from the function server 30.

If the function server 30 ascertains that the MFP 10 has successfully received the data by using the multifunction device reception status, the function server 30 sends output-data to the MFP 10. The output-data means image data if the output job is a print job (i.e., a job executed in a service concerning image data to be printed by the recording unit 14), or PCM data if the job is a sound output job (i.e., a job executed in a service concerning PCM data representing sound to be output by the sound output nit 18).

When the MFP 10 receives the output-data from the function server 30, the MFP 10 performs an outputting process (e.g., print of an image or sound output) using the output-data. Then, the MFP 10 sends MFP status information representing a status of the ME; 10 to the function server 30. When the function server 30 receives the MFP status information, the function server 30 sends service status information to the MFP 10 representing a status of the function server 30 and the service.

Hereafter, processing executed by the MFP 10, directory server 20 and function server 30 will be described.

Figure 12:
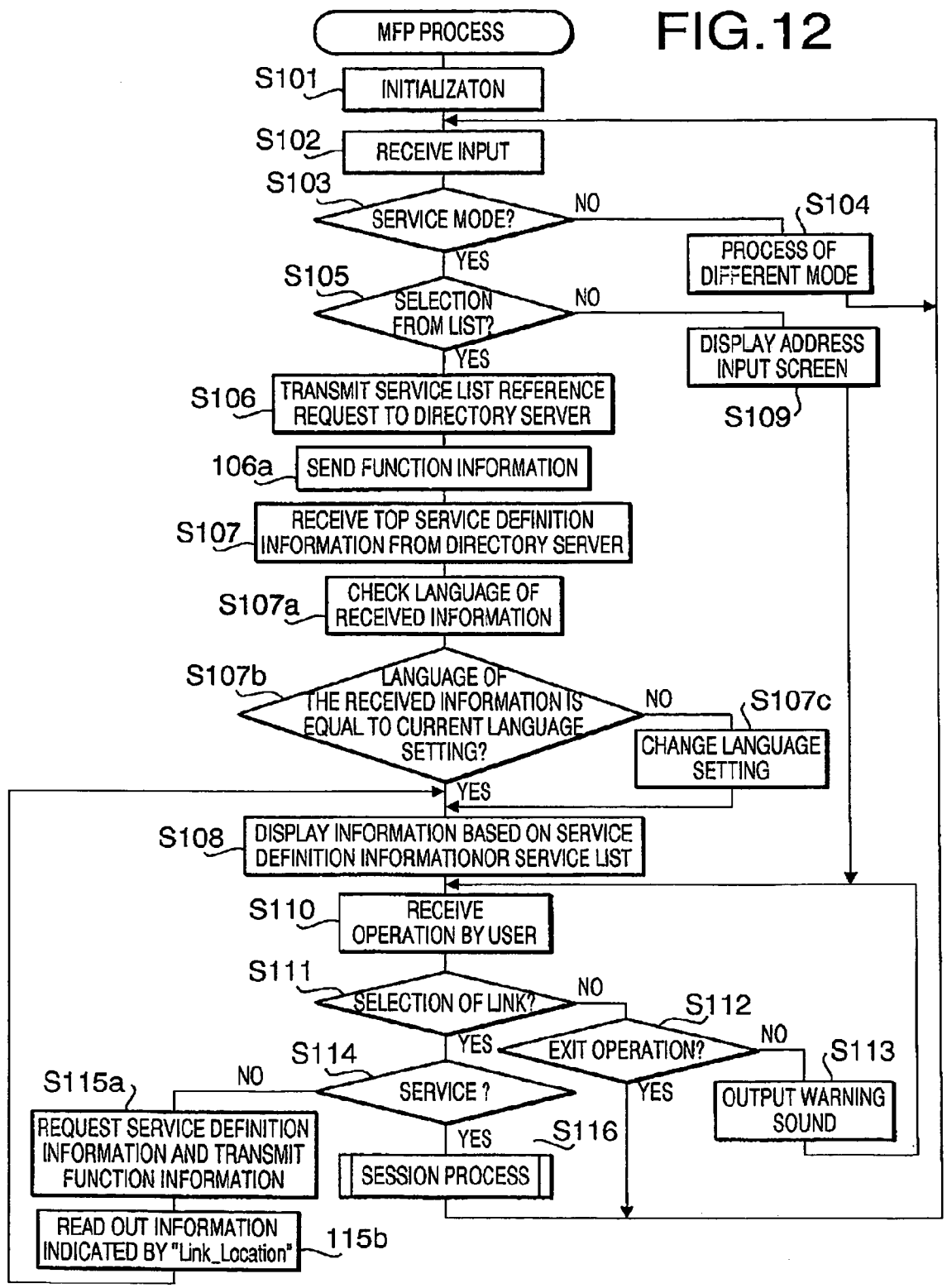
FIG. 12 is a flowchart showing an MFP process which is executed by a control unit of the MFP in accordance with aspects of the invention.
Figure 13:
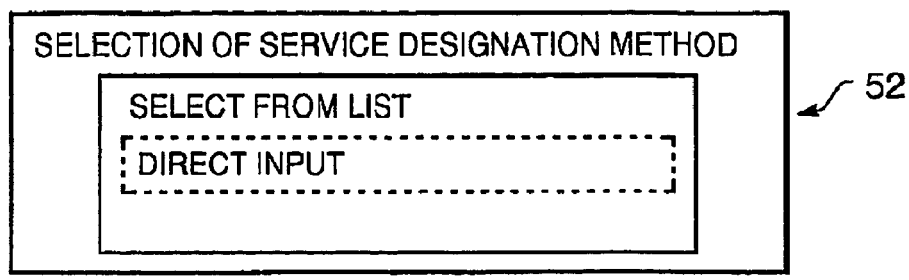
FIG. 13 shows an example of a selection screen used to designate a service designation method.

FIG. 12 is a flowchart illustrating an MFP process executed under control of the control unit 11 of the MFP 10. First, in step S101, the control unit 11 executes an initializing process for the MFP 10. Then, in step S102, the control unit 11 accepts a command input. The command input means an input for instructing the MFP 10 to execute a certain process. For example, the command input is a key input inputted by a user through the operation unit 12 or a command transmitted from an external computer.

In step S103, the control unit 11 judges whether the inputted command is a command instructing the MFP 10 to change to a service mode. Specifically, in step S102, the control unit 11 judges whether the user operation in step S102 is a pressing operation of the service key 44 on the operation panel 12a. If the inputted command input is not the command instructing the MFP 10 to change to the service mode (S103: NO), control proceeds to step S104 where a process for another mode corresponding to a user input in step S102 is executed. For example, a print process is executed in step S104. Then, control returns to step S102.

If the inputted command instructs the MFP 10 to change to the service mode (S103: YES), control proceeds to step S105. In step S105, the control unit 11 displays a selection screen on the display 52 requesting a user to decide whether the user wants to select a desirable service (to be requested to the function server 30) from a list or to designate directly a URL of a destination of a desirable service. Then, the control unit 11 waits for a user input. If the user input is received, the control unit 11 judges whether a service to be requested to the function server 30 should be selected from a service list (S105).

If it is judged in step S105 that a service to be requested to the function server 30 is selected from a service list (S105: YES), control proceeds to step S106 where the control unit 11 sends a request (service list reference request) for a service list to the directory server 20. In step S106, the control unit 11 sends a request to the directory server 20 for the top level service definition information 25 (see FIG. 3). The MFP 10 may be configured to have a URL for requesting the top level service definition information in the storage unit 23.

More specifically, in step S106, the MFP 10 sends an HTTP request based on HTTP 1.1 to a destination address stored in advance in the storage unit 16 to request a service list. As described later, after the directory server 20 receives the request, the directory server sends a function information request back to the MFP 10 as an HTTP response. The function information request is used to request the MFP 10 to transmit information (function information) concerning the functions of the MFP 10.

After the MFP 10 receives the function information request from the directory server 20, the MFP 10 sends the function information to the directory server 20 (S106a). In this illustrative embodiment, information indicating the scanner function attained by the reading unit 13 (e.g., words "SCAN"), the printing function attained by the recording unit 14 (e.g., words "PRINT"), the sound input and output function attained by the sound input unit 17 and the sound output unit 18 (e.g., words "VOICE"), information about language setting indicating the language to be displayed on the display 52 are included in the function information to be provided to the directory server 20.

If the directory server 20 receives the function information from the MFP 10, the directory server 20 generates the top service definition information (which is described in detail later) and transmits it to the MFP 10 as an HTTP response.

According to the information about language contained in the function information, one of the information of which message part is described in Japanese and the information of which message part is described in a foreign-language (e.g., English) is transmitted from the directory server 20. The following explanations are given for the case where the message part of the service definition information 25 is described in Japanese.

Next, in step S107, the control unit 11 receives the top level service definition information 25 from the directory server 20 via the communication unit 15.

In step S107a, the control unit 11 checks the language of the top service definition information 25. In step S107b, the control unit 11 judges whether the language of the service definition information matches the language setting currently set for the MFP 10. If the language of the service definition information 25 does not match the current language setting of the MFP 10 (S107b: NO), the control unit 11 changes the language setting of the MFP 10 so that the service definition information can be displayed appropriately on the display 52 on the operation panel 12a (S107c). If the language of the service definition information 25 matches the current language setting of the MFP 10 (S107b: YES), control proceeds to step S108.

In step S108, the control unit 11 generates a service selection screen using the service definition information 25 received in step S107 and displays the screen on the display 52 (see FIG. 5A). Then, control proceeds to step S110.

If it is judged in step S105 that a service to be requested to the function server 30 is not selected from a service list (S105: NO), control proceeds to step S109 where control unit 11 generates an input screen for allowing a user to directly input a URL and displays the input screen on the display 52. Then, control proceeds to step S110.

In step S110, the control unit 11 accepts a user operation through the operation panel 12a to decide a service to be received from the function server 30. If the user operation is performed, control proceeds to step S111 where the control unit 11 judges whether the user operation is an operation for selecting a link. Specifically, in step S111, the control unit 11 judges that the user operation is the operation for selecting a link if a selection is made successfully by a user on the service selection screen displayed at step S108 or if a URL is successfully inputted through the input screen displayed at step S109.

If the user operation is not an operation for selecting a link (S111: NO), control proceeds to step S112 where the control unit 11 judges whether the user operation accepted at step S110 is an operation for ending the service mode. If the user operation is an operation for ending the service mode (S112: YES), control returns to step S102. That is, in this case the process as a service mode terminates.

If it is judged in step S112 that the user operation is not an operation for ending the service mode (S112: NO), control proceeds to step S113 where the control unit 11 produces a beeping sound. Then, control returns to step S110. That is, if the user operation accepted in step S110 is not an operation for selecting a link and is not an operation for ending the service mode, the beep sound is produced so as to notify a user that the user operation is invalid.

If the user operation is an operation for selecting a link (S111: YES), control proceeds to step S114 where the control unit 11 judges whether the selected link is a URL for a service.

If the selected link is not a URL for a service (i.e., the selected link is a URL of the service definition information 25) (S114: NO), control proceeds to step S115a. In step S115a, the control unit 11 requests the service definition information from the directory server 20 based on information (ID) of the Link_Location (based on a URL if the URL is directly inputted), receives the function information request from the directory server 20, and then sends the function information to the directory server 20. Next, in step S115b, the MFP 10 receives the service definition information 25 from the directory server 20. Then, control returns to step S108 so that a new service selection screen is displayed on the display 52.

If the selected link is a URL of a service (S114: YES), control proceeds to step S116, where a session process which will be described later (see FIG. 14) is executed. After the step S116 is finished, control returns to step S102.

Figure 14:
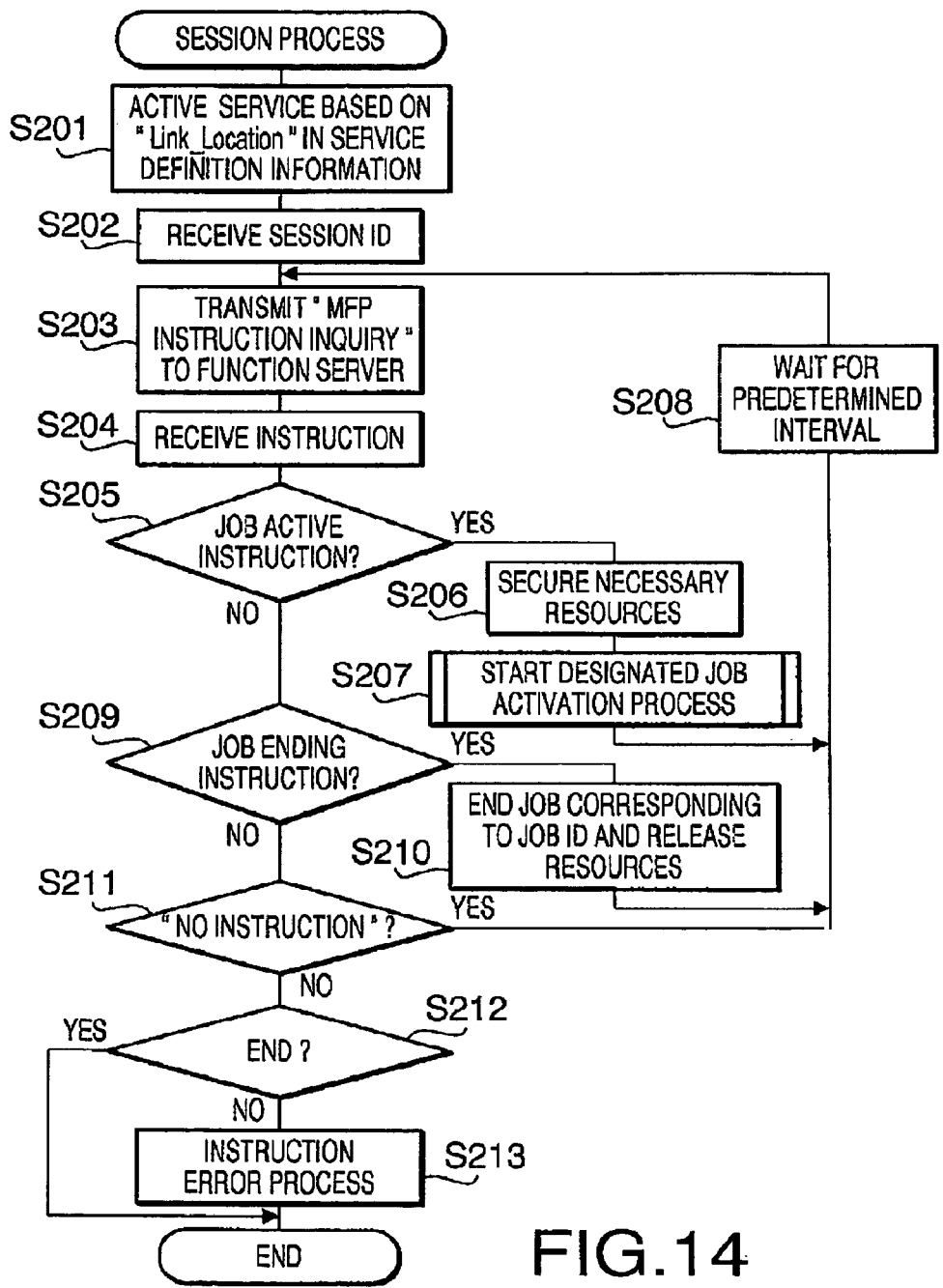
FIG. 14 is a flowchart showing a session process which is executed by the control unit of the MFP in accordance with aspects of the invention.

Next, the session process executed in the step S116 of the MFP process (FIG. 12) will be explained referring to a flowchart of FIG. 14.

At the start of the session process, the MFP 10 activates a service selected by the user based on the "Link_Location" in the service definition information 25 (when a URL is inputted directly by the user, based the URL), by transmitting a service activation instruction to the URL of the service (S201).

In response to the service activation instruction of S201, the MFP 10 receives a session TD from the function server 30 (S202). Incidentally, the session ID is generated in step S805 of a function server process shown in FIG. 20 (explained later) which is executed by the control unit 31 of the function server 30 and transmitted by the function server 30 in step S809 of a function server process.

Subsequently, the MFP 10 transmits the "MFP command inquiry" (inquiring about instructions to the MFP 10) to the function server 30 (S203). The session ID received in S202 is attached to the MFP instruction inquiry.

In response to the MFP instruction inquiry of S203, the MFP 10 receives a command from the function server 30 (S204).

Subsequently, the MFP 10 judges whether the command received in S204 is a job activation command (the aforementioned UI job activation instruction, input job activation instruction or output job activation instruction) (S205). Incidentally, the job activation command is outputted in step S1003, S1007 or S1011 of a session process shown in FIG. 22 (explained later) which is executed by the control unit 31 of the function server 30. Along with the job activation command, a job ID and a destination URL of the job are received from the function server 30.

If the command received in S204 is a job activation command (S205: YES), the MOP 10 reserves resources necessary for the execution of the job (S206), and starts a process for activating the designated job (a designated job activation process) (S207). Then, the control unit 11 waits a prescribed time interval (S208), and control returns to step S203.

If the command received in S204 is not a job activation instruction (S205: NO), the MFP 10 judges whether the command is a job ending command (S209). Incidentally, the job ending command is outputted in step S1019, S1021 or S1023 of a session process shown in FIG. 26 (explained later) which is executed by the control unit 31 of the function server 30. Along with the job ending command, a job ID corresponding to the job to be ended is received from the function server 30.

If the command received in S204 is a job ending command (S209: YES), the MFP 10 ends the job corresponding to the job ID while releasing the resources (S210). Then, the MFP 10 waits the prescribed time interval (S208), and control returns to step S203.

If the command received in S204 is not a job ending instruction (S209: NO), the MFP 10 judges whether the command indicates "no command", that is, whether the response to the MFP command inquiry of S203 indicates that there is no command (S211).

If the command received in S204 indicates "no command" (S211: YES), the MFP 10 waits the prescribed time interval (S208). Then, control returns to step S203.

If the command received in S204 does not indicate "no command" (S211: NO), the MFP 10 judges whether the command is a session ending command (S212). Incidentally, the session ending instruction is outputted in step S1026 of the session process shown in FIG. 23 (explained later) which is executed by the control unit 31 of the function server 30.

If the command received in S204 is the session ending command (S212: YES), the MFP 10 ends the session process of FIG. 14.

If the command received in S204 is not the service ending command, that is, if the command is none of the job activation command, the job ending command, the "no command" or the session ending command (S212: NO), the MFP 10 executes a command error process (e.g. displaying an error message on the display 52 of the operation panel 12a) (S213) and thereafter ends the session process of FIG. 14.

Figure 15:
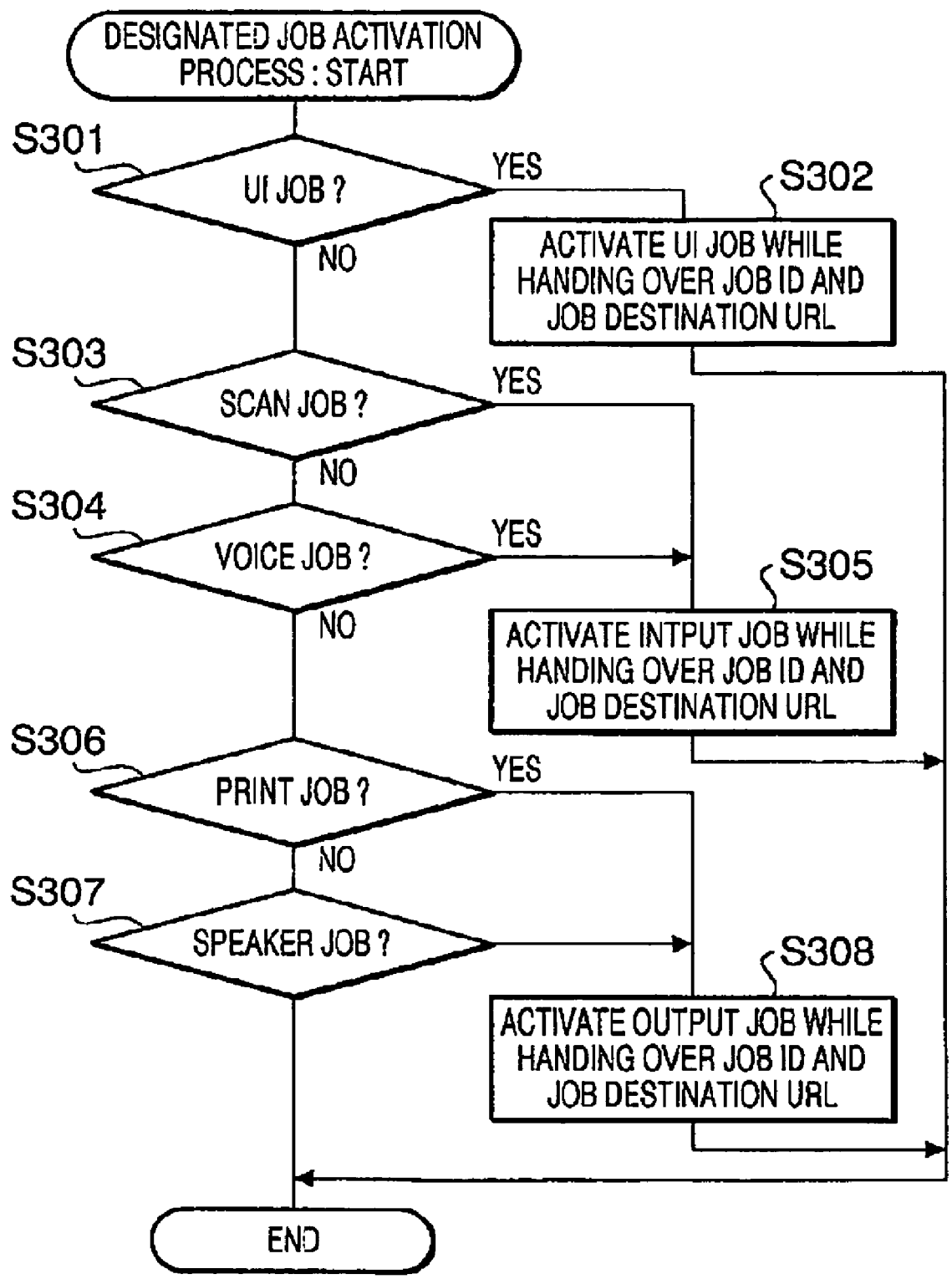
FIG. 15 is a flowchart showing a designated job activation process which is executed by the control unit of the MFP in accordance with aspects of the invention.

Next, the designated job activation process which is started in the step S207 of the session process (FIG. 14 will be explained referring to a flowchart of FIG. 15.

At the start of the designated job activation process, the MFP 10 judges whether the job designated by the job activation command is the UI job (S301).

If the job designated by the job activation command is the UI job (S301: YES), the MFP 10 activates the UT job while handing over the job ID and the destination URL of the job (S302). Then, the MFP 10 ends the designated job activation process.

If the job designated by the job activation command is not the UI job (S301: NO), the MFP 10 judges whether the job designated by the job activation command is a scan job (S303).

If the job designated by the job activation command is not the scan job (S303: NO), the MFP 10 judges whether the job designated by the job activation command is a voice job (S304).

If the job designated by the job activation command is the scan job (S303: YES) or the voice job (S304: YES), the MFP 10 activates the input job while handing over the job ID and the destination URL of the job (S305). Then, the MFP 10 ends the designated job activation process.

If the job designated by the job activation command is not the voice job (S304: NO), the MFP 10 judges whether the job designated by the job activation command is a print job (S306).

If the job designated by the job activation command is not the print job (S306: NO), the MFP 10 judges whether the job designated by the job activation command is a speaker job (S307).

If the job designated by the job activation command is the print job (S306: YES) or the speaker job (S307: YES), the MFP 10 activates the output job while handing over the job ID and the destination URL of the job (S308). Then, the MFP 10 ends the designated job activation process.

If the job designated by the job activation command is not the speaker job, that is, if the designated job is none of the UI job, scan job, voice job, print job or speaker job (S307: NO), the MFP 10 ends the designated job activation process.

Figure 16:
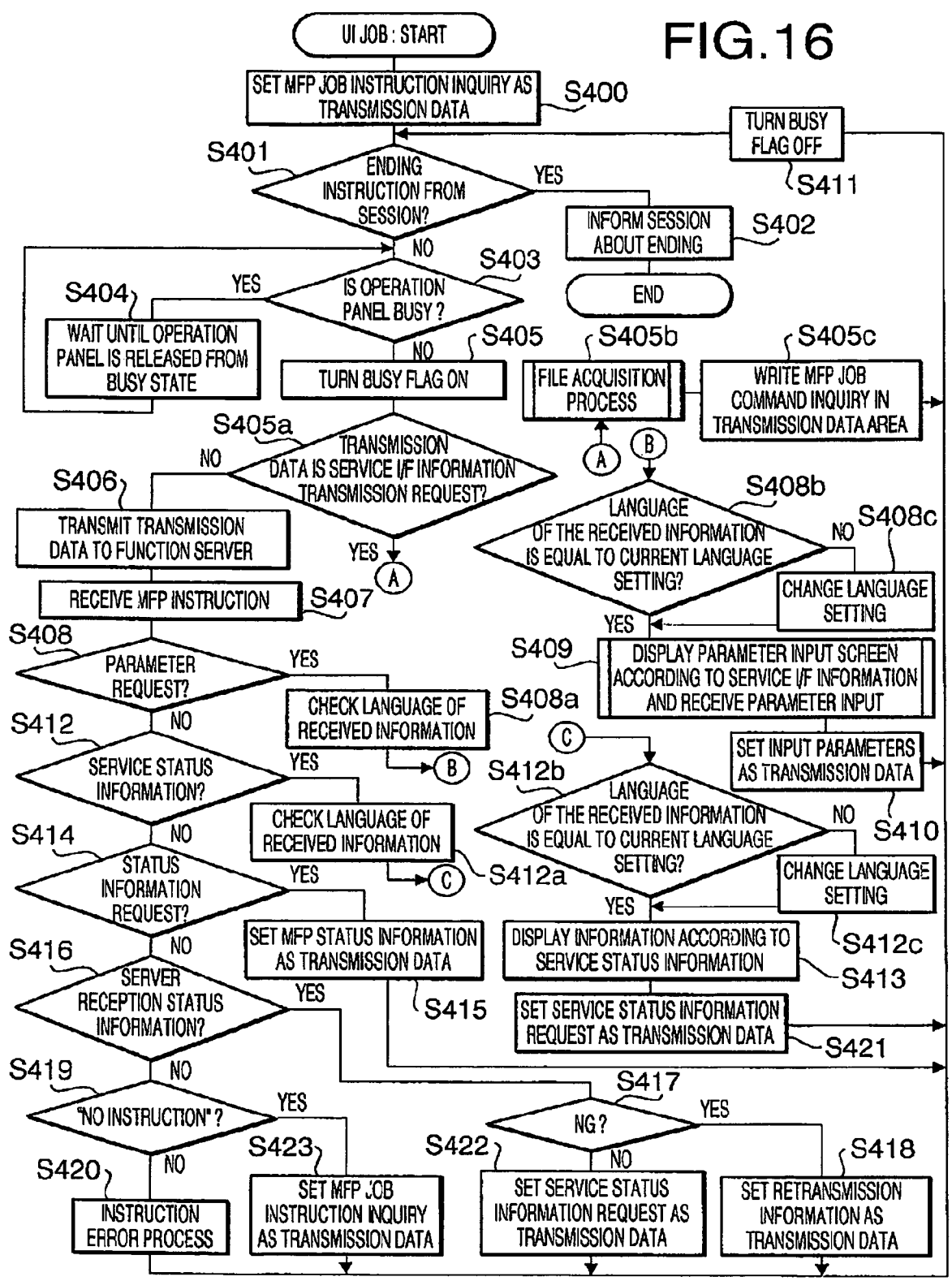
FIG. 16 is a flowchart showing a UI job which is executed by the control unit of the MFP in accordance with aspects of the invention.

Next, the UI job, which is activated in the step S302 of the designated job activation process (FIG. 15) to operate concurrently with the session process, will be explained referring to a flowchart of FIG. 16.

At the start of the UI job, the MFP 10 writes the MFP job command inquiry (inquiring about commands to the MFP 10) in a prescribed storage area, as transmission data (S400). The transmission data is information that will be used in step S406 (explained later), in which the information written as the transmission data is transmitted to the function server 30 together with the session ID and the job ID. The storage area for the transmission data (transmission data storage area) is formed in a prescribed area of the RAM (not shown) of the control unit 11 of the MFP 10.

Subsequently, the MFP 10 judges whether there is an ending command from the session (S401). Incidentally, the ending command from the session is issued in the step S210 of the session process of FIG. 14 which is executed by the control unit 11 of the MFP 10.

If there is an ending command from the session (S401: YES), the MFP 10 informs the session about the ending (S402). Then, the UI job terminates.

If there is no ending command from the session (S401: NO), the MFP 10 judges whether the operation panel 12a is in a busy state (S403). Specifically, the MFP 10 judges that the operation panel 12a is in the busy state when a busy flag "Fu" (indicating whether the operation panel 12a is in the busy state) has been turned on (not in the busy state when the busy flag "Fu" is off).

If the operation panel 12a is in the busy state (S403: YES), the MFP 10 waits until the operation panel 12a is released from the busy state (S404).

If the operation panel 12a is not in the busy state (S403: NO), the MFP 10 turns the busy flag "Fu" on (S405).

Next, the control unit 11 judges whether the transmission data is a service I/F information transmission request (S405a). It should be noted that the transmission data is a service I/F information transmission request if step S313 is processed first, while the transmission data may not be the service I/F information transmission request if step S313 is processed in later stages. If the transmission data is the service I/F information transmission request (S405a: YES), control proceeds to step S405b where a file acquisition process, which will be described later, is executed to obtain the service I/F information 36 (S405b).

Then, the control unit 11 writes an MFP job command inquiry (an inquiry about a command to the MFP 10) in a storing area for the transmission data (S405c). Then, control proceeds to step S411 to turn the busy flag "Fu" OFF.

If the transmission data is not the service I/F information transmission request (S405a: NO), control proceeds to step S406. In step S406, the control unit 11 transmits the information written as the transmission data to the function server 30 together with the session ID and the job ID (S406).

In response to the information transmitted in S406, the MFP 10 receives an MFP command from the function server 30 (S407).

Subsequently, the MFP 10 judges whether the MFP command received in S407 is the parameter request not (S408). Incidentally, the parameter request is transmitted by the function server 30 in step S1102 of a UT job process shown in FIG. 24 which is executed by the control unit 31 of the function server 30. Along with the parameter request, the aforementioned service I/F information 36 is received from the function server 30.

If the MFP command received in S407 is the parameter request (S408: YES), control proceeds to step S408a.

In step S408a, the control unit 11 checks the language of the service I/F information 36. In step S408b, the control unit 11 judges whether the language of the service I/F information 36 matches the language setting currently set for the MFP 10. If the language of the service I/F information 36 does not match the current language setting of the MFP 10 (S408b: NO), the control unit 11 change the language setting of the MFP 10 so that the service I/F information 36 can be displayed appropriately on the display 52 on the operation panel 12. If the language of the service I/F information 36 matches the current language setting of the MFP 10 (S408b: YES), control proceeds to step S409.

In step S409, the MFP 10 displays the parameter input screen according to the service I/F information 36 on the display 52 of the operation panel 12a and prompts the user to perform an input operation for setting parameters. In step S410, the MFP 10 writes input parameters (parameters inputted by the user) in the transmission data storage area as the transmission data in order to transmit the input parameters to the function server 30 (S410). Then, the MFP 10 turns the busy flag "Fu" off (S411) and thereafter control returns to the step S401. The parameters written as the transmission data will be transmitted to the function server 30 in the aforementioned step S406 when there is no ending command from the session (S401: NO) and the operation panel 12a is not in the busy state (S403: NO).

If the MFP command received in S407 is not the parameter request (S408: NO), the MFP 10 judges whether the MFP command is the service status information (S412). Incidentally, the service status information is transmitted by the function server 30 in step S1113 of a UI job process shown in FIG. 24 (explained later) which is executed by the control unit 31 of the function server 30. Along with the service status information, the service I/F information 36 and an error code are received from the function server 30.

If the MFP command received in S407 is the service status information (S412: YES), control proceeds to step S412a.

In step S412a, the control unit 11 checks the language of the service status information. In step S412b, the control unit 11 judges whether the language of the service status information matches the language setting currently set for the MFP 10. If the language of the service status information does not match the current language setting of the MFP 10 (S412b: NO), the control unit 11 changes the language setting of the MFP 10 so that the service status information can be displayed appropriately on the display 52 on the operation panel 12a. If the language of the service status information matches the current language setting of the MFP 10 (S408b: YES), control proceeds to step S413.

In step S413, the MFP 10 displays information according to the service status information on the display 52 of the operation panel 12a. In step S421, the MFP 10 writes the service status information request (a command requesting information on the operational status of the service executed by the function server 30) in the transmission data storage area as the transmission data in order to transmit the service status information request to the function server 30 (S421). Then, the MFP 10 turns the busy flag "Fu" off (S411) and thereafter control returns to the step S401. The service status information request written as the transmission data will be transmitted to the function server 30 in step S406 when there is no ending command from the session (S401: NO) and the operation panel 12a is not in the busy state (S403: NO).

If the MFP command received in S407 is not the service status information (S412: NO), the MFP 10 judges whether the MFP command is a status information request (S414).

If the MFP command received in S407 is the status information request (S414: YES), the MFP 10 writes the MFP status information (indicating the status of the MFP 10) in the transmission data storage area as the transmission data in order to transmit the MFP status information to the function server 30 (S415). Then, the MFP 10 turns the busy flag "Fu" off (S411) and thereafter control returns to the step S401. The MFP status information written as the transmission data will be transmitted to the function server 30 in step S406 when there is no ending command from the session (S401: NO) and the operation panel 12a is not in the busy state (S403: NO).

If the MFP command received in S407 is not the status information request (S414: NO), the MFP 10 judges whether the MFP command is the server reception status (indicating whether the function server 30 received information from the MFP 10 normally) (S416).

If the MFP command received in S407 is the server reception status (S416: YES), the MFP 10 judges whether the server reception status indicates abnormal reception (NG) (S417).

If the server reception status indicates abnormal reception (NG) (S417: YES), the MFP 10 writes previous information (information that was previously transmitted to the function server 30) in the transmission data storage area as the transmission data in order to retransmit the previous information (retransmission information) to the function server 30 (S418). Then, the MFP 10 turns the busy flag "Fu" off (S411) and thereafter control returns to the step S401.

If the server reception status does not indicate abnormal reception (NG) (S417: NO), the MAP 10 writes the service status information request (a command requesting information on the operational status of the service) in the transmission data storage area as the transmission data in order to transmit the service status information request to the function server 30 (S422). Then, the MFP 10 turns the busy flag "Fu" off (S411) and thereafter control returns to step S401.

Incidentally, the retransmission information or the service status information request written as the transmission data will be transmitted to the function server 30 in step S406 when there is no ending command from the session (S401: NO) and the operation panel 12a is not in the busy state (S403: NO).

If the MFP command received in S407 is not the server reception status (S416: NO), the MFP 10 judges whether the MFP command indicates "no command", that is, whether the response to the MFP job command inquiry transmitted in S406 indicates that there is no command (S419).

If the MFP command received in S407 indicates "no command" (S419: YES), the MFP 10 writes the MFP job command inquiry (inquiring about commands to the MFP 10) in the transmission data storage area as the transmission data in order to transmit the MFP job command inquiry to the function server 30 (S423). Then, the MFP 10 turns the busy flag "Fu" off (S411) and thereafter control returns to the step S401. The MFP job command inquiry written as the transmission data will be transmitted to the function server 30 in step S406 when there is no ending command from the session (S401: NO) and the operation panel 12a is not in the busy state (S403: NO).

If the MFP command received in S407 does not indicate "no command" (S419: NO), the MFP 10 executes a command error process (S420). Then, the MFP 10 turns the busy flag "Fu" off (S411) and thereafter control returns to the step S401.

Hereafter, a caching function of the MFP 10 will be explained. In the storage unit 16, a cache area has been prepared so that data or file received through the communication unit 12 can be cached. In the cache area, cache management information (used for management of files stored in the cache area) and the files are stored while the files are associated with the cache management information. FIG. 55 shows an example of the cache management information. As shown in FIG. 55, the cache management information-includes a URL (a destination address from which a target is requested), a group ID (grouping information of the address), a filename if a cache file, and time information (Time) representing a time when the file is stored in the cache area or when a request for obtaining the file is issued again.

It should be noted that the group ID is an option. The group ID is categorized into two types: a first type group ID and a second type group ID. The first type group ID is formed of only a main group ID (characters ahead of the second occurrence "//" of each item in FIG. 55). The second type group ID is formed of a main group ID and a sub-group ID (characters subsequent to the second occurrence "//").

In FIG. 6, a group ID represented by <GID> tag is included in the service T/F information 36.

Figure 50:
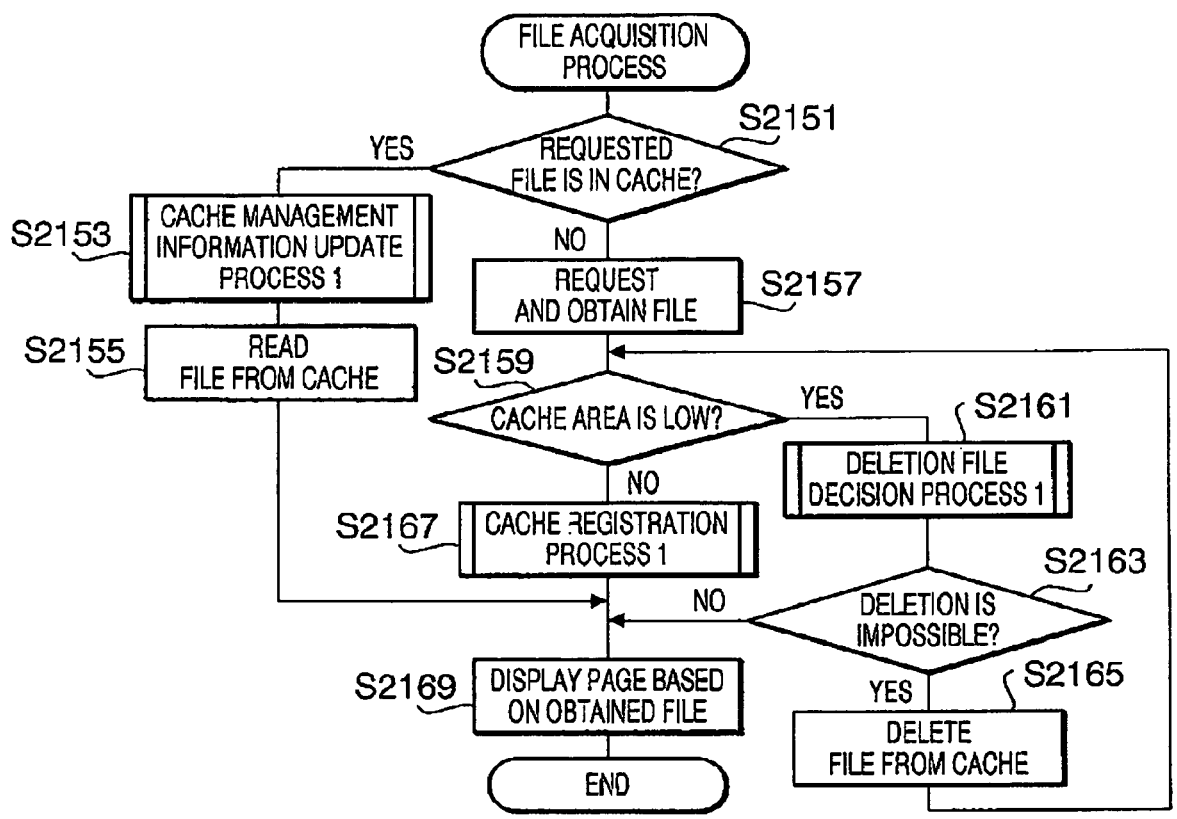
FIG. 50 is a flowchart illustrating a file acquisition process.

Hereafter, the file acquisition process executed in step S405b of FIG. 16 will be described with reference to FIG. 50. First, the control unit 11 judges whether a requested file (e.g., the service I/F information) has been stored in the cache area (S2151). Specifically, the control unit 11 checks whether the requested URL is found in pieces of data of an item URL in cache management information (see FIG. 55). If the requested URL is found in the cache management information (S2151: YES), a cache management information update process 1, which will be described in detail later, is executed (S2153). Then, the control unit 11 reads out the requested file from the cache (S2155).

If the requested URL is not found in the cache management information (S2151: NO), the requested file is obtained from the server (the function server or directory server) (S2157). Then, the control unit 11 tries to store the file in the cache area.

Specifically, the control unit 11 checks whether a remaining cache area is low (S2159). If the remaining cache area is low (S2159: YES), a deletion file decision process 1, which will be described in detail later, is executed to decide a file to be removed from the cache area (S2161).

Next, the control unit 11 judges whether the result of the deletion file decision process 1 indicates "deletion impossible" (S2163). If the result of the deletion file decision process 1 is "deletion impossible" (S2163; YES), control proceeds to step S2169. If the result of the deletion file decision process 1 is not "deletion impossible" (S2163: NO), a file judged to be removed from the cache area by the deletion file decision process 1 is removed from the cache area (S2165). In this case, a record corresponding to the removed file is removed from the cache management information.

After the file is removed from the cache area in step S2165, control returns to step S2159. If the remaining cache area is not low (S2159: NO), a cache registration process 1 is executed and the obtained file is stored in the cache area (S2167). In step S2169, the information based on the obtained file may be displayed on the display 52. Then, the file acquisition process terminates.

Figure 51:
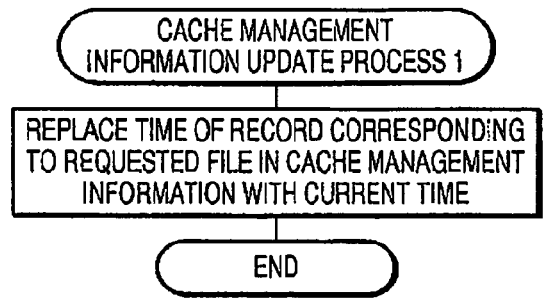
FIG. 51 is a flowchart illustrating a cache management information update process 1.

Next, the cache management information update process 1 executed in step S2153 of FIG. 50 will described with reference to FIG. 51. In this process, the control unit 11 replaces the time of a record corresponding to the requested file in the cache management information (see FIG. 55) with the current time (S2553). Then, the cache management information update process 1 terminates.

Next, the deletion file decision process 1 executed in step S2161 of FIG. 50 will be described with reference to FIGS. 52 and 53. First, the control unit 11 assigns 0 to a variable N and initializes a temporary list (S2351). Then, the control unit 11 increments the variable N by one (S2353). Next, the control unit 11 judges whether the cache management information has the N-th record (S2355).

If the cache management information has the N-th record (S2355: YES), the control unit 11 judges whether the N-th record has a group ID (S2357). If the N-th record has a group ID (S2357: YES), the control unit 11 judges whether the group ID is included in the temporary list (S2361). If the N-th record does not have a group ID (S2357: NO), the control unit 11 copies a URL and time information of the N-th record in the temporary list (S2359). Then, control returns to step S2353.

The temporary list means a memory area is defined in the RAM of the control unit 11. Multiple pairs of a URI, and time information or a group ID and time information can be stored in the memory area.

If the group ID of the N-th record is included in the temporary list (S2361: YES), the control unit 11 compares the time information of the N-th record with the time information of the corresponding record in the temporary list so as to judge whether the time information of the N-th record is newer than that of the temporary list (S2365).

If the group ID of the N-th record is not included in the temporary list (S2361: NO), the control unit 11 copies the group ID and the time information of the N-th record in the temporary list (S2363). Then, control returns to step S2353.

If it is judged in step S2365 that the time information of the N-th record is newer than that of the corresponding record of the temporary list (S2365: YES), the control unit replaces the time information of the record of the temporary list with the record of the N-th record in the cache management information (S2367). Then, control returns to step S2353. If the time information of the N-th record is older than that of the corresponding record of the temporary list (S2365: NO), control returns to step S2351 without changing the time information of the temporary list.

If it is judged in step S2355 that the cache management information does not have N-th record (S2355: NO), control proceeds to step S2369 in FIG. 53. In step S2369, the control unit 11 judges whether N is 1. If N is 1 (S2369: YES), the control unit 11 determines that the all of the files stored in the cache area can not be deleted at all (S2373). Then, the deletion file decision process 1 terminates.

If N is not 1 (S2369: NO), the control unit 11 determines that the file corresponding to a URL or group ID of the record having the oldest time information of all of the records in the temporary list should be deleted from the temporary list (S2371). If a deletion target file is associated with the group ID, the control unit 11 judges whether the group ID is a first type group ID (S2375). If the group ID is not the first type group ID (S2375: NO), the deletion file decision process 1 terminates.

If the group ID is the first type group ID (S2375: YES), the control unit 11 judges whether a second type group ID corresponding to the first type group ID exists in the temporary list (S2377). Specifically, the control unit 11 searches for a second type group ID of which a main group ID coincides with a main group ID of the first type group ID.

If such a second type group ID is not found in the temporary list (S2377: NO), the deletion file decision process 1 terminates. If such a second type group ID is found in the temporary list (S2377: YES), the control unit 11 deletes the first type group ID from the temporary list and decrements N by 1 (S2379). Then, control returns to step S2369 to repeat the process from step S2369.

Figure 54:
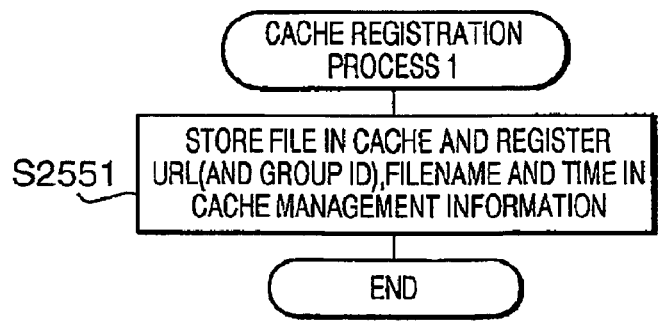
FIG. 54 is a flowchart illustrating a cache registration process 1.

Next, the cache registration process 1 executed in step S2167 of FIG. 50 will be described with reference to FIG. 54. In this process, the control unit 11 stores the obtained file in the cache area, and creates a new record including a URL, a group ID (if it exists), a filename, and a current time, and stores the new record in the cache management information (S2551).

It is understood that the above mentioned file obtaining process (FIG. 50) may be executed in step S107 of the MFP process (FIG. 12) to read or store the requested file (the service definition information) from or to the cache area.

As described above, the MFP 10 obtains the service definition information 25 from the directory server 20 before receiving a requested service, and obtains the service I/F information 36 from the function server 30. The acquisition of the information (file) is executed through the above mentioned file acquisition process (FIG. 50) in which if the requested file is found in the cached area, the cached file is used without obtaining the requested file from the server. When the file (which is not found in the cache area) is obtained from the server, the obtained file is added to the cached area.

Figure 52:
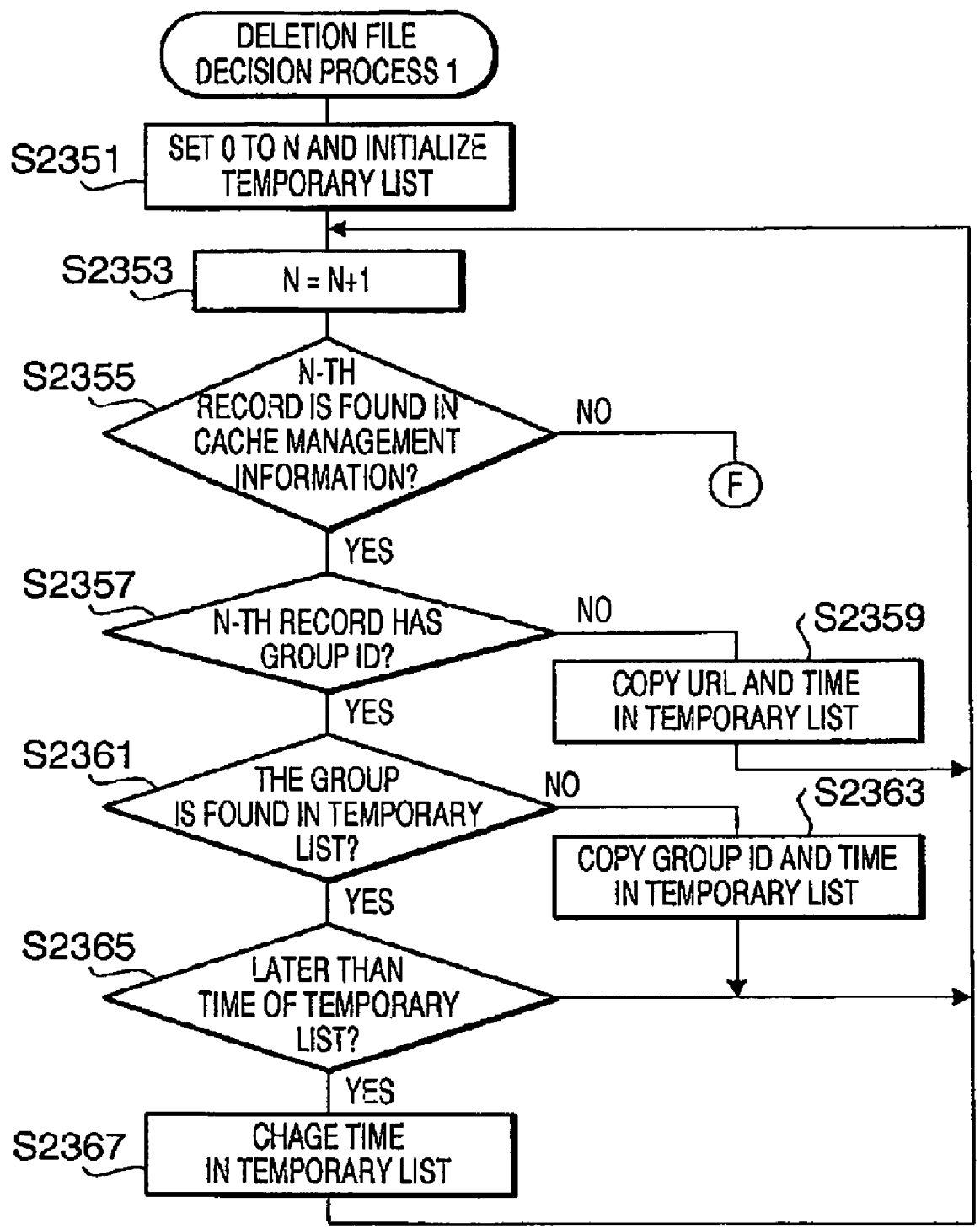
FIGS. 52 and 53 show a flowchart illustrating a deletion file decision process 1.
Figure 53:
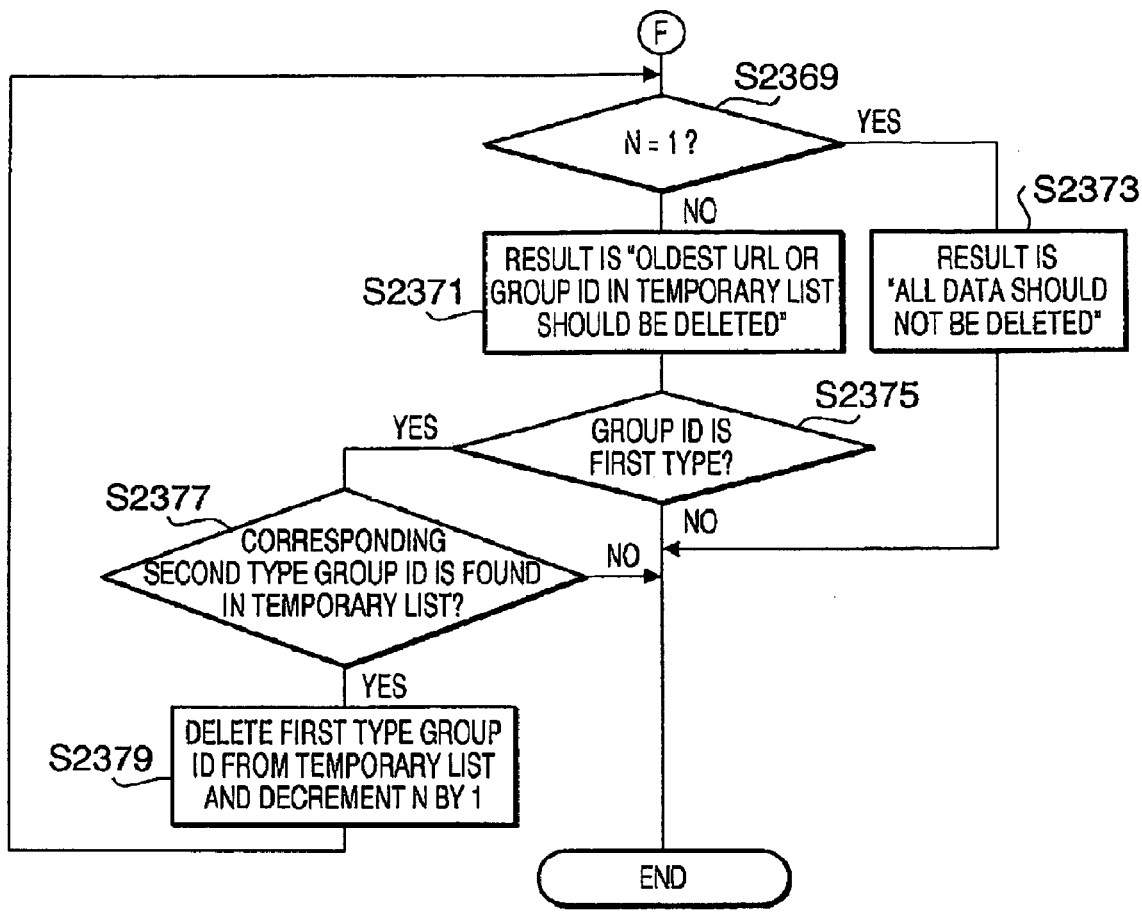

To effectively use the cached area of which memory size is limited, the judgment as to whether a cached file should be deleted is conducted on a group ID basis (see FIGS. 52 and 53). Therefore, a possibility, that a file (service definition file 25) having a high possibility of being used again is deleted from the cache area by a file (service definition information 36) which happened to be obtained one time, can be reduced, by which occurrences of operations for re-obtaining requested files also decrease. That is, the processing burden on the server and the network can be reduced. Since a response difference in regard to use of files having the same group ID decreases, usability of the MFP 10 is also enhanced.

In this illustrative embodiment, the oldest file is deleted from the cache area (see step S2375 of FIG. 53). In other words, late files having high frequency of usage can be maintained in the cache area. Therefore, efficiency of the usage of the cache area can be enhanced.

Two types of group IDs (the first type group ID and second type group ID) are available for the caching management of files. With regard to the first and second group IDs both of which have the same main group ID, deletion of files corresponding to one of such group IDs is limited. Specifically, in this case, a possibility that the file corresponding to the first type group ID is deleted from the cached area earlier than the file corresponding to another type group ID is reduced (see steps S2375 to S2379 of FIG. 53).

Figure 45:
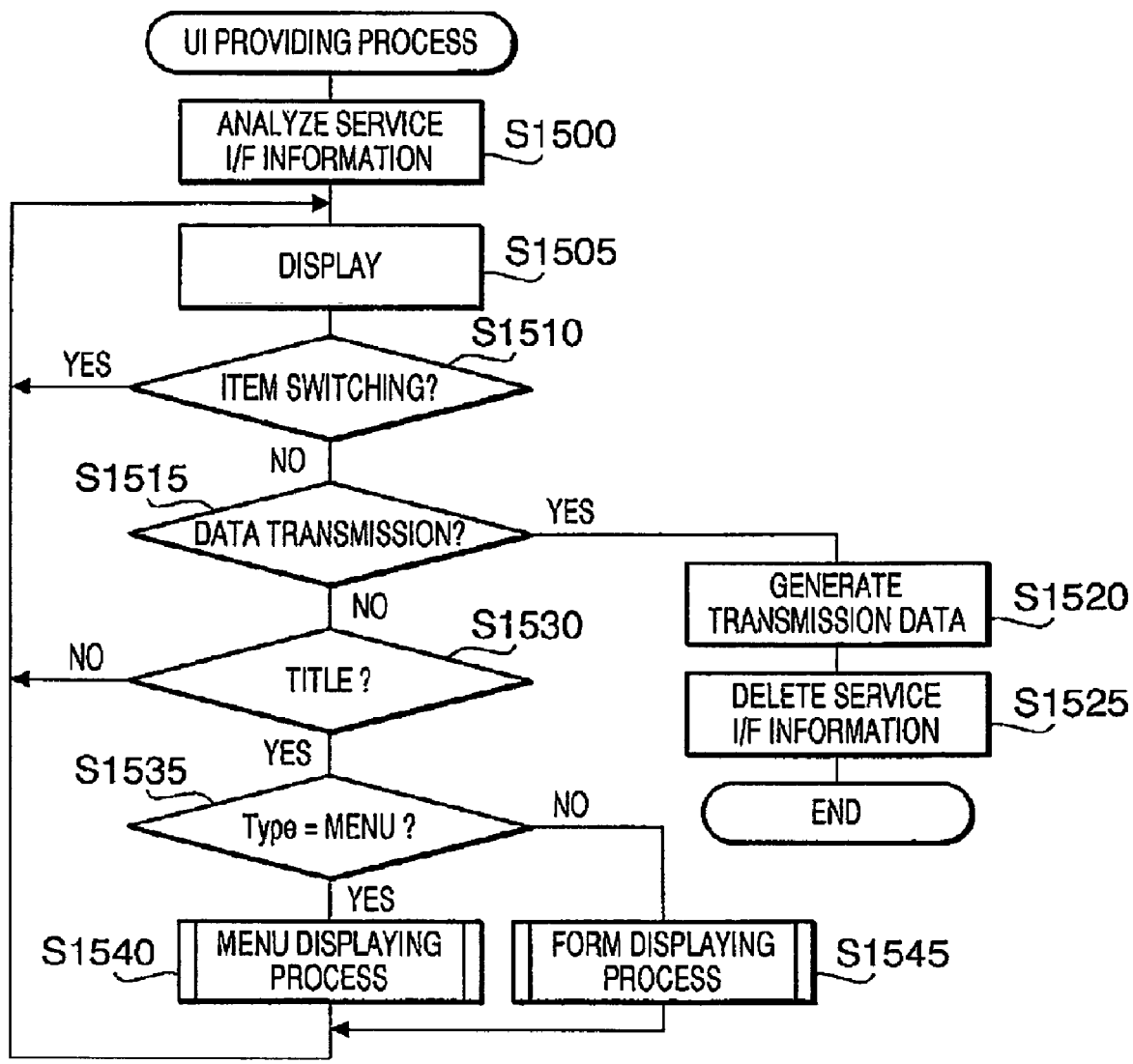
FIG. 45 is a flowchart illustrating a UI (user interface) providing process.

Hereafter, a UI (user interface) providing process executed in step S409 of the UI job (FIG. 16) will be described with reference to FIG. 45. First, the control unit 11 of the MFP 10 analyzes the service I/F information 36 transmitted from the function server 30 (S1500). Specifically, the control unit 11 analyzes a data structure of the service I/F information 36 containing menu information which is used to prepare an menu image allowing a user to input various types of parameters, so that the menu image based on the service I/F information is appropriately displayed on the display 52 in accordance with the performance specifications of the display 52.

Next, the control unit 11 displays the menu image on the display 52 according to the result of analysis of the service I/F information 36 (S1501). If data is inputted through the menu image displayed in step S1505, the control unit 11 judges whether the input data is a command requesting the item switching (S1510). If the command is the item switching (S1510: YES), control returns to step S1505 to display another menu image for a next item.

If the command is not the item switching (S1510: NO), the control unit 11 judges whether data transmission is selected (S1515). If data transmission is selected (S1515: YES), the control unit 11 generates transmission data (S1520). Then, the control unit 11 deletes the service I/F information provided by the function server 30. Although in this process the service I/F information is deleted in step S1525 to reduce burden on the MFP 10 in regard to the data storage; however, the service I/F information may be cached in a cache memory area by a caching function of the MFP 10.

If the data transmission is not selected (S1515: NO), the control unit 11 judges whether the title in the menu image is selected (S1530). If the title is not selected (S1530, NO), control returns to step S1505. If the title is selected (S1530: YES), the data type ("Type") of the item designated by "Title" is "MENU" (S1535). If the data type is "MENU" (S1535: YES), control proceeds to step S1540 where a menu displaying process (see FIG. 46) is executed. If it is judged in step S1535 that the data type is not "MENU", control proceeds to step S1545 where a FORM displaying process (see FIG. 47) is executed.

Figure 46:
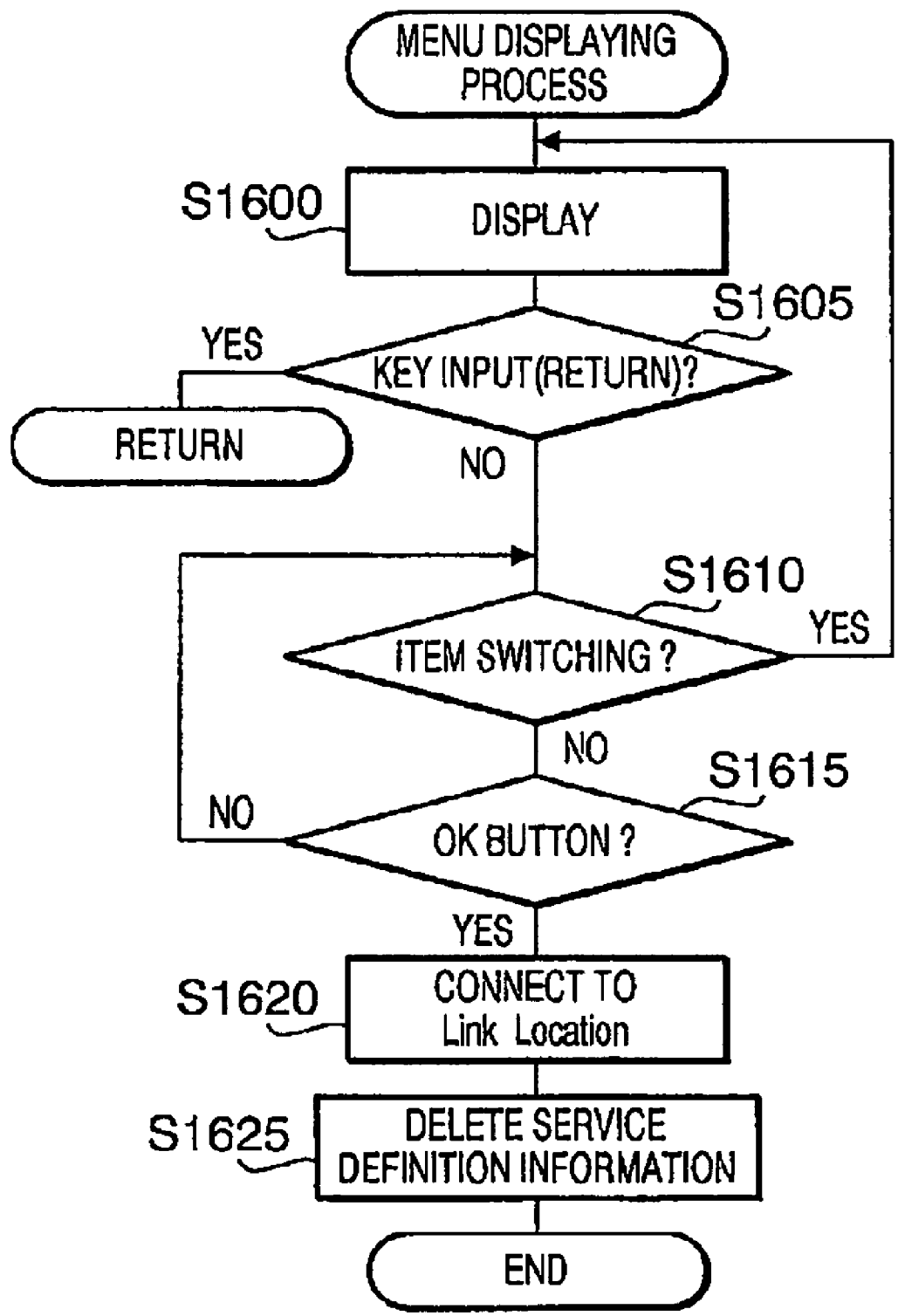
FIG. 46 is a flowchart illustrating a menu displaying process.

Hereafter, the menu displaying process will be described with reference to FIG. 46. First, the control unit 11 displays data designated by tags <Title> and <Link_Title> (S1600). In this case, the number of display lines is determined in accordance with the specifications of the display 52. Next, the control unit 11 judges whether the command (key input) inputted through the menu image is "RETURN". If the command is the "RETURN" (S1605: YES), the menu displaying process terminates, and control returns to step S1505 of FIG. 45.

If the command is not the "RETURN" (S1605: NO), the control unit 11 judges whether the command requests the item switching (S1610). If the command requests the item switching (S1610: YES), the control unit 11 displays data designated by tags "Title" and "Link_Title" (S600). If the command is not the item switching (S1610: NO), i.e., if a link is selected, control proceeds to step S1615.

In step S1615, the control unit 11 judges whether the "OK" button 50 is pressed. If the "OK" button 50 is not pressed (S1615: NO), control returns to step S1610. If the "OK" button 50 is pressed (S1610: YES), the control unit 11 operates to connect the MFP 10 to a URL of a service defined by the <Link_Location> tag. If the MFP 10 is connected to the link, the obtained service definition information is deleted (S1625). Although in this process the service definition information is deleted in step S1625 to reduce burden on the MFP 10 in regard to the data storage; however, the service definition information may be cached in a cache memory area by a caching function of the MFP 10.

Figure 47:
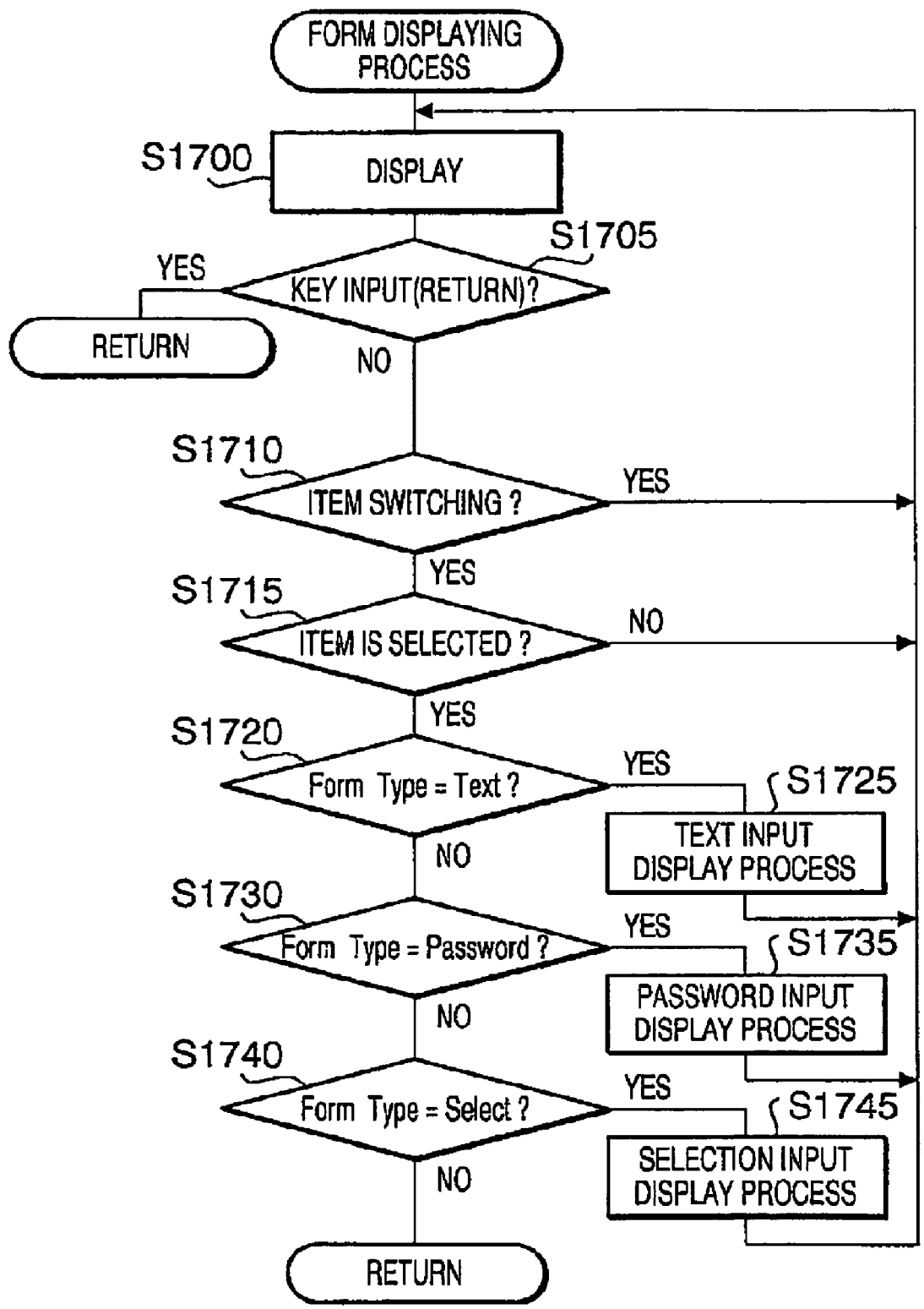
FIG. 47 is a flowchart illustrating a form displaying process.

Hereafter, the form displaying process will be described with reference to FIG. 47. First, the control unit 11 displays data designated by tags <Title> and Disp_Name> (S1700). In this case, the number of display lines is determined in accordance with the specifications of the display 52. Next, the control unit 11 judges whether the command (key input) inputted through the menu image is "RETURN". If the command is the "RETURN" (S1705: YES), the form displaying process terminates, and control returns to step S1505 of FIG. 45.

If the command is not the "RETURN" (S1705: NO), control unit 11 judges whether the command requests the item switching (S1710). If the command requests the item switching (S1710: YES), the control unit 11 judges whether the selection of the item is confirmed (S1715). If the selection of the item is confirmed (S1715: YES), the control unit 11 judges whether the form type is a text type (S1720). If the form type is a text type (S1720: YES), a text input display process is executed in step S725.

If the form type is not the text type (S1720: NO), the control unit 11 judges whether the form type is a password type (S1730). If the form type is the password type (S1730: YES), a password input display process is executed (S1735). In the password input display process, words inputted by use of a password converted to other symbols and the converted symbols are displayed on the display 52 so that the inputted words are concealed.

If the form type is not the password type (S1730: NO), the control unit 111 judges whether the form type is a selection type (S1740). If the form type is the selection type (S1740: YES), a selection input display process is executed to display selection items (S1745). If the form type is not the selection type (S1740: NO), the form displaying process terminates, and control returns to step S1505 of FIG. 45.

Figure 48:
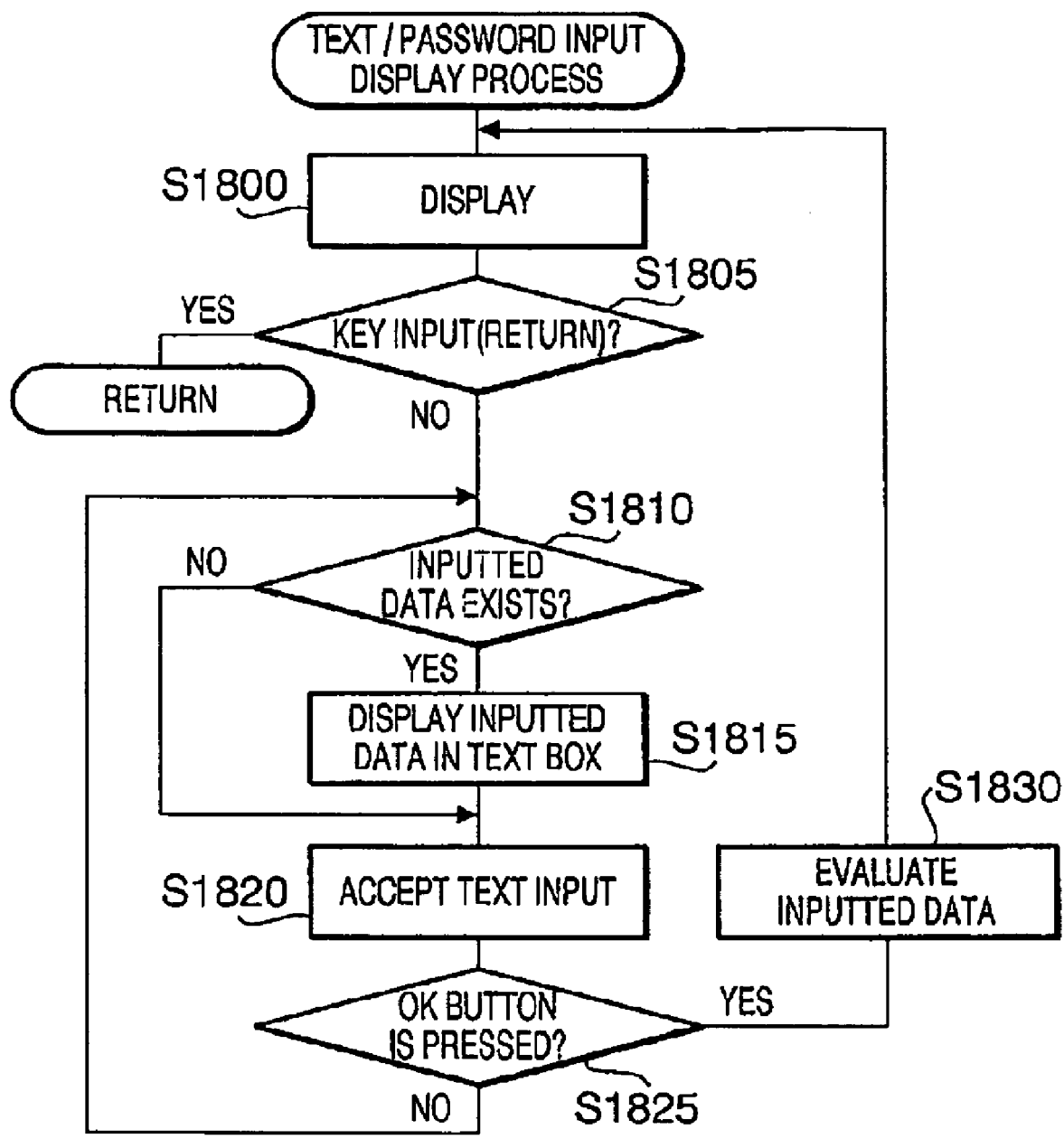
FIG. 48 is a flowchart illustrating a text/password input display process.

Hereafter, the text input displaying process and the password input displaying process will be described with reference to a flowchart of FIG. 48 which can be applied to the two processes. First, the control unit 11 displays data designated by tag <Disp_Name> and a text input box (S1800). Next, the control unit 11 judges whether the command (key input) inputted through the menu image is "RETURN" (S1805). If the command is the "RETURN" (S1805: YES), the form displaying process terminates, and control returns to step S1700 of FIG. 47.

If the command is not "RETURN" (S1805: NO), the control unit 11 judges whether data has been already input (S1810). If there is already input data (S1810: YES), the control unit 11 displays the input data in the text box (S1815). If data has not been input (S1805: NO), the control unit 11 accepts the text input (S1820). Next, the control unit 11 judges whether the "OK" button 50 is pressed (S1825). If the "OK" button 50 is not pressed (S1825: NO), control returns to step S1810.

If the "OK" button 50 is pressed (S1825: YES), the control unit 11 evaluates the input data (S1830). Then, control returns to step S1800.

Figure 49:
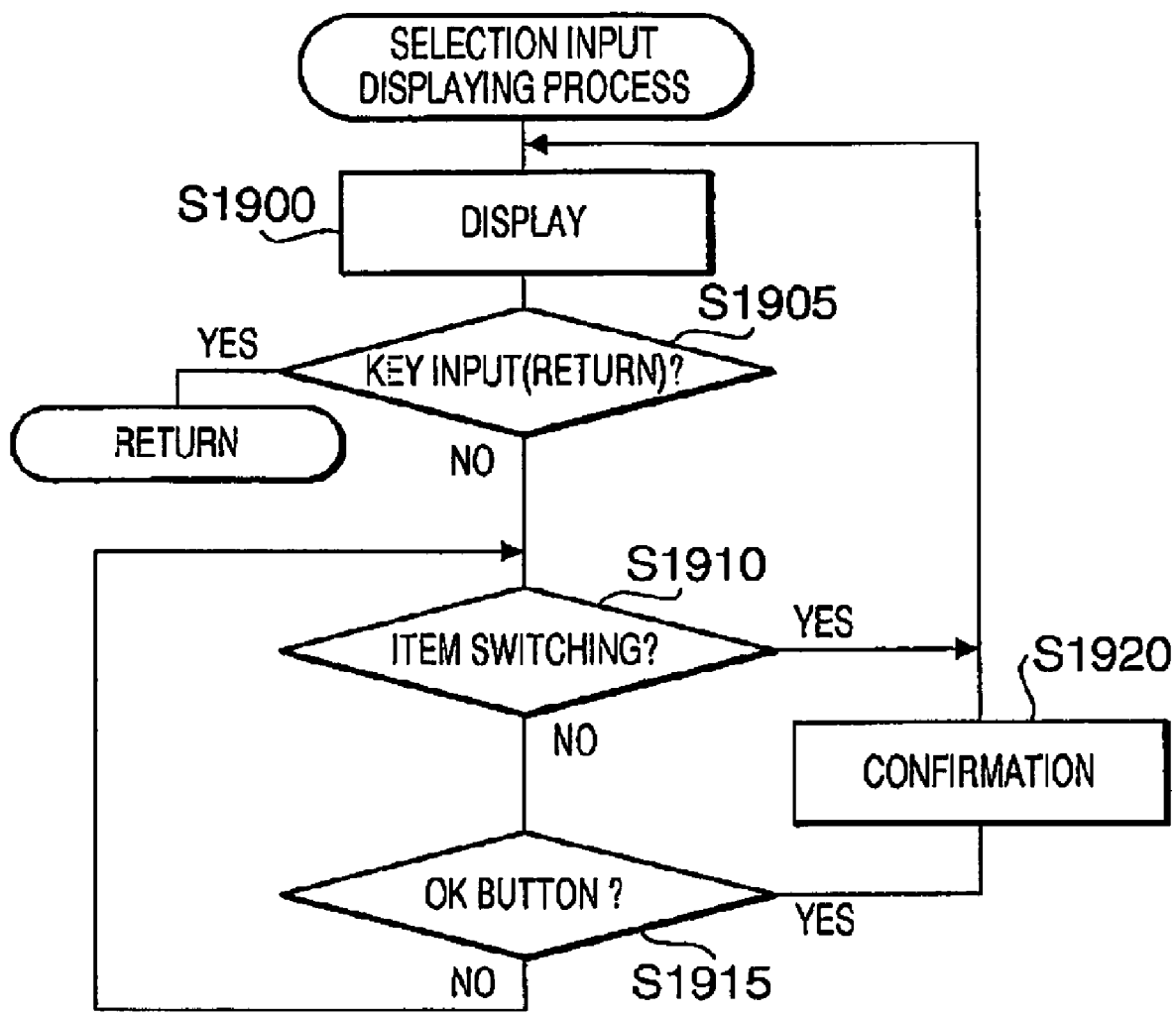
FIG. 49 is a flowchart illustrating a selection input displaying process.

Hereafter, the selection input displaying process will be described with reference to FIG. 49. First, the control unit 11 displays data designated by tags <Disp_Name> and <Disp_Select> (S1900). Next, the control unit 11 judges whether the command (key input) inputted through the menu image is "RETURN". If the command is the "RETURN" (S1905: YES), the selection input displaying process terminates, and control returns to step S1700 of FIG. 47.

If the command is not the "RETURN" (S1905: NO), the control unit 11 judges whether the command requests item switching (S1910). If the command requests item switching (S1910: YES), the control unit 11 judges whether the "OK" button 50 is pressed (S1915). If the "OK" button 50 is not pressed (S1915: NO), control returns to step S1910. If the "OK" button 50 is pressed (S1915: YES), the control unit 11 confirms the selection (S1920). Then, control returns to step S1900.

As described above, the menu information based on the service definition information 25 or the service I/F information is generated reflecting the specifications of units (e.g., a printer unit or scanner unit) of the MFP 10, and thus generated menu information is supplied to the MFP 10. The MFP 10 generates the menu image based on the menu information and displays the menu image on the display 52 in accordance with the specifications of the display 52 on the operation panel 12a so as to allow a user to select a service to be requested from the function server 30 and to set parameters of the service.

Therefore, it becomes possible to display the menu image regardless of the specifications of the display unit of the MFP 10. The image processing system 100 provides a desirable service to users.

In the image processing system 100, the menu information based on the service definition information 25 or the service I/F information 36 is structured in a hierarchical format, and the tag is given to each piece of information so that each information is identified and defined. Such a configuration enables the MFP 10 to easily generate the menu image, to decrease the time required for generating the menu image, and to decrease the processing burden on the MFP 10. The efficiency of data communications among the MFP(s) 10, the directory server 20 and the function server 30 is also enhanced.

Figure 17:
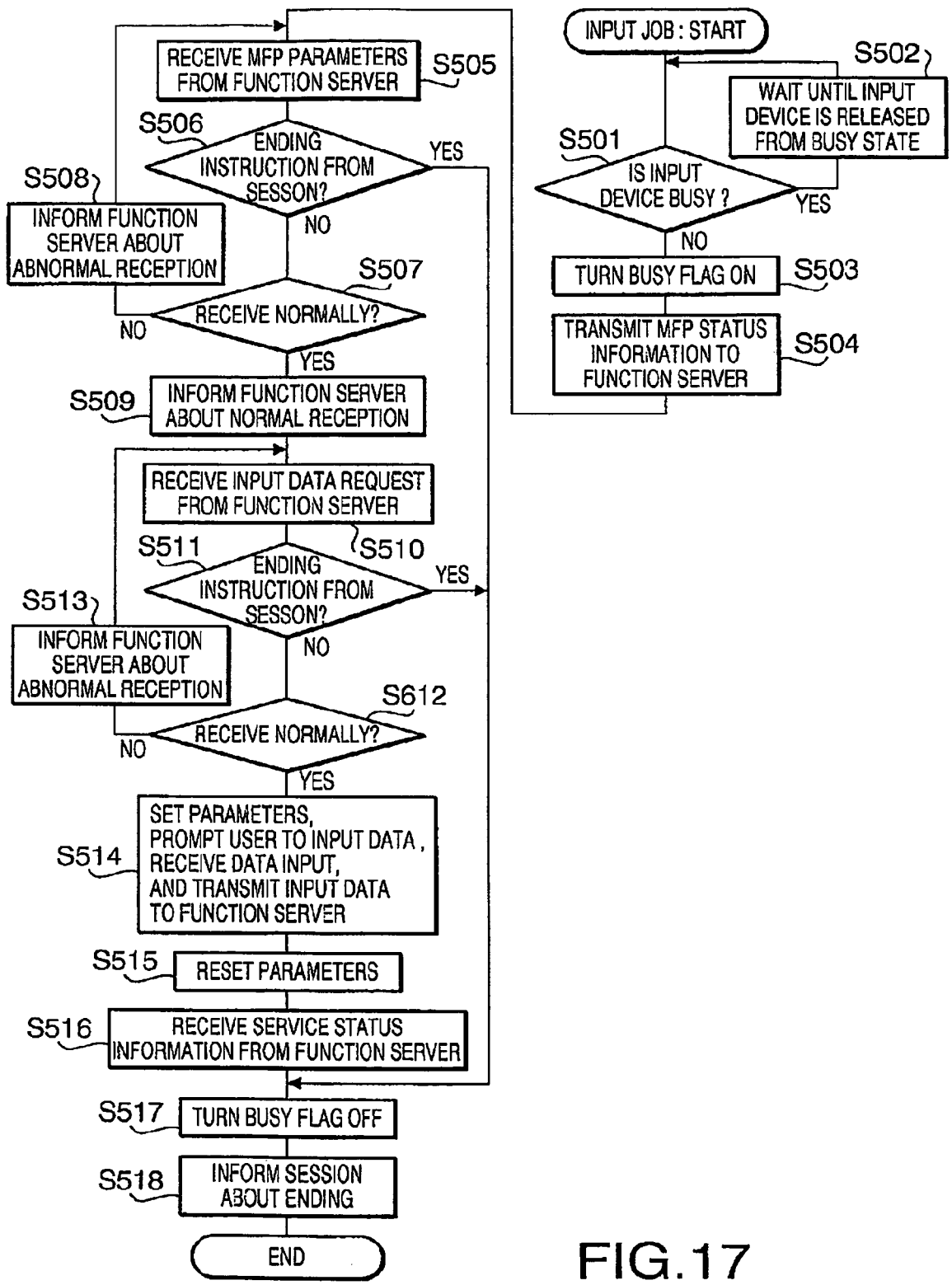
FIG. 17 is a flowchart showing an input job which is executed by the control unit of the MFP in accordance with aspects of the invention.

Hereafter, the input job, which is activated in step S305 of the designated job activation process (FIG. 15) to operate concurrently with the session process and the UI job, will be explained referring to a flowchart of FIG. 17.

At the start of the input job, the MFP 10 judges whether the input device (the reading unit 103 (when the service pertains to image data generated by the reading unit 103) or the sound input unit 107 (when the service pertains to sound data generated by the sound input unit 107)) is in a busy state (S501). Specifically, the MFP 10 judges that the input device is in the busy state when a busy flag "Fi" (indicating whether the input device is in the busy state) has been turned on (not in the busy state when the busy flag "Fi" is off).

If the input device is in the busy state (S501: YES), the MFP 10 waits until the input device is released from the busy state (S502). If the input device is not in the busy state (S501: NO), the MFP 10 turns the busy flag "Fi" on (S503) and transmits the MFP status information to the function server 30 together with the session ID, the job ID and the error code (S504).

In response to the MFP status information transmitted in S504, the MFP 10 receives the MFP parameters from the function server 30 (S505). Incidentally, the MFP parameters are transmitted by the function server 30 in step S1203 of a scan job process shown in FIG. 25 (explained later) which is executed by the control unit 31 of the function server 30.

Subsequently, the MFP 10 judges whether there is an ending command from the session (S506). Incidentally, the ending command from the session is issued in step S210 of the session process of FIG. 14.

If there is no ending command from the session (S506: NO), the MFP 10 judges whether the MFP parameters were received normally in S505 (S507).

If the MFP parameters were not received normally (S507: NO), the MFP 10 informs the function server 30 about the abnormal reception (NG) as the MFP reception status indicating whether the MFP 10 received information from the function server 30 normally (S508) and thereafter control returns to the step S505. Incidentally, the MFP reception status is transmitted to the function server 30 together with the session ID and the job TD.

If the MFP parameters were received normally (S507: YES), the MFP 10 informs the function server 30 about the normal reception (OK) as the MFP reception status (S509).

Subsequently, the MFP 10 receives the input data request from the function server 30 (S510). Incidentally, the input data request is transmitted by the function server 30 in step S1209 of the scan job process shown in FIG. 25 (explained later) which is executed by the control unit 31 of the function server 30.

Subsequently, the MFP 10 judges whether there is an ending command from the session, similarly to S506 (S511).

If there is no ending command from the session (S511: NO), the MFP 10 judges whether the input data request was received normally in step S510 (S512).

If the input data request was not received normally (S512: NO), the MFP 10 informs the function server 30 about the abnormal reception (NG) (S513) and thereafter control returns to the step S510.

If the input data request was received normally (S512: YES), the MFP 10 sets the parameters, prompts the user to perform an input operation (displays a message like "Set a document on the scanner and press OK key." or "Lift the handset and input voice." on the display 52 of the operation panel 102a) and successively transmits the input data to the function server 30 (S514). The input data may also be image data read out from a semiconductor memory (e.g. memory card), image data read out from the storage unit 16, etc. Incidentally, the input data is transmitted to the function server 30 together with the session ID and the job ID.

Subsequently, the MFP 10 resets the parameters set in the step S514 (S515). Subsequently, the MFP 10 receives the service status information from the function server 30 (S516) and turns the busy flag "Fi" off (S517). Incidentally, the service status information is transmitted by the function server 30 in step S1208 or S1212 of the scan job process shown in FIG. 25 (explained later) which is executed by the control unit 31 of the function server 30.

If there is an ending command from the session in the step S506 (S506: YES) or S511 (S511: YES), control directly advances to step S517 and the MFP 10 turns the busy flag "Fi" off (S518). Thereafter, the MFP 10 informs the session about the ending (S518). Then, the input job terminates.

Figure 18:
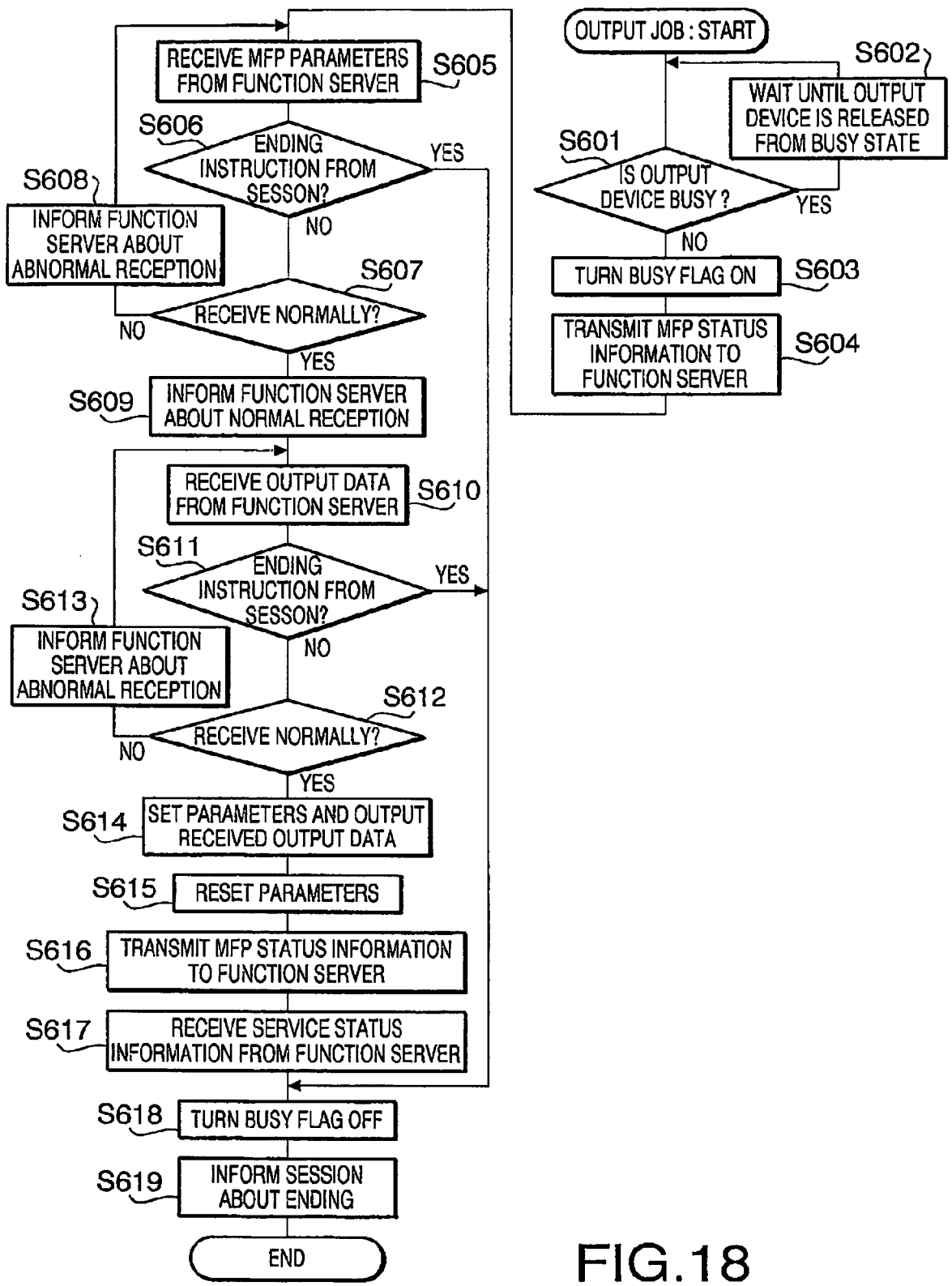
FIG. 18 is a flowchart showing an output job which is executed by the control unit of the MFP in accordance with aspects of the invention.

Hereafter, the output job, which is activated in step S308 of the designated job activation process (FIG. 25) to operate concurrently with the session process, the UI job and the input job, will be explained referring to a flowchart of FIG. 18.

At the start of the output job, the MFP 10 judges whether the output device (the recording unit 104 (when the service pertains to image data representing an image to be printed by the recording unit 104) or the sound output unit 108 (when the service pertains to sound data representing sound to be outputted by the sound output unit 108)) is in a busy state (S601). Specifically, the MFP 10 judges that the output device is in the busy state when a busy flag "Fo" (indicating whether the output device is in the busy state) has been turned on (not in the busy state when the busy flag "Fo" is off).

If the output device is in the busy state (S601: YES), the MFP 10 waits until the output device is released from the busy state (S602) and thereafter control returns to the step S601.

If the output device is not in the busy state (S601: NO), the MFP 10 turns the busy flag "Fo" on (S603) and transmits the MFP status information to the function server 30 together with the session ID, the job ID and the error code (S604).

In response to the MFP status information transmitted in S604, the MFP 10 receives the MFP parameters from the function server 30 (S605). Incidentally, the MFP parameters are transmitted by the function server 30 in step S1303 of a print job process shown in FIG. 26 (explained later) which is executed by the control unit 31 of the function server 30.

Subsequently, the MFP 10 judges whether there is an ending command from the session (S606). Incidentally, the ending command from the session is issued in step S210 of the session process of FIG. 14 which is executed by the control unit 101 of the MFP 10.

If there is no ending command from the session (S606: NO), the MFP 10 judges whether the MFP parameters were received normally in S605 (S607).

If the MFP parameters were not received normally (S607: NO), the MFP 10 informs the function server 30 about the abnormal reception (NG) as the MFP reception status information indicating whether the MFP 10 received information from the function server 30 normally (S608) and thereafter control returns to the step S605. Incidentally, the MFP reception status information is transmitted to the function server 30 together with the session ID and the job ID.

If the MFP parameters were received normally (S607: YES), the MFP 10 informs the function server 30 about the normal reception (OK) as the MFP reception status information (S609).

Subsequently, the MFP 10 receives the output data (e.g. image data or sound data) from the function server 30 (S610). Incidentally, the output data is transmitted by the function server 30 in step S1309 of the print job process shown in FIG. 26 (explained later) which is executed by the control unit 31 of the function server 30.

Subsequently, the MFP 10 judges whether there is an ending command from the session, similarly to S606 (S611).

If there is no ending command from the session (S611: NO), the MFP 10 judges whether the output data was received normally in step S610 (S612).

If the output data was not received normally (S612: NO), the MFP 10 informs the function server 30 about the abnormal reception (NG) (S613) and thereafter control returns to the step S610.

If the output data was received normally (S612: YES), the MFP 10 sets the parameters and executes a process for outputting the output data (e.g. outputting of an image represented by the image data or sound represented by the sound data) (S614).

Subsequently, the MFP 10 resets the parameters set in the step S614 (S615) and transmits the MFP status information to the function server 30 together with the session ID, the job ID and the error code (S616).

Subsequently, the MFP 10 receives the service status information from the function server 30 (S617) and turns the busy flag "Fo" off (S618). Incidentally, the service status information is transmitted by the function server 30 in step S1308 or S1312 of the print job process shown in FIG. 26 (explained later) which is executed by the control unit 31 of the function server 30.

If there is an ending command from the session in the step S606 (S606: YES) or S611 (S611: YES), control directly advances to the step S618 and turns the busy flag "Fo" off. Thereafter, the MFP 10 informs the session about the ending (S619). Then, the output job terminates.

Figure 19:
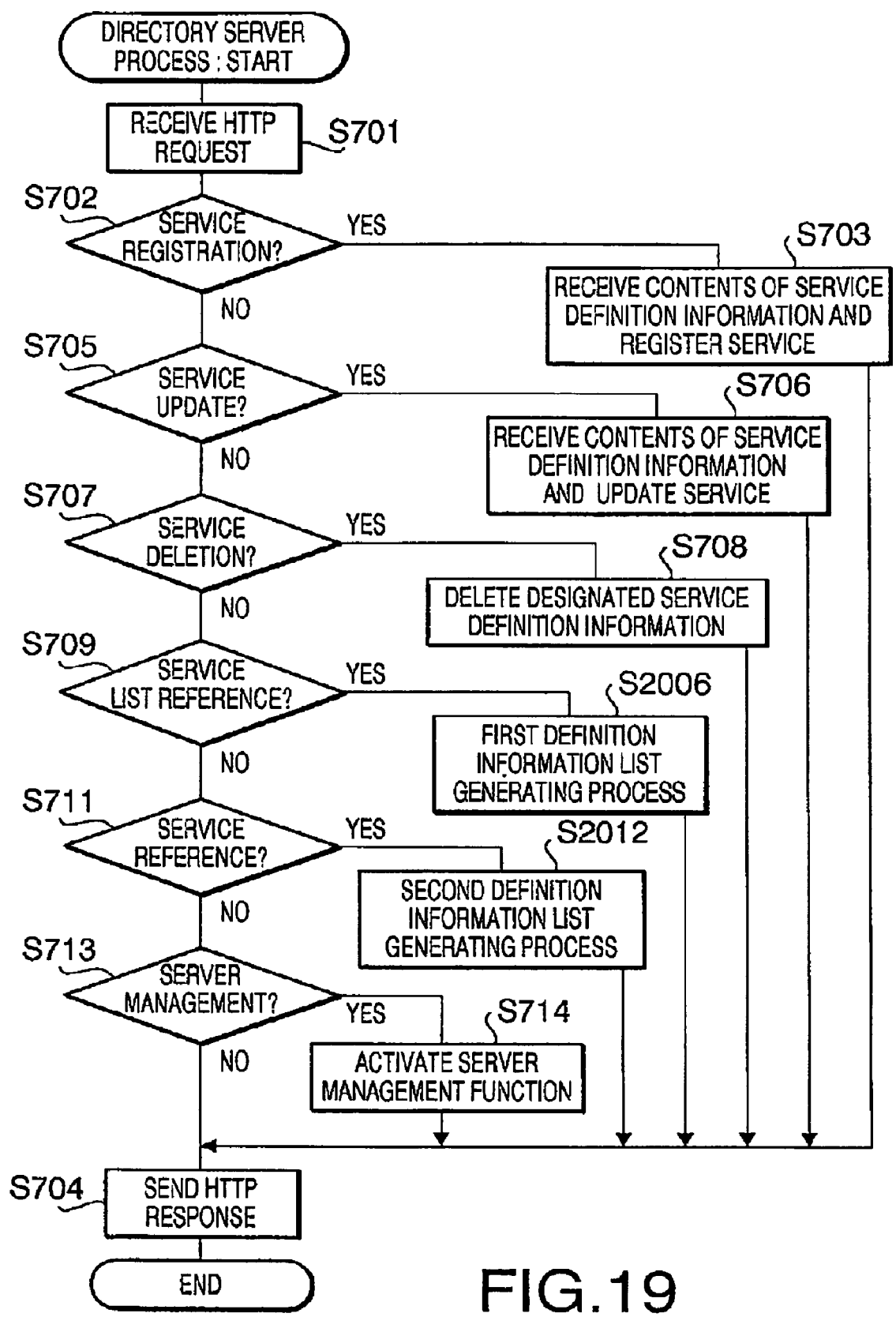
FIG. 19 is a flowchart showing a directory server process executed by a control unit of the directory server in accordance with aspects of the invention.

Hereafter, a directory server process executed by the control unit 21 of the directory server 20 will be explained referring to a flowchart of FIG. 19. The directory server process is started when an HTTP request is received by the directory server 20.

At the start of the directory server process, the control unit 21 of the directory server 20 (hereinafter also referred to simply as "the directory server 20") receives an HTTP request (S701).

Subsequently, the directory server 20 judges whether the HTTP request received in S701 is a service registration command (S702). Incidentally, the service registration command is transmitted by the function server 30 in step S1406 of a service addition process shown in FIG. 27 (explained later) which is executed by the control unit 31 of the function server 30.

If the HTTP request received in S701 is a service registration command (S702: YES), the directory server 20 receives the contents of the service definition information 25 and registers a new service (S703). Specifically, information on the new service is registered in the service definition information 25 stored in the service definition information storage unit 24 of the storage unit 23. Thereafter, the directory server 20 transmits an HTTP response (S704). Then, the directory server process terminates.

If the HTTP request received in S701 is not a service registration command (S702: NO), the directory server 20 judges whether the HTTP request is a service update command (requesting or reporting alteration of a URL for requesting a service, for example) or not (S705). Incidentally, the service update command is transmitted by the function server 30 in step S1503 of a service alteration process shown in FIG. 28 (explained later) which is executed by the control unit 31 of the function server 30.

If the HTTP request received in S701 is a service update command (S705: YES), the directory server 20 receives the contents of the service definition information 25 and updates a service (S706). Specifically, information an a service included in the service definition information 25 stored in the service definition information storage unit 24 of the storage unit 23 is updated. Thereafter, the directory server 20 transmits an HTTP response (S704). Then, the directory server process terminates.

If the HTTP request received in S701 is not a service update command (S705: NO), the directory server 20 judges whether the HTTP request is a service deletion instruction (S707). Incidentally, the service deletion command is transmitted by the function server 30 in step S1602 of a service deletion process shown in FIG. 29 (explained later) which is executed by the control unit 31 of the function server 30.

If the HTTP request received in S701 is a service deletion command (S707: YES), the directory server 20 deletes service definition information 25 corresponding to a service designated by the service deletion instruction (S708). Specifically, information on the designated service included in the service definition information 25 stored in the service definition information storage unit 24 of the storage unit 23 is deleted. Thereafter, the directory server 20 transmits an HTTP response (S704). Then, the directory server process terminates.

If the HTTP request received in S701 is not a service deletion instruction (S707: NO), the directory server 20 judges whether the HTTP request is a service list reference request (S709). Incidentally, the service list reference request is transmitted by the MFP 10 in step S106 of the MFP process (FIG. 12) executed by the control unit 101 of the MFP 10.

If the HTTP request received in S701 is the service list reference request (S709: YES), control proceeds to step S2006 where a first definition information list generating process (see FIG. 43) is executed. In step S2006, the directory server 20 generates the top service definition information 25. Next, the directory server 20 transmits an HTTP response containing the top service definition information 25 (S704). Then, the directory server process terminates.

If the HTTP request received in S701 is not the service list reference request (S709: NO), the directory server 20 judges whether the HTTP request is the service reference request (S711). Incidentally, the service reference request is transmitted by the MFP 10 in the step S115a of the MFP process (FIG. 12) executed by the control unit 101 of the MFP 10.

If the HTTP request received in S701 is the service reference request (S711: YES), control proceeds to step S2012 where a second definition information list generating process (see FIG. 44) is executed. In step S2012, the directory server 20 generates the service definition information 25. Next, the directory server 20 transmits an HTTP response containing the service definition information 25 (S704). Then, the directory server process terminates.

If the HTTP request received in S701 is not the service reference request (S711: NO), the directory server 20 judges whether the HTTP request is a server management command for managing the directory server 20 (S713). Incidentally, a process transmitting the server management command is not directly relevant to the present invention and thus an explanation thereof is omitted here.

If the HTTP request received in S701 is a server management command (S713: YES), the directory server 20 activates a server management function (S714), and transmits an HTTP response (S704). Then, the directory server process terminates. If the HTTP request received in S701 is not a server management command (S733: NO), the directory server 20 transmits an HTTP response (S704). Then, the MFP ends the directory server process.

Hereafter, the first definition information list generating process executed under control of the control unit 21 of the directory server 20 will be explained with reference to FIG. 43. First, the directory server 20 generates a function information request (S2102), and transmits the function information request to the MFP 10 as an HTTP response (S2104). The function information request is a command for requesting the MFP 10 to send information about the functions of the MFP 10.

After the MFP 10 receives the function information request, the MFP 10 transmits the function information to the directory server 20 as an HTTP request (S2106). In this illustrative embodiment, the function information including "SCAN", "PRINT", "VOICE" and the language is transmitted from the MFP 10 to the directory server. After receiving the HTTP request from the MFP 10, the directory server 20 judges whether the function information has been obtained (S2108). If the function information has been obtained (S2108: YES), the directory server 20 reads out the value of the "Link_DevResource" tag contained in the top service definition information 25 (S2110). Specifically, in step S2110, the service definition information of which message part is described in the language designated by the language information in the function information is obtained.

In the storage unit 23 of the directory server 20, the ID tag values are stored while being associated with their respective languages. In the example shown in FIG. 3, the value '11111110' is assigned to "ID" tag as information indicating that the service I/F information should be displayed in Japanese. From the service definition information 25 shown in FIG. 3, "SCAN" and "VOICE" are read out as values of the "Link_DevResource" tag included in the first "Link" tags ("Link", "/Link"), "PRINT" is read out as values of the "Link_DevResource" tag included in the second "Link" Lags ("Link", "/Link"), and "PRINT" and "SCAN" are read out as values of the "Link_DevResource" tag included in the third "Link" tags ("Link", "/Link"). These values of the "Link_DevResource" tags represent functions necessary for receiving the corresponding service on the MFP 10.

In step S2112, the top one of the values of "Link_DevResource" tags obtained in step S2110 is selected as a target. Next, in step S2114, the directory server 20 judges whether the functions of the MFP 10 indicated in the function information obtained in step S2108 satisfy the functions designated in the target "Link_DevResource" tag. If all of the functions designated in the target "Link_DevResource" tag are supported by the functions indicated in the function information, the judgment result of step S2114 is "YES".

If the judgment result of step S2114 is "YES," control proceeds to step S2116 where the directory server 20 registers the "Link" tags including the target "Link_DevResource" tag in the service definition information list. If the judgment result of step S2114 is "NO", control proceeds to step S2118. The service definition information list is XML data (which is empty in an initial state) in which the link tags are registered along with the information ahead of the link tags.

In step S2118, the directory server 20 judges whether all of the "Link_DevResource" tags have been processed. If all of the "Link_DevResource" tags have not been processed, a next target is selected (S2120). Then, control returns to step S2114. If all of the "Link_DevResource" tags have been processed (S211: YES), the first service definition information list generating process terminates. The service definition information list thus generated is sent back to the MFP 10 in step S704.

Since the MFP 10 has all of the functions "SCANNER", "PRINT" and "VOICE", the service I/F information 36 containing all of the functions indicated in FIG. 3 is generated for the MFP 10. If an MFP (MFP B) not having the function "VOICE" is provided in the image processing system 100, the service I/F information 36 containing only the print service is generated for the MFP B, and the service definition information is displayed (S108).

Hereafter, the second definition information list generating process executed under control of the control unit 21 of the directory server 20 will be described with reference to FIG. 44. First, the directory server 20 generates a function information request (S2202), and transmits the function information request to the MFP 10 as an HTTP response (S2204). The function information request is a command for requesting the MFP 10 to send information about the functions of the MFP 10.

After the MFP 10 receives the function information request, the MFP 10 transmits the function information to the directory server 20 as an HTTP request (S2206). In this illustrative embodiment, the function information including "SCAN", "PRINT", "VOICE" and the language is transmitted from the MFP 10 to the directory server. After receiving the HTTP request from the MFP 10, the directory server judges whether the function information has been obtained (S2208). If the function information has been obtained (S2208: YES), the directory server 20 reads out service definition information 25 designated by a URL from the service definition information storage unit 24, and reads the value of the "Link_DevResource" tag contained in the service definition information 25 (S2210). Specifically, in step S2210, the service definition information is obtained regarding which message part is described in the language designated by the language information in the function information.

From the service definition information 25 shown in FIG. 3, "PRINT" and "SCAN" are read out as values of the "Link_DevResource" tag included in the first "Think" tags ("Link", "/Link"), "PRINT" and "SCAN" are read out as values of the "Link_DevResource" tag included in the second "Link" tags ("Link", "/Link"), "PRINT" and "VOICE" are read out as values of the "Link_DevResource" tag included in the third "Link" tags ("Link", "/Link"), and "PRINT" and "VOICE" are read out as values of the "Link_DevResource" tag included in the fourth "Link" tags ("Link", "Link"). These values of the "Link_DevResource" tag represent functions necessary for receiving the corresponding service on the MFP 10.

In step S2212, the top one of the values of "Link_DevResource" tags obtained in step S2210 is selected as a target. Next, in step S2214, the directory server 20 judges whether the functions of the MFP 10 indicated in the function information obtained in step S2208 satisfy the functions designated in the target "Link_DevResource" tag. If all of the functions designated in the target "Link_DevResource" tag are supported by the functions indicated in the function information, the judgment result of step S2214 is "YES".

If the judgment result of step S2214 is "YES," control proceeds to step S2216 where the directory server 20 registers the "Link" tags including the target "Link_DevResource" tag in the service definition information list. If the judgment result of step S2214 is "NO", control proceeds to step S2218. The service definition information list is XML data (which is empty in an initial state) in which the link tags are registered along with the information ahead of the link tags.

In step S2218, the directory server 20 judges whether all of the "Link_DevResource" tags have been processed. If all of the "Link_DevResource" tags have not been processed, a next target is selected (S2220). Then, control returns to step S2214. If all of the "Link_DevResource" tags have been processed (S2218: YES), the second service definition information list generating process terminates. The service definition information list thus generated is sent back to the MFP 10 in step S704.

As described above, the directory server 20 generates the service definition information 25 so that services matching the functions of the MFP 10 are included in the service definition information 25. Such a configuration prevents a service not matching the functions of the MFP 10 from being selected by the user. The MFP 10 requests a service selected by the user based on the service definition information 25 generated as mentioned above. Therefore, the MFP 10 can reliably receive a service matching the functions thereof.

Figure 43:
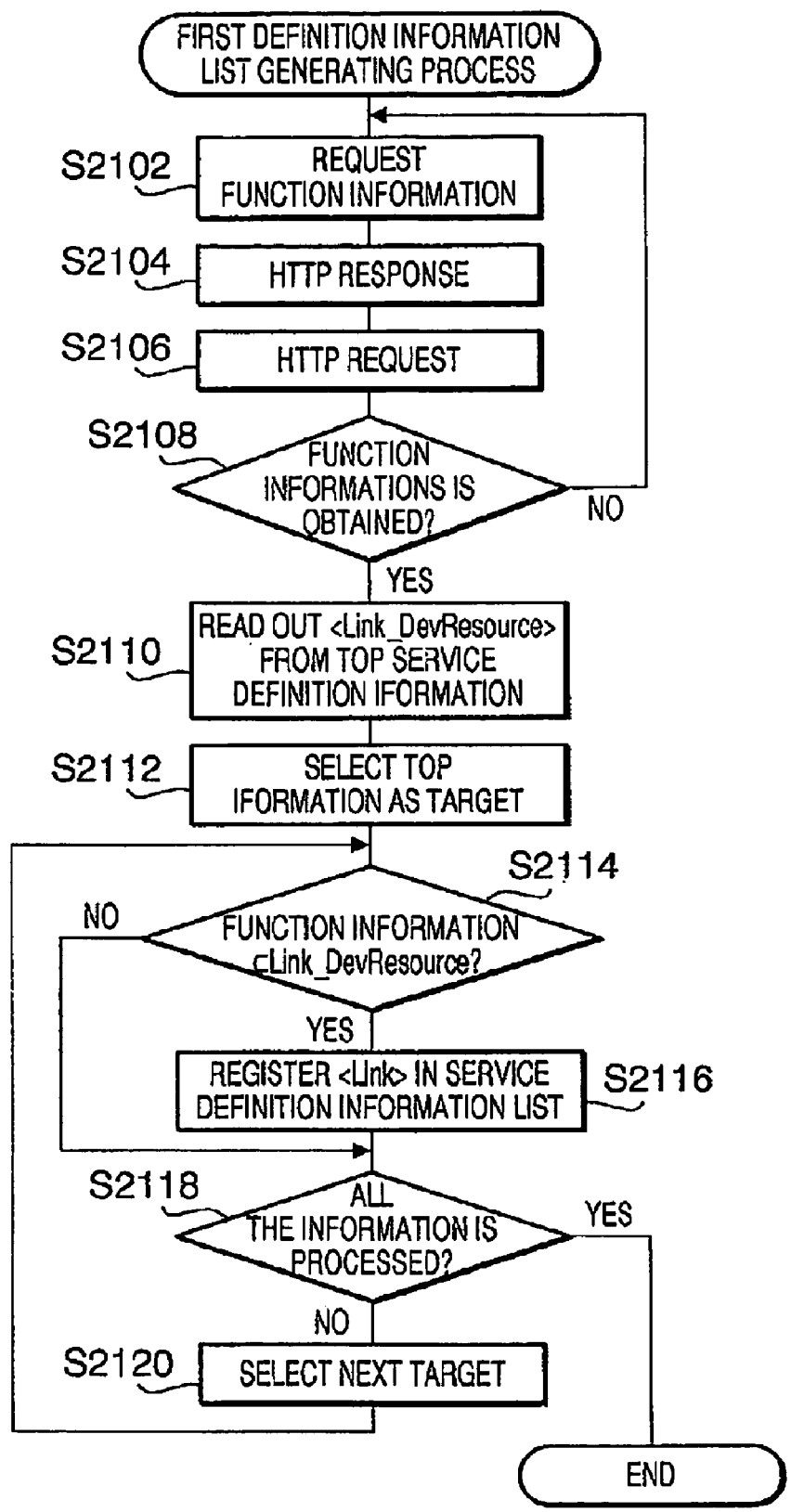
FIG. 43 is a flowchart illustrating a first definition information list generating process.
Figure 44:
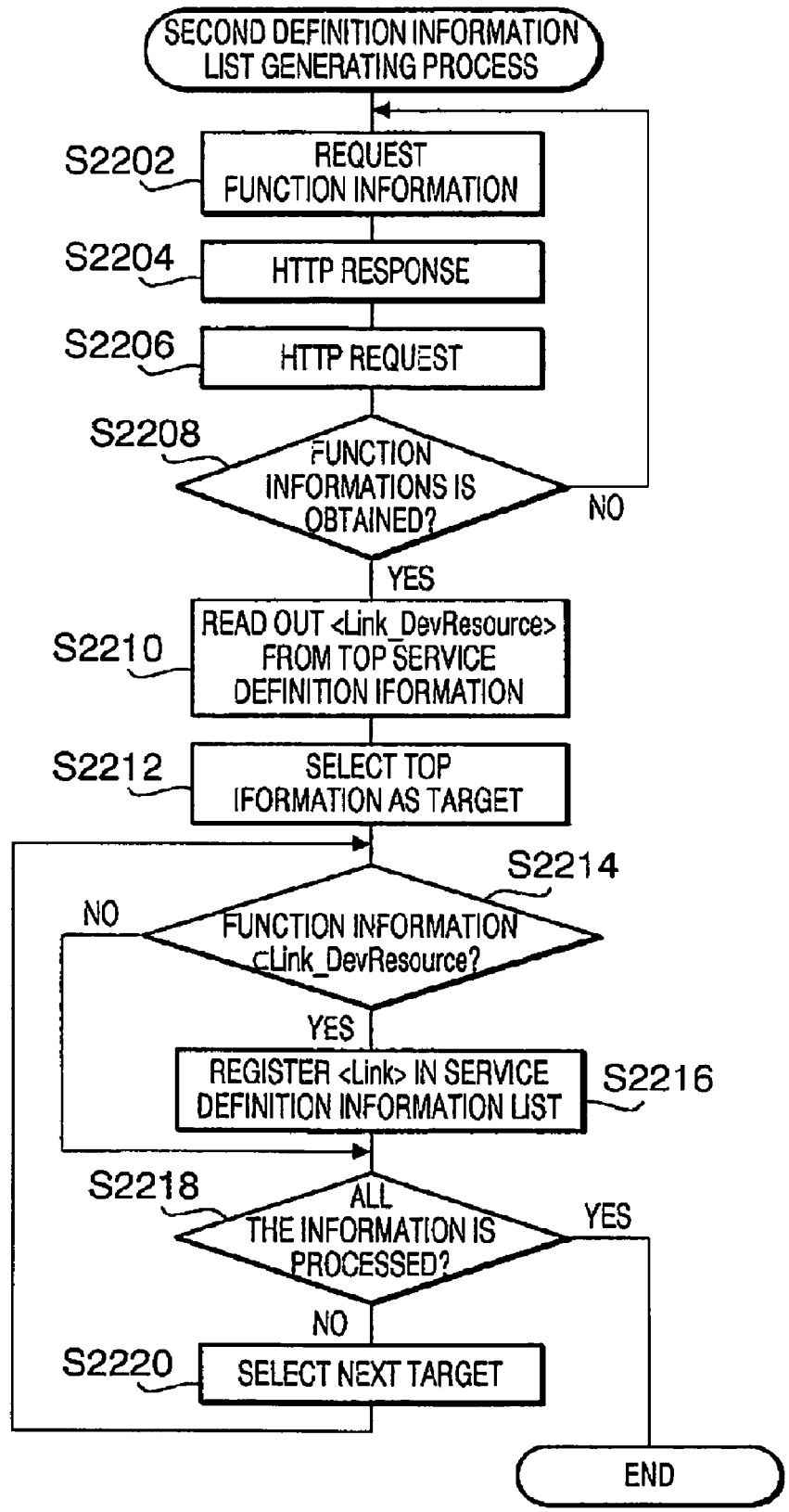
FIG. 44 is a flowchart illustrating a second definition information list generating process.

As shown in FIGS. 43 and 44, the directory server 20 is able to generate the service definition information 25 based on the function information which is supplied from the MFP 10 in steps S2102 to S2108 or steps S2202 to S2208. Therefore, it is not necessary for the directory server 20 to store in advance the function information of the MFP 10. It becomes possible to reduce the burden on the directory server 20 in regard to the information management even if more than one MFP is provided in the image processing system 100.

The directory server 20 sends a request for the function information to the MFP 10 in step S2106 or S2206 upon receiving the request for the service list from the MFP 10, and thereafter receives the function information from the MFP 10 as a response to the request for the function information. That is, supply of the function information to the directory server 20 is conducted when the request for the service list is issued by the MFP 10.

Since the message part of the service definition information 25 supplied from the directory server 20 to the MFP 10 is described in the language designated in the function information, it becomes possible to reliably form a service selection screen in a language required by the user of MFP 10.

Figure 20:
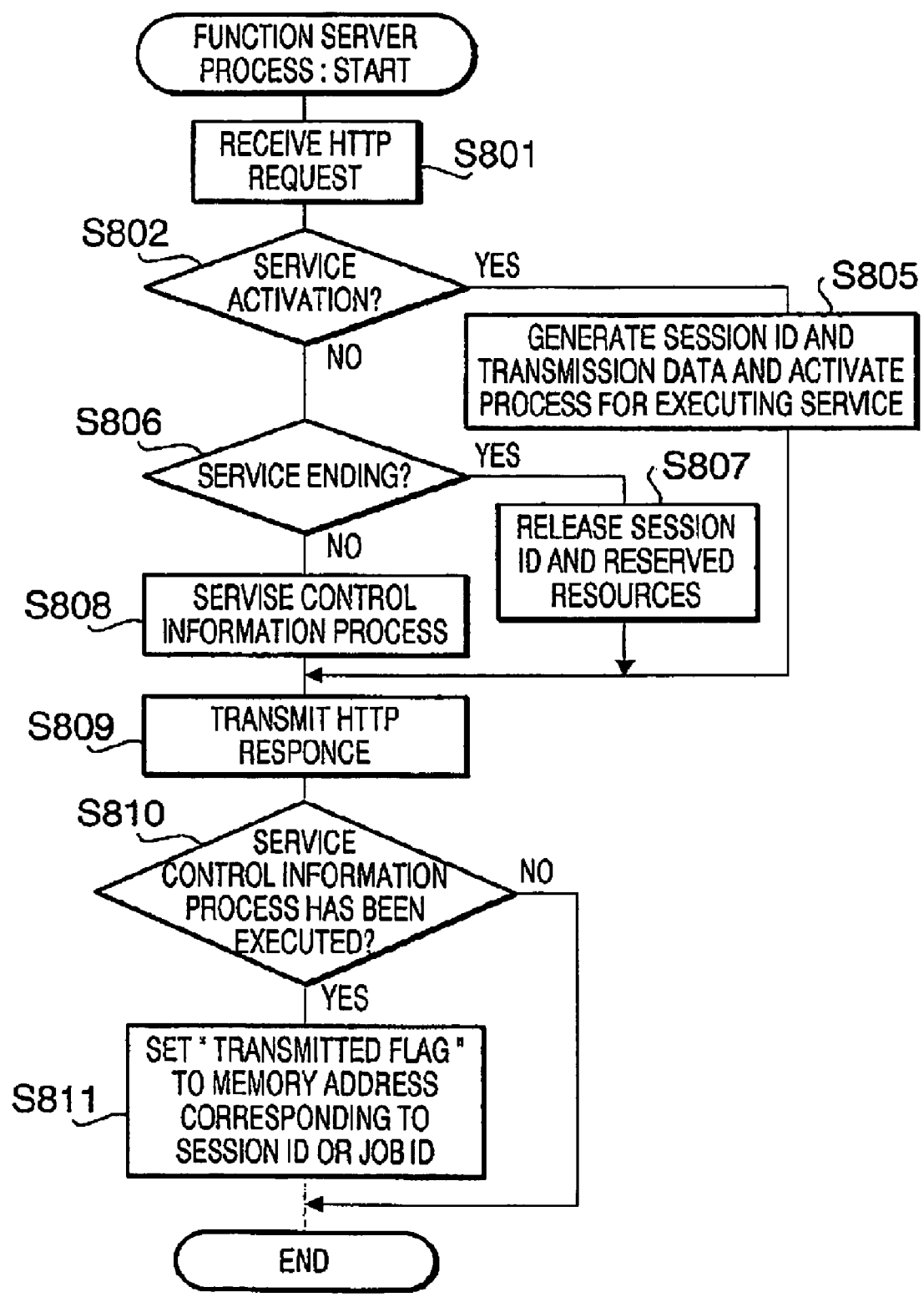
FIG. 20 is a flowchart showing a function server process executed by a control unit of the function server in accordance with aspects of the invention.

Hereafter, the aforementioned function server process executed by the control unit 31 of the function server 30 will be explained referring to a flowchart of FIG. 20. The function server process is started when an HTTP request is received by the function server 30.

At the start of the function server process, the control unit 31 of the function server 30 (hereinafter also referred to simply as "the function server 30") receives an HTTP request (S801).

Subsequently, the function server 30 judges whether the HTTP request received in S801 is a service activation command (S802). Incidentally, the service activation command is transmitted by the MFP 10 in step S201 of the session process (FIG. 14) executed by the control unit 101 of the MFP 10.

If the HTTP request received in S801 is the service activation command (S802: YES), the function server 30 generates a session ID and transmission data and activates a process for executing a service (specifically, a session process (FIG. 22) which will be explained later) (S1305). Thereafter, the process advances to step S809.

If the HTTP request received in S1301 is not the service activation command (S1302: NO), the function server 30 judges whether the HTTP request is the service ending command (S806). Incidentally, the service ending command is transmitted by the MFP 10 in response to an ending command (as an interrupt) from the user (e.g. the pressing of the cancel key 51 during the execution of a service).

If the HTTP request received in S801 is the service ending command (S806: YES), the function server 30 releases the session ID and reserved resources (S807) and thereafter control advances to the step S809.

If the HTTP request received in S801 is not the service ending instruction (S1306: NO), the function server 30 executes a service control information process (S1308) and thereafter control advances to step S809. The details of the service control information process (FIG. 21) will be explained later.

In step S809, the function server 30 transmits an HTTP response which can contain generated information.

Subsequently, the function server 30 judges whether the service control information process (S808) has been executed (S810).

If the service control information process has been executed (S810: YES), the function server 30 sets a "transmitted flag" to a memory address corresponding to the session ID or job ID (S1311) and ends the function server process. If the service control information process has not been executed (S810: NO), the function server 30 ends the function server process.

Figure 21:
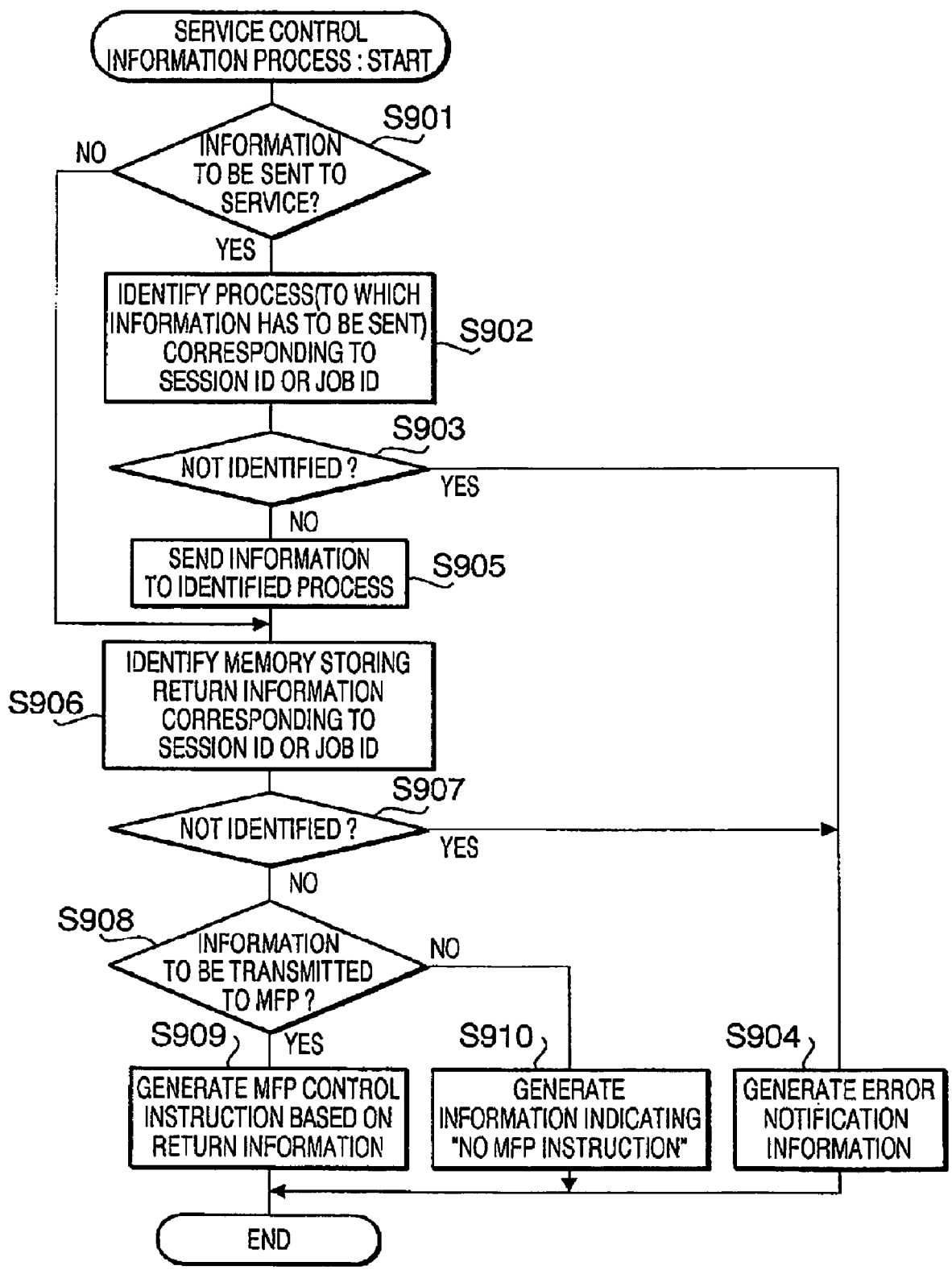
FIG. 21 is a flowchart showing a service control information process executed by the control unit of the function server in accordance with aspects of the invention.

Hereafter, the service control information process which is executed in the step S808 of the function server process (FIG. 20) will be explained referring to a flowchart of FIG. 21.

At the start of the service control information process, the function server 30 judges whether there exists information to be sent to a service (S901). Specifically, the function server 30 judges whether the HTTP request received in S801 of the function server process (FIG. 20) contains information on a service (session or job).

If there exists information to be sent to a service (S901: YES), the function server 30 identifies a process corresponding to the session ID or job ID, that is, a process as the destination of the information contained in the received HTTP request (S902).

Subsequently, the function server 30 judges whether the process (as the destination of the information contained in the received HTTP request) can be identified (S903).

If the process can not be identified due to some type of error (S903: YES), the function server 30 generates error notification information (S904). Then, the service control information process terminates.

If the process can be identified (S903: NO), the function server 30 sends the information to the identified process (S905) and thereafter control advances to step S906.

If there exists no information to be sent to a service (S901: NO), control directly advances to step S906.

In step S906, the function server 30 identifies memory storing reply information (to be sent back to the MFP 10) corresponding to the session ID or job ID.

Subsequently, the function server 30 judges whether the memory storing reply information can be identified (S907).

If the memory storing reply information can not be identified (S907: YES), the function server 30 generates error notification information (S904) and ends the service control information process.

If the memory storing reply information can be identified (S907; NO), the function server 30 judges whether there exists information to be transmitted to the MFP 10 (S908).

If there exists information to be transmitted to the MS 10 (S908. YES), the function server 30 generates an MFP control command based on the reply information (S909). Then, the service control information process terminates.

If there exists no information to be transmitted to the MFP 10 (S908: NO), the function server 30 generates information indicating "no MFP command" (S910). Then, the service control information process terminates.

Figure 22:
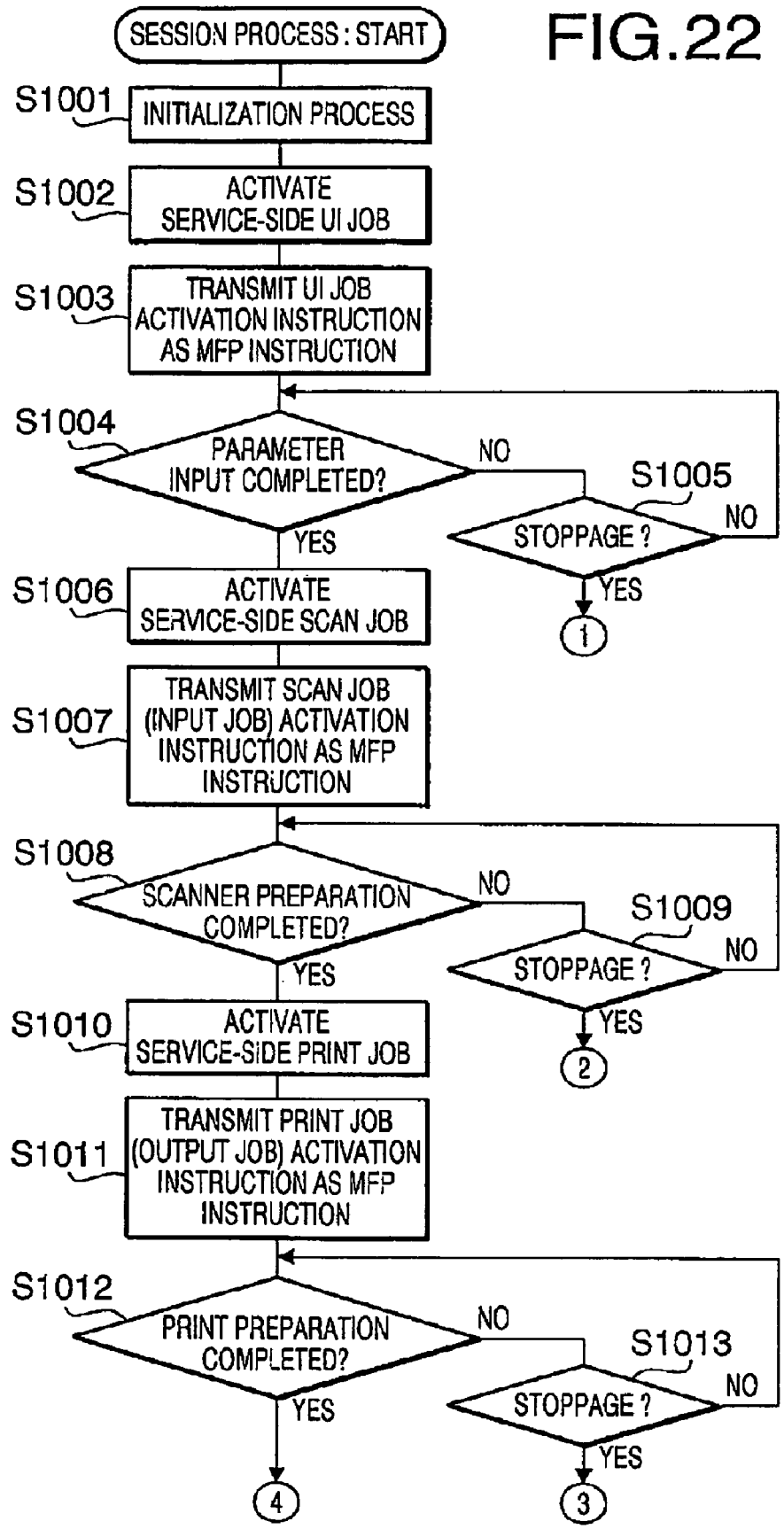
FIGS. 22 and 23 are flowcharts showing a session process executed by the control unit of the function server in accordance with aspects of the invention.
Figure 23:
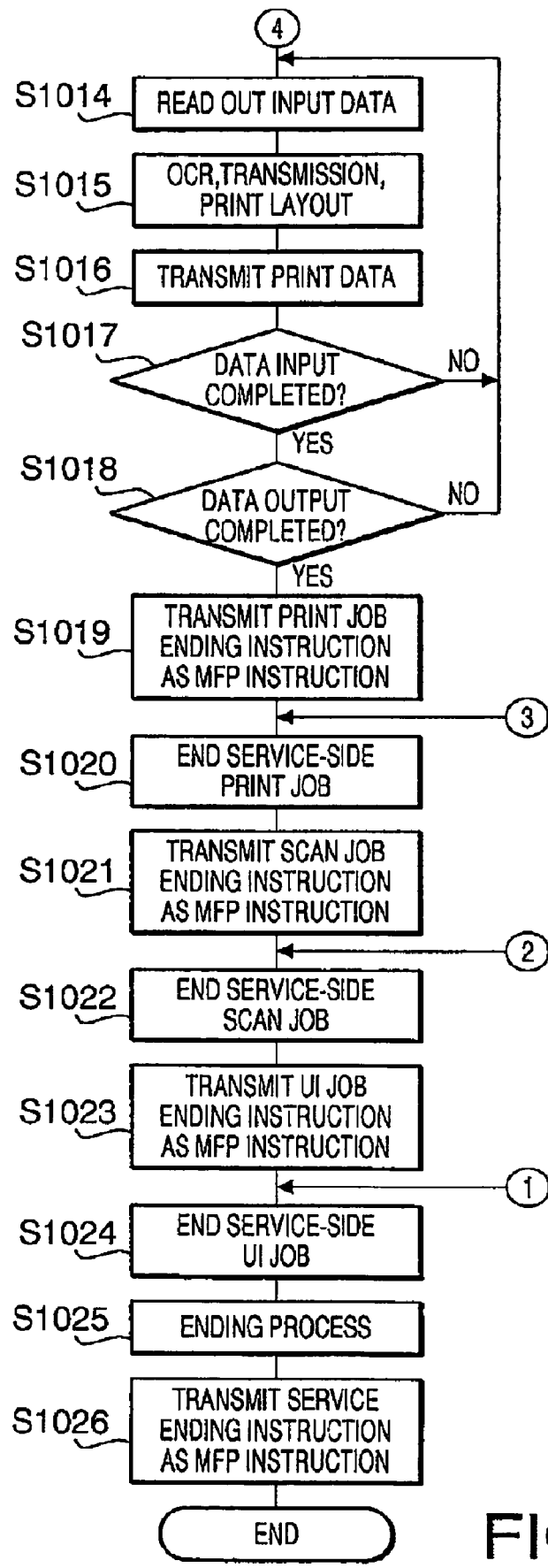

Next, the session process executed by the control unit 31 of the function server 30 will be explained referring to flowcharts of FIGS. 22 and 23. Since the session process varies depending on the type of service, the following explanation will be given taking a session process regarding the translation copy service as an example. The session process of FIGS. 22 and 23 is started in step S805 of the function server process (FIG. 20).

At the start of the session process, (the control unit 31 of) the function server 30 executes an initialization process (S1001) and thereafter activates a service-side UI job (S1002). The details of the service-side UI job (FIG. 24) will be explained later.

Subsequently, the function server 30 transmits a UI job activation command as an MFP command (S1003). Specifically, the MFP command is written in the aforementioned memory for storing reply information and thereafter the "transmitted flag" is set by step S811 of the function server process (FIG. 20), by which the transmission of the MFP command (UI job activation instruction) is confirmed. The UI job activation command is transmitted together with a job ID and a destination URL of the job.

Subsequently, the function server 30 judges whether parameter input has been completed (S1004). Whether the parameter input has been completed is judged based on whether a parameter input completion notification has been issued by step S1611 of a UI job process (FIG. 24) which will be explained later.

If the parameter input has not been completed yet (S1004; NO), the function server 30 judges whether the session has been informed of stoppage (S1005). Incidentally, the session is informed of stoppage in step S1109 of the UI job process (FIG. 24) which will be explained later.

If the session has not been informed of stoppage (S1005: NO), control returns to the step S1004. If the session has been informed of stoppage (S1005: YES), control advances to step S1024 of FIG. 23 which will be explained later.

If the parameter input has already been completed (S1004: YES), the function server 30 activates a service-side scan job (S1006). The details of the service-side scan job (FIG. 25) will be explained later.

Subsequently, the function server 30 transmits a scan job (input job) activation command as an MFP command (S1007). The scan job activation command is transmitted together with a job ID and a destination URL of the job.

Subsequently, the function server 30 judges whether the preparation of the scanner has been completed (S1008). Whether the scanner preparation has been completed is judged based on whether a scanner preparation completion notification has been issued by step S1213 of a scan job process (FIG. 25) which will be explained later.

If the scanner preparation has not been completed yet (S1008: NO), the function server 30 judges whether the session has been informed of stoppage (S1009). Incidentally, the session is informed of stoppage in step S1207 of the scan job process (FIG. 25) which will be explained later.

If the session has not been informed of stoppage (S1009: NO), control returns to step S1008. If the session has been informed of stoppage (S1009: YES), control advances to step S1022 of FIG. 23 which will be explained later.

If the scanner preparation has been completed (S1008: YES), the function server 30 activates a service-side print job (S1010). The details of the service-side print job (FIG. 26) will be explained later.

Subsequently, the function server 30 transmits a print job (output job) activation command as an MFP command (S1011). The print job activation command is transmitted together with a job ID and a destination URL of the job.

Subsequently, the function server 30 judges whether the preparation for printing has been completed (S1012). Whether the print preparation has been completed is judged based on whether a print preparation completion notification has been issued by step S1313 of a print job process (FIG. 26) which will be explained later.

If the print preparation has not been completed yet (S1012: NO), the function server 30 judges whether the session has been informed of stoppage (S1013). Incidentally, the session is informed of stoppage in step S1307 of the print job process (FIG. 26) which will be explained later.

If the session has not been informed of stoppage (S1013: NO), control returns to step S1012. If the session has been informed of stoppage (S1013: YES), control advances to step S1020 of FIG. 23 which will be explained later.

If the print preparation has been completed (S1012: YES), control advances to step S1014 of FIG. 23 and the function server 30 reads out the input data (e.g., image data generated by the reading unit 103).

Subsequently, the function server 30 generates image data for printing by recognizing text contained in the image data read out in the step S1014 (by executing an OCR process to the image data), executing a translation process to the recognized text, and setting print layout for the translated text (S1015).

Subsequently, the image data for printing generated in S1015 (print data) is outputted (S1016).

Subsequently, the function server 30 judges whether data input (reading) of the whole input data has been completed (S1017). If the data input has not been completed (S1017: NO), control returns to the step S1014.

If the data input of the whole input data has been completed (S1017: YES), the function server 30 judges whether data output of the whole output data (image data for printing) has been completed (S1018). If the data output has not been completed (S1018: NO), control returns to step S1014.

If the data output of the whole output data has been completed (S1018: YES), the function server 30 transmits a print job ending command (together with the job ID of the print job to be ended) as an MFP command (S1019) and thereafter ends the service-side print job (S1020).

Subsequently, the function server 30 transmits a scan job ending command (together with the job ID of the scan job to be ended) as an MFP command (S1021) and thereafter ends the service-side scan job (S1022).

Subsequently, the function server 30 transmits an UI job ending command (together with the job ID of the UI job to be ended) as an MFP command (S1023) and thereafter ends the service-side UT job (S1024).

Thereafter, the function server 30 executes an ending process such as releasing of memory (S1025), transmits a service ending command as an MFP command (S1026), and ends the session process of FIGS. 22 and 23.

Figure 24:
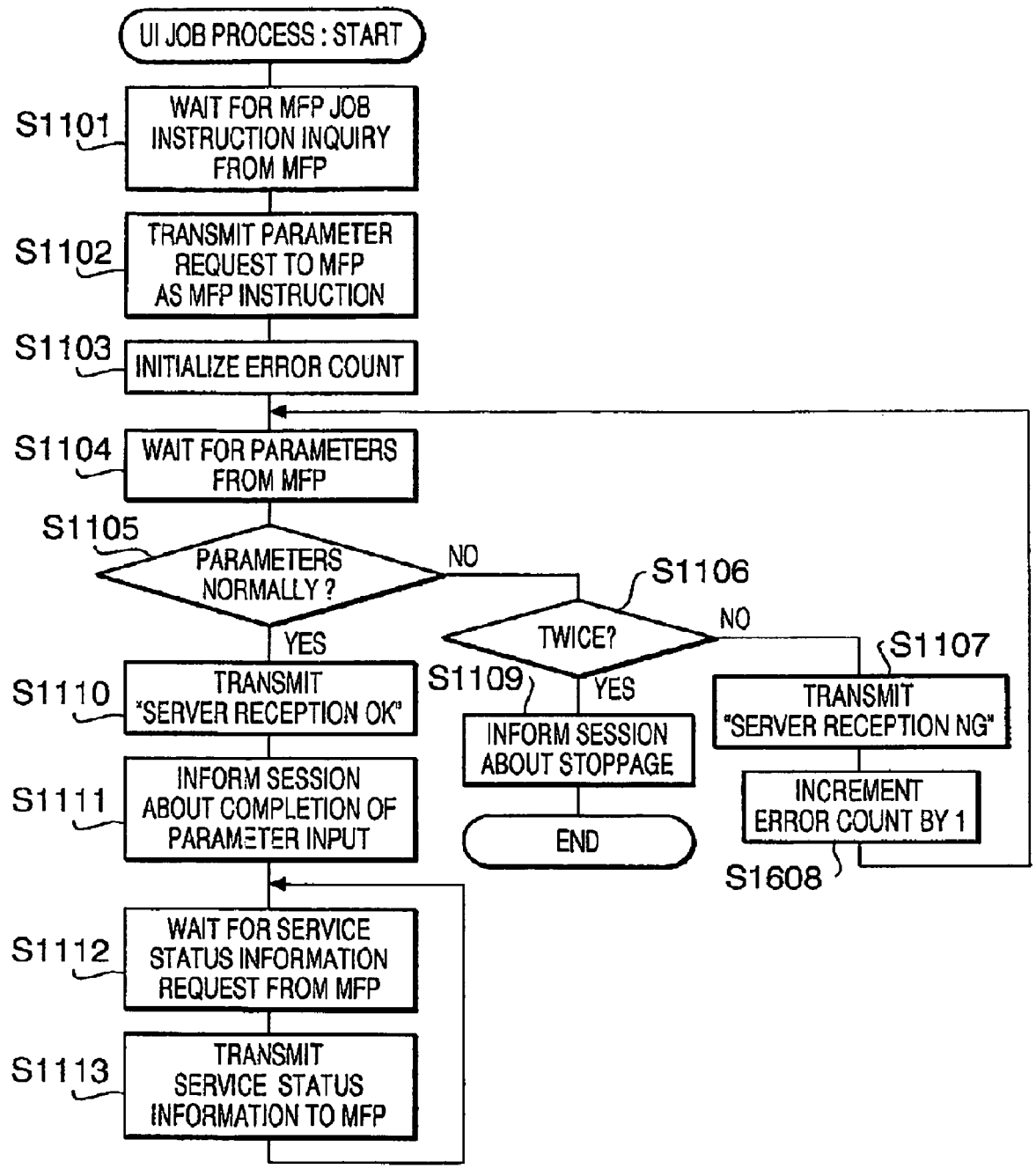
FIG. 24 is a flowchart showing a UI job process executed by the control unit of the function server in accordance with aspects of the invention.

Next, the UI job process (service-side UT job), which is activated in step S1002 of the above session process (FIG. 22) to operate concurrently with the function server process and the session process, will be explained referring to a flowchart of FIG. 24.

At the start of the UI job process, the function server 30 receives the MFP job command inquiry from the MFP 10 (S1101). Incidentally, the MFP job command inquiry is set as transmission data in the MFP 10 in step S400 or 9423 of the UI job (FIG. 16) executed by the control unit 11 of the MFP 10 and transmitted by the MFP 10 in step S406 of the UI job (FIG. 16).

Subsequently, the function server 30 transmits the parameter request (requesting the setting of parameters necessary for the execution of a service) to the MFP 10 as an MFP command (S1102). Incidentally, the parameter request is transmitted together with the service I/F information 36 stored in the service I/F information area 34 of the storage unit 33 (in this example, service I/F information 36 corresponding to the translation copy service).

Subsequently, the function server 30 initializes an error count (S1103).

Subsequently, the function server 30 receives parameters from the MFP 10 (S1104). Incidentally, the parameters are set as transmission data in the MFP 10 in step S410 of the UI job (FIG. 16) executed by the control unit 11 of the MFP 10 and transmitted by the MFP 10 in step S406 of the UT job (FIG. 16).

Subsequently, the function server 30 judges whether the parameters received in S1104 are normal (S1105).

If the parameters are abnormal (S1105: NO), the function server 30 judges whether the judgment of S1105 has resulted in "NO" twice based on the error count initialized in S1103 (S1106).

If the judgment of S1105 has not resulted in "NO" twice, that is, if the judgment of S1105 is "NO" for the first time (S1106: NO), the function server 30 transmits the server reception status (indicating whether the function server 30 received information from the MFP 10 normally) that indicates "server reception NG (abnormal reception)" to the MFP 10 (S1107), and increments the error count by 1 (S1108). The control returns to the step S1104.

If the judgment of S1105 has resulted in "NO" twice (S1106: YES), the function server 30 informs the session about stoppage (S1109). Then, the UI job process terminates.

If the parameters received in S1104 are normal (S1105: YES), the function server 30 transmits the server reception status that indicates "server reception OK (normal reception)" to the MFP 10 (S1110) and informs the session about the completion of parameter input (S1111).

Subsequently, the function server 30 receives the service status information request (S1112). Incidentally, the service status information request is set as transmission data in the MFP 10 in the step S421 or S422 of the UI job (FIG. 16) and transmitted by the MFP 10 in step S406 of the UI job (FIG. 16) as explained above.

Subsequently, the function server 30 transmits the service status information to the MFP 10 (S1113), and control returns to step S1112. Therefore, the reception of the service status information request from the MFP 10 and the returning of the service status information are repeated until the loop is stopped by another process. Incidentally, the service status information is transmitted together with the service I/F information 36 and the error code.

Figure 25:
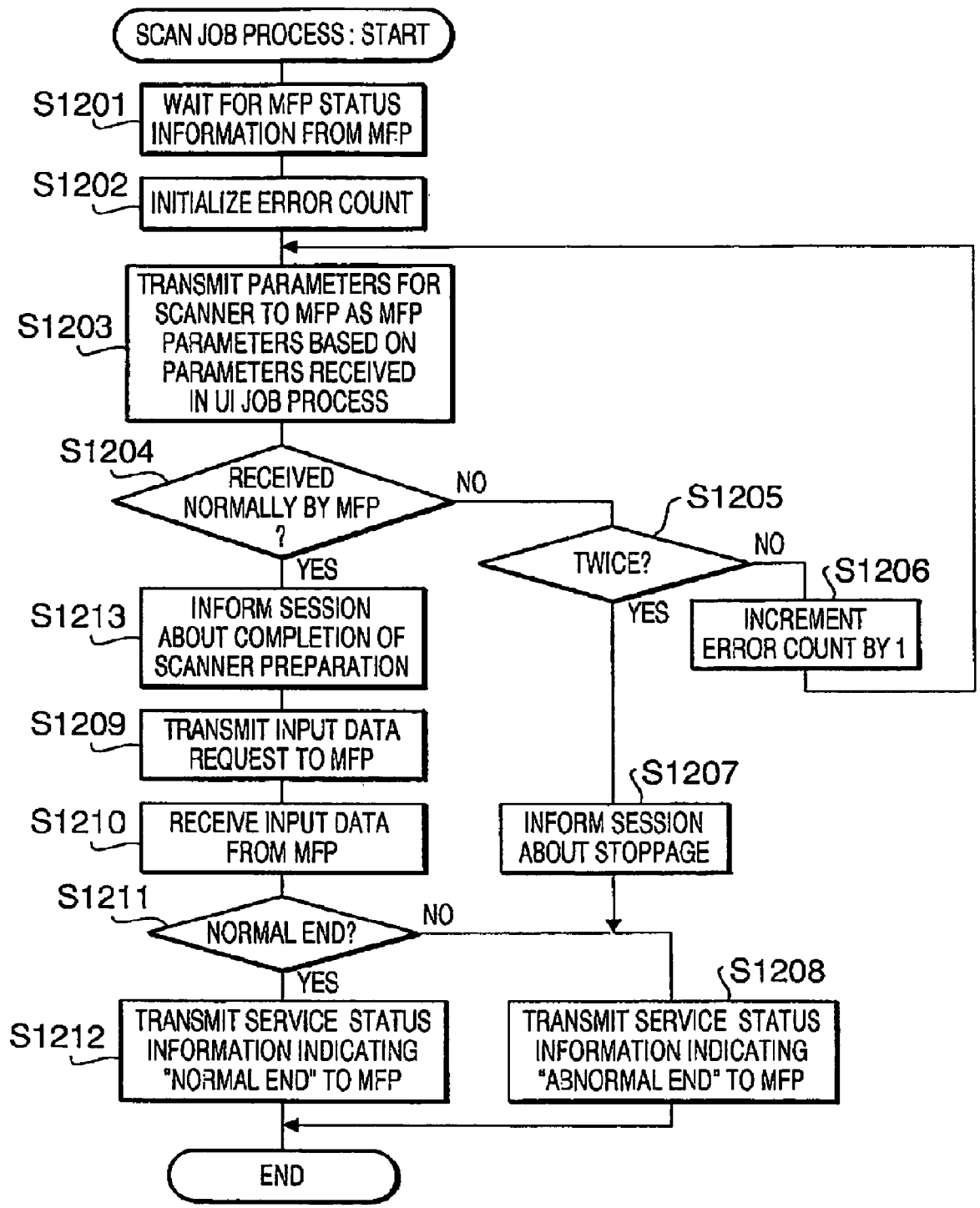
FIG. 25 is a flowchart showing a scan job process executed by the control unit of the function server in accordance with aspects of the invention.

Next, the scan job process (service-side scan job), which is activated in the step S1006 of the session process (FIG. 22) to operate concurrently with the function server process, the session process and the UI job process, will be explained referring to a flowchart of FIG. 25.

At the start of the scan job process, the function server 30 receives the MFP status information from the MFP 10 (S1201). Incidentally, the MFP status information is transmitted by the MFP 10 in step S504 of the input job (FIG. 17) executed by the control unit 11 of the MFP 10.

Subsequently, the function server 30 initializes an error count (S1202).

Subsequently, based on the parameters received in the step S1104 of the UI job process (FIG. 24), the function server 30 transmits parameters for the reading unit 13 (scanner) to the MFP 10 as the MFP parameters (S1203).

Subsequently, the function server 30 judges whether the MFP parameters have been received by the MFP 10 normally (S1204). Specifically, the MFP parameters are judged to have been received normally if the function server 30 is informed of normal reception (as the MFP reception status information) by step S509 of the input job (FIG. 17). If the function server 30 is informed of abnormal reception (as the MFP reception status information) by step S508 of the input job (FIG. 17), the MFP parameters are judged to have not been received normally.

If the MFP parameters have not been received by the MFP 10 normally (S1204: NO), the function server 30 judges whether the judgment of S1204 has resulted in "NO" twice based on the error count initialized in S1202 (S1205).

If the judgment of S1204 has not resulted in "NO" twice, that is, if the judgment of S1204 is "NO" for the first time (S1205: NO), the function server 30 increments the error count by 1 (S1206). Then, control returns to the step S1703.

If the judgment of S1204 has resulted in "NO" twice (S1205: YES), the function server 30 informs the session about stoppage (S1207), and transmits the service status information indicating "abnormal end" to the MFP 10 (S1208). Then, the scan job process terminates.

If the MFP parameters have been received by the MFP 10 normally (S1204: YES), the function server 30 informs the session about the completion of scanner preparation (S1213) and transmits the input data request (requesting the inputting of data of a type corresponding to the job) to the MFP 10 (S1209).

Subsequently, the function server 30 receives the input data from the MFP 10 (S1210). Incidentally, the input data is transmitted by the MFP 10 in step S514 of the input job (FIG. 17) executed by the control unit 11 of the MFP 10.

Subsequently, the function server 30 judges whether the scan job process is at a normal end (S1211). If the scan job process is not judged to be at a normal end (S1211: NO), the function server 30 transmits the service status information indicating "abnormal end" to the MFP 10 (S1208). Then, the scan job process terminates.

On the other hand, if the scan job process is judged to be at a normal end (S1211: YES), the function server 30 transmits the service status information indicating "normal end" to the MFP 10 (S1212). Then, the scan job process terminates.

Figure 26:
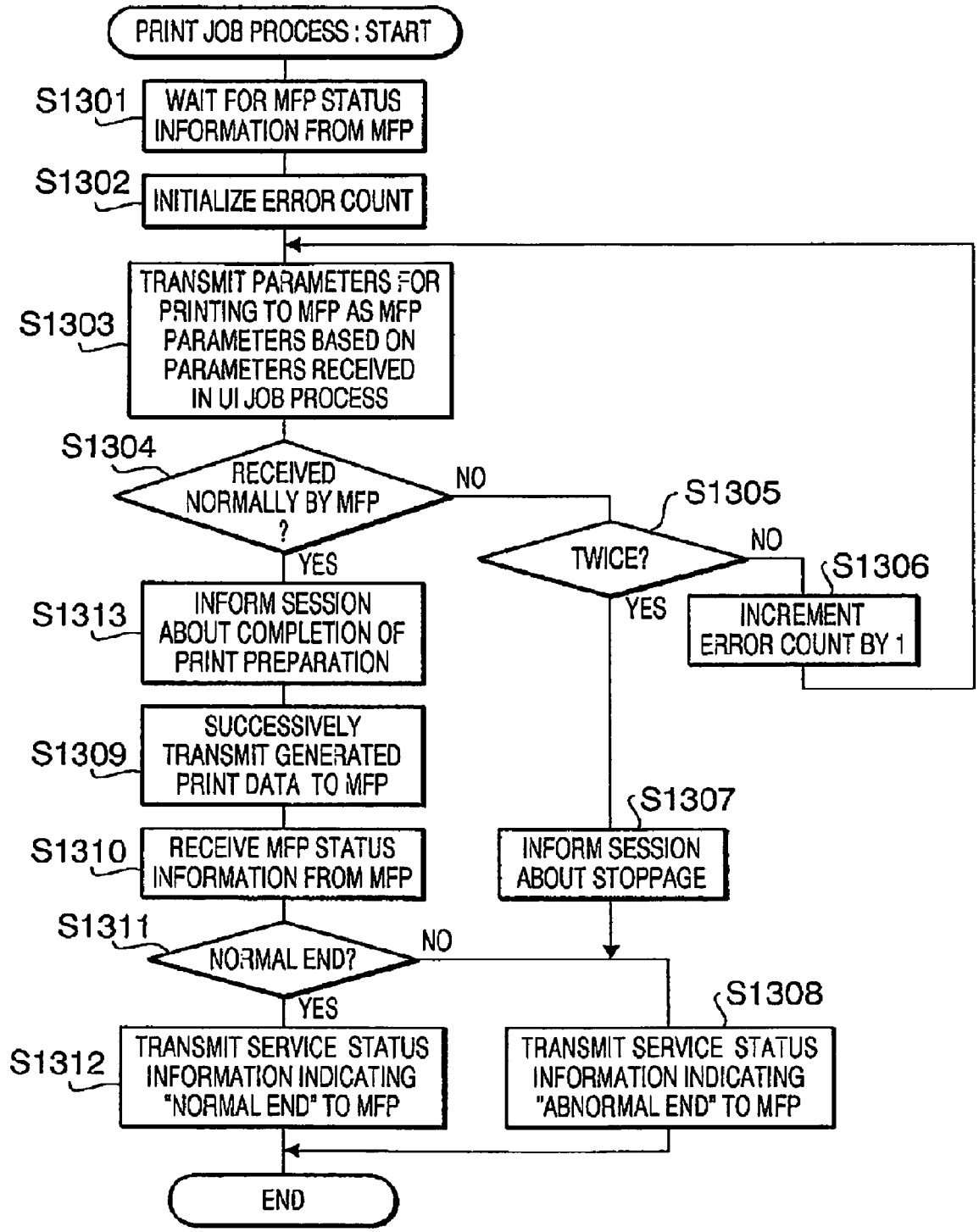
FIG. 26 is a flowchart showing a print job process executed by the control unit of the function server in accordance with aspects of the invention.

Next, the print job process (service-side print job), which is activated in step S1101 of the session process (FIG. 22) to operate concurrently with the function server process, the session process, the UI job process and the scan job process, will be explained referring to a flowchart of FIG. 26.

At the start of the print job process, the function server 30 receives the MFP status information from the MFP 10 (S1301). Incidentally, the MFP status information is transmitted by the MFP 10 in step S604 of the output job (FIG. 18) executed by the control unit 11 of the MFP 10.

Subsequently, the function server 30 initializes an error count (S1302).

Subsequently, based on the parameters received in the step S1104 of the UI job process (FIG. 24), the function server 30 transmits parameters for printing to the MFP 10 as the MFP parameters (S1303).

Subsequently, the function server 30 judges whether the MFP parameters have been received by the MFP 10 normally (S1304). Specifically, the MFP parameters are judged to have been received normally if the function server 30 is informed of normal reception (as the MFP reception status information) by step S609 of the output job (FIG. 18). If the function server 30 is informed of abnormal reception (as the MFP reception status information) by step S608 of the output job (FIG. 18), the MFP parameters are judged to have not been received normally.

If the MFP parameters have not been received by the MFP 10 normally (S1304: NO), the function server 30 judges whether the judgment of S1304 has resulted in "NO" twice based on the error count initialized in S1302 (S1305).

If the judgment of S1304 has not resulted in "NO" twice, that is, if the judgment of S1304 is "NO" for the first time (S1305: NO), the function server 30 increments the error count by 1 (S1306). Then, control returns to the step S1303.

If the judgment of S1304 has resulted in "NO" twice (S1305: YES), the function server 30 informs the session about stoppage (S1307), and transmits the service status information indicating "abnormal end" to the MFP 10 (S1308). Then, the print job process terminates.

If the MFP parameters have been received by the MFP 10 normally (S1304: YES), the function server 30 informs the session about the completion of print preparation (S1313) and thereafter successively transmits the generated print data to the MFP 10 (S1309).

Subsequently, the function server 30 receives the MFP status information from the MFP 10 (S1310). Incidentally, the MFP status information is transmitted by the MFP 10 in step S616 of the output job (FIG. 18) executed by the control unit 11 of the MFP 10.

Subsequently, the function server 30 judges whether the print job process is at a normal end (S1311). If the print job process is not judged to be at a normal end (S1311: NO), the function server 30 transmits the service status information indicating "abnormal end" to the MFP 10 (S1308). Then, the print job process terminates. On the other hand, if the print job process is judged to be at a normal end (S1311: YES), the function server 30 transmits the service status information indicating "normal end" to the MFP 10 (S1312). Then, the print job process terminates.

Figure 27:
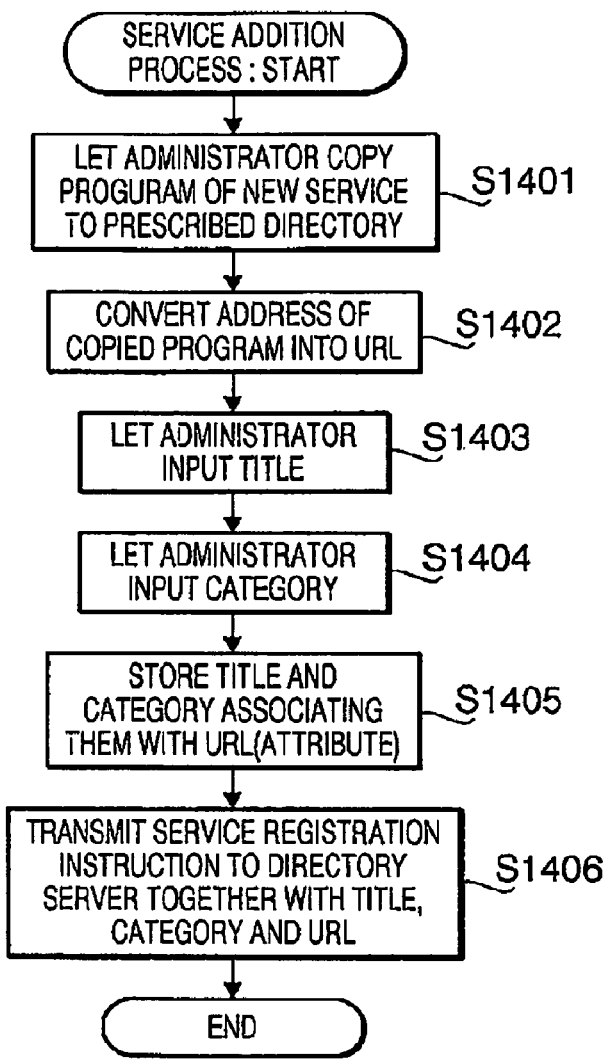
FIG. 27 is a flowchart showing a service addition process executed by the control unit of the function server in accordance with aspects of the invention.

Next, the service addition process executed by the control unit 31 of the function server 30 will be explained referring to a flowchart of FIG. 27. The service addition process is started when a prescribed operation is performed by an administrator of the function server 30

At the start of the service addition process, the function server 30 lets the administrator perform an operation for copying a program of a service to be added (service software 37 of a new service) to a prescribed directory (S1401).

Subsequently, the function server 30 executes a process for converting the address of the program copied in S1401 into a URL (S1402) and lets the administrator input the title (service name) of the added service (S1403).

Subsequently, the function server 30 lets the administrator input the category of the added service (S1404). In this step, the administrator can input one of the aforementioned three categories "data storage service", "print service" and "copy application service".

Thereafter, the function server 30 stores the title inputted in S1403 and the category inputted in S1404 associating them with the URL generated in the step S1402 (S1405), and informs the directory server 20 about the addition (registration) of the service by transmitting the service registration command to the directory server 20 together with the title, category and URL stored in step S1405 (S1406). Then, the service addition process terminates.

Figure 28:
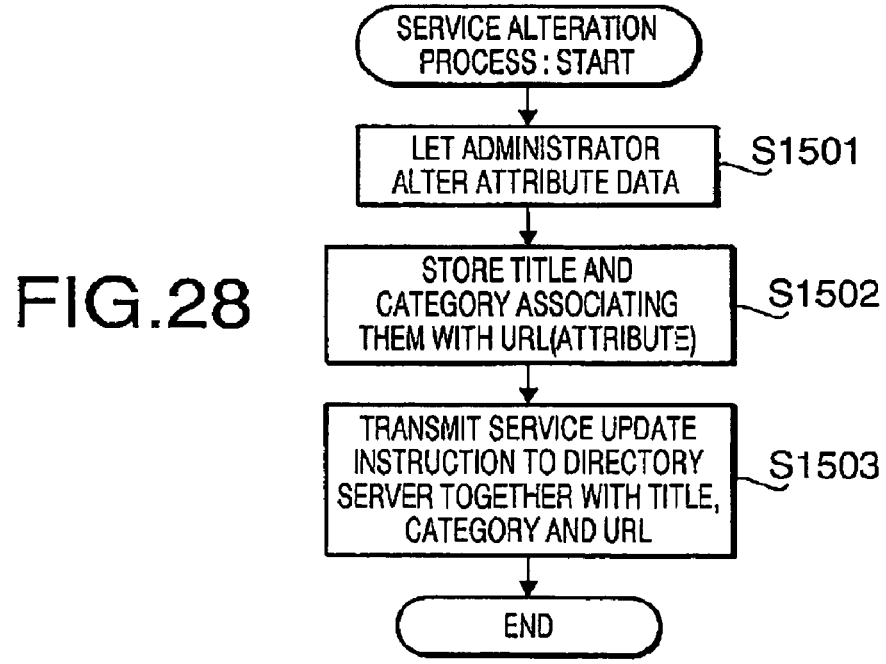
FIG. 28 is a flowchart showing a service alteration process executed by the control unit of the function server in accordance with aspects of the invention.

Next, the service alteration process executed by the control unit 31 of the function server 30 will be explained referring to a flowchart of FIG. 28. The service alteration process is started when a prescribed operation is performed by the administrator of the function server 30.

At the start of the service alteration process, the function server 30 lets the administrator perform an operation for altering attribute data regarding a service (S1501).

Subsequently, the function server 30 stores the title and the category of the altered service associating them with the URL (S1502).

Thereafter, the function server 30 informs the directory server 20 about the alteration of the service by transmitting the service update command to the directory server 20 together with the title, category and URL (S1503). Then, the service alteration process terminates.

Figure 29:
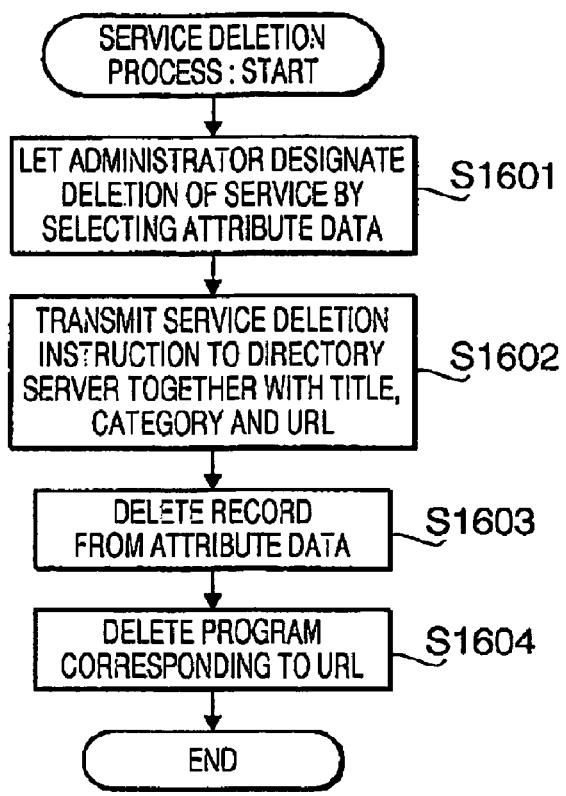
FIG. 29 is a flowchart showing a service deletion process executed by the control unit of the function server in accordance with aspects of the invention.

Next, the service deletion process executed by the control unit 31 of the function server 30 will be explained referring to a flowchart of FIG. 29. The service deletion process is started when a prescribed operation is performed by the administrator of the function server 30.

At the start of the service deletion process, the function server 30 lets the administrator designate the deletion of a service by selecting attribute data (S1601).

Subsequently, the function server 30 informs the directory server 20 about the deletion of the service by transmitting the service deletion instruction to the directory server 20 together with the title, category and URL (S1602).

Thereafter, the function server 30 deletes a record from the attribute data (S1603), and deletes a program (service software 37) corresponding to the URL (S1604). Then, the service deletion process terminates.

In the above mentioned embodiment, the reading unit 13 corresponds to an image reading system, the recording unit 14 corresponding to an image printing system, the sound input unit 17 corresponds to a sound input system, and the sound output unit 18 corresponds to a sound output system. Step S103 in the MFP process of FIG. 12 corresponds to a service request judging system, and steps S106 and S115 correspond to a service information requesting system. The combination of the operation unit 12 and steps S108 and S110 to S115 corresponds to a service decision system. Step S201 of the session process in FIG. 14 corresponds to a service requesting system. Steps S400 and S406 of the UI job in FIG. 16 correspond to a parameter setting information requesting system. The combination of the operation unit 12 and step S409 of the UI job in FIG. 16 corresponds to a parameter setting system. Steps S406 and S410 of the UT job in FIG. 16 correspond to a parameter transmitting system. The MFP 10 having these functions corresponds to an image processing device. The process executed by the service software 37 corresponds to a service executing system. Each of step S1406 of the service addition process (FIG. 27), step S1503 of the service alteration process (FIG. 28) and step S1602 of the service deletion process (FIG. 29) corresponds to a service notification system. The function server 30 having these functions corresponds to a service providing system.

The service definition information storage unit 24 of the storage unit 23 corresponds to a service storing system. Steps S702, 5703, and S705 to S708 correspond to a service information updating system. Step S704 executed after step S710 or S712 corresponds to a service information transmission system. The directory server 20 having these functions corresponds to an information providing system.

Step S1102 of the UI job (FIG. 24) executed by the function server 30 corresponds to a parameter setting information transmission system.

As described above, the image processing system includes the MFP 10, the function server 30 executing the service in response to the request from the MFP 10, and the directory server 20 providing information regarding services to the MFP 10 that the function server 30 supports. The MFP 10 decides a service to be requested from the function server 30 based on the service definition information 25 transmitted from the directory server 20. Further, the MFP 10 sets the parameters necessary for execution of the service.

It is understood that the image processing system 100 is suitable for environments in which the number of services randomly increases and decreases from day to day (like general servers on the Internet). That is, in the image processing system 10, the MFP 110 can recognize the types of services and the locations of the services, that the MFP 10 can receive, based on the service definition information 25 transmitted from the directory server 20. Therefore, it is not necessary for the MFP 10 to save the information regarding the type of services and the locations of the services in the MFP 10.

It becomes possible to reduce the burdens on the MFP 10 and the user of the MFP 10 in environments in which the number of services randomly increases and decreases frequently. It is also possible to prevent the memory amount for storing information about services in the MFP 10 from increasing even if the number of available services increases substantially. It is possible to prevent the dispensable information from staying in the MFP 10.

Such advantages can be maintained in an environment in which there is a possibility that the specifications of parameters used for execution of services are changed.

The service definition information 25 and the service I/F information 36 are transmitted from a server to the MFP 10 as a response to a request from the MFP 10. Therefore, according to the illustrative embodiment, it becomes possible to receive the service definition information 25 and the service I/F information 36 on the MFP 10 without changing the settings of the broadband router 2.

The service definition information 25 and the service I/F information 36 are transmitted to the MFP 10 only if the MFP 10 sends a service request to the function server 30. Therefore, according to the illustrative embodiment, it is possible to prevent the service definition information 25 and the service I/F information 36 from being transmitted to the MFP 10 more than necessary. Consequently, the burden on the MFP 10 can be reduced.

In the image processing system 100, the information based on the service definition information 25 and the service I/F information 36 is displayed on the display 52a of the operation panel 12a of the MFP 10 so as to allow a user to select a service to be requested from the function server 30 and to make settings of parameters for the selected service. Such a configuration enables a user of the MFP 10 to execute a desirable service on the MFP 10.

In the image processing system 100, if the service that the function server 30 supports is changed, the information about the change of the service is notified from the function server 30 to the directory server 30. Therefore, according to the illustrative embodiment, it is unnecessary for the directory server 20 to analyze the services that the function server 30 is able to execute. In short, service-related information is collected effectively. The latest service-related information is provided to the MFP 10 constantly. Such an information providing scheme (in which the service-related information is provided by the function server 30) is advantageous because the analysis of all of the available services on the directory server 20 is very difficult in particular in a system in which the available services are distributed over multiple servers.

In the image processing system 100, the settable parameters defined in the service definition information 36 are limited to a part of parameters that are available in the MFP 10. Therefore, according to the illustrative embodiment, inappropriate parameters are prevented from being used in each service. It is possible to execute each service.

Although the present invention has been described in considerable detail with reference to certain preferred embodiments thereof, other illustrative embodiments are possible.

In the above mentioned illustrative embodiment, the MFP 10 receives first the top service definition information 25 of the pieces of service definition information stored in the service definition information storage unit 24 in the directory server 20 to allow a user to select a category, and thereafter receives the service definition information 25 corresponding to the selected category to allow the user to select a service. However, the MFP 10 may receive more than one piece of (or all of the pies of) service definition information 25 from the directory server 20 at a time.

The parameters which are requested through the service I/F information 36 are not limited to the examples (resolutions, and etc.) described in the above mentioned illustrative embodiment. Various types of parameters including a selection between monochrome and color, density of toner (printing density), and a volume may be selectively used as parameters to be used for a service in accordance with the type of the service.

In the above mentioned illustrative embodiment, the parameters made unavailable by the service I/F information 36 are parameters having lower values or higher values. However, the value of the parameters made unavailable by the service I/F information is not necessarily limited to such values. For example, if the three reading resolutions of 200 dpi, 300 dpi and 600 dpi are available in the MFP 10, the resolution 300 dpi may be made unavailable by the service I/F information 36.

In FIG. 1, one MFP 10 is illustrated by way of example where a system configuration in which one directory server 20 and one function server 30 are illustrated connected to the network 1. However, a system configuration of an image processing system according to the present invention is not limited to such an example.

For example, pieces of MFPs 10 may be provided in an image processing system. In this case, each of the pieces of MFPs 10 operates to receive the service definition information from the directory server 20 shared by the MFPs 10 and to request a service to the function server 30 shared by the MFPs 10.

Alternatively or additionally, more than one directory servers 20 may be provided in an image processing system. In this case, a first directory server 20 may be configured to provide the top service definition information 25 to the MFP 10 and a second directory server 20 may be configured to provide the service definition information of each category to the MFP 10.

Alternatively or additionally, more than one function server 30 may be provided in an image processing system. In this case, the function of transmitting the service TI/F information 36 and the function of executing the service may be executed on different function servers 30, respectively. With regard to the execution of the service, the function of processing the session process and the function of executing the job process may be accomplished on a different function server 30, respectively.

With regard to the types of the services, the function servers may respectively execute different services. For example, the system may include a function server executing service A, a function server executing services B, C and D, and a function server executing services E and F. In this case, one of the function servers executing the services may have the function of transmitting the service I/F information 36 to the MFP 10, or a function server different from those having the function of executing the service may have the function of transmitting the service I/F information 36.

The functions attained by the directory server 20 and the function server 30 may be implemented in a computer. The functions attained by the directory server 20 and the function server 30 may be implemented in one of the MFPs in the image processing system.

Hereafter, thirteen examples of configurations of image processing systems according to the invention will be described.

EXAMPLE 1

Figure 30:
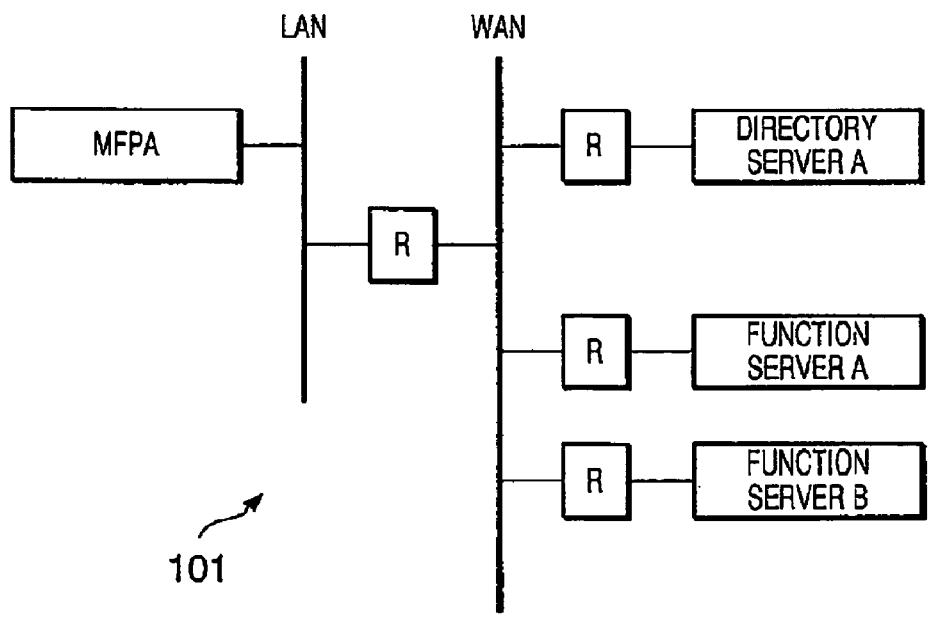
FIGS. 30 to 42 show variations of the configuration of the image processing system according to the illustrative embodiment.

FIG. 30 illustrates a first example of a configuration of an image processing system according to the invention. As shown in FIG. 30, the image processing system 101 includes an MFP A, a directory server A, and function servers A and B. The MFP A is connected to a local area network (LAN), and the LAN is connected to a wide area network (WAN) via a router (broadband router) R. The directory server A, and the function servers A and B are connected to the WAN via their respective routers R.

The feature of the image processing system 101 is that more than one function server are provided in the system 101. Each of the function servers A and B is capable of executing one or more services and transmitting the service I/F information corresponding to each service to the MFP A. The directory server A transmits the service definition information 25 of each of the services that the function servers A and B support, to the MFP A. The MFP A requests a desired service from one of the function servers A and B. The function server A or B transmits the service I/F information 36 corresponding to the requested service to the MFP A, while the MFP A provides the function server A or B with the inputted parameters.

The image processing system 101 is useful in the case where more than one service provider use the system 101 to provide their respective services independently.

In the image processing system 101, the MFP A corresponds to an image processing device, the directory server A corresponds to an information providing system, and the function servers A and B correspond to a service providing system and a parameter setting information transmission system.

EXAMPLE 2

Figure 31:
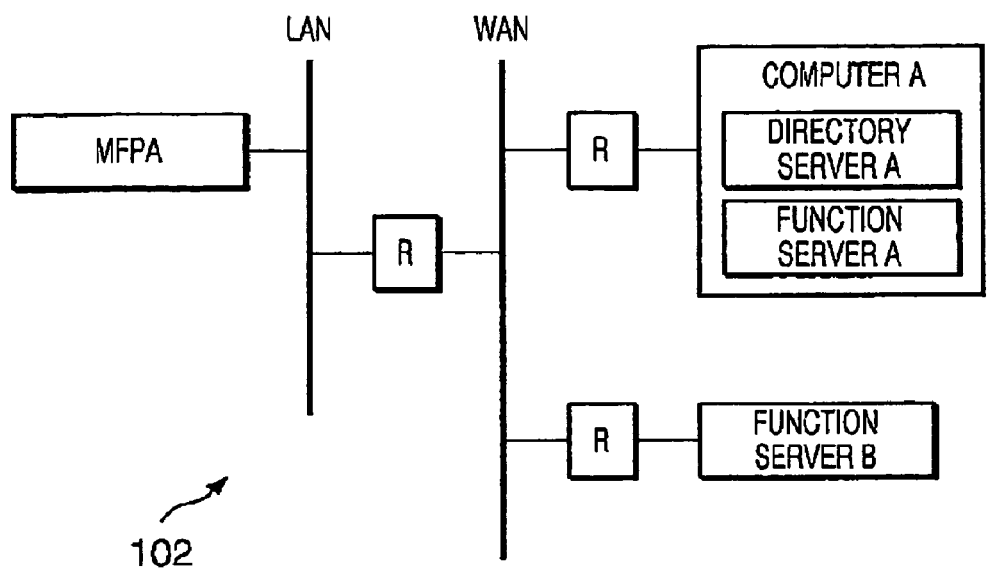

FIG. 31 illustrates a second example of a configuration of an image processing system according to the invention. As shown in FIG. 31, the image processing system 102 includes an MFP A, a computer A incorporating a directory server A and a function server A, and a function server B. The MFP A is connected to a local area network (LAN), and the LAN is connected to a wide area network (WAN) via a router (broadband router) R. The computer A and the function server B are connected to the WAN via their respective routers R.

The feature of the image processing system 102 is that the directory A and the function server B are implemented in the computer A and that more than one function server are provided in the system 102.

Similarly to the first example, each of the function servers A and B is capable of executing one or more services and transmitting the service I/F information 36 corresponding to each service to the MFP A. The directory server A transmits to the MFP A the service definition information 25 of each of the services that the function servers A and B support. The MFP A requests a desired service from one of the function servers A and B. The function server A or B transmits the service I/F information 36 corresponding to the requested service to the MFP A, while the MFP A provides the function server A or B with the inputted parameters.

Since the directory server A and the function server B are implemented in the computer A (i.e., the functions of the directory server A and the function server B are implemented in the computer A), the system 102 can be accomplished at relatively low cost.

In the image processing system 102, the MFP A corresponds to an image processing device, the directory server A corresponds to an information providing system, and the function servers A and B correspond to a service providing system and a parameter setting information transmission system.

EXAMPLE 3

Figure 32:
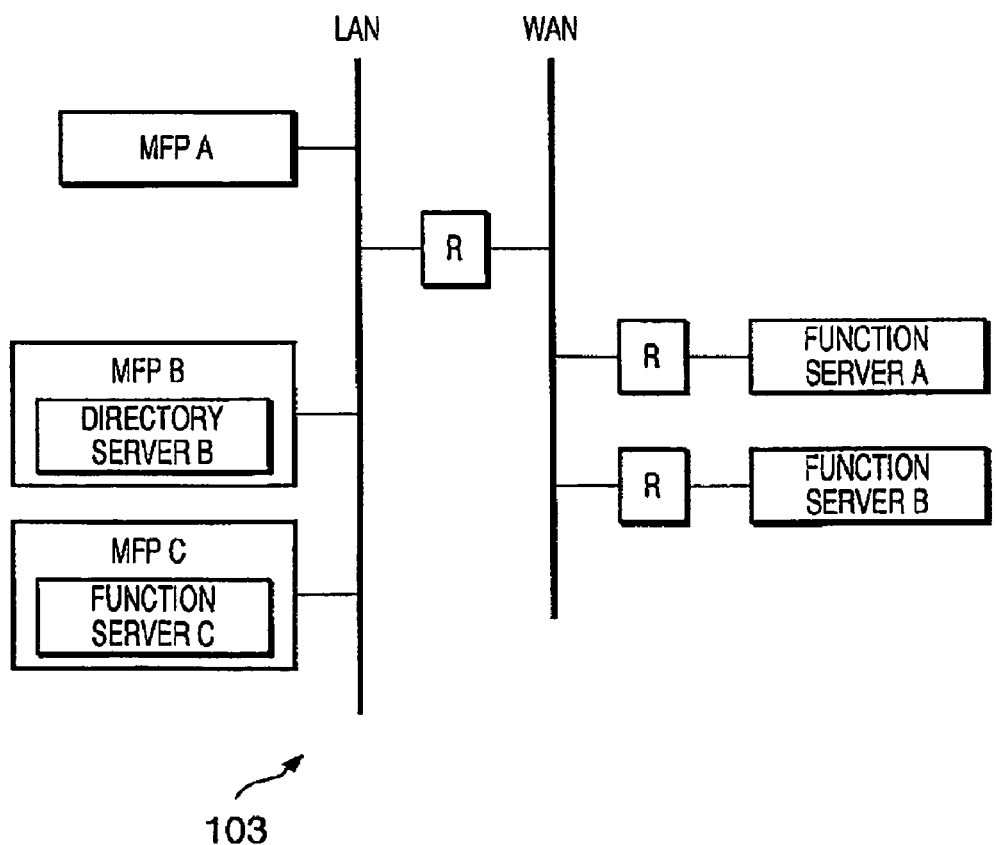

FIG. 32 illustrates a third example of a configuration of an image processing system according to the invention. As shown in FIG. 32, the image processing system 103 includes an MFP A, an MFP B incorporating a directory server A, an MFP C incorporating a function server C, and function servers A and B. The MFPs A, B and C are connected to a local area network (LAN), and the LAN is connected to a wide area network (WAN) via a router (broadband router) R. The function servers A and B are connected to the WAN via their respective routers R.

The feature of the image processing system 103 is that more than one MFP is provided in the system 103, the directory server B is incorporated in the MFP B, the function server C is incorporated in the MFP C, and more than one function server are provided in the system 103.

In the image processing system 103, each of the function servers A, B and C is capable of executing one or more services and transmitting the service I/F information 36 corresponding to each service to one of the MFPs. The directory server B transmits the service definition information 25 of each of the services, that the function servers A, B and C support, to one of the MFPs A, B and C. Each of the MFPs A, B and C requests a desired service from one of the function servers A, B and C. The function server A, B or C transmits the service I/F information 36 corresponding to the requested service to one of the MFPs A, B and C, while each of the MFPs A, B and C provides the function server A, B or C with the inputted parameters.

According to the image processing system 103, there is no necessity to use separate computers for the directory server B and the function server C. Therefore, the system 103 can be accomplished at relatively low cost.

In the image processing system 103, each of the MFPs A, B and C corresponds to an image processing device, the directory server A corresponds to an information providing system, and the function servers A, B and C correspond to a service providing system and a parameter setting information transmission system.

EXAMPLE 4

Figure 33:
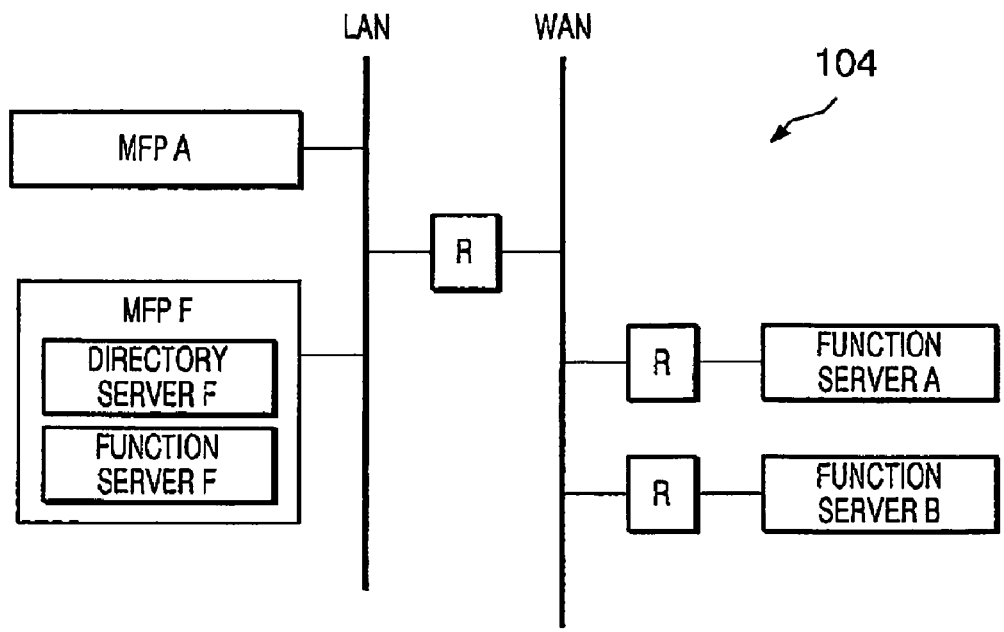

FIG. 33 illustrates a fourth example of a configuration of an image processing system according to the invention. As shown in FIG. 33, the image processing system 104 includes an MFP A, an MFP F incorporating a directory server F and a function server F, and function servers A and B. The MFPs A and F are connected to a local area network (LAN), and the LAN is connected to a wide area network (WAN) via a router (broadband router) R. The function servers A and B are connected to the WAN via their respective routers R.

The feature of the image processing system 104 is that more than one MFP is provided in the system 104, the directory server F and the function server F are incorporated in the MFP F, and more than one function servers is provided in the system 104.

In the image processing system 104, each of the function servers A, B and F is capable of executing one or more services and transmitting the service I/F information 36 corresponding to each service to one of the MFPs. The directory server F transmits the service definition information 25 of each of the services that the function servers A, B and F support to one of the MFPs A and F. Each of the MFPs A and F requests a desired service from one of the function servers A, B and F. The function server A, B or F transmits the service I/F information 36 corresponding to the requested service to one of the MFPs A and F, while each of the MFPs A and F provides the function server A, B or F with the inputted parameters.

According to the image processing system 104, there is no necessity to use separate computers for the directory server F and the function server F. Therefore, the system 104 can be accomplished at relatively low cost.

In the image processing system 103, each of the MFPs A and F corresponds to an image processing device, the directory server F corresponds to an information providing system, and the function servers A, B and F correspond to a service providing system and a parameter setting information transmission system.

EXAMPLE 5

Figure 34:
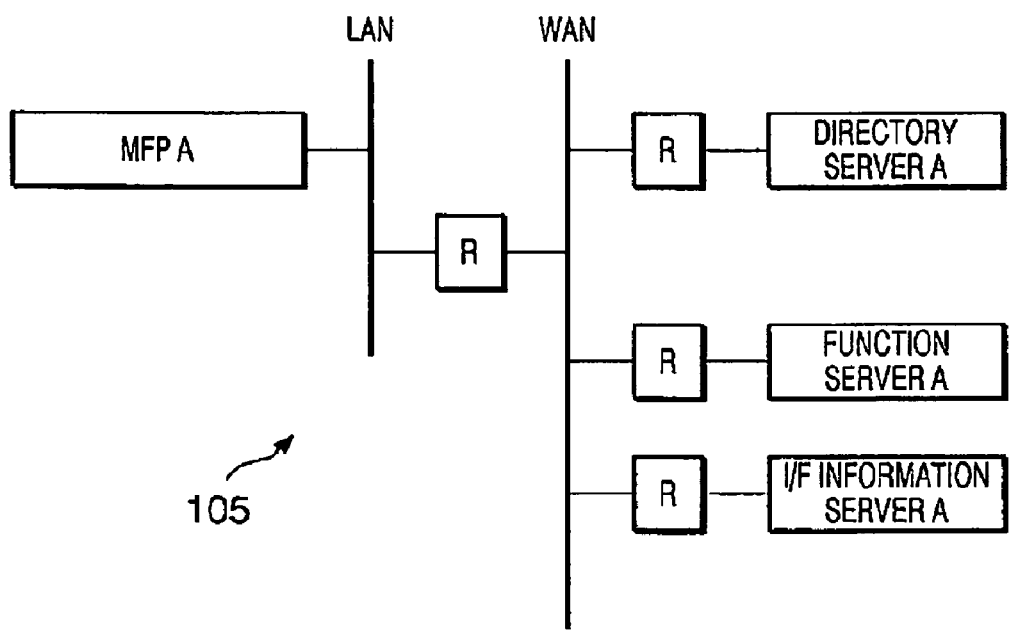

FIG. 34 illustrates a fifth example of a configuration of an image processing system according to the invention. As shown in FIG. 34, the image processing system 105 includes an MFP A, a directory server A, a function server A, and an I/F information server A. The MFP A is connected to a local area network (LAN), and the LAN is connected to a wide area network (WAN) via a router (broadband router) R. The directory server A, the function server A and the I/F information server A are connected to the WAN via their respective routers R.

In this example (and the following examples), a server having the function of transmitting the service I/F information 36 is referred to as an I/F information server A, and a server having the function of executing services is referred to as a function server.

The feature of the image processing system 105 is that the function of executing services and the function of transmitting the service I/F information 36 are implemented in two separate servers, respectively.

In the image processing system 105, the directory server A transmits the service definition information 25 of each of the services that the function server A supports to the MFP A. The MFP A requests the service I/F information 36 corresponding to a required service from the I/F information server A, while the I/F information server A provides the service I/F information 36 to the MFP A. The MFP A provides the function server A with the inputted parameters to request a service.

In the image processing system 105, the MFP A corresponds to an image processing device, the directory server A corresponds to an information providing system, the function server A corresponds to a service providing system, and the I/F information server A corresponds to a parameter setting information transmission system.

EXAMPLE 6

Figure 35:
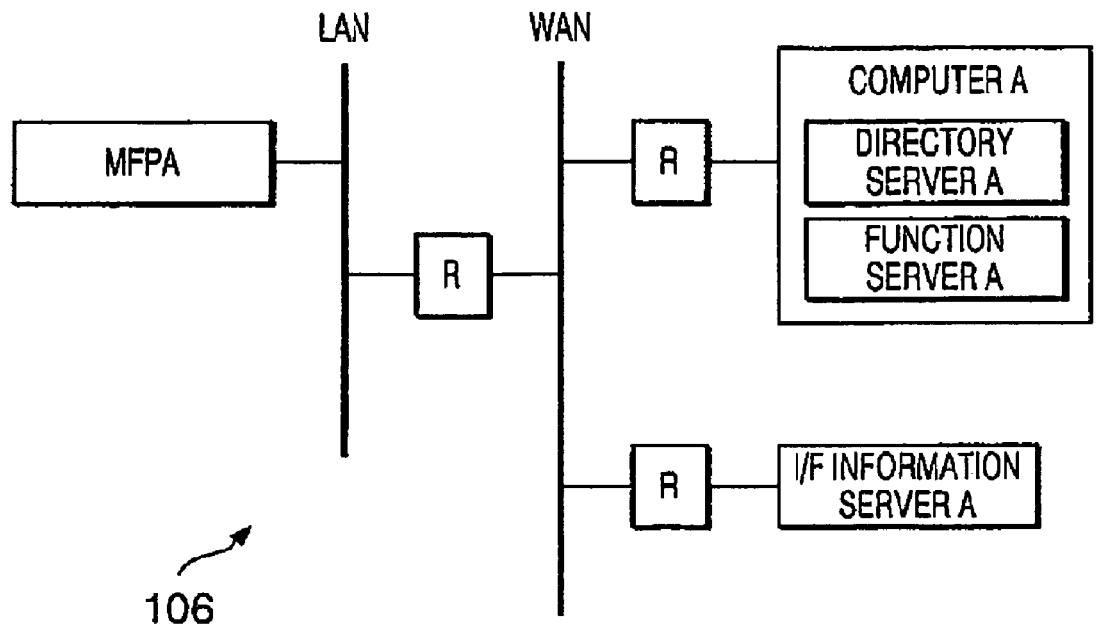

FIG. 35 illustrates a sixth example of a configuration of an image processing system according to the invention. As shown in FIG. 35, the image processing system 106 includes an MFP A, a computer A incorporating a directory server A and a function server A, and an I/F information server A. The MFP A is connected to a local area network (LAN), and the LAN is connected to a wide area network (WAN) via a router (broadband router) R. The computer A and the I/F information server A are connected to the WAN via their respective routers R.

The feature of the image processing system 106 is that the function of executing services and the function of transmitting the service I/F information 36 are implemented in two separate servers, respectively, and that the directory server A and the function server A are incorporated in the computer A.

In the image processing system 106, the directory server A transmits the service definition information 25 of each of the services that the function server A supports to the MFP A. The MFP A requests the service I/F information 36 corresponding to a required service from the I/F information server A, while the I/F information server A provides the service I/F information 36 to the MFP A. The MFP A provides the function server A with the inputted parameters to request a service.

Since the function of the directory server A and the function of the function server A are accomplished by a single computer (the computer A), the system 106 can be attained at a relatively low cost.

In the image processing system 106, the MFP A corresponds to an image processing device, the directory server A corresponds to an information providing system, the function server A corresponds to a service providing system, and the I/F information server A corresponds to a parameter setting information transmission system.

EXAMPLE 7

Figure 36:
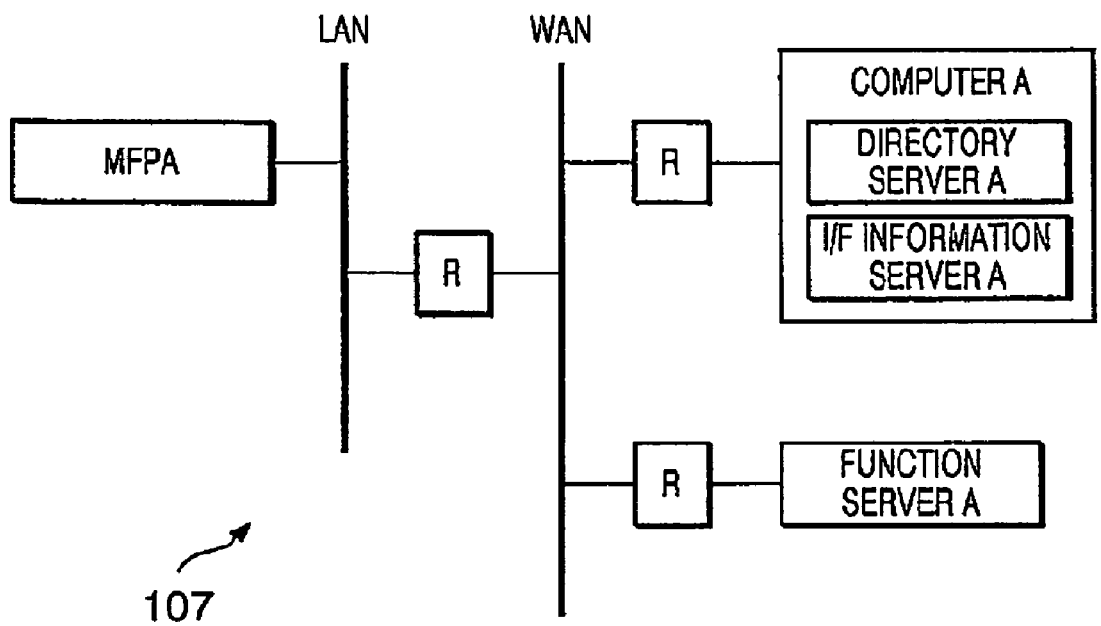

FIG. 36 illustrates a seventh example of a configuration of an image processing system according to the invention. As shown in FIG. 36, the image processing system 107 includes an MFP A, a computer A incorporating a directory server A and an I/F information server A, and a function server A. The MFP A is connected to a local area network (LAN), and the LAN is connected to a wide area network (WAN) via a router (broadband router) R. The computer A and the function server A are connected to the WAN via their respective routers R.

The feature of the image processing system 107 is that the function of executing services and the function of transmitting the service I/F information 36 are implemented in two separate servers, respectively, and the directory server A and the I/F information server A are incorporated in the computer A.

In the image processing system 107, the directory server A transmits the service definition information 25 of each of the services that the function server A supports to the MFP A. The MFP A requests the service I/F information 36 corresponding to a required service from the I/F information server A, while the I/F information server A provides the service I/F information 36 to the MFP A. The MFP A provides the function server A with the inputted parameters to request a service.

Since the function of the directory server A and the function of the I/F information server A are implemented in a single computer (the computer A), the system 107 can be attained at a relatively low cost.

In the image processing system 107, the MFP A corresponds to an image processing device, the directory server A corresponds to an information providing system, the function server A corresponds to a service providing system, and the I/F information server A corresponds to a parameter setting information transmission system.

EXAMPLE 8

Figure 37:
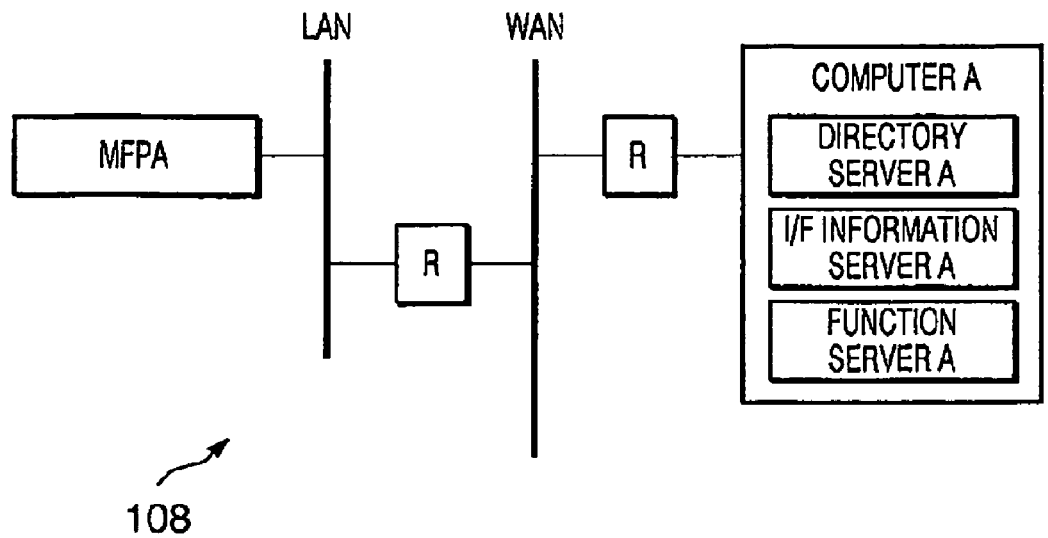

FIG. 37 illustrates an eighth example of a configuration of an image processing system according to the invention. As shown in FIG. 37, the image processing system 108 includes an MFP A, and a computer A incorporating a directory server A, an I/F information server A and a function server A. The MFP A is connected to a local area network (LAN), and the TAN is connected to a wide area network (WAN) via a router (broadband router) R. The computer A is connected to the WAN via a router R.

The feature of the image processing system 108 is that the function of executing services and the function of transmitting the service I/F information 36 are implemented in two separate servers, respectively, and that the directory server A, the I/F information server A and the function server A are incorporated in the computer A.

In the image processing system 108, the directory server A transmits the service definition information 25 of each of the services that the function server A supports to the MFP A. The MFP A requests the service I/F information 36 corresponding to a required service from the I/F information server A, while the T/F information server A provides the service I/F information 36 to the MFP A. The MFP A provides the function server A with the inputted parameters to request a service.

Since the functions of the directory server A, the I/F information server A and the function server A are implemented in a single computer (the computer A), the system 108 can be attained at a relatively low cost.

In the image processing system 108, the MFP A corresponds to an image processing device, the directory server A corresponds to an information providing system, the function server A corresponds to a service providing system, and the I/F information server A corresponds to a parameter setting information transmission system.

EXAMPLE 9

Figure 38:
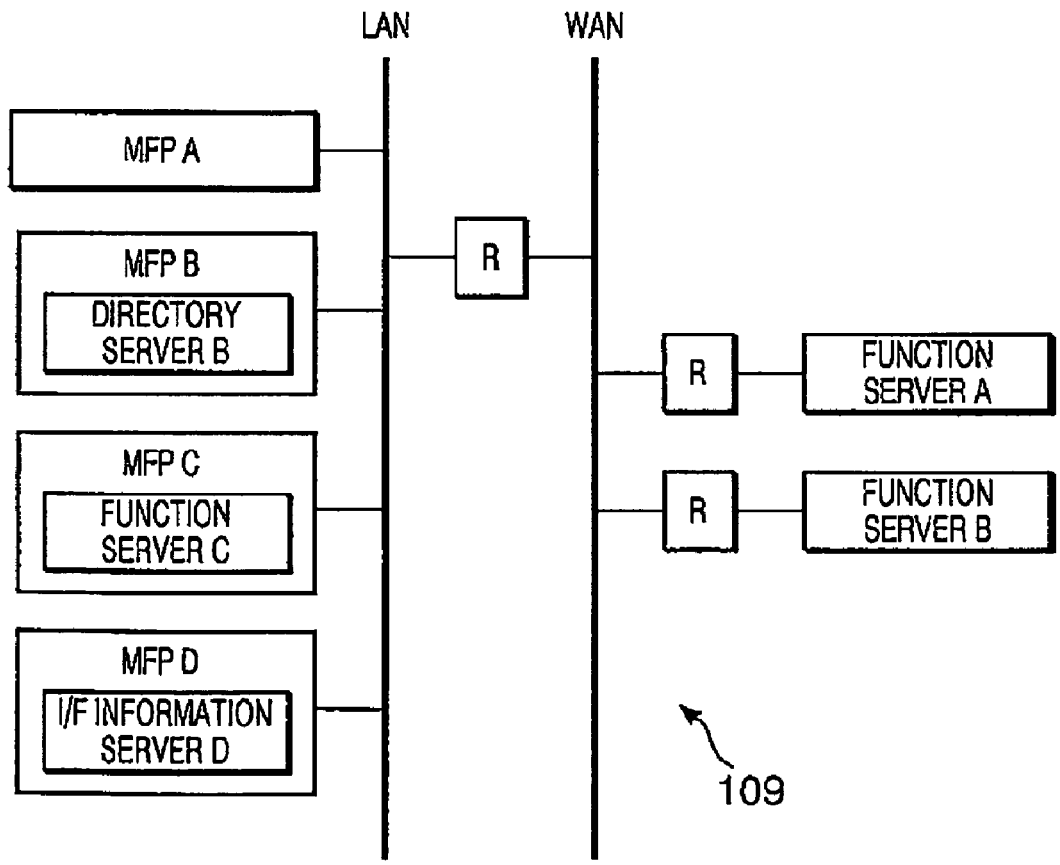

FIG. 38 illustrates a ninth example of a configuration of an image processing system according to the invention. As shown in FIG. 37, the image processing system 109 includes an MFP A, an MFP B incorporating a directory server B, an MFP C incorporating a function server C, an MFP D incorporating an I/F information server D, and function servers A and B. The MFPs A, B, C and D are connected to a local area network (LAN), and the LAN is connected to a wide area network (WAN) via a router (broadband router) R. The function servers A and B are connected to the WAN via their respective routers R.

The feature of the system 109 is that more than one MFP is provided in the system 109, the function of executing services and the function of transmitting the service I/F information 36 are implemented in separate servers, respectively, more than one function server is provided in the system 110, the directory server B is incorporated in the MFP B, the function server C is incorporated in the MFP C, and the I/F information server D is incorporated in the MFP D.

In the image processing system 109, the directory server B transmits the service definition information 25 of each of the services that the function servers A, B and C support to one of the MFPs A to D. Each of the MFPs A to D requests the service I/F information 36 corresponding to a required service from the I/F information server D, while the I/F information server D provides the service I/F information 36 to one of the MFPs A to D. Each of the MFPs A to D provides one of the function servers A to C with the inputted parameters to request a service.

According to the image processing system 109, there is no necessity to provide separate computers for the functions of the directory server B, the function server C and the I/F information server D. Therefore, the system 109 can be attained at a relatively low cost.

In the image processing system 109, each of the MFPs A to D corresponds to an image processing device, the directory server B corresponds to an information providing system, each of the function servers A to C corresponds to a service providing system, and the I/F information server D corresponds to a parameter setting information transmission system.

EXAMPLE 10

Figure 39:
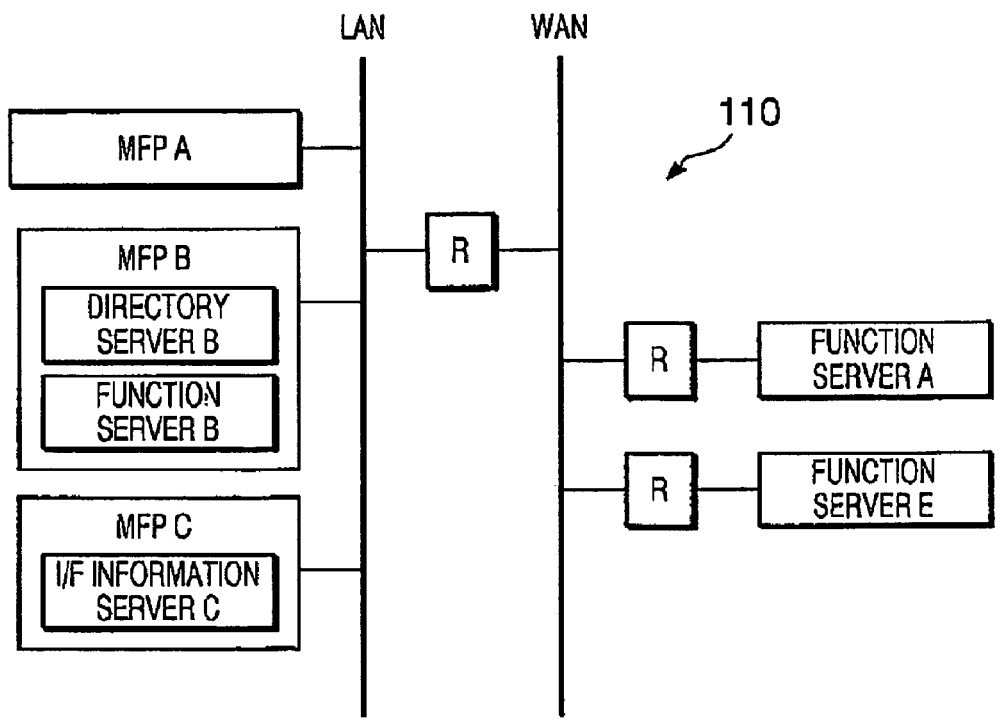

FIG. 39 illustrates a tenth example of a configuration of an image processing system according to the invention. As shown in FIG. 39, the image processing system 110 includes an MFP A, an MFP B incorporating a directory server B and a function server B, an MFP C incorporating an I/F information server C, and function servers A and B. The MFPs A, B and C are connected to a local area network (LAN), and the LAN is connected to a wide area network (WAN) via a router (broadband router) R. The function servers A and E are connected to the WAN via their respective routers R.

The feature of the system 110 is that more than one MFP is provided in the system 110, the function of executing services and the function of transmitting the service I/F information 36 are implemented in separate servers, respectively, more than one function servers are provided in the system 110, the directory server B and the function server BS are incorporated in the MFP B, and the function server C is incorporated in the MFP C.

In the image processing system 110, the directory server B transmits the service definition information 25 of each of the services that the function servers A, B and E support to one of the MFPs A to C. Each of the MFPs A, B and C requests the service I/F information 36 corresponding to a required service from the I/F information server C, while the I/F information server C provides the service I/F information 36 to one of the MFPs A, B and C. Each of the MFPs A, B and C provides one of the function servers A, B and E with the inputted parameters to request a service.

According to the image processing system 110, there is no necessity to provide separate computers for the functions of the directory server B, the function server C and the I/F information server C. Therefore, the system 110 can be attained at a relatively low cost.

In the image processing system 110, each of the MFPs A, B and C corresponds to an image processing device, the directory server B corresponds to an information providing system, each of the function servers A, R and E corresponds to a service providing system, and the I/F information server C corresponds to a parameter setting information transmission system.

EXAMPLE 11

Figure 40:
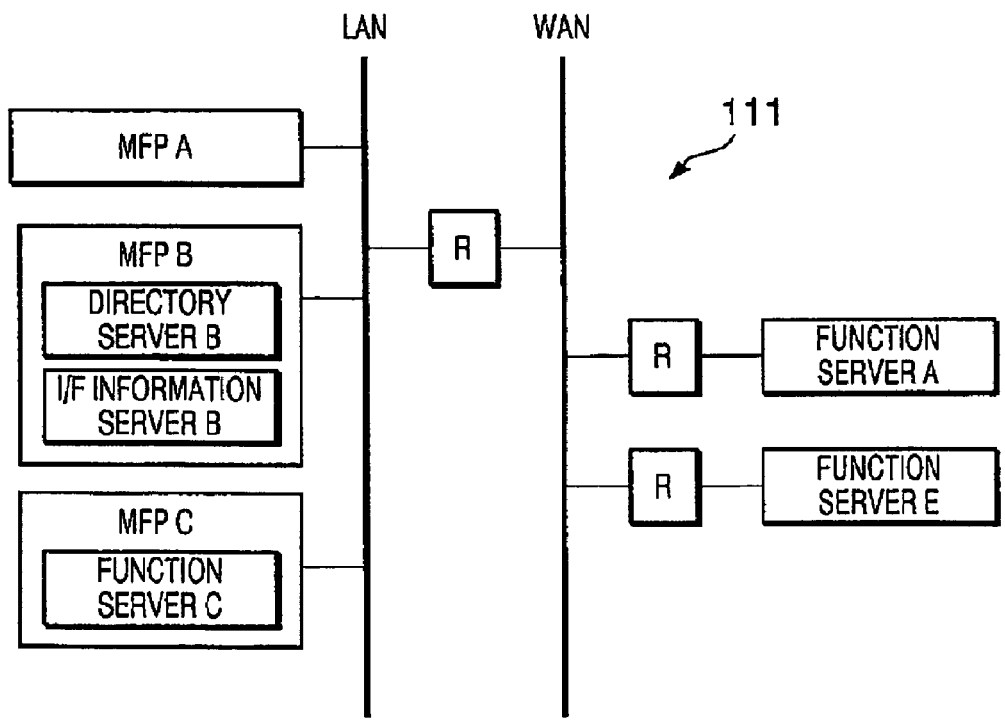

FIG. 40 illustrates an eleventh example of a configuration of an image processing system according to the invention. As shown in FIG. 40, the image processing system 111 includes an MFP A, an MFP B incorporating a directory server B and an I/F information server B, an MFP C incorporating a function server C, and function servers A and E. The MFPs A, B and C are connected to a local area network (LAN), and the LAN is connected to a wide area network (WAN) via a router (broadband router) R. The function servers A and E are connected to the WAN via their respective routers R.

The feature of the system 111 is that more than one MFP is provided in the system 111, the function of executing services and the function of transmitting the service I/F information 36 are implemented in separate servers, respectively, more than one function server is provided in the system 111, the directory server B and the I/F information server B are incorporated in the MFP B, and the function server C is incorporated in the MFP C.

In the image processing system 111, the directory server B transmits the service definition information 25 of each of the services that the function servers A, B and E support to one of the MFPs A to C. Each of the MFPs A, B and C requests the service I/F information 36 corresponding to a required service, from the I/F information server B, while the I/F information server B provides the service I/F information 36 to one of the MFPs A, B and C. Each of the MFPs A, B and C provides one of the function servers A, B and E with the inputted parameters to request a service.

According to the image processing system 111, there is no necessity to provide separate computers for the functions of the directory server B, the function server C and the I/F information server B. Therefore, the system 111 can be attained at a relatively low cost.

In the image processing system 111, each of the MFPs A, B and C corresponds to an image processing device, the directory server B corresponds to an information providing system, each of the function servers A, B and E corresponds to a service providing system, and the I/F information server B corresponds to a parameter setting information transmission system.

EXAMPLE 12

Figure 41:
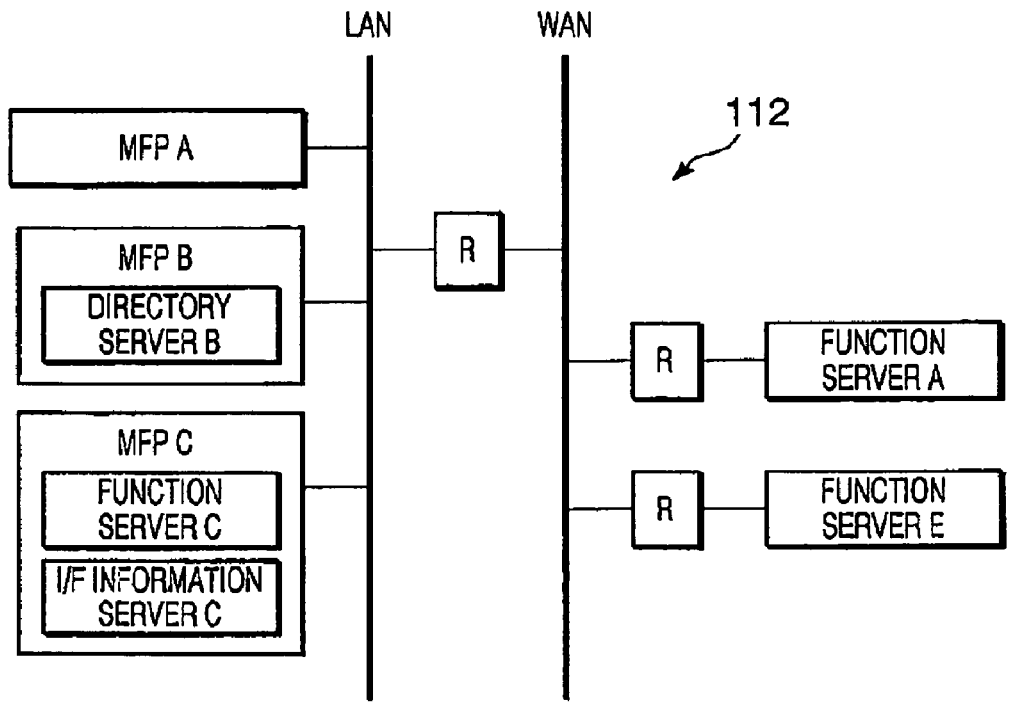
Figure 42:
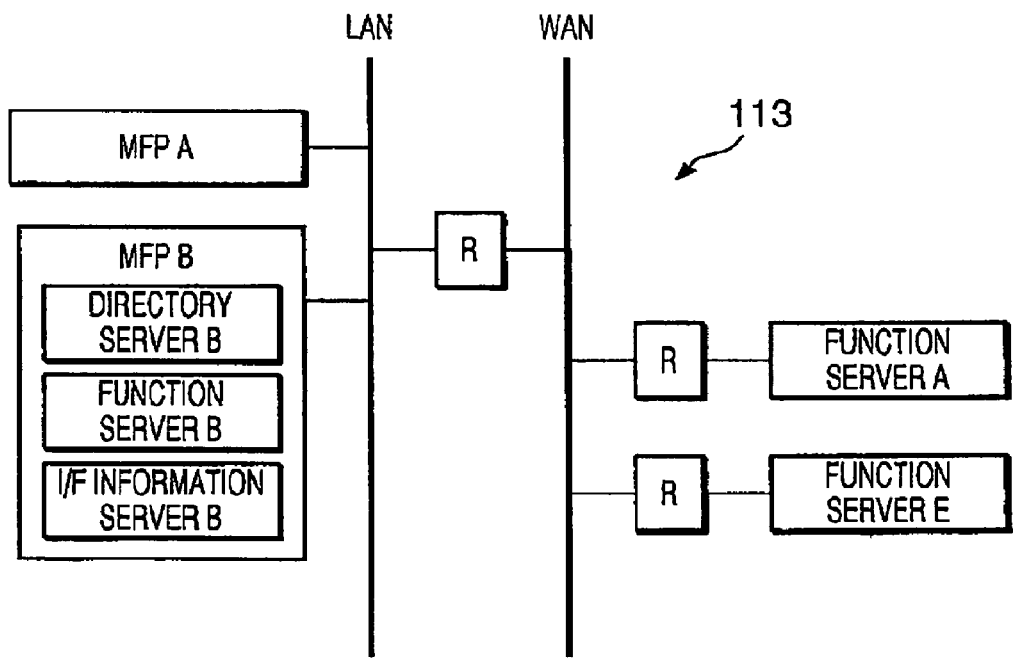

FIG. 41 illustrates a twelfth example of a configuration of an image processing system according to the invention. As shown in FIG. 41, the image processing system 112 includes an MFP A, an MFP B incorporating a directory server B, an MFP C incorporating a function server C and an I/F information server C, and function servers A and E. The MFPs A, B and C are connected to a local area network (LAN), and the LAN is connected to a wide area network (WAN) via a router (broadband router) R. The function servers A and E are connected to the WAN via their respective routers R.

The feature of the system 112 is that more than one MFP is provided in the system 112, the function of executing services and the function of transmitting the service I/F information 36 are implemented in separate servers, respectively, more than one function server is provided in the system 112, the directory server B is incorporated in the MFP B, and the function server C and the I/F information server C are incorporated in the MFP C.

In the image processing system 112, the directory server B transmits the service definition information 25 of each of the services that the function servers A, B and E support to one of the MFPs A to C. Each of the MFPs A, B and C requests the service I/F information 36 corresponding to a required service from the I/F information server C, while the I/F information server C provides the service I/F information 36 to one of the MFPs A, B and C. Each of the MFPs A, B and C provides one of the function servers A, B and E with the inputted parameters to request a service.

According to the image processing system 112, there is no necessity to provide separate computers for the functions of the directory server B, the function server C and the I/F information server C. Therefore, the system 112 can be attained at a relatively low cost.

In the image processing system 112, each of the MFPs A, B and C corresponds to an image processing device, the directory server B corresponds to an information providing system, each of the function servers A, B and E corresponds to a service providing system, and the I/F information server C corresponds to a parameter setting information transmission system.

EXAMPLE 13

FIG. 41 illustrates a thirteenth example of a configuration of an image processing system according to the invention. As shown in FIG. 41, the image processing system 113 includes an MFP A, an MFP B incorporating a directory server B, a function server B and an I/F information server B, and function servers A and E. The MFPs A and B are connected to a local area network (LAN), and the LAN is connected to a wide area network (WAN) via a router (broadband router) R. The function servers A and F are connected to the WAN via their respective routers R.

The feature of the system 113 is that more than one MFP is provided in the system 112, the function of executing services and the function of transmitting the service I/F information 36 are implemented in separate servers, respectively, more than one function server is provided in the system 112, and the directory server B, the function server C and the I/F information server B are incorporated in the MFP B.

In the image processing system 113, the directory server B transmits the service definition information 25 of each of the services that the function servers A, B and E support to one of the MFPs A and B. Each of the MFPs A and B requests the service I/F information 36 corresponding to a required service from the I/F information server B, while the I/F information server B provides the service I/F information 36 to one of the MFPs A and B. Each of the MFPs A and B provides one of the function servers A, B and E with the inputted parameters to request a service.

According to the image processing system 113, there is no necessity to provide separate computers for the functions of the directory server B, the function server B and the I/F information server B. Therefore, the system 113 can be attained at a relatively low cost.

In the image processing system 113, each of the MFPs A and B corresponds to an image processing device, the directory server B corresponds to an information providing system, each of the function servers A, B and E corresponds to a service providing system, and the I/F information server B corresponds to a parameter setting information transmission system.

In the above mentioned first embodiment, the cache management information includes a URI, (address of the requested file), a group ID (grouping information of the address), a filename of the cached file, and time information (which is a time when the file is cached or a request for obtaining the file again). However, frequency of requests may be stored in the cache management information in place of the time information as illustrated in FIG. 56.

Figure 58:
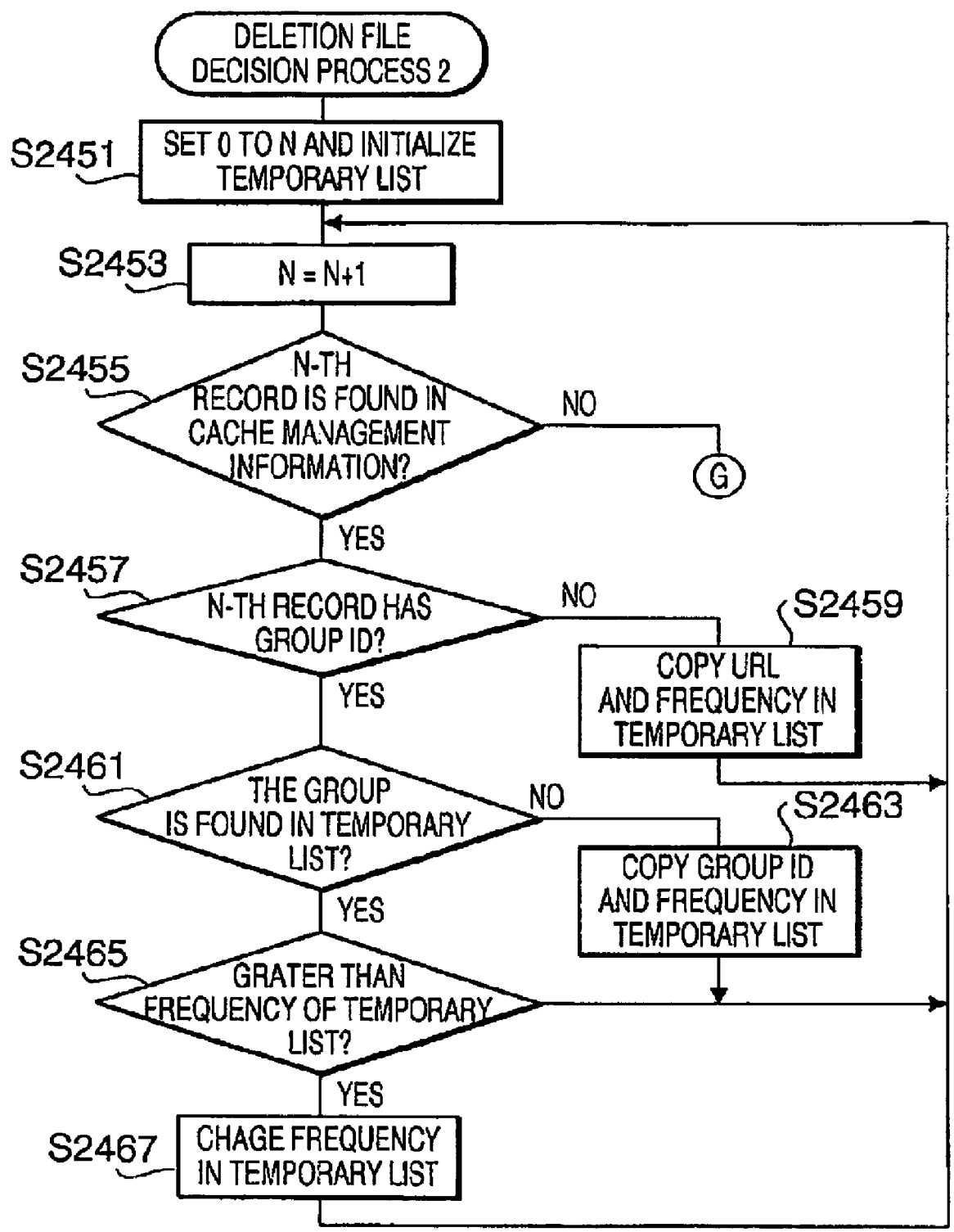
FIGS. 58 and 59 show a flowchart illustrating a deletion file decision process 2.
Figure 60:
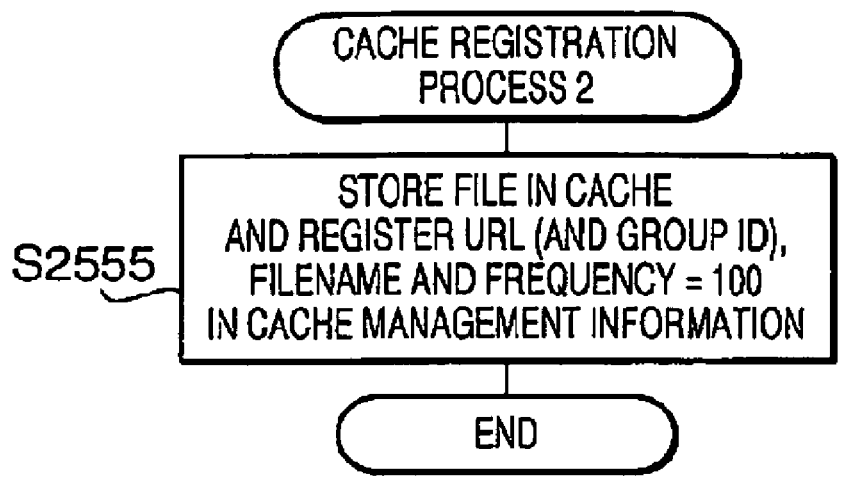
FIG. 60 is a flowchart illustrating a cache registration process 2.

If the cache management information shown in FIG. 56 is used, a cache management information update process 2 shown in FIG. 57 may be executed in place of the cache management information update process 1, a deletion file decision process 2 shown in FIG. 58 may be executed in place of the deletion file decision process 2, and a cache registration process 2 shown FIG. 60 may be executed in place of the cache registration process 1.

The cache management information update process 2 will be described with reference to FIG. 57. In this process, the control unit 11 adds 100 to the frequency of the record corresponding to the requested file (S2557). Then, the cache management information update process 2 terminates.

Figure 59:
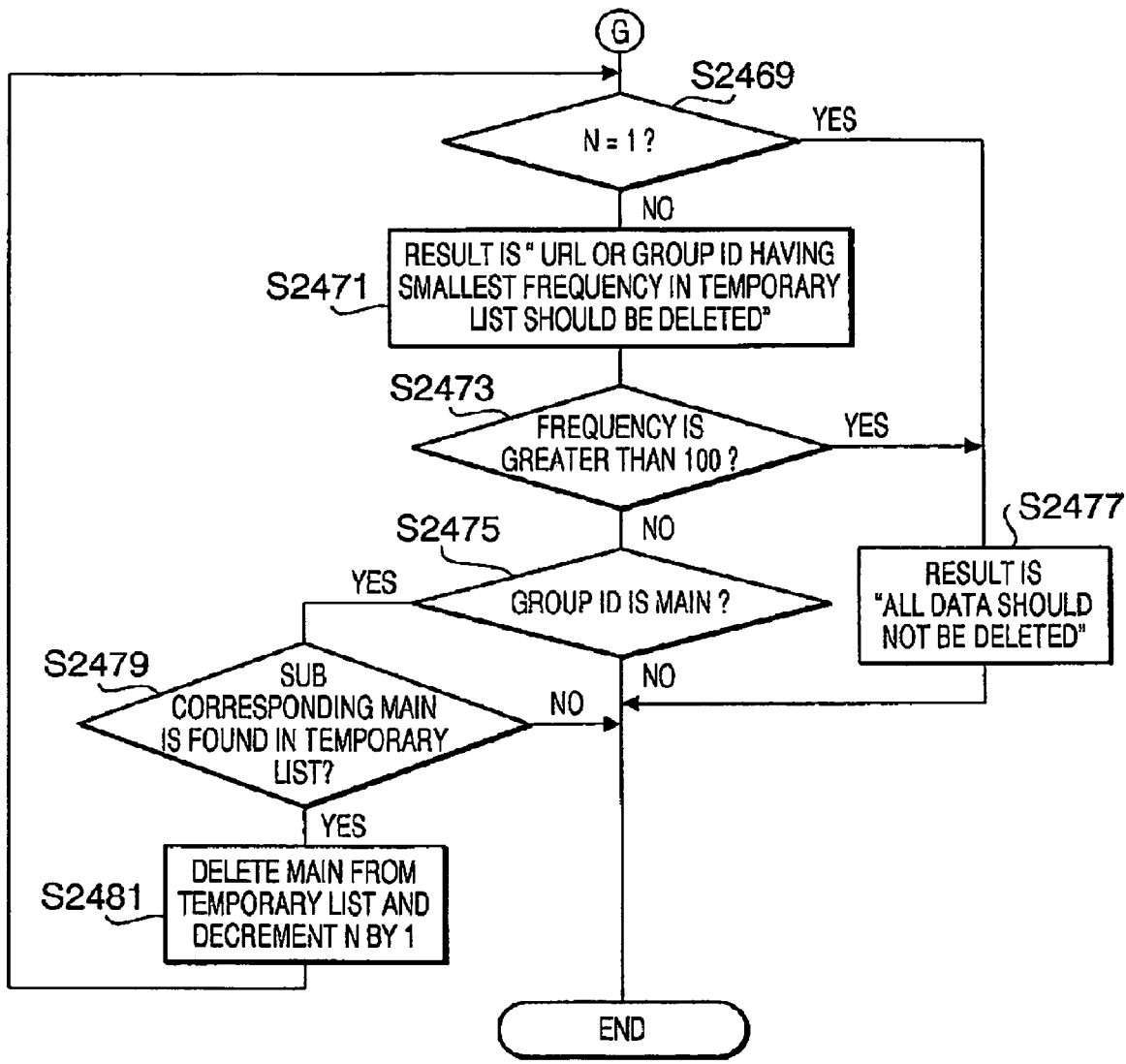

Next, the deletion file decision process 2 will be described with reference to FIGS. 58 and 59. First, the control unit 11 assigns 0 to a variable N and initializes a temporary list (S2451). Then, the control unit 11 increments the variable N by one (S2453). Next, the control unit 11 judges whether the cache management information has an N-th record (S2455).

If the cache management information has an N-th record (S2455: YES), the control unit 11 judges whether the N-th record has a group ID (S2457). If the N-th record has a group ID (S2457: YES), the control unit 11 judges whether the group ID is included in the temporary list (S2461). If the N-th record does not have a group ID (S2457: NO), the control unit 11 copies a URL and frequency of the N-th record in the temporary list (S2459). Then, control returns to step S2453.

The temporary list means a memory area defined in the RAM of the control unit 11. Multiple pairs of a URL and frequency or a group ID and frequency can be stored in the memory area.

If the group ID of the N-th record is included in the temporary list (S2461: YES), the control unit 11 compares the frequency of the N-th record with the frequency of the corresponding record in the temporary list so as to judge whether the frequency of the N-th record is larger than that of the temporary list (S2465).

If the group ID of the N-th record is not included in the temporary list (S2361: NO), the control unit 11 copies the group ID and the frequency of the N-th record in the temporary list (S2463). Then, control returns to step S2453.

If it is judged in step S2465 that the frequency of the N-th record is larger than that of the corresponding record of the temporary list (S2465: YES), the control unit replaces the frequency of the record of the temporary list with the record of the N-th record in the cache management information (S2467). Then, control returns to step S2453. If the frequency is not larger than that of the corresponding record of the temporary list (S2465: NO), control returns to step S2451 without changing the frequency of the temporary list.

If it is judged in step S2455 that the cache management information does not have an N-th record (S2455: NO), control proceeds to step S2469 in FIG. 59. In step S2469, the control unit 11 judges whether N is 1. If N is 1 (S2469: YES), the control unit 11 determines that the all of the files stored in the cache area can not be deleted (S2477). Then, the deletion file decision process 2 terminates.

If N is not 1 (S2469: NO), the control unit 11 determines that the file corresponding to a URL or group ID of the record having the smallest frequency of all of the records in the temporary list should be deleted from the temporary list (S2471). If a deletion target file is associated with the group ID, the control unit 11 judges whether the group ID is a first type group ID (S2475). If the group ID is not the first type group ID (S2475: NO), the deletion file decision process 2 terminates.

If the group ID is the first type group ID (S2475: YES), the control unit 11 judges whether a second type group ID corresponding to the first type group ID exists in the temporary list (S2479). Specifically, the control unit 11 searches for a second type group ID of which main group ID coincides with a main group ID of the first type group ID.

If such a second type group ID is not found in the temporary list (S2379: NO), the deletion file decision process 2 terminates. If such a second type group ID is found in the temporary list (S2479: YES), the control unit 11 deletes the first type group ID from the temporary list and decrements N by 1 (S2481). Then, control returns to step S2469 to repeat the process from step S2469.

Next, the cache registration process 2 will be described with reference to FIG. 60. In this process, the control unit 11 stores the obtained file in the cache area, and creates a new record including a URL, a group ID (if it exists), a filename, and frequency (=100), and stores the new record in the cache management information (S2555).

If the cache management information shown in FIG. 56 is used the following frequency updating process is executed in the MFP 10.

Figure 61:
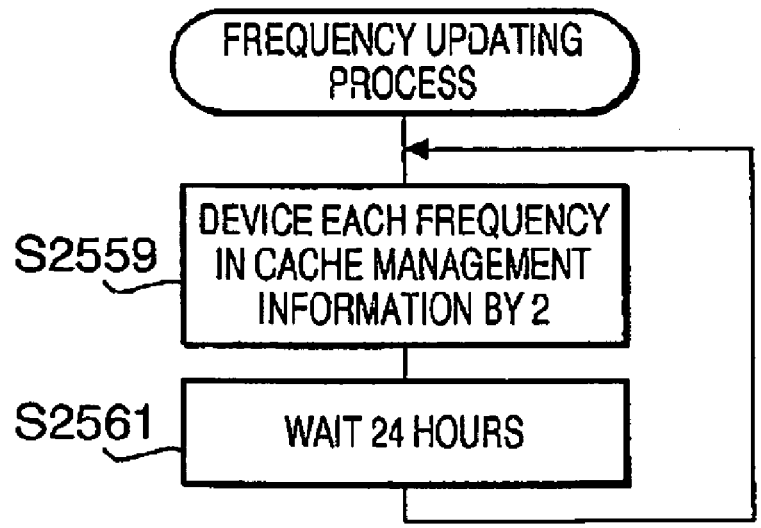
FIG. 61 is a flowchart illustrating a frequency updating process.

FIG. 61 is a flowchart illustrating the frequency updating process, which is initiated when the MFP 10 is powered ON and is executed during the power on of the MFP 10. In this process, the each of the frequencies in the cache management information (FIG. 56) is divided by 2 (S2559). Fractions below decimal point may be cut off. Then, the control unit 11 waits 24 hours (S2561). Then, control returns to step S2559.

Figures 62, 63:
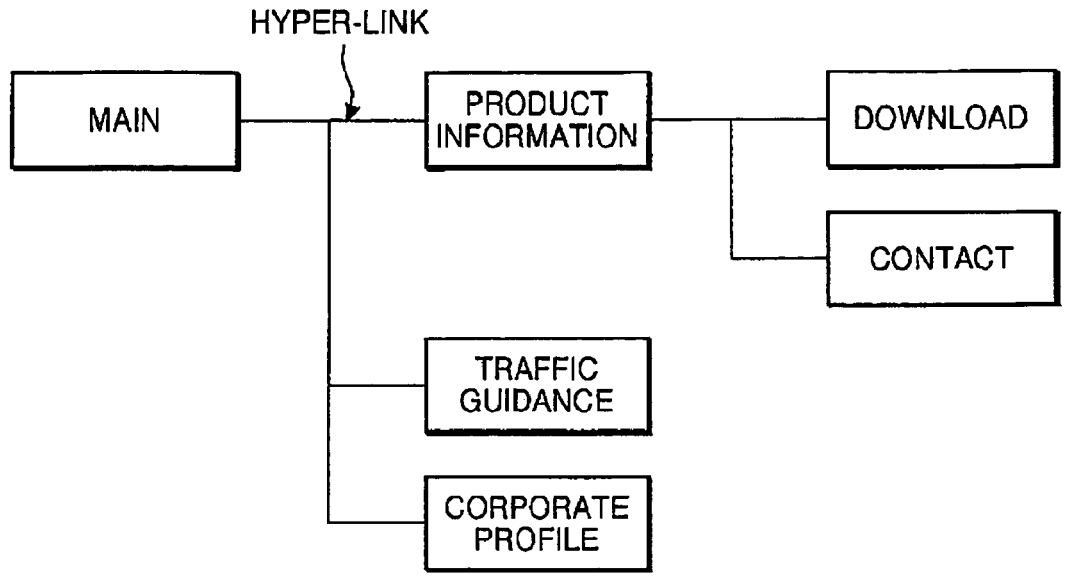
FIG. 62 shows an example of a data structure of a web page.
FIG. 63 shows an example of a main page.

The caching function described in the above mention embodiment may be applied to acquire a general web page, for example, shown in FIG. 62. By defining a group ID (a first type group ID) in an HTML file of the main page (see FIG. 63) using a META tag and defining a group ID (a second type group ID) in an HTML file of a traffic guidance page (see FIG. 64) using a META tag, it becomes possible to prevent the main page from being deleted from the cache area in a situation where both the main page and the traffic guidance page are stored in the cache area. In other words, even if a file is newly stored in the cached area after the main page is stored in the cached area, an occurrence of a situation where a response time for accessing the main page becomes larger than that for the traffic guidance page can be avoided.

Second Embodiment

Hereafter, an image processing system according to a second embodiment of the invention will be described with reference to the accompanying drawings. In this illustrative embodiment, the same reference numbers are assigned to elements, which are equivalent to those of the first embodiment, and explanations thereof will not be repeated. In the following, the feature of the image processing system 201 is described. It should be noted that various processes described in the first embodiment can also be processed in the image processing system 201.

Figure 65:
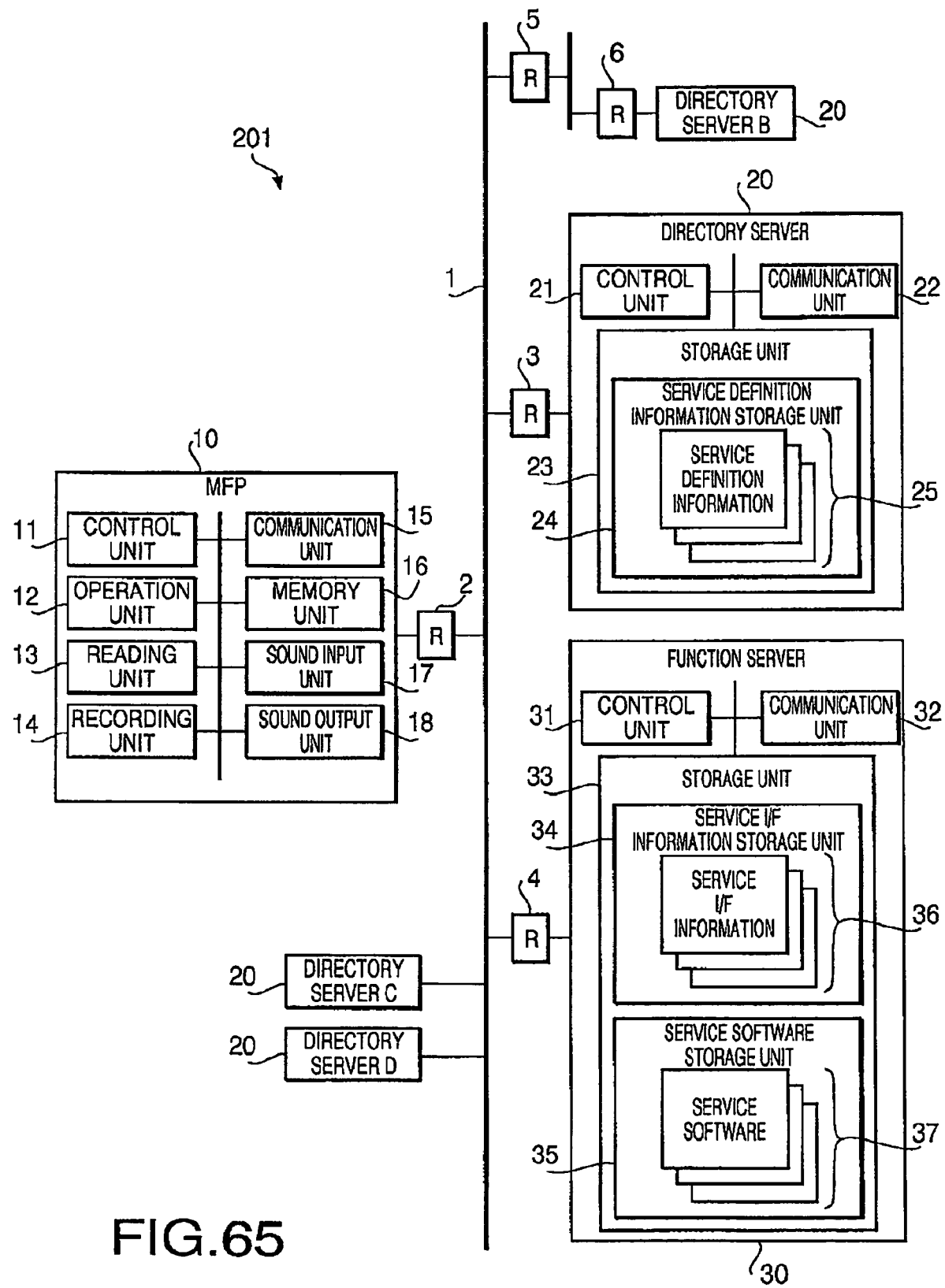
FIG. 65 is a block diagram of an image processing system according to a second illustrative embodiment.

FIG. 65 is a block diagram of an image processing system 201 according to the second embodiment. As shown in FIG. 65, the image processing system 201 includes MFP (multi-function peripheral) 10, directory servers 20 (directory servers B, C and D), and a function server 30 which are capable of communicating with each other via a wide area network 1 (e.g., the Internet). The MFP 10, the directory servers 20, and the function server 30 are directly or indirectly connected to the wide area network 1 via respective routers (2, 3, 4, 5, 6). The router 2 is, for example, a broadband router.

More specifically, with regard to packets to be sent to the internal devices (e.g., the MFP 10) in a sub-network, the router 2 passes only packets, which are judged to be a response to a request from the internal device, and blocks the other packets. That is, the router 2 serves as a fire wall that blocks unauthorized access to the MFP 10 from the wide area network 1.

Figure 66:
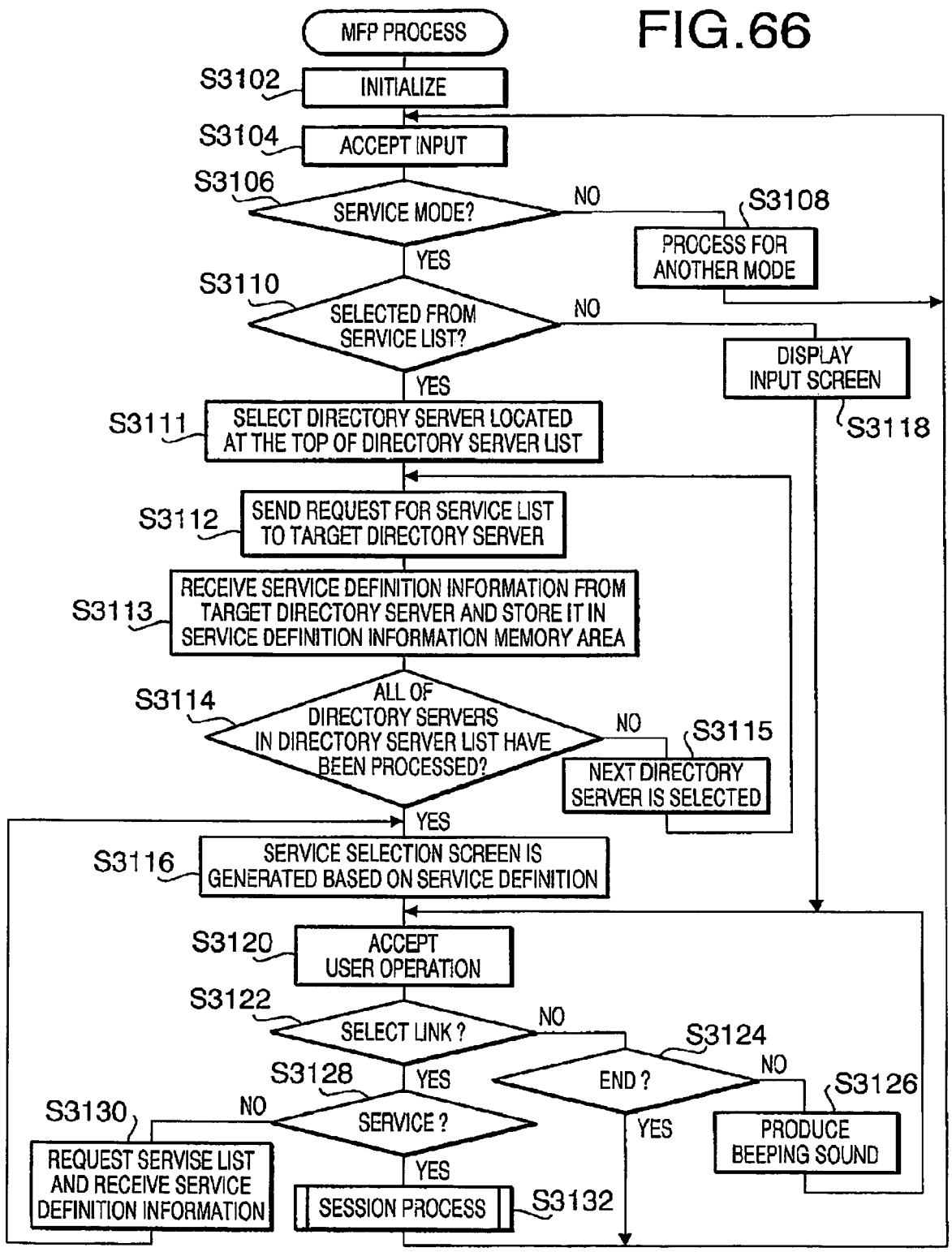
FIG. 66 is a flowchart illustrating an MFP process.

Hereafter, an MFP process will be described with reference to FIG. 66. FIG. 66 is a flowchart illustrating the MFP process executed under control of the control unit 11 of the MFP 10. First, in step S3102, the control unit 11 executes an initializing process for the MFP 10. Then, in step S3104, the control unit 11 accepts a command input. The command input means an input for instructing the MFP 10 to execute a certain process. For example, the command input is a key input inputted by a user through the operation unit 12 or a command transmitted from an external computer.

In step S3106, the control unit 11 judges whether the inputted command is a command instructing the MFP 10 to change to a service mode. Specifically, in step S3106, the control unit 11 judges whether the user operation in step S3104 is a pressing operation of the service key 44 on the operation panel 12a. If the inputted command input is not the command instructing the MFP 10 to change to the service mode (S3106: NO), control proceeds to step S3108 where a process for another mode corresponding to a user input in step S3104 is executed. For example, a print process is executed in step S3108. Then, control returns to step S3104.

If the inputted command is the command instructing the MFP 10 to change to the service mode (S3106: YES), control proceeds to step S3110. In step S3110, the control unit 11 displays a selection screen on the display 52 requesting a user to decide whether the user wants to select a desirable service (to be requested to the function server 30) from a list or to designate directly a URL of a destination of a desirable service. Then, the control unit 11 waits for a user input. If the user input is received, the control unit 11 judges whether a service to be requested to the function server 30 should be selected from a service list (S3110).

If it is judged in step S3110 that a service to be requested to the function server 30 is selected from a service list (S3110: YES), control proceeds to step S3111.

In step S3111, the control unit 11 selects a directory server (one of the directory servers B, C and D) located at the top of a directory server list. Hereafter, the selected directory service is referred to as a target directory server 20.

Next, the control unit 11 sends a request for a service list to the target directory server (S3112). FIG. 67 illustrates an example of the directory server list. As shown in FIG. 67, the directory server list includes one or more addresses of directory servers from which service lists are to be received. More specifically, in step S106, the MFP 10 sends an HTTP request based on HTTP 1.1 to a destination address of the target directory server to request a service list. After the directory server 20 receives the request, the directory server sends the service definition information 25 back to the MFP 10 as a HTTP response based on HTTP 1.1.

The service definition information 25 includes information (top service definition information 25) for displaying a service selection screen, which requests a user to select a service from among the services (e.g. "DATA STORAGE SERVICE", "PRINT SERVICE", "COPY APPLICATION SERVICE") that the function server 30 supports, and information (category service definition information 25) for displaying a service selection screen for allowing a user to select a category.

In step S3112, the control unit 11 sends HTTP requests to addresses for accessing all of the pieces of service definition information. FIG. 68 illustrates an example of the top service definition information 25. FIG. 69 illustrates an example of the category service definition information 25.

Next, in step S3113, the control unit 11 receives the service definition information 25 from the target directory server 20 and stores it in a service definition information memory area. Specifically, each piece of data in the received service definition information 25 is stored in a memory area for the service definition information.

Figure 70:
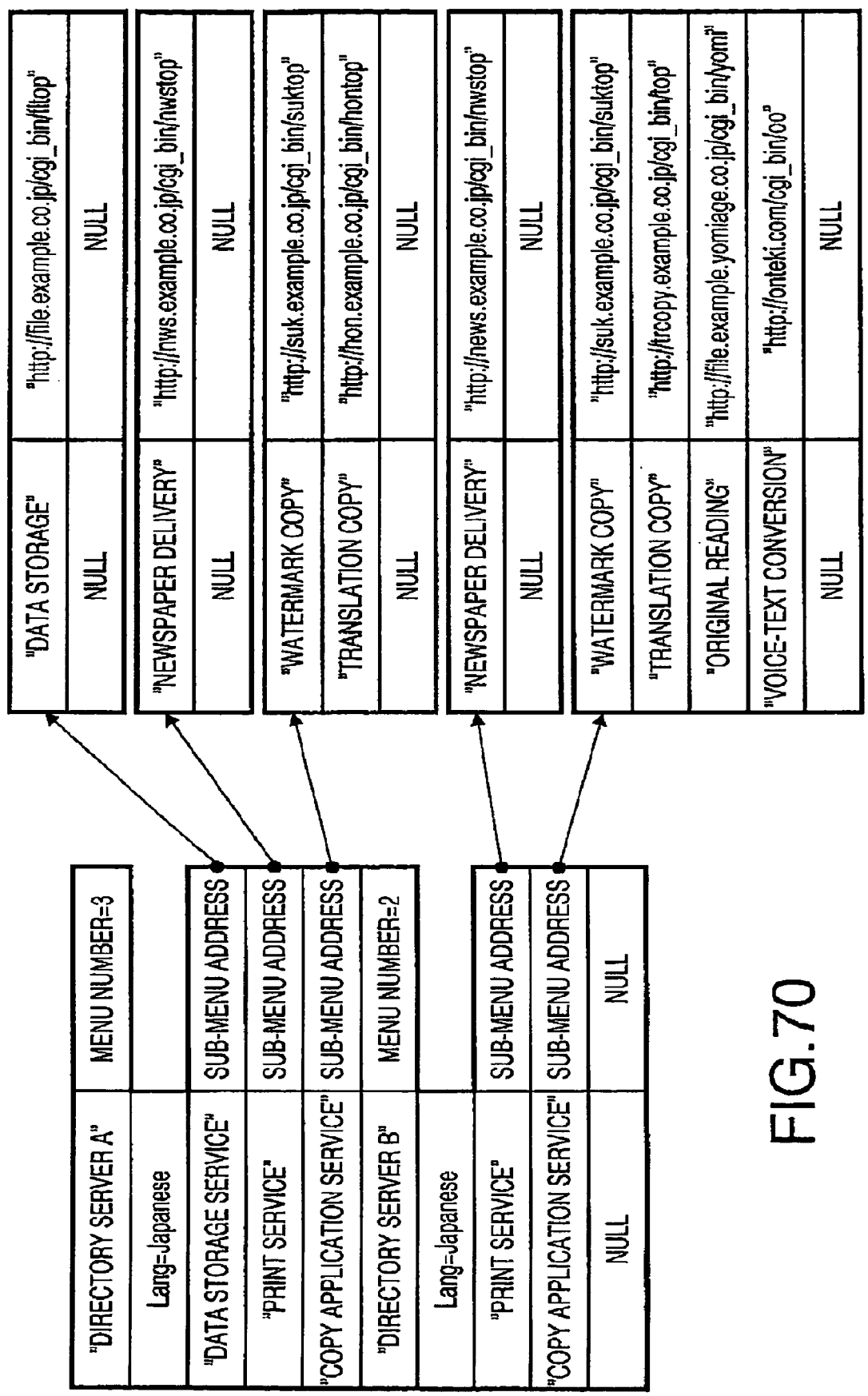
FIG. 70 shows a data structure of information stored in a service definition information memory area.

For example, if pieces of service definition information 25 shown in FIG. 68 are received from the directory server A, a name of the directory server A from which the pieces of service definition information is received, the number of menus in the top service definition information 25 (see "Number of Menus" in FIG. 70), and the category names to be offered to a user are registered in the service definition information memory area as shown in FIG. 70. In this case, the "directory server A" is registered as the directory server name, the value of "Num_Link" tag is registered as the number of menus, the value of "Language" tag is registered as the language, the value of "Link_Title" tag is registered as the category name. Further, the addresses corresponding to the services of the categories also registered while being associated with the respective service names. In the example shown in FIG. 10, the value of "Link_Location" tag in the category service definition information 25 is registered as "SUB-MENU address" while being associated with the value of "Link_Title" tag Next, in step S3114, the control unit 11 judges whether all of the directory servers in the directory server list have been processed. If all of the directory servers have not been processed (S3114: NO), the next directory server is selected (S3115). Then, control returns to step S3112. The sequence of steps S3112 to S3115 are executed until the sequence of steps is processed for all of the directory servers.

If all of the directory servers have been processed (S3114: YES), control proceeds to step S3116 where a service selection screen is generated based on the service definition information 25 currently stored in the service definition information memory area. Specifically, in step S3116 a service selection screen generating process is executed.

If step 3116 is executed first after the initiation of the MFP process, the service selection screen shown in FIG. 5A is displayed. If step S3116 is executed after control returns from step S3130, a service selection screen shown in FIG. 5B or 5C is displayed.

If it is judged in step S3110 that a service to be requested to the function server 30 is not selected from a service list (S3110: NO), control proceeds to step S3108 where control unit 11 generates an input screen for allowing a user to directly input a URL and displays the input screen on the display 52. Then, control proceeds to step S3120.

In step S3120, the control unit 11 accepts a user operation through the operation panel 12a to decide which service is to be received from the function server 30. If the user operation is performed, control proceeds to step S3122 where the control unit 11 judges whether the user operation is an operation for selecting a link. Specifically, in step S3122, the control unit 11 judges that the user operation is the operation for selecting a link if a selection is made successfully by a user on the service selection screen displayed at step S116 or if a URL is successfully inputted through the input screen displayed at step S118.

If the user operation is not an operation for selecting a link (S3122: NO), control proceeds to step S3124 where the control unit 11 judges whether the user operation accepted at step S3120 is an operation for ending the service mode. If the user operation is an operation for ending the service mode (S3120: YES), control returns to step S3104. That is, in this case the process as a service mode terminates.

If it is judged in step S3124 that the user operation is not an operation for ending the service mode (S3124: NO), control proceeds to step S3126 where the control unit 11 produces a beeping sound. Then, control returns to step S3104. That is, if the user operation accepted in step S3120 is not one of an operation for selecting a link and an operation for ending the service mode, the beep sound is produced so as to notify a user that the user operation is invalid.

If the user operation is an operation for selecting a link (S3122: YES), control proceeds to step S3128 where the control unit 11 judges whether the selected link is a link (ID) for a service.

If the selected link is not a link for a service (i.e., the selected link is a URL of the service definition information 25) (S3128: NO), control proceeds to step S3130. In step S3130, the control unit 11 requests the service list and receives the service definition information 25. Then, control returns to step S3116 so that a new service selection screen is displayed on the display 52.

if the selected link is a link of a service (S3128: YES), control proceeds to step S3132, where the session process (FIG. 14) is executed. After the session process is finished, control returns to step S3104.

Hereafter, the service selection screen generating process executed in step S3116 of FIG. 66 will be described with reference to FIG. 71. First, the control unit 11 acquires a memory area for a server address table (S4002). Next, the control unit 11 selects top information in the service definition information memory area as target information (S4004). Data of the service definition information is registered in the service definition information memory area in step S3113 of FIG. 66, and a range is defined from an item of the directory server name to an item of the category name as a target.

Next, the control unit judges whether "NULL" is assigned to the target data as the directory server name (S4006). If "NULL" is not assigned to the target data (i.e., a name of the directory server 20 is assigned to the target data (S4006: NO)), the control unit 11 reads out the directory server name and stores it in a display memory area (S4008). The display memory area is a memory area for storing information to be displayed on the display 52, and the information stored in the display memory area is displayed on the display 52.

Next, a value of the "number of menu" corresponding to the directory server name is read out from the target information, and is assigned to a variable N (S4010). Next, the control unit 11 judges whether N is larger than 0 (S4012). If N>0 (S4012: YES), the control unit 11 reads out categories from the target information, and stores the read data in the display memory area (S4014).

Then, the control unit 11 reads out the SUB-MENU addresses from the target information, and selects a top SUB-MENU address as a target (S4016). Then, the control unit 11 reads out the address (value of "Link_Location" in a service) of the target SUB-MENU address (S4018), and judges whether the address is equal to one of addresses in the server address table (S4020). If the server address table does not include an address equal to the address of target SUB-MENU (S4020: NO), the address is stored in the server address table (S4022). Then, the service name (the value of "Link_Title") of the target SUB-MENU is read out, and it is stored in the display area (S4024). Then, control proceeds to step S4026.

If the server address table includes an address equal to the address of target SUB-MENU (S4020: YES), control proceeds to step S4060 without processing steps S4022 and S4024.

Next, the control unit 11 judges whether "NULL" is assigned to the service name of the target SUB-MENU (i.e., the target information does not exist) (S4026). If the target information exist (S4026: NO), control returns to step S4018 to repeat steps S4018 to S4026 so that all of the SUB-MENU addresses are processed. If all of the SUB-MENU addresses have been processed (S4026: YES), the control unit 11 decrements N by 1 (S4028). Then, control returns to step S4012 so that all of the menus in the target information are processed.

If all of the menus in the target information have bee processed (S4012: NO), the next one of the pieces of information in the service definition information memory area is selected as target information (S4030). Then, control returns to step S4006 so that all of the pieces of information in the service definition information memory area are processed.

If all of the pieces of information have been processed (S4006: YES), the memory area acquired in step S4002 is released (S4032). Then, the service selection screen generating process terminates.

Figure 71:
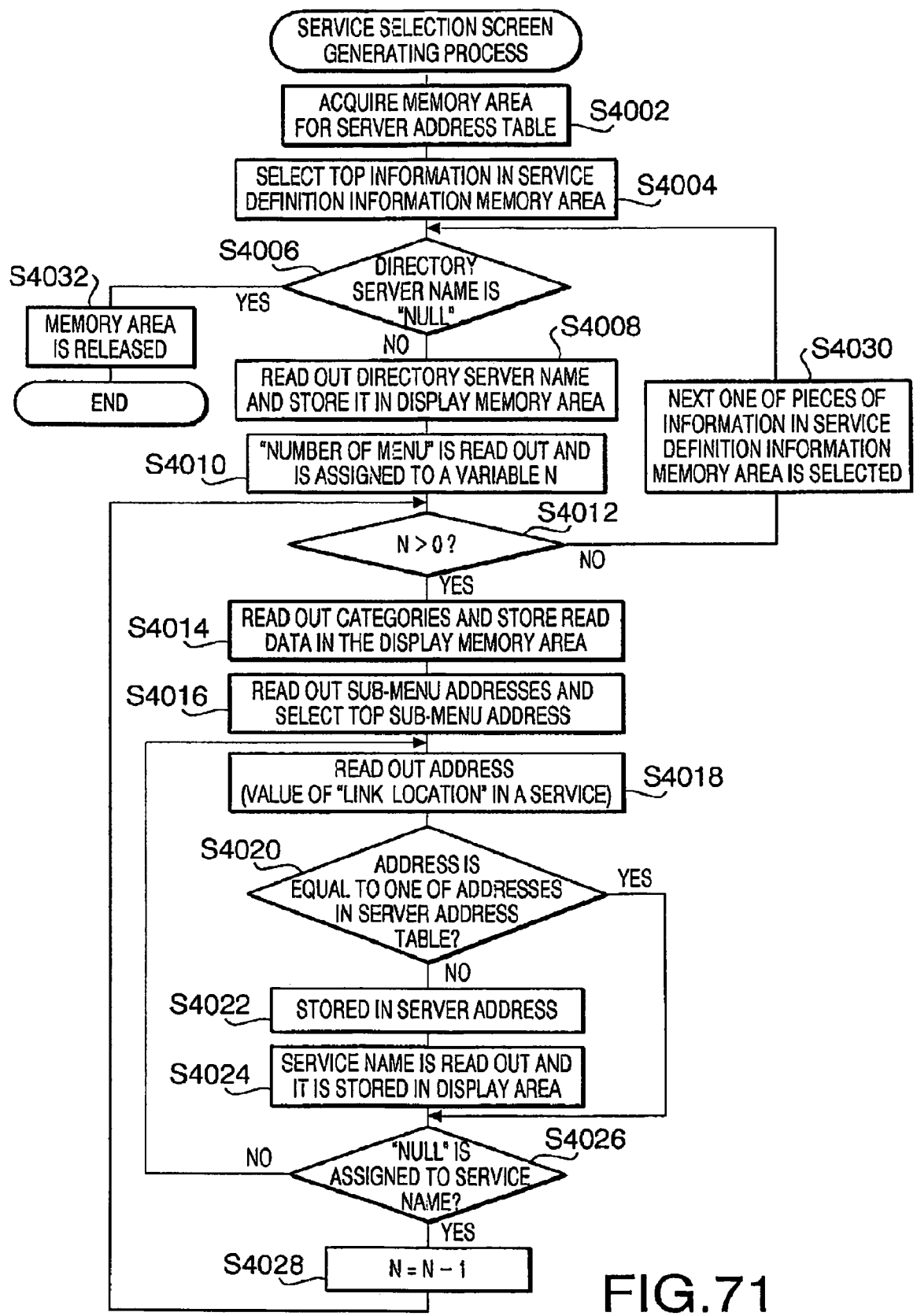
FIG. 71 is a flowchart illustrating a service selection screen generating process.
Figure 72:
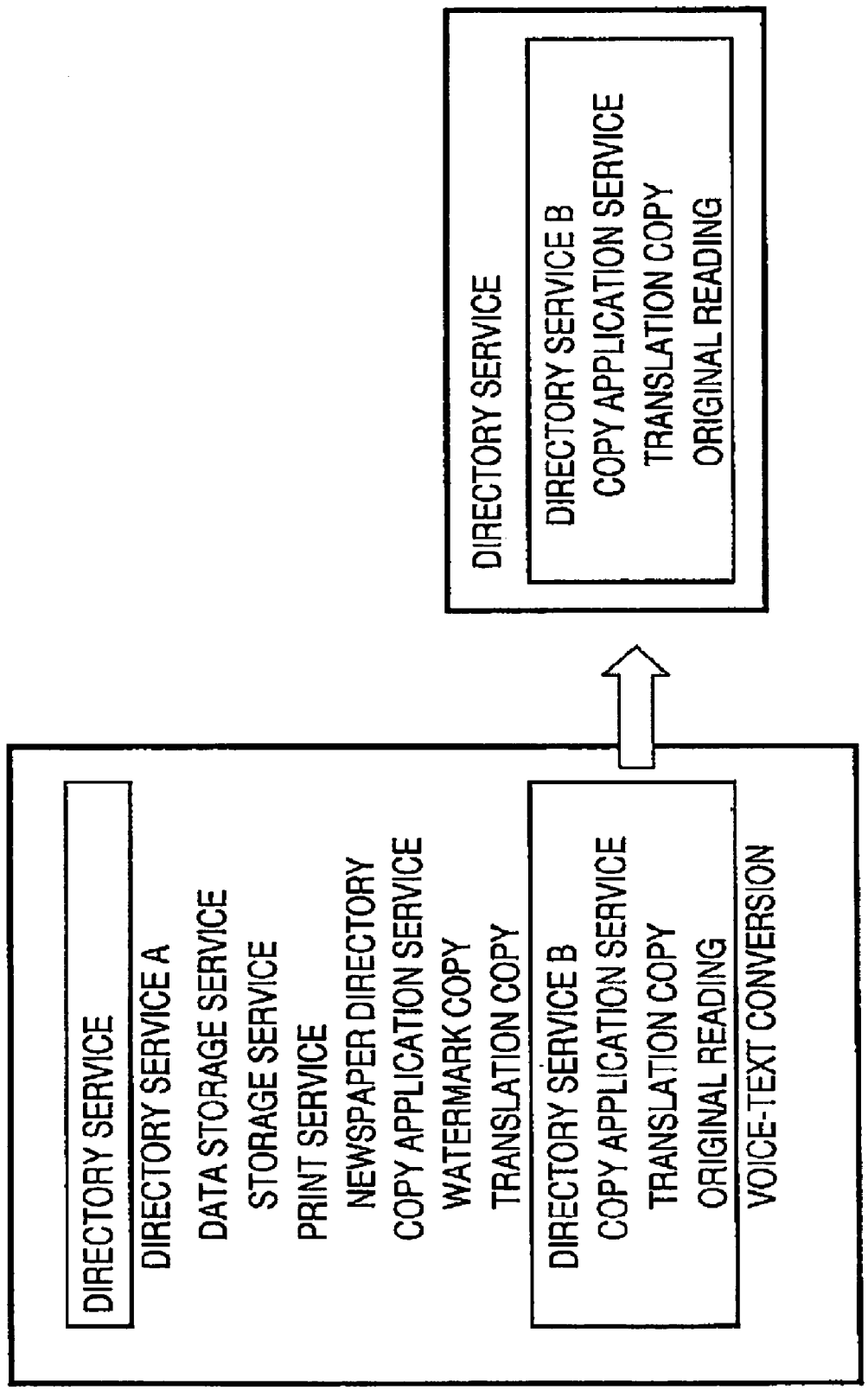
FIG. 72 shows an example of a service selection screen generated through the service selection screen generating process.

FIG. 72 shows an example of a service selection screen generated through the service selection screen generating process of FIG. 71. As can be seen from FIG. 72, the duplicate display of services in the same category among the directory servers A and B is avoided. In the example of FIG. 72, "NEWS REPORT" and "WATERMARK COPY" of the copy application service in the directory server B are removed because the addresses of these services are equal to the corresponding ones of the directory server A.

As described above, according to the second illustrative embodiment, the service selection screen is generated reflecting the service lists received from more than one directory server 20, and a user is allowed to select a service through the generated service selection screen. Such a configuration allows the user to easily and reliably select a desirable service.

In the service selection screen generated in step S3116 of FIG. 66, duplicate display of services in the same category among more than one directory server can be avoided. In other words, only different services types are displayed on the service selection screen as options. Therefore, it is prevented that the same services are displayed simultaneously in the service selection screen. Such a configuration prevents the MFP 10 from confusing a user by displaying the same services simultaneously.

Since duplicate display of services can be avoided, it becomes possible to minimize the necessary display area for displaying the service list. It is understood that such a configuration is very useful because the size of the display 52 is limited. Unnecessary operations for selecting a desirable service on the display 52 can also be avoided.

The service definition information 25 can be obtained by repeating steps S3111 to S3115 at a time when a user is permitted to select a desirable service in step S3110.

Next, variations of the MFP process shown in FIG. 66 will be described.

Variation 1

Figure 73:
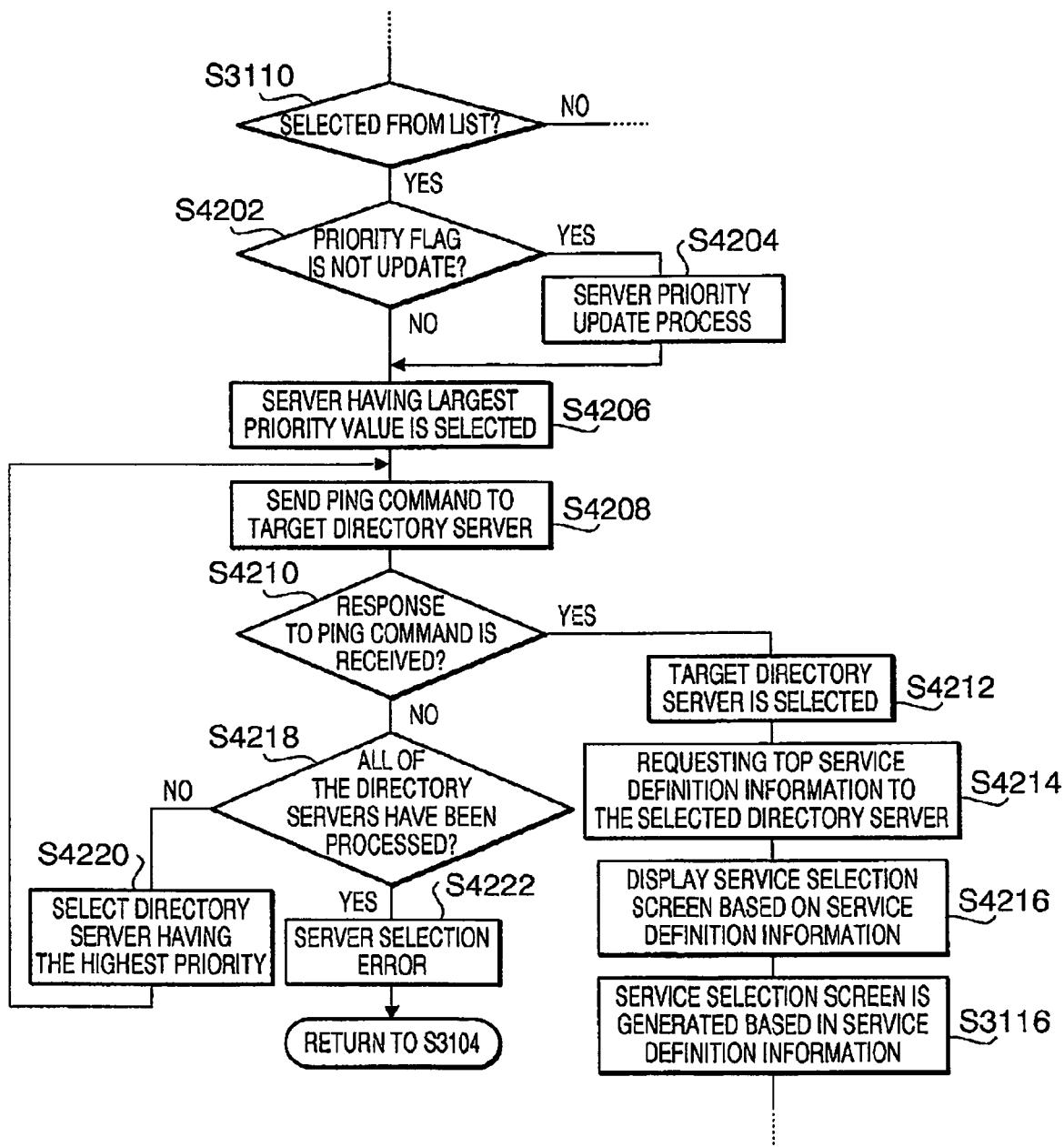
FIG. 73 shows one variant of the MFP process.

FIG. 73 shows a first variation of the MFP process shown in FIG. 66. In FIG. 73, only a feature of the first variation is illustrated omitting the same steps as those of FIG. 66. In this process, after steps S3102 to S3110 are processed, step S4202 is processed if the judgment result of step S3110 is "YES". In step S4202, the control unit 11 judges whether a priority flag is not updated. The priority flag is set at "0" if the directory server registered in the directory server list does not have priority (see FIG. 67), and the priority flag is set at "1," if the directory server in the directory server list has priority.

If the priority flag is not updated (the priority flag=0) (S4202: YES), control proceeds to step S4204 where a server priority update process is executed. Then, control proceeds to step S4206. If the priority flag has been updated (S4202: NO), control proceeds to step S4206 without executing the server priority update process.

In step S4206, a server having highest priority (having the largest priority value) of all of the directory servers registered in the directory server list is selected as a target (target directory server). Next, the control unit 11 requests a response from the target directory server. Specifically, the control unit 11 sends a ping command to the target directory server.

If a response to the ping command is received from the target directory server (S4210: YES), the target directory server is selected as a target for requesting the service list (S4212). Then, the control unit 11 requests the service list from the selected directory server by transmitting an HTTP request requesting the top service definition information 25 to the selected directory server (S4214). If the directory server receives the HTTP request, the directory server sends the top service definition information 25 back to the MFP 10.

Next, the control unit 11 displays the service selection screen based on the service definition information 25 (S4216), and then control proceeds to step S3120.

If the response is not received (S4210: NO), the control unit 11 judges whether all of the directory servers registered in the directory server list have been processed (S4218). If all of the directory servers registered in the directory server list have not been processed (S4218: NO), the control unit 11 selects a directory server having the highest priority of all of the unprocessed directory servers in the directory server list as a target (S4220). Then, control returns to step S4208.

If all of the directory servers registered in the directory server list have been processed (S4218: YES), an error process for a server selection error is executed (S4222). Then, control returns to step S3104 (see FIG. 66).

Figure 74:
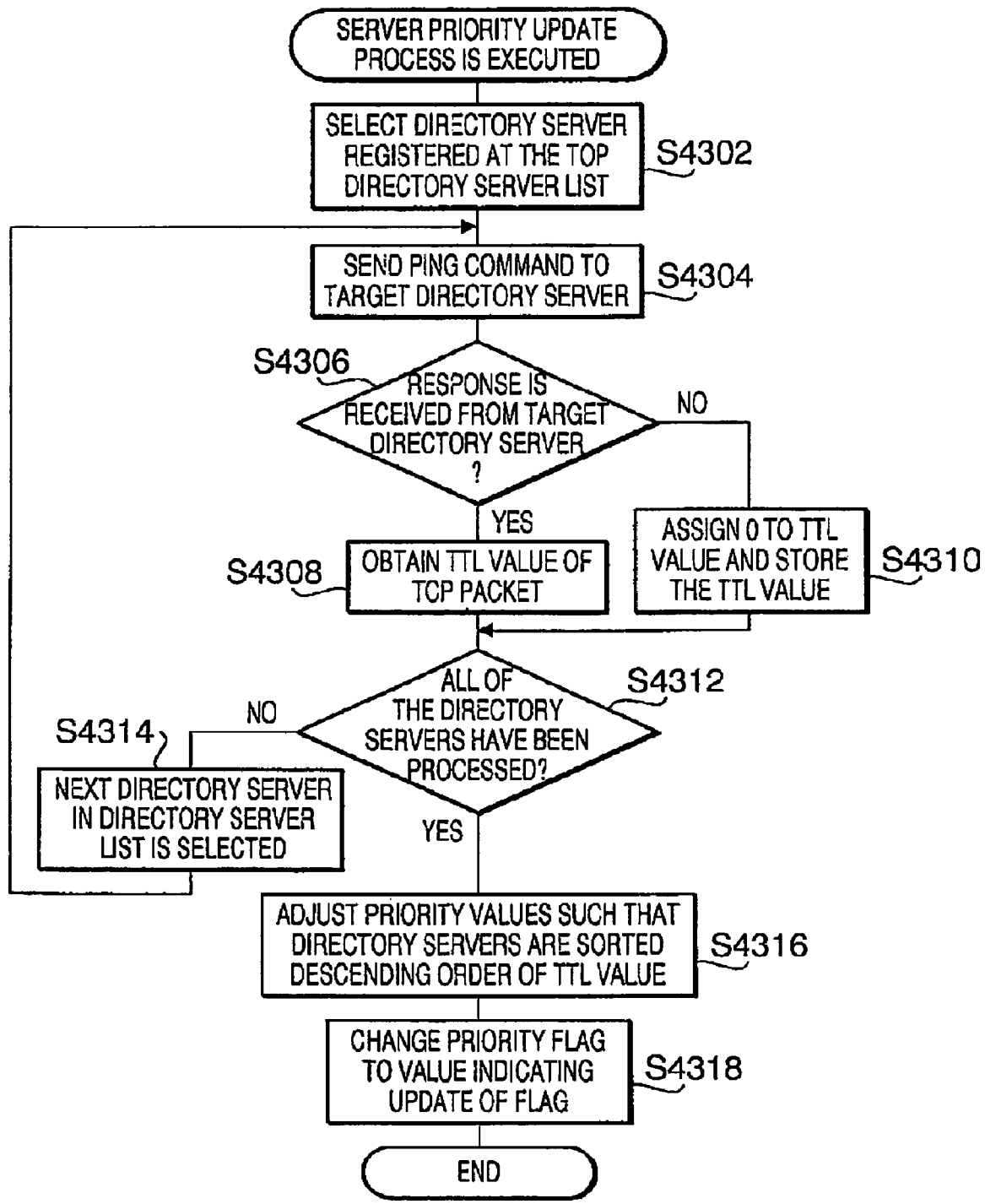
FIG. 74 is a flowchart illustrating a server priority update process.

Next, the server priority update process executed in step S4204 of FIG. 73 will be described with reference to FIG. 74.

First, the control unit 11 selects a directory server registered at the top the directory server list as a target directory server (S4302). Then, the control unit 11 sends a ping command to the target directory server to request a response (S4304). If a response is received from the target directory server (S4306: YES), the control unit 11 obtains a TTL (Time To Live) value from a header of the response (TCP packet), and stores it while associating the TTL value with the target directory server (S4308). Then, control proceeds to step S4312.

If the response is not received (S4306: NO), the control unit 11 assigns 0 to the TTL value and stores the TTL value while associating the TTL value with target directory server (S4310). Then, control proceeds to step S4312.

In step S4312, the control unit 11 judges whether all of the directory servers in the directory server list have been processed. If all of the directory servers in the directory server list have not been processed (S4312: NO), the next directory server in the directory server list is selected as a target (S4314). If all of the directory servers in the directory server list have been processed (S4312: YES), the control unit 11 adjusts the priority values in the directory server list such that the directory servers are sorted in descending order of TTL value, so that the directory server are sorted in descending order of priority (S4316).

Then, the control unit 11 changes the priority flag to a value indicating the update of the flag (S4318).

According to the variation 1, it becomes possible to form the service selection screen based only on the service definition information 25 of the directory servers selected by steps S4206 to S4212. Since the directory server having the highest priority is selected from among the directory servers that can respond in steps S4206 to S4212, the service definition information can be obtained from the most appropriate directory server.

In the server priority update process which defines the priorities of the servers in the directory server list, the server having the higher TTL value is assigned the higher priority. The TTL value is a reference value for estimating relaying devices (e.g., routers) intervening in a communication rout between two devices. The TTL value becomes greater as the number of relaying times becomes smaller. If the number of relaying times is smaller, it is assumed that the communication rout is short as a network. That is, such a communication rout having the smaller number of relaying times can be regarded as a rout having suitable network conditions.

Therefore, by setting the priorities using the TTL values, it becomes possible to obtain the service definition information only from the directory server considered to be a device having suitable network conditions. Consequently, the service selection screen is generated (in step S3116) based in the service definition information 25 from the directory server having the suitable network conditions (located at a closer network position).

In this variation, the TTL value is used to generate the priorities. However, another criterion may be adopted for generating the priorities. For example an echo request based on ICMP may be used for generating the priorities. In this case, the each request is transmitted to the directory server 20, and a time until the response to the echo request is received is measured. The response time becomes shorter as a network distance becomes shorter. Therefore, the response time can be used for generating the priorities.

Variation 2

Figure 75:
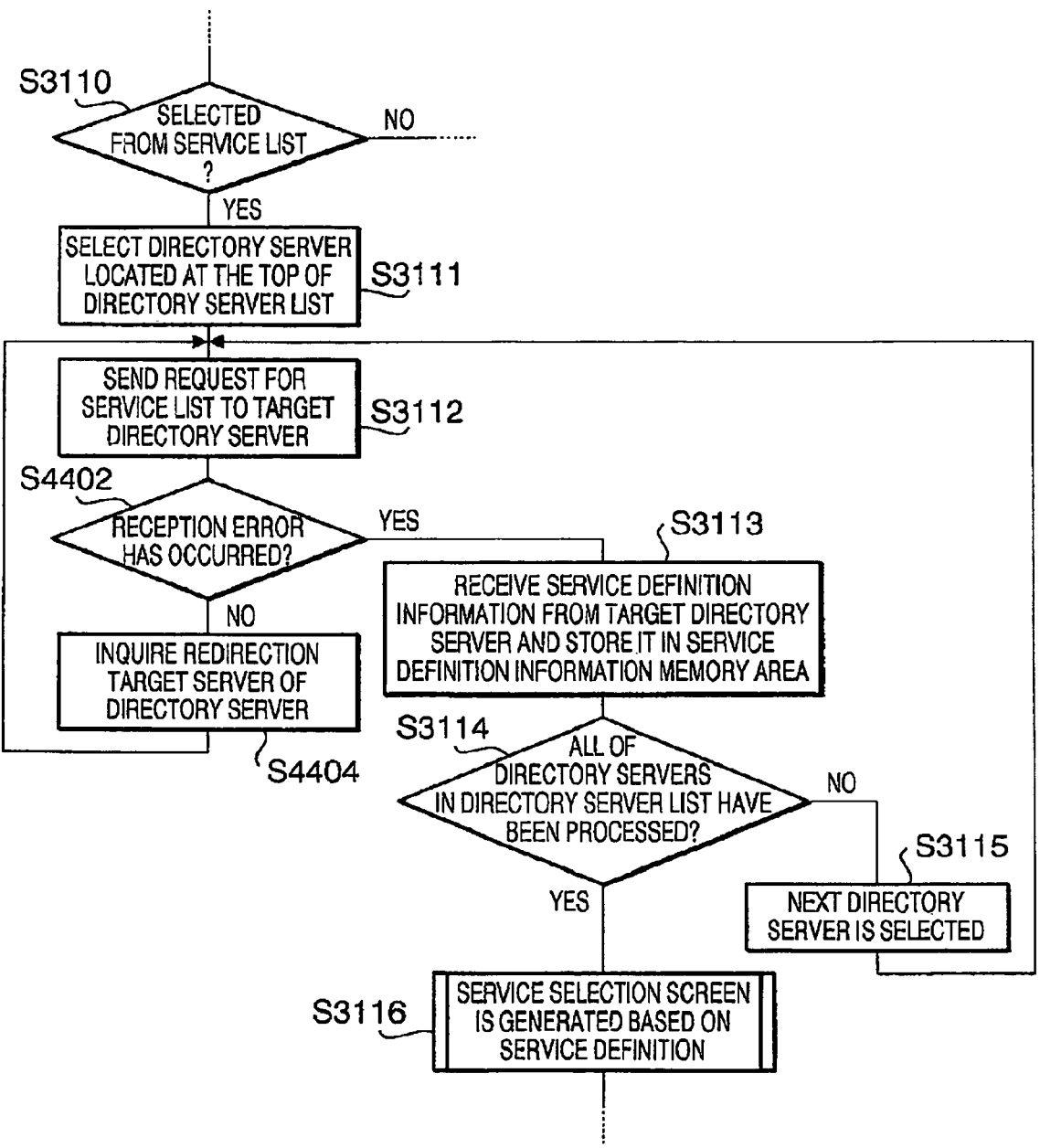
FIGS. 75 and 76 show variations of the MFP process.

FIG. 75 shows a second variation of the MFP process shown in FIG. 66. In FIG. 75, only the feature of the second variation is illustrated omitting partly the same steps as those of FIG. 66. After steps S3102 to S3112 have been processed, the control unit 11 judges whether a reception error has occurred in the receiving process for the service definition information (S4402). If the service definition information 25 of the type requested in step S3112 is not stored in the directory server 20, the directory server 20 sends an error notification to the MFP 10. Therefore, in this case, the MFP 10 can notice that the reception error has occurred.

If the reception error has occurred (S4402: YES), the control unit 11 requires a redirection target server of the directory server 20 (which the directory server requested the service list) (S4404). Then, control returns to step S3112 to request the service list from the redirected target server. Each directory server 20 has addresses of redirection target servers which are provided to the MFP 10 when each directory server 20 can not provide the service list to the MFP 10.

If the reception error has not occurred (S4402: NO), control proceeds to step S3113 of FIG. 66.

In the second variation, after the control unit 11 inquires the redirection target server, control returns to step S3112. However, before step S4404, the directory server 20 which can not respond to the request of the MFP 10 in step S3112 may be deleted from the directory server list as shown in step S4403 of FIG. 76.

According to the second variation, even if the service definition information can not be obtained from the directory server, the MFP 10 can obtain a redirection target. Therefore, the MFP 10 can obtain the service definition information 25 from the redirected server.

Figure 76:
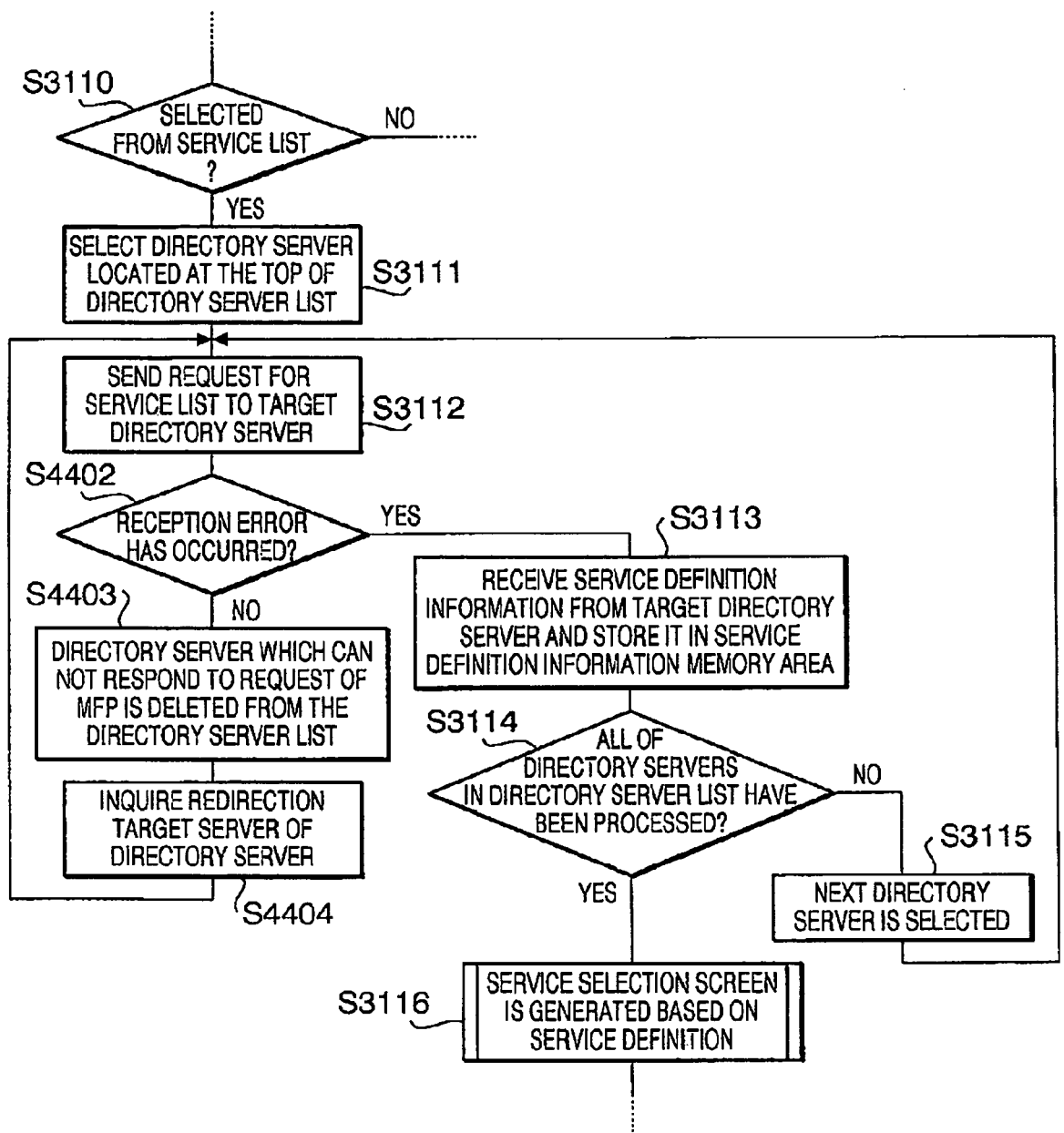

In particular, the directory server which can not respond to the request of the MFP 10 is deleted from the directory server list in the case of FIG. 76. Therefore, the MFP 10 is prevented from requesting the service list from the directory server which can not respond to the request of the MFP 10.

The combination of the features of the first and second variations is also possible as shown in FIGS. 60 and 61. In FIG. 60, if the directory server having the higher priority can not respond the request of the service list in step S4214 (S4402; YES), the MFP 10 requests the service list from the redirected server (S4404). In FIG. 61, the directory server which can not respond to the request of the MFP 10 is deleted from the directory server list (S4403).

Third Embodiment

Hereafter, an image processing system according to a third embodiment of the invention will be described with reference to the accompanying drawings. In this illustrative embodiment, the same reference numbers are assigned to elements, which are equivalent to those of the first embodiment, and explanations thereof will not be repeated. In the following, the feature of the image processing system 301 is described. It should be noted that various processes described in the first embodiment can also be processed in the image processing system 301.

Figure 77:
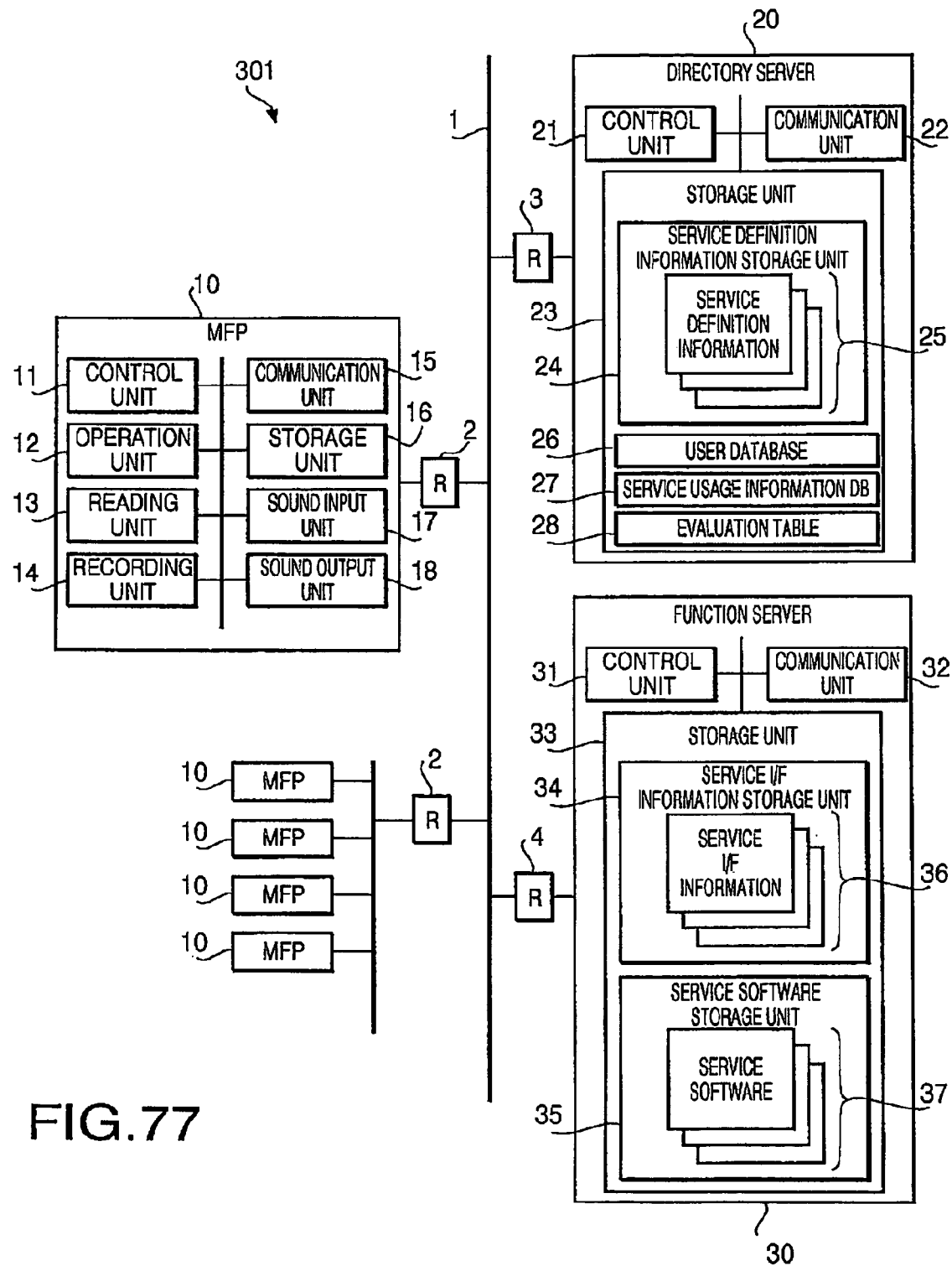
FIG. 77 is a block diagram of an image processing system according to a third illustrative embodiment.

FIG. 77 is a block diagram of an image processing system 301 according to the third embodiment. As shown in FIG. 77, the image processing system 301 includes MFPs (multifunction peripherals) 10, a directory server 20, and a function server 30 which are capable of communicating with each other via a wide area network NT (e.g., the Internet). The MFP 10, the directory servers 20, and the function server 30 are connected to the wide area network 1 via respective routers (2, 3, 4). The router (2, 3, 4) is, for example, a broadband router.

Similarly to the first illustrative embodiment, the MFPs 10, the directory server 20 and the function server 30 exchange packets in accordance with HTTP 1.1.

Hereafter, an MFP process will be described with reference to FIG. 82. The MFP process is executed under control of the control unit 11 of the MFP 10. First, in step S5101, the control unit 11 executes an initializing process for the MFP 10. Then, in step S5102, the control unit 11 accepts a command input. The command input means an input for instructing the MFP 10 to execute a certain process. For example, the command input is a key input inputted by a user through the operation unit 12 or a command transmitted from an external computer.

In step S5103, the control unit 11 judges whether the inputted command is a command instructing the MFP 10 to change to a service mode. Specifically, in step S5103, the control unit 11 judges whether the user operation in step S5102 is a pressing operation of the service key 44 on the operation panel 12*a*. If the inputted command input is not the command instructing the MFP 10 to change to the service mode (S5103: NO), control proceeds to step S5104 where a process for another mode corresponding to a user input in step S5102 is executed. For example, a print process is executed in step S5104. Then, control returns to step S5102.

If the inputted command instructs the MFP 10 to change to the service mode (S5103: YES), control proceeds to step S5105. In step S5105, the control unit 11 displays a selection screen on the display 52 requesting a user to decide whether to select a desirable service (to be requested to the function server 30) from a list or to designate directly a URL of a destination of a desirable service. Then, the control unit 11 waits for a user input. If the user input is received, the control unit 11 judges whether a service to be requested to the function server 30 should be selected from a service list (S5105).

If it is judged in step S5105 that a service to be requested to the function server 30 is selected from a service list (S5105: YES), control proceeds to step S5105.

Next, the control unit 11 sends a request for a service list to the directory server 20 (S3112). Specifically, the control unit 11 sends a request signal for the top service definition information (see FIG. 79). In the request signal, an ID and IP address assigned to the MFP 10 are also contained. After the directory server 20 receives the request, the directory server sends the service definition information 25 back to the MFP 10 as an HTTP response based on HTTP 1.1.

Next, in step S5107, the control unit 11 receives the service definition information 25 from the directory server 20. Then, the control unit 11 displays a service selection screen based on the received service definition information 25 on the display 52. FIGS. 80 and 81 also illustrate examples of the service definition information. FIGS. 78A, 78B and 78C illustrate examples of the service selection screens respectively corresponding to the pieces of service definition information 25 of FIGS. 79, 80 and 81.

If step 5108 is executed first after the initiation of the MFP process, the service selection screen shown FIG. 78A is displayed. If step S5108 is executed after control returns from step S5117, a service selection screen shown in FIG. 78B or 78C is displayed.

If it is judged in step S5105 that a service to be requested to the function server 30 is not selected from a service list (S5105: NO), control proceeds to step S5109 where control unit 11 generates an input screen for allowing a user to directly input a URL and displays the input screen on the display 52. Then, control proceeds to step S5110.

In step S5110, the control unit 11 accepts a user operation through the operation panel 12*a* selecting a service to be received from the function server 30. If the user operation is performed, control proceeds to step S5111 where the control unit 11 judges whether the user operation is an operation for selecting a link. Specifically, in step S5111, the control unit 11 judges that the user operation is the operation for selecting a link if a selection is made successfully by a user on the service selection screen displayed at step S116 or if a URL is successfully inputted through the input screen displayed at step S5109.

If the user operation is not an operation for selecting a link (S5111: NO), control proceeds to step S5112 where the control unit 11 judges whether the user operation accepted in step S5110 is an operation for registration of a bookmark. If the user operation is an operation for registration of a bookmark (S5112: YES), control proceeds to step S5113 where a bookmark registration process is executed for an item (service) currently selected. After the bookmark registration process is finished, control returns to step S5110.

If the user operation is not an operation for registration of a bookmark (S5112: NO), control proceeds to step S5114 where the control unit 11 judges whether the user operation accepted at step S5110 is an operation for ending the service mode. If the user operation is an operation for ending the service mode (S5114: YES), control returns to step S5102. That is, in this case the service mode process terminates.

If it is judged in step S5114 that the user operation is not an operation for ending the service mode (S5114: NO), control proceeds to step S5115 where the control unit 11 produces a beeping sound. Then, control returns to step S5110. That is, if the user operation accepted in step S5110 is not any one of an operation for selecting a link, an operation for registration of a bookmark and an operation for ending the service mode, the beep sound is produced so as to notify a user that the user operation is invalid.

If the user operation is an operation for selecting a link (S5111: YES), control proceeds to step S5112 where the control unit 11 judges whether the selected link is a URL for a service. If the selected link is not a URL for a service (S5116: NO), the control unit 11 requests the service definition information 25 and then receives the service definition information 25 based on an ID (a URL if a URL is directly inputted) designated by Link_Location tag in the service definition information 25b (FIG. 80) or 25c (FIG. 81) (S5117). Then, control returns to step S5108 so that a new service selection screen is displayed on the display 52.

If the selected link is a link of a service (S5116: YES), the control unit 11 executes a usage history recording process (see FIG. 84) so as to store a usage history regarding a selected service in a usage history file (see FIG. 85) (S5118). Next, in step S5120, the control unit 11 assigns the selected link to an argument and calls a service reception process. The session process shown in FIG. 14 in the first embodiment may be executed in step S5120 as the service reception process. Then, control returns to step S5102.

Figure 83:
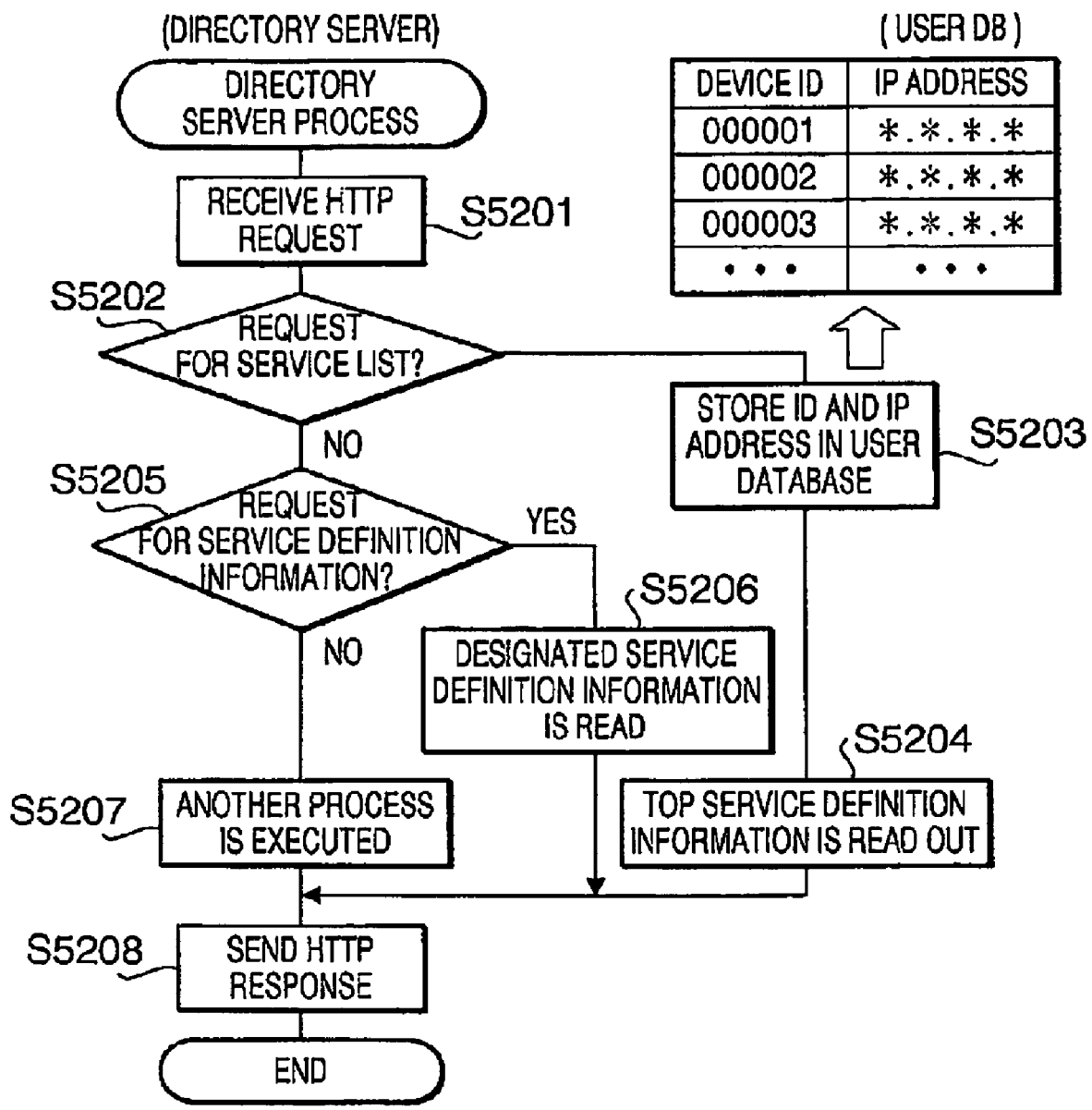
FIG. 83 is a flowchart illustrating a directory server process.

FIG. 83 shows a directory server process executed by the directory server 20. First, the directory server 20 receives an HTTP request from the MB 10 (S5201). Then, the directory server 20 judges whether the HTTP request is a request for a service list (S5202). If the HTTP request is a request for the service list (S5202: YES), control proceeds to step S5203 where the directory server 20 stores the ID and IP address while associating the ID with the IP address in a user database 26. Then, the top service definition information 25 is read nut (S5204). Then, control proceeds to step S5208

If the HTTP request is not a request for the service list (S5202: NO), the directory server 20 judges whether the HTTP request is a request for the service definition information issued in step S5117 (S5205). If so (S5205: YES), the designated service definition information is read from the service definition information storage unit 24 (S5206). Then, control proceeds to step S5208.

If the HTTP request is not a request for the service definition information issued in step S5117 (S5205: NO), control proceeds to step S5207 where another process is executed. Then, control proceeds to step S5208. In step S5208, an HTTP response containing the service definition information read out in step S5204 or S5208 is sent to the MFP 10.

Hereafter, the usage history recording process executed by the MFP 10 will be described with reference to FIG. 84. FIG. 85 is an example of a data structure of the usage history file stored in the storage unit 16. Definitions of tags used in the usage history file are shown in the following Table 3.

TABLE 3

| | DATA NAME | DATA TYPE | REMARKS |
|---|---|---|---|
| Basic data | ID | integer | Identification of service usage information (device) |
| | Num_History | Integer | Number of history tags |
| | History[ ] | | Substance of History tag |
| | Num_Bookmark | Integer | Number of bookmark tags |
| | Bookmark[ ] | | Substance of bookmark tag |
| History Data | History_Title | String | Title of used service |
| | History_URL | String | URL of used service |
| | History_Count | Integer | Number of times of usage of service |
| Bookmark data | Bookmark_Title | String | Title of bookmark-registered service |
| | Bookmark_URL | String | URL of bookmark-registered service |

As shown in FIG. 85, the usage history file is formed by one or more History tag, and History_Title tag, History_URL tag and History_Count tag are included between <History> and </History>. History_Count tag represents the number of times "n" that a service specified in History_URL tag is used. The number of times "n" is count up each time the service reception process (S5120) is executed for the service. History_Title tag represents a name of a service designated in History_URL tag belonging to the same History tag.

In the usage history recording process, the control unit 11 reads out the usage history file first (S5501). Then, the control unit 11 judges whether a URL equal to the URL of the selected link (service) is stored in the usage history file. If a URL equal to the URL of the selected link (service) is stored in the usage history file (S5502: YES), the control unit 11 increments the History_count tag belonging to the same History tag. Then, control proceeds to step S510.

If a URL equal to the URL of the selected link (service) is not stored in the usage history file (S5502: NO), the control unit 11 adds a new history tag to the usage history file (stored temporarily in the RAM) (S5504). Then, the control unit 11 adds History_Title tag representing the name of the selected service between the new history tags (<History>, </history>).

In step S5506, the control unit 11 adds new History_URL tag representing the URL of the selected service between the History tags (<History>, </history>). Then, the control unit adds History_count tag (which is assigned '1' as the number of times of use of the service) between the History tags (S5507). In step S5510, the updated usage history file in the RAM is saved into the storage unit 16. Then, the usage history recording process terminates.

Hereafter, the bookmark registration process executed under control of the control unit 11 of MFP will be described with reference to FIG. 86. FIG. 87A shows an example of a bookmark file stored in the storage unit 16 of MFP 10. The definition of tags shown in Table 3 is applied to tags of the bookmark file.

As shown in FIG. 87A, the bookmark file includes one or more bookmark tags. Bookmark_Title tag and Bookmark_URL are included between the bookmark tags (<Bookmark>, </Bookmark>). Bookmark_URL tag is used to describe a URL of a target device of a service to be received, and Bookmark_Title tag is used to describe a name of the service designated by the Bookmark_URL tag.

Figure 86:
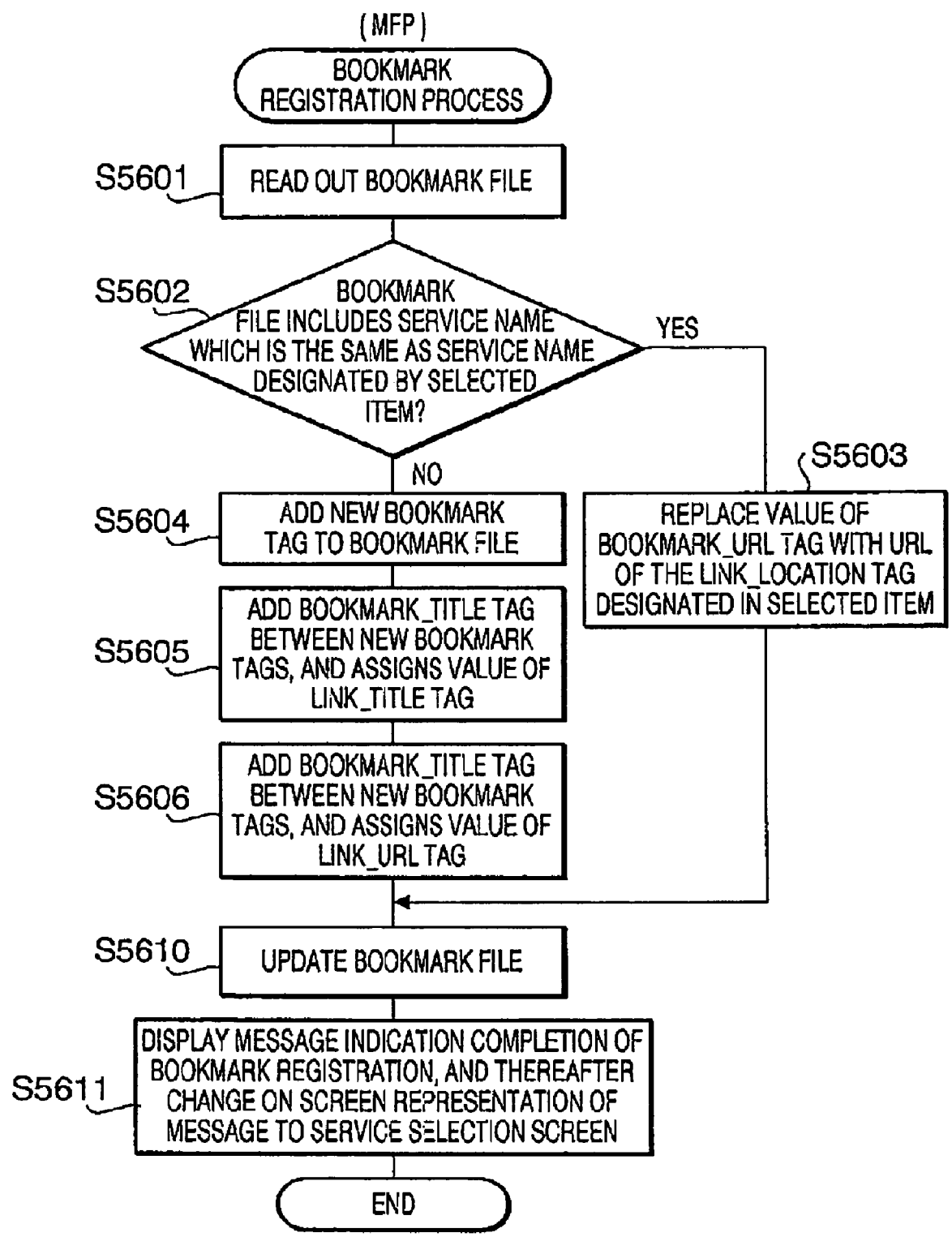
FIG. 86 is a flowchart illustrating a bookmark registration process.
Figures 87A, 87B:
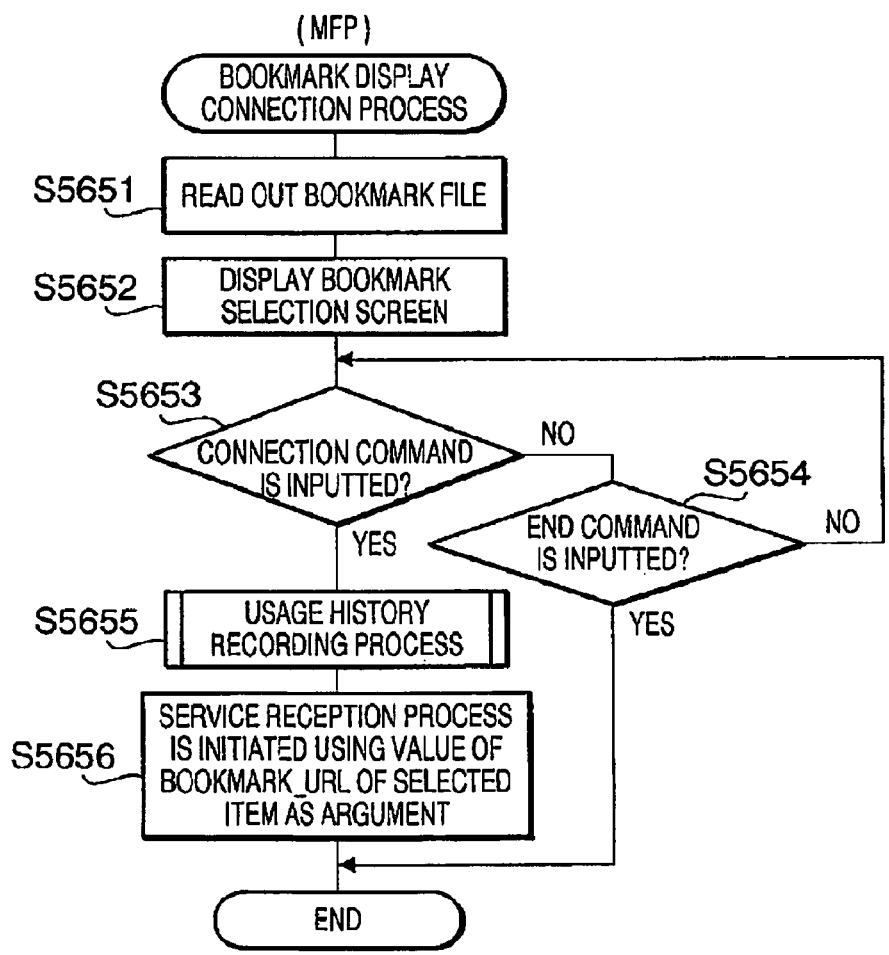
FIG. 87A shows an example of a bookmark file.
FIG. 87B is a flowchart illustrating a bookmark display connection process.

As shown in FIG. 86, first, the control unit 11 reads out the bookmark file from the storage unit 16 and saves it in RAM temporarily (S5601). Then, in step S5602, the control unit 11 judges whether the bookmark file includes a service name (represented by Bookmark_Title tag in the bookmark file) which is the same as the service name (represented by Link_Title tag in the service definition information) designated by the selected item (service).

If the judgment result of step S5602 is "YES", control proceeds to step S5603 where the control unit 11 replaces the value of the Bookmark_URL tag found in step S5602 with the URL of the Link_Location tag designated in the selected item. Then, control proceeds to step S5610.

If the judgment result of step S5602 is "NO", the control unit 11 adds a new bookmark tag to the bookmark file (S5604). Then, the control unit 11 adds Bookmark_Title tag between the new bookmark tags, and assigns the value of Link_Title tag of the selected item in the service definition information to the Bookmark_Title tag (S5605).

Next, the control unit 11 adds Bookmark_URL tag between the new bookmark tags, and assigns the value of Link_Location tag of the selected item in the service definition information to the Bookmark_URL tag (S5606).

Then, the control unit 11 updates the bookmark file by copying the updated bookmark file in RAM into the storage unit 16. Next, the control unit 11 temporarily displays a message indication completion of the bookmark registration on the display 52a, and thereafter changes the onscreen representation of the message to the service selection screen previously displayed. Then, the bookmark registration process terminates.

Hereafter, a bookmark display connection process will be described with reference to FIG. 87B. The bookmark display connection process is executed under control of the control unit 11 of the MFP 10 when a bookmark display command is inputted by a user through the operation unit 12. The bookmark display connection process is executed in step S5104 of the MFP process.

First, the control unit 11 reads out the bookmark file from the storage unit 16 (S5651). Then, the control unit 11 displays a bookmark selection screen on the display 52 (S5652). In the bookmark selection screen, selection items, respectively representing service names designated by Bookmark_Title tags in the bookmark file, are displayed.

Next, the control unit 11 waits for a user input (S5653). If an end command is inputted through the operation unit 12 (S5653: NO, S5654: YES), the bookmark display connection process terminates. If a connection command is inputted (S5653: YES), the usage history recording process (FIG. 84) is executed using the value of Bookmark_Title tag and Bookmark_URL tag corresponding to an item currently selected (S5655). In step S5656, the service reception process (session process) is initiated using the value of Bookmark_URL of the selected item as an argument. Then, the bookmark display connection process terminates.

Hereafter, a service usage information transmission process executed under control of the control unit 11 of the MFP 10 will be described with reference to FIG. 88A. The service usage information transmission process is executed repeatedly during the power on of the MFP 10. FIG. 88B shows a service usage information generating process executed in step S5710 of FIG. 88A.

FIG. 89 shows an example of service usage information generated by the service usage information generating process. The definitions of tags shown in Table 3 are applied to tags of the service usage information.

Figures 88A, 88B:
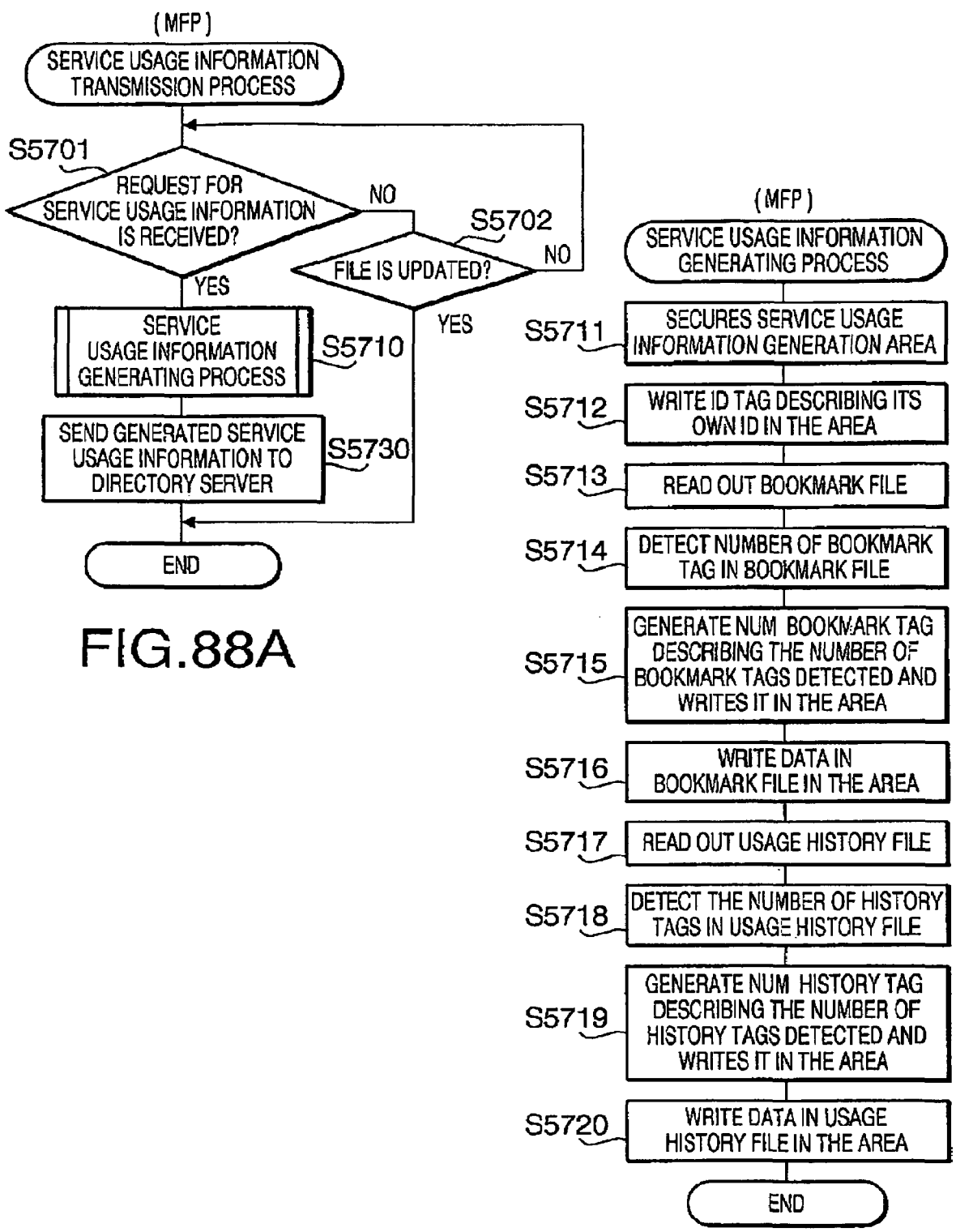
FIG. 88A is a flowchart illustrating a service usage information transmission process.
FIG. 88B is a flowchart illustrating a service usage information generating process.

As shown in FIG. 88A, first, the control unit 11 waits until a request for the service usage information is received from the directory server 20 or one of the usage history file and the bookmark file is updated. If the request for the service usage information is received (S5701: YES), the service usage information generating process is executed (S5710).

If the request for the service usage information is not received and one of the usage history file and the bookmark file is updated (S5701: NO, S5702: YES), control proceeds step S5710.

In the service usage information generating process (FIG. 88B), first, the control unit 11 secures a service usage information generation area in the RAM (S5711). Then, the control unit 11 writes an ID tag describing its own ID in the area (S5712). Then, the control unit 11 reads out the bookmark file from the storage unit 16 (S5713), and detects the number of Bookmark tags in the bookmark file (S5714).

Then, the control unit 11 generates a Num_Bookmark tag describing the number of Bookmark tags detected in step S5714 and writes it in the area (S5715). Next, the control unit 11 writes data in the bookmark file in the area (S5716). In step S5717, the control unit 11 reads out the usage history file from the storage unit 16. Then, the control unit 11 detects the number of History tags in the usage history file (S5718).

Then, the control unit 11 generates a Num_History tag describing the number of History tags detected in step S5718 and writes it in the area (S5719). Next, the control unit 11 writes data in the usage history file in the area (S5720). Then, the service usage information generating process terminates.

Referring back to FIG. 88A, after step S5710 is finished, the control unit 11 transmits the service usage information generated in step S5710 to the directory server 20. Then, service usage information transmission process terminates.

Hereafter, a usage information collecting process executed under control of the control unit 21 of the directory server 20 will be described with reference to FIG. 90. The usage information collecting process is executed repeatedly during power on of the directory server 20.

First, the control unit 21 waits until a predetermined time is reached (S5801). If the predetermined time is reached (S5801: YES), the control unit 21 selects the smallest ID of the IDs in the user database 26, and defines the selected ID as a target ID (S5802). Further, in step S5802, the control unit 21 reads out an IP address of the MFP 10 corresponding to the target ID.

Next, the control unit 21 sends a request for the service usage information to the ID address read in step S5802 (S5803). Then, in step S5804, a usage information reception and registration process is executed. The request issued in step S5803 is received by the MFP 10 corresponding to the target ID. After the MFP 10 receives the request, the MFP 10 sends the usage information to the directory server 20.

FIG. 91 is a flowchart illustrating the usage information reception and registration process in which the directory server 20 operates to receive the usage information and stores it in a service usage information database 27. Hereafter, the usage information reception and registration process will be described with reference to FIG. 91.

First, the control unit 21 waits until the usage information is received through the communication unit 21 (S5901). If the usage information is received (S5901: YES), the control unit 21 identifies the device ID of a source device, which provided the usage information to the directory server 20, based on an ID tag contained in the received usage information (S5902).

Then, the control unit 21 judges whether the usage information of the identified device ID is registered in the service usage information database 27 (S5903). If the usage information of the identified device ID is not registered in the service usage information database 27 (S5903: NO), the control unit 21 secures a storage area for the usage information of the target ID in the service usage information database 27 (S5904), and writes data based in the usage information in the storage area in the service usage information database 27 (S5905).

FIG. 92 illustrates an example of the service usage information database 27 stored in the storage unit 23. As shown in FIG. 92, the service usage information database 27 includes pieces of bookmark data and pieces of usage history data (hereafter, frequently referred to as usage-related data) for each of the device IDs, a number of times of usage, a weighted number of times of usage and a repeat number "rp" (see FIG. 94) for each service relating to one of corresponding bookmark data and usage history data.

The bookmark data is data including the service name and the URL of the target service (i.e., the value of the Bookmark tag) registered in the bookmark file. The usage history data includes the service name, the URL, and the number of times of usage "n" of the target service (i.e., the value of the History tag).

In step S5905, the control unit 21 writes each piece of bookmark data based on the corresponding Bookmark tag in the storage area of the identified device ID, and writes each pieces of usage history data based on the corresponding History tag in the storage area of the identified device ID. Then, the usage information reception and registration process terminates.

If the usage information (usage-related data) of the identified device ID is registered in the service usage information database 27 (S5903: YES), the control unit 21 deletes old usage-related data of the identified device ID to secure space in the database 27 for the (new) usage-related data of the identified device ID (S5906), and writes the (new) usage-related data of the identified device ID in the secured area in the database 27 (S5907). Then, the usage information reception and registration process of FIG. 91 terminates. In steps S5904 and S5905, information about the weighted number of times of usage and the repeat number "rp" is not written in corresponding areas in the database 27.

Referring back to FIG. 90, after the usage information reception and registration process (S5804) is finished, the control unit 21 judges whether all of the device IDs in the user database 26 have been processed (S5805). If all of the device IDs in the user database 26 have not been processed (S5805. NO), control proceeds to step S5806 where the next device ID from among the device IDs in the user database 26 is selected and an IP address of the newly selected ID from the user database 26 is read out. Then, control returns to step S5803.

If all of the device IDs in the user database 26 have been processed (S5805: YES), the control unit 21 executes a service evaluation process (S5807). After the service evaluation process is finished, the usage information collecting process terminates.

The control unit 21 operates to repeatedly execute processes corresponding to the usage information reception and registration process of FIG. 91 so that the service usage information sent voluntarily from the MFP 10 is processed and then the database 27 is updated.

Figure 93:
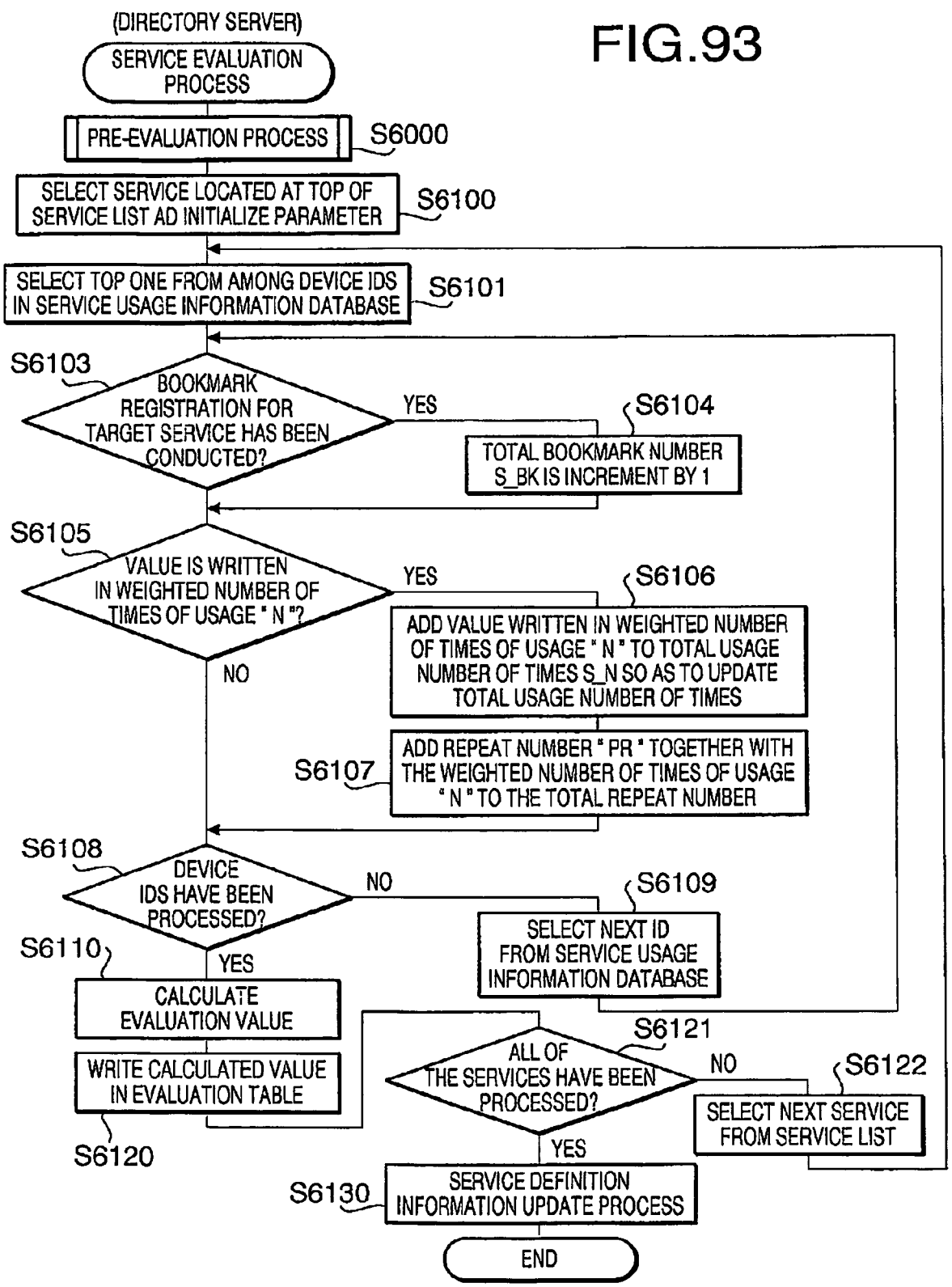
FIG. 93 is a flowchart illustrating a service evaluation process.

Hereafter, the service evaluation process executed under control of the control unit 21 of the directory server 20 will be described with reference to FIG. 93. First, the control unit 21 executes a pre-evaluation process (S6000).

Figure 94:
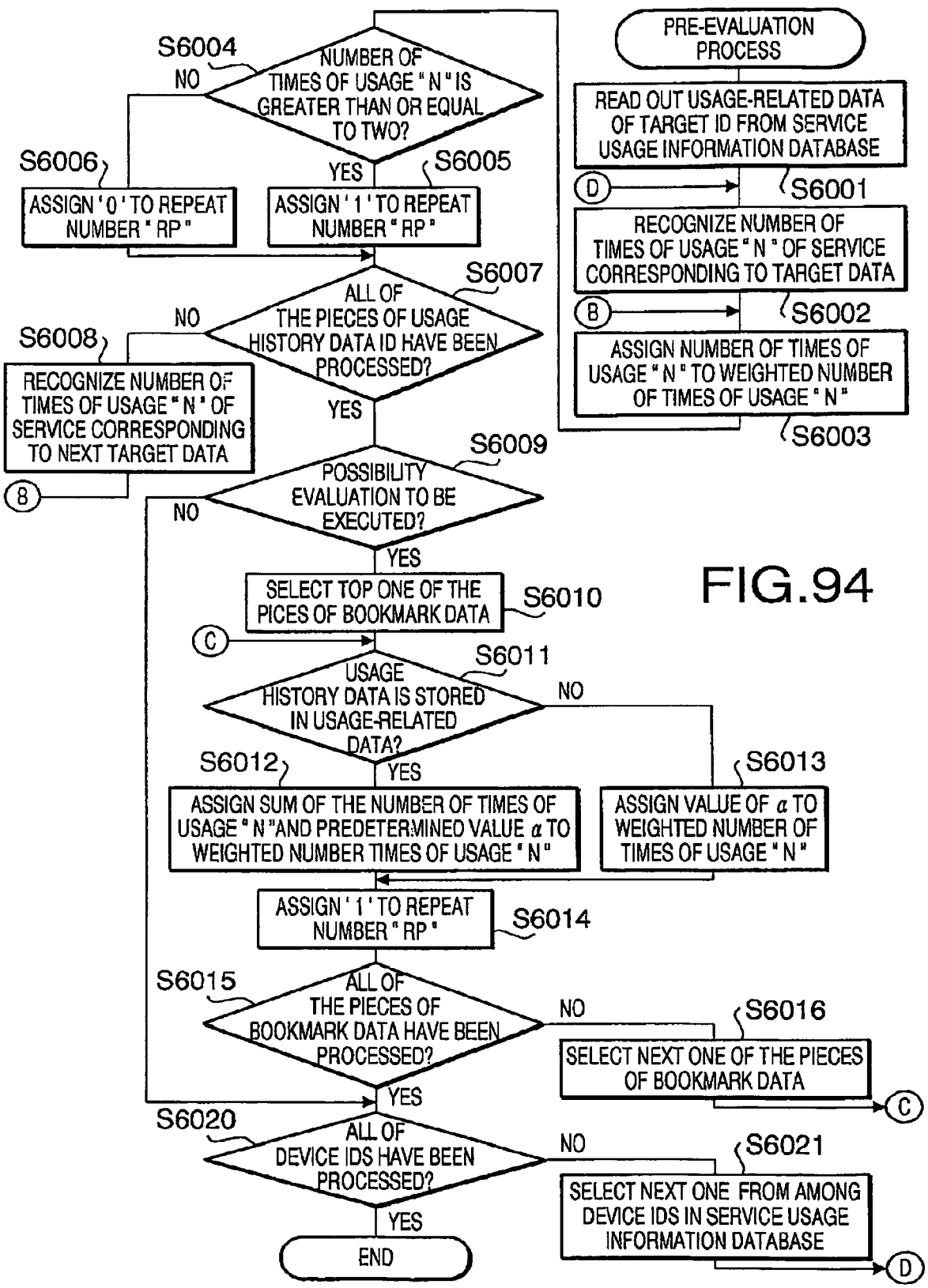
FIG. 94 is a flowchart illustrating a pre-evaluation process.

FIG. 94 is a flowchart illustrating the pre-evaluation process. Hereafter, the pre-evaluation process will be described. First, the control unit 21 selects the smallest ID from among the device IDs registered in the service usage information database 27 as a target ID, and reads out the usage-related data of the target ID from the service usage information database 27 (S6001).

Next, the control unit 21 selects a top one of the pieces of usage history data contained in the usage-related data of the target ID as target data, and recognizes the number of times of usage "n" of the service corresponding to the target data (i.e., the control unit 21 obtains the number of times of usage "n" in the target data) (S6002).

Then, the control unit 21 assigns the number of times of usage "n" of the target data to the weighted number of times of usage "N" of the target data (S6003). Next, the control unit 21 judges whether the number of times of usage "n" is greater than or equal to two. If the number of times of usage "n" is greater than or equal to two (S6004: YES), the control unit 21 assigns '1' to the repeat number "rp" of the target data of the target ID (S6005). Then, control proceeds to step S6007.

If the number of times of usage "n" is smaller than two (S6004: NO), the control unit 21 assigns '0' to the repeat number "rp" of the target data of the target ID (S6006). Then, control proceeds to step S6007.

In step S6007, the control unit 21 judges whether all of the pieces of usage history data in the target ID have been processed. If all of the pieces of usage history data in the target ID have not been processed (S6007: NO), the control unit 21 selects the next one of the pieces of usage history data contained in the usage-related data of the target ID as next target data, and recognizes the number of times of usage "n" of the service corresponding to the next target data (S6008). Then, control returns to step S1003 where the control unit 21 assigns the number of times of usage "n" of the next target data to the weighted number of times of usage "N" of the next target data (S6003).

If all of the pieces of usage history data in the target ID have been processed (S6007: YES), the control unit 21 judges whether to evaluate a possibility that a service may be requested. If the setting value of the possibility is set to "ON", the control unit 21 judges that the possibility evaluation is to be executed. If the setting value of the possibility is set to "OFF", the control unit 21 judges that the possibility evaluation is not to be executed. The setting value of the possibility may be switched to ON or OFF by an administrator of the directory server 20.

If the possibility evaluation is not to be executed (S6009: NO), control proceeds to step S6020. If the possibility evaluation is to be executed (S6009: YES), control proceeds to step S6010. In step S6010, the control unit 21 selects a top one of the pieces or bookmark data contained in the usage-related data of the target ID as target data, and judges whether the usage history data of the service corresponding to the target data is stored in the usage-related data of the target ID (S6011).

If the usage history data of the service corresponding to the target data is stored in the usage-related data of the target ID (S6011: YES), the control unit 21 assigns a sum of the number of times of usage "n" of the service and a predetermined value α to the weighted number times of usage "N" of the service.

Then, control proceeds to step S6014. Various values may be adopted as the predetermined value α. In the example of FIG. 92, α=1 used.

If the usage history data of the service corresponding to the target data is not stored in the usage-related data of the target ID (S6011: NO), control proceeds to step S6013 where the control unit 21 assigns the value of α to the weighted number of times of usage "N" in the service usage information database 27. Then, control proceeds to step S6014.

In step S6014, the control unit 21 assigns '1' to the repeat number "rp" of the service corresponding to the target data of the target ID in the service usage information database 27. Next, in step S6015, the control unit 21 judges whether all of the pieces of bookmark data in the usage-related data of the target ID have been processed. If all of the pieces of bookmark data in the usage-related data of the target ID have not been processed (S6015: NO), the control unit 21 selects the next one of the pieces of bookmark data contained in the usage-related data of the target ID as next target data (S6016), and judges whether the usage history data of the service corresponding to the next target data is stored in the usage-related data of the target ID (S6011).

If all of the pieces of bookmark data in the usage-related data of the target ID have been processed (S6015: YES), control proceeds to step S6020 where the control unit 21 judges whether all of the device IDs in the service usage information database 27 have been processed. If all of the device IDs in the service usage information database 27 have not been processed (S6020: NO), control proceeds to step S6021 where the control unit 21 selects a next one from among the devices IDs in the service usage information database 27, and reads the usage-related data of the selected ID. Then, the control unit 21 selects a top one of the pieces of usage history data contained in the usage-related data of the next target ID as target data, and recognizes the number of times of usage "n" of the service corresponding to the target data (i.e., the control unit 21 obtains the number of times of usage "n" in the target data) (S6002).

If all of the device IDs in the service usage information database 27 have been processed (S6020: YES), the pre-evaluation process terminates.

Referring back to FIG. 93, after the pre-evaluation process is finished, the control unit 21 reads out an evaluation table 28 from the storage unit 23, and selects a service located at a top of service list registered in the evaluation table 28 as a target service (S6100). Further, in step S6100, the control unit 21 initializes (assigns '0' to) the total bookmark number S_Bk, the total usage number of times S_N, and the total repeat number S_rp. FIG. 95 illustrates an example of the evaluation table 28.

Next, the control unit 21 selects a top one from among the device IDs in the service usage information database 27 as a target ID (S6101). Then, the control unit 21 judges whether the bookmark registration for the target service has been conducted in the MFP 10 corresponding to the target ID (S6103). Specifically, in step S6103, the control unit 21 judges whether the bookmark data of the target service is found in the usage related data of the target ID. If the bookmark data of the target service is found in the usage related data of the target ID, the control unit 21 judges that the bookmark registration for the target service has been conducted in the MFP 10 corresponding to the target ID.

If the judgment result of step S6103 is "YES", control proceeds to step S6104 where the total bookmark number S_Bk is incremented by 1. Then, control proceeds to step S6105. If the judgment result of step S6103 is "NO", control proceeds to step S6105.

In step S6105, the control unit 21 judges whether a value is written in the weighted number of times of usage "N" in the data storage area of the target ID stored in the service usage information database 27. If a value is written in the weighted number of times of usage "N" in the data storage area of the target ID stored in the service usage information database 27 (S6105: YES), control proceeds to step S6106 where the control unit 21 adds the value written in the weighted number of times of usage "N" in the data storage area of the target ID to the total usage number of times S_N so as to update the total usage number of times S_N.

Next, the control unit 21 adds the repeat number "rp" written in the data storage area of the target TD together with the weighted number of times of usage "N" to the total repeat number S_rp (S6107). Then, control proceeds to step S6108. If the judgment result of step S6105 is "NO", control proceeds to step S6108 without processing steps S6106 and S6107.

In step S6108, the control unit 21 judges whether all of the device IDs in the service usage information database 27 have been processed. If all of the device IDs in the service usage information database 27 have not been processed (S6108: NO), the control unit 21 selects the next ID from among the device IDs registered in the service usage information database 27 as a next target ID (S6109). Then, control proceeds to step S6103 where the control unit 21 judges whether the bookmark registration for the target service has been conducted in the MFP 10 corresponding to the next target ID.

If all of the device IDs in the service usage information database 27 have been processed (S6108: YES), control proceeds to step S6110. In step S6110, the control unit 21 calculates an evaluation value E according to a function E=f (S_Bk, S_N, S_rp) having parameters of the total bookmark number S_Bk, the total usage number of times S_N, and the total repeat number S_rp.

The following expression can be used as the evaluation function f:

$$f(S\_Bk, S\_N, S\_rp) = S\_N \cdot (1 + S\_rp/10) + \beta \cdot S\_Bk$$

where β is a constant value (real number) including zero.

Next, in step S6120, the control unit 21 judges whether all of the services registered in the service list of the evaluation table 28 have been processed. If all of the services registered in the service list of the evaluation table 28 have not been processed (S6121: NO), the control unit 21 selects the next service from the service list as a target service, and initializes (assigns '0' to) the total bookmark number S_Bk, the total usage number of times S_N, and the total repeat number S_rp of the target service.

If all of the services registered in the service list of the evaluation table 28 have been processed (S6121: YES), a service definition information update process is executed (S6130). After the service definition information update process is finished, the service evaluation process terminates.

Hereafter, the service definition information update process executed under control of the control unit 21 of the directory server 20 will be described with reference to FIG. 96. FIG. 97A illustrates an example of the service definition information updated by the service definition information update process.

First, the control unit 21 selects one of the pieces of low level service definition information 25c stored in the service definition information storage unit 24 as target service definition information 25c (S6201), and stores it in the RAM temporarily (S6202). Then, the control unit 21 reads the evaluation value E of a service corresponding to each Link tag stored in the target service definition information 25c from the evaluation table 28 (S6203).

Then, based on the evaluation value of each service obtained in step S6203, the control unit 21 sorts the Link tags in the target service definition information 25c in the descending order of evaluation values E (S6204). Then, the control unit 21 writes the service definition information 25c modified in step S6204 in the service definition information storage unit 24, so that the update of the service definition information 25c is finished (S6205).

Next, the control unit 21 judges whether all of the pieces of low level service definition information 25c stored in the service definition information storage unit 24 have been processed (S6206). If all of the pieces of low level service definition information 25c have not been processed (S6206: NO), control returns to step S6201 where one of the unprocessed pieces of low level service definition information 25c is selected as a target.

If all of the pieces of low level service definition information 25c have been processed (S6206: YES), the service definition information update process terminates.

Figure 84:
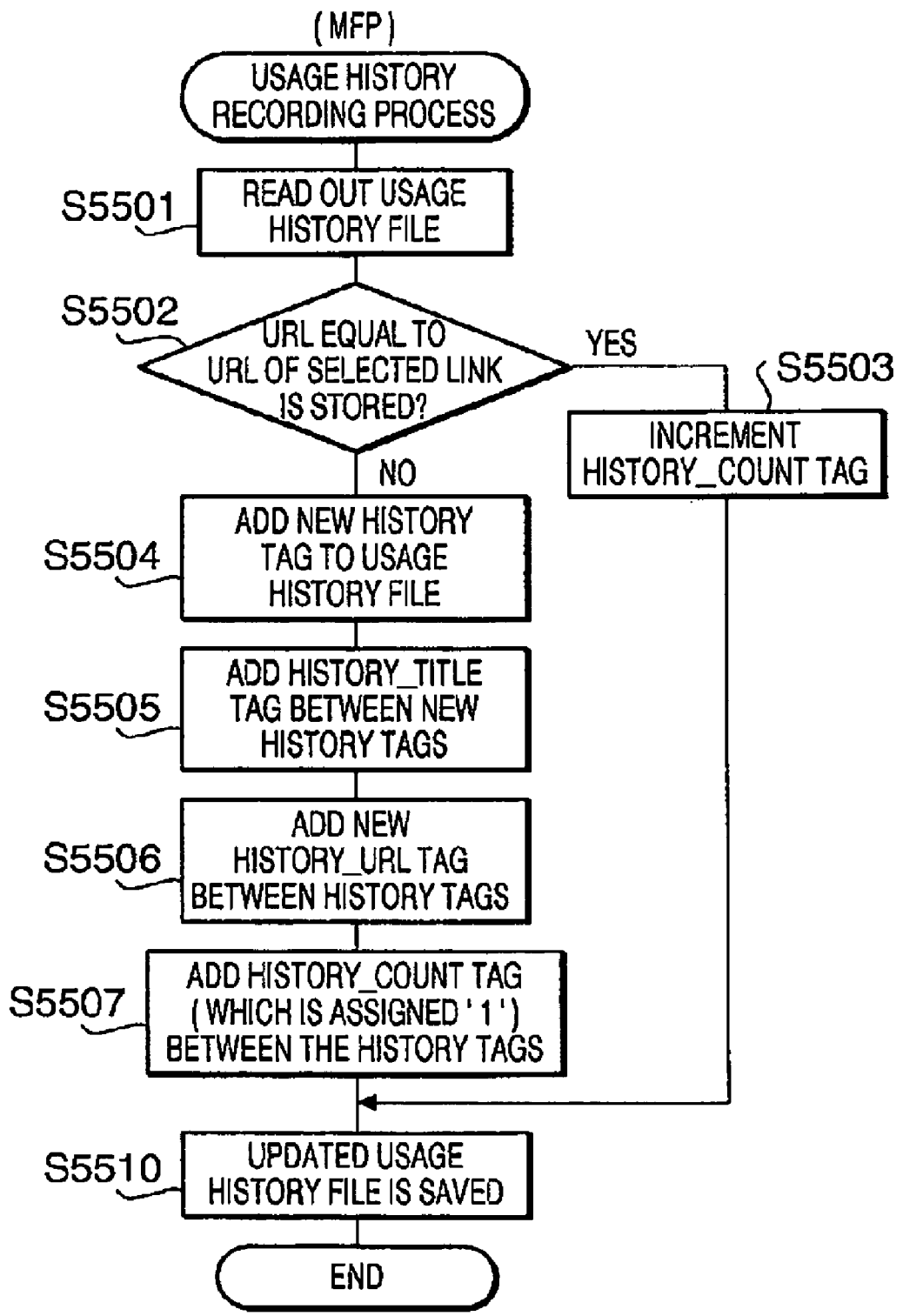
FIG. 84 is a flowchart illustrating a usage history recording process.

If the service definition information 25c having the evaluation values E corresponding to the Link tags in the service definition information 25c shown in FIG. 84 is subjected to the service definition information update process, the updated service definition information 25c is configured as shown in FIG. 97B. It should be noted that the services are sorted in the descending order of the evaluation values E. When the service selection screen for the updated service definition information is executed in step S6108 of the MFP 10 process, such a screen (FIG. 97B) is displayed on the display 52.

Figure 96:
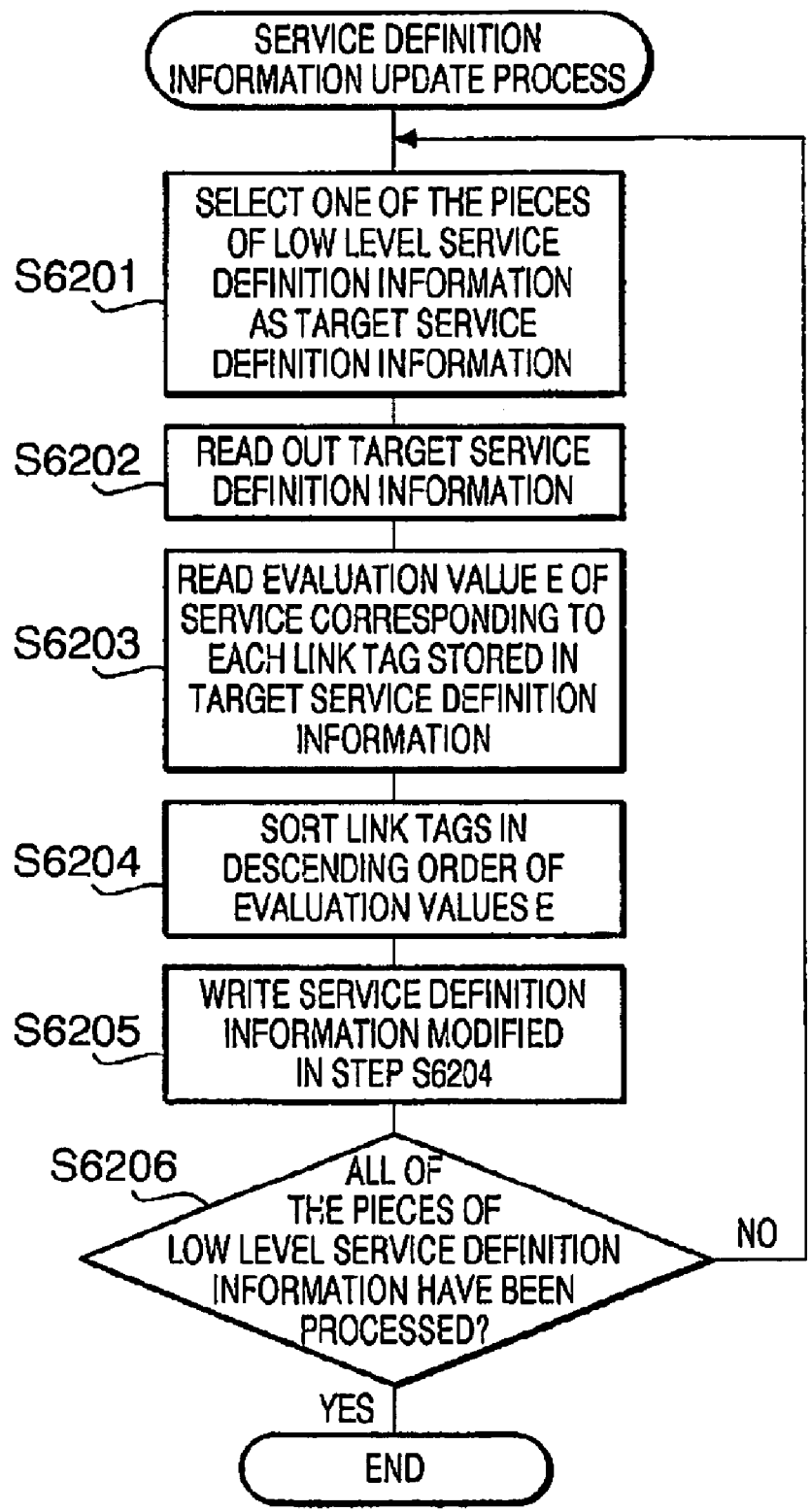
FIG. 96 is a flowchart illustrating a service definition information update process.

Hereafter, a variation of the service definition information update process of FIG. 96 is described. FIG. 25 is a flowchart illustrating a variation of the service definition information update process of FIG. 96. In this variation, the evaluation values E are displayed on the display 52. FIG. 99A is an example of the service definition information 25c generated by the service definition information update process of FIG. 98. FIG. 99B is an example of a service selection screen of the service definition information 25c shown in FIG. 99A.

Figure 98:
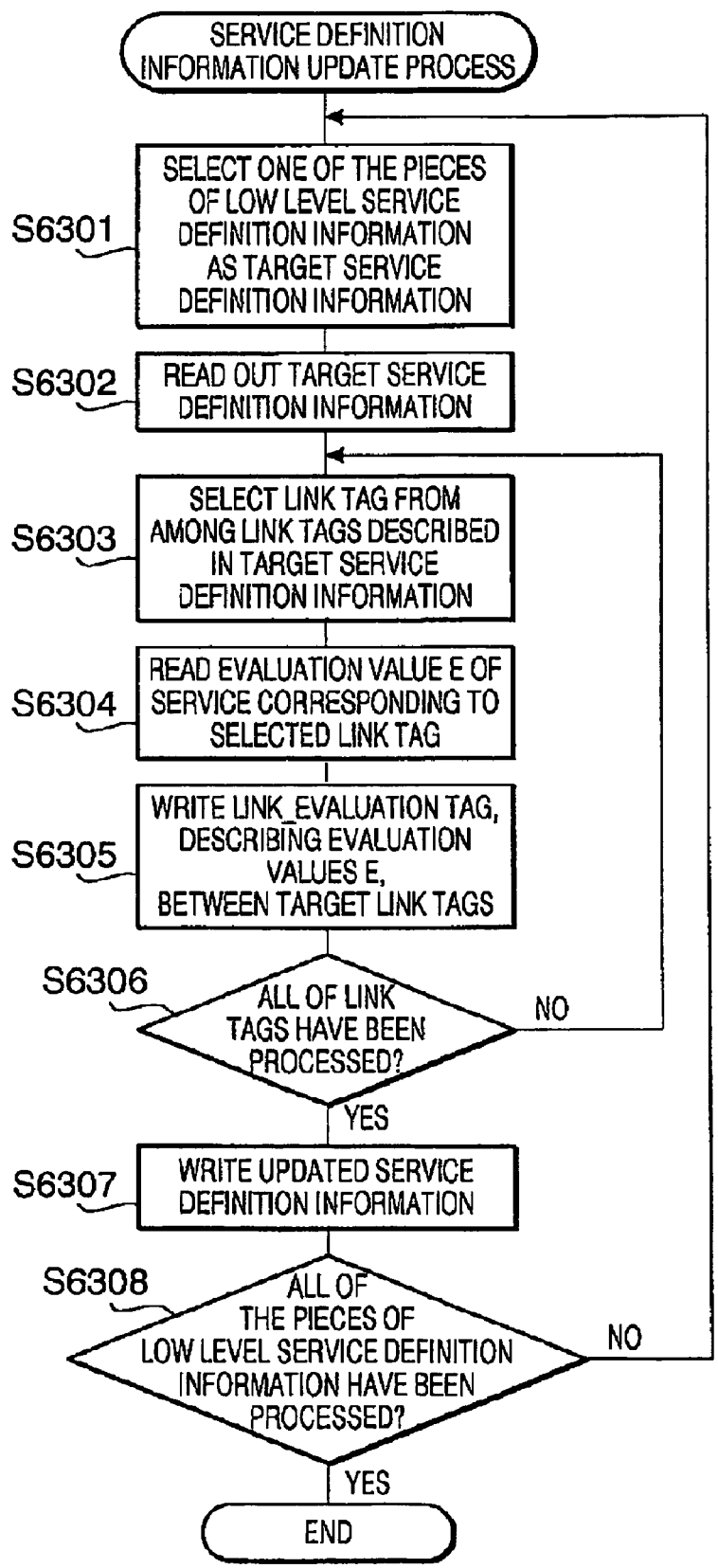
FIG. 98 is a flowchart illustrating a service definition information update process.

In the service definition information update process of FIG. 98, first, the control unit 21 selects one of the pieces of low level service definition information 25c stored in the service definition information storage unit 24 as target service definition information 25c (S6301). Then, the control unit 21 reads out the target service definition information 25c from the storage unit 23 and stores it in the RAM temporarily (S6302).

Next, the control unit 21 selects a Link tag from among the Link tags described in the target service definition information 25c (S6303). Next, the control unit 21 reads the evaluation value E of a service corresponding to the selected Link tag (a target Link tag) from the evaluation table 28 (S6204).

Next, the control unit 21 writes a Link_Evaluation tag, describing the evaluation value E obtained in step S6304, between the target Link tags (<Link>,</Link>). For example, if the evaluation value is 30, a string <Link_Evaluation>30<Link_Evaluation> is written in the target Link tags (<Link>,</Link>). The Link_Evaluation is defined as a tag describing an evaluation value.

If the Link_Evaluation tag has already been written in the target service definition information 25c, the control unit 21 replaces the value of the Link_Evaluation tag with the evaluation value E obtained in step S6304.

Next, in step S6306, the control unit 21 judges whether all of the Link tags in the target service definition information 25c have been processed (S6306). If all of the Link tags in the target service definition information 25c have not been processed (S6306: NO), control returns to step S6303 where the control unit 21 selects one of the unprocessed Link tags as a target Link tag.

If all of the Link tags in the target service definition information 25c have been processed (S6306: YES), the control unit 21 writes the updated service definition information 25c stored temporarily in the RAM into the service definition information storage unit 24 (S6307). Next, in step S6308, the control unit 21 judges whether all of the pieces of low level service definition information 25c stored in the service definition information storage unit 24 have been processed. If all of the pieces of low level service definition information 25c have not been processed (S1308: NO), control returns to step S6301 where one of the unprocessed pieces of low level service definition information 25c is selected as a target.

If all of the pieces of low level service definition information 25c have been processed (S1308: YES), the service definition information update process terminates. By the service definition information update process, the service definition information is updated as shown in FIG. 99A in which the Link_Evaluation tag is inserted into each Link tag.

Figure 82:
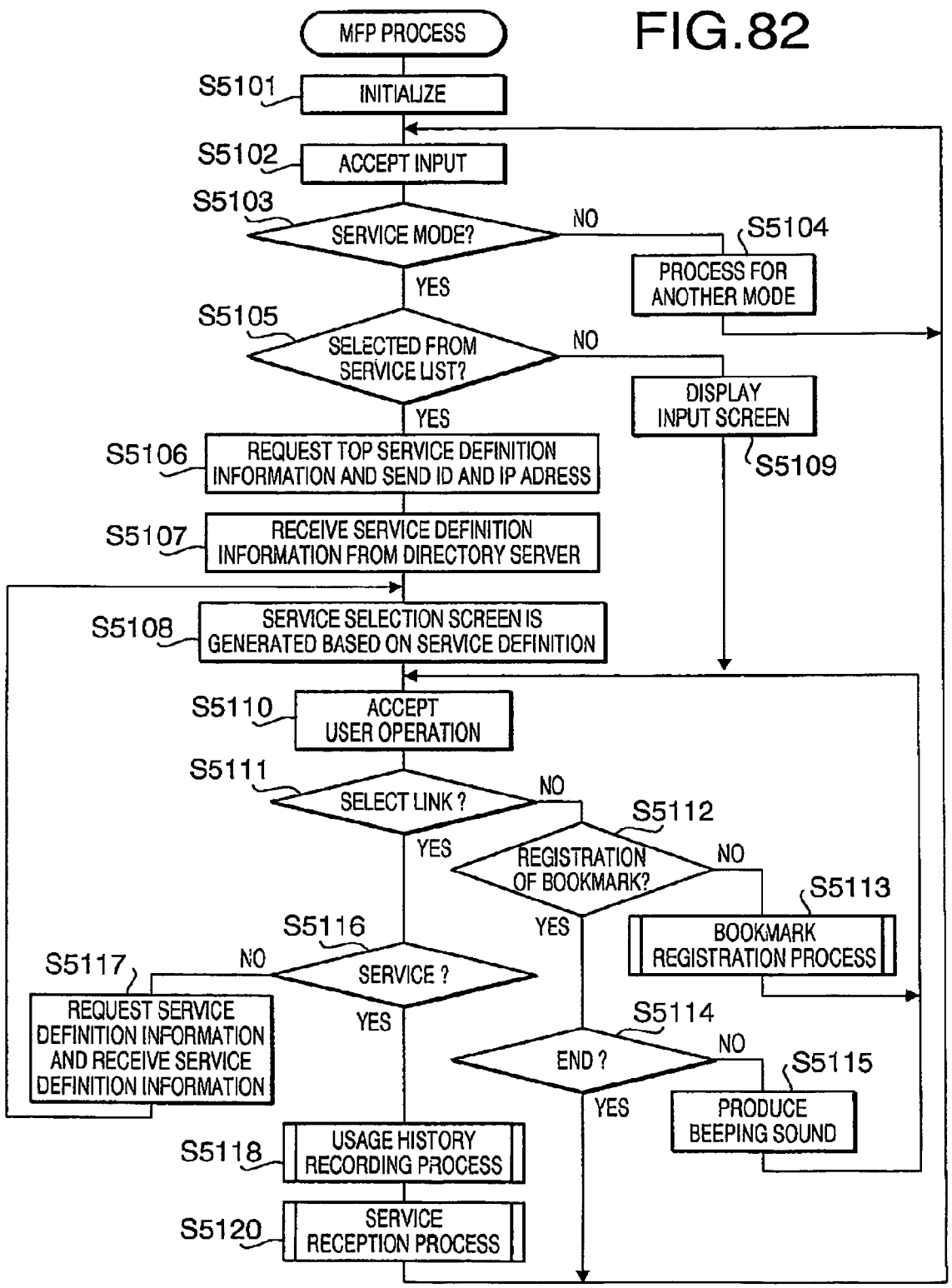
FIG. 82 is a flowchart illustrating an MFP process.
Figure 100:
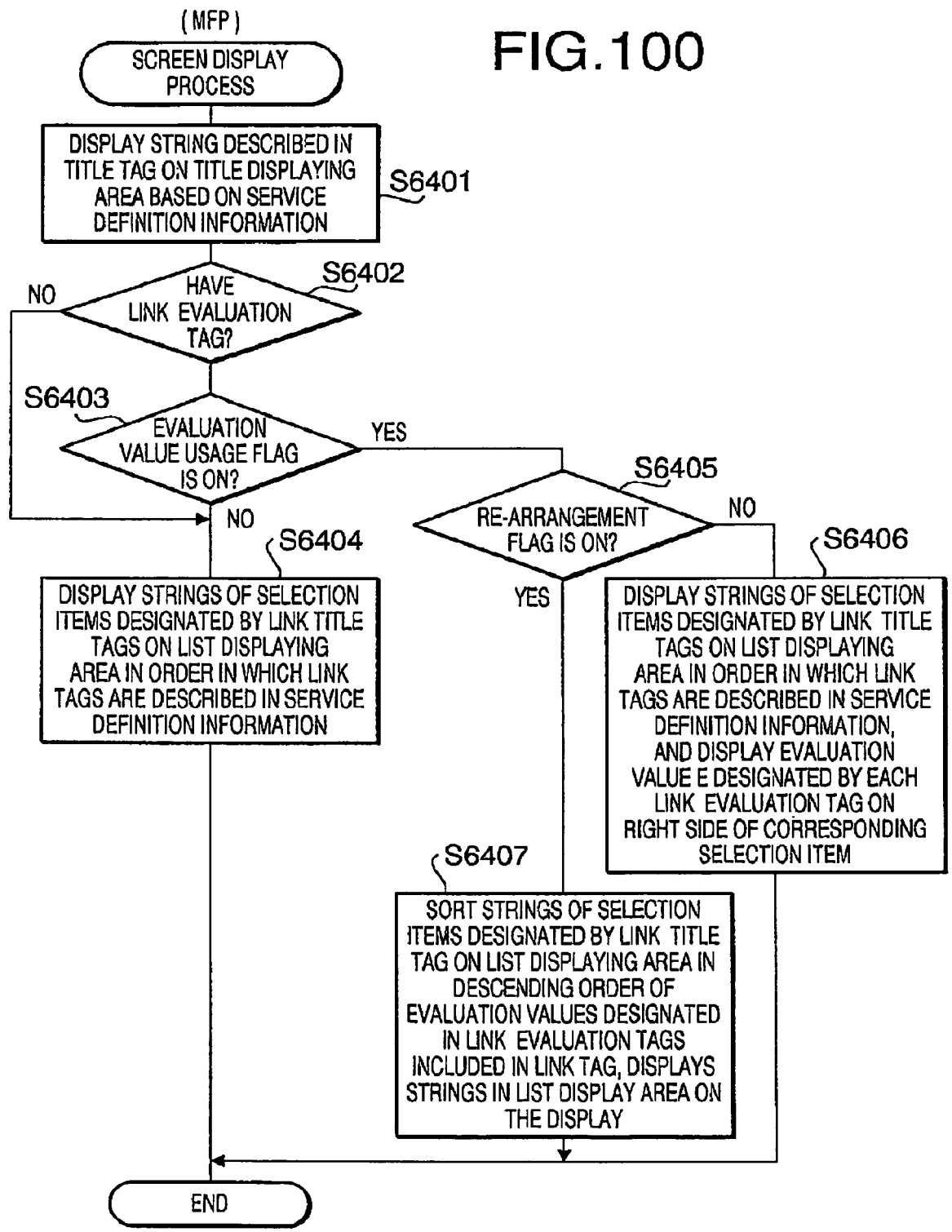
FIG. 100 is a flowchart illustrating a screen display process.

FIG. 100 is a flowchart illustrating a screen display process executed under control of the control unit 11 of the MFP 10 in step S5108 of the MFP process (FIG. 82). First, the control unit 11 displays a string described in the Title tag on a title displaying area on the display 52 based on the service definition information received in step S5107 or S5117. Then, the control unit 11 judges whether the received service definition information 25 has a Link_Evaluation tag (S6402).

If the received service definition information 25 does not have a Link_Evaluation tag (S6402: NO), the control unit 11 displays strings (categories, or strings representing categories or services) of selection items designated by Link_Title tags on a list displaying area of the display 52 in the order in which the Link tags are described in the service definition information 25 (see FIGS. 2A to 2C) (S6404).

If the received service definition information 25 has a Link_Evaluation tag (S6402: YES), control proceeds to step S6403 where the control unit 11 judges whether an evaluation value usage flag stored in the MFP 10 is ON. The evaluation value usage flag and a re-arrangement flag (which will be described later) can be switched to ON or OFF by a user through a setting screen (not shown), for example, in step S5104.

If the evaluation value usage flag is not ON (S6403: NO), control proceeds to step S6404. If the evaluation value usage flag is ON (S6403: YES), control proceeds to step S6405 where the control unit 11 judges whether the re-arrangement flag is ON.

If the re-arrangement flag is not ON (S6405: NO), control proceeds to step S6406 where the control unit 11 displays strings (representing services) of selection items designated by Link_Title tags on a list displaying area of the display 52 in the order in which the Link tags are described in the service definition information 25, and displays an evaluation value E designated by each Link_Evaluation tag on the right side of the corresponding selection item as shown in FIG. 99B. Then, the screen display process terminates.

If the re-arrangement flag is ON (S6405: YES), control proceeds to step S6407 where the control unit 11 sorts strings (representing services) of selection items designated by Link_Title tags on a list displaying area of the display 52 in the descending order of evaluation values designated in Link_Evaluation tags included in the Link tag, and displays the strings in the list display area on the display 52. Then, the screen display process terminates. If the service definition information is processed where the evaluation values of the services corresponding to the Link tags are shown in FIG. 99A, the service selection screen shown in FIG. 97B is displayed on the display 52 in step S6407.

As described above, according to the illustrative embodiment, the service usage information is obtained that contains the history information obtained from the user operation that the user has conducted through the MFPs 10, and each service is evaluated based on the obtained service usage information. Therefore, it becomes possible to rapidly and properly evaluate each service in view of popularity with users in comparison with the case where each service is evaluated based on a questionnaire on the services.

According to the illustrative embodiment, the evaluation results are contained in the service definition information 25c, and the evaluation results are transmitted to a source device (MFP 10) when a request for the service definition information 25c is sent from the MFP 10. The MFP 10 displays the service selection screen based on the received service definition information 25c. Therefore, a user is able to select a suitable service from among the services through the service selection screen and to receive the suitable service.

Consequently, it becomes possible to enhance the usability as a service providing system.

As described above, the Link tags in the service definition information 25c are arranged in the descending order of evaluation values E (see step S6204 of FIG. 96) by the directory server 20. Therefore, the MFP 10 is not required to have the function of sorting the Link tags in the descending order of evaluation values. Therefore according to the illustrative embodiment, it is possible to keep the cost of the MFP 10 at a low level, and to allow a user to easily select a desirable service.

In the above mentioned illustrative embodiment, the request for the history information is periodically sent to the MFPs 10 registered in the user database 26, while each MFP 10 (which received the request) generates the service usage information based on the current bookmark file and the usage history file and provides it to the directory server 20. Therefore, the directory server 20 is able to obtain the service usage information voluntarily, and to conducts an evaluation of each service periodically and properly.

In the above mentioned illustrative embodiment, the MFP 10 is configured to voluntarily send service usage information each time the usage history file or the bookmark file is newly generated by the usage history recording process or the bookmark registration process to the directory server 20. Therefore, the directory server 20 is able to evaluate each service rapidly and properly in the service evaluation process. It should be noted that the service evaluation process may be initiated by a user operation conducted by an administrator of the directory server 20.

Since the evaluation is conducted based on two types of information (the bookmark data and the usage history data), it becomes possible to evaluate each service more properly in comparison with the case where the evaluation is conducted based one of the bookmark data and the usage history data. According to the illustrative embodiment, it is possible to provide a service having high popularity to users and to enhance the usability as a service providing system.

What is claimed is:

1. An image processing system, comprising:
   an image processing device including at least one of an image reading unit which reads an image and generates image data representing the image and an image printing unit which prints an image represented by image data;
   a service supply unit configured to execute a service regarding at least one of image data generated by the image reading unit and image data representing an image to be printed by the image printing unit, in response to a request from the image processing device; and
   an information supply unit which supplies the image processing device with information on services executable by the service supply unit, wherein:
   the information supply unit includes:
      a service storage unit that stores service selection information in which service items of the services are respectively associated with corresponding URLs and upper level selection information in which items of a plurality of pieces of service selection information are respectively associated with corresponding IDs of the plurality of pieces of service selection information as the information on services executable by the service supply unit; and
      a service information transmitting unit that transmits the upper level selection information to the image processing device, and transmits the service selection information to the image processing device in response to a request transmitted from the image processing device,
   the image processing device includes:
      a service determination unit that selects an item from among the items of the plurality of pieces of service selection information based on the upper level selection information, requests the service selection information corresponding to the ID associated with the selected item from the information supply unit and determines a service from among the service items based on the service selection information transmitted for the service supply unit; and
      a service requesting unit which requests the service supply unit to execute the service determined by the service determination unit by designating the URL associated with the service item determined by the service determination unit as a request target for the determined service,
   wherein the service supply unit includes a service execution unit that executes the service requested by the image processing device.

2. The image processing system according to claim 1, wherein:
   the image processing device includes a service information request unit that sends a request for the upper level selection information to the information supply unit; and
   the service information transmitting unit transmits the upper level selection information to the image processing device in response to receiving the request from the service information request unit.

3. The image processing system according to claim 2, wherein:
   the image processing device includes a service request judgment unit that judges whether the image processing device is in a state where the image processing device should request a service from the service supply unit; and
   the service information request unit sends the request for the upper level selection information to the information supply unit if the service request judgment system judges that the image processing device is in the state where the image processing device should request a service from the service supply unit.

4. The image processing system according to claim 1, wherein the service determination unit determines the service to be requested from the service supply unit by displaying the upper level selection information and the service section information and accepting a user input for selecting the service.

5. The image processing system according to claim 1, wherein:
the service supply unit includes a service notification unit that transmits the information on services executable by the service supply unit to the information supply unit; and
the information supply unit includes a service information update unit that updates the information on services stored in the service storage unit based on the information on services transmitted from the service supply unit.

6. The image processing system according to claim 5, wherein if a service executable by the service supply unit is modified, the service notification unit transmits information on the modified service to the information supply unit.

7. The image processing system according to claim 1, further comprising a parameter setting information transmission unit that transmits to the image processing device parameter setting information for requesting parameters for execution of services,
wherein the image processing device includes:
a parameter setting unit that sets parameters using the parameter setting information; and
a parameter transmission unit that transmits the parameters set by the parameter setting unit to the service supply unit,
wherein the service execution unit executes the service requested by the image processing device in accordance with the parameters transmitted from the parameter transmission unit.

8. The image processing system according to claim 1, wherein the information supply unit and the service supply unit are implemented on a computer.

9. The image processing system according to claim 1, comprising a plurality of image processing devices each of which functions as the image processing device,
wherein at least a part of functions of the information supply unit are incorporated in a part of the plurality of image processing devices.

10. The image processing system according to claim 1, comprising a plurality of image processing devices each of which functions as the image processing device,
wherein at least a part of functions of the information supply unit and the service supply unit are incorporated in a part of the plurality of image processing devices.

11. The image processing system according to claim 1, wherein:
the image processing device includes a function execution unit that executes a function of the image processing device in response to the image processing device receiving the service from the service supply unit;
the information supply unit includes an environment selection unit that selects a service suitable for a usage environment of the image processing device from among the services executable by the service supply unit; and
the service information transmitting unit transmits the information regarding a service selected by the environment selection unit.

12. The image processing system according to claim 11, wherein the usage environment relates to performance of the function of the image processing device.

13. The image processing system according to claim 11, wherein:
the image processing device includes an environment notification unit that supplies the environment selection unit with the usage environment;
the environment selection unit selects the service in accordance with the usage environment supplied by the environment notification unit.

14. The image processing system according to claim 11, wherein:
the image processing device includes:
a user identification unit that identifies users who use the image processing device;
an information extraction unit that extracts permission information corresponding to a user identified by the user identification unit from a database in which pieces of permission information are respectively associated with users, the permission information representing services which the user has permitted; and
a permission notification unit that identifies the permission information extracted by the information extraction unit to the information supply unit, and
the environment selection unit selects a service from services indicated in the permission information provided by the permission notification unit.

15. The image processing system according to claim 11, wherein the service information transmitting unit transmits the information regarding which language matches a language setting of the image processing device to which the information on services is to be provided.

16. The image processing system according to claim 15, wherein:
the image processing device includes:
a service information request unit that sends a request for the information on services to the information supply unit; and
a language notification unit that identifies the language setting to the information supply unit, and
the service information transmitting unit transmits the information of which language matches the language setting identified by the language notification unit in response to the information supply unit receiving the request from the service information request unit.

17. The image processing system according to claim 1, wherein the information transmitted from the service information transmitting unit to the image processing device has a data structure enabling the information to be displayed on a display unit of the image processing device regardless of specifications of the display unit.

18. The image processing system according to claim 17, wherein the information has a hierarchical structure in which items used for selection of services are layered in a predetermined order.

19. The image processing system according to claim 17, wherein:
the information supply unit has display language information used to generate the information on services in one of a plurality of different languages;
the information supply unit generates the information on services corresponding to a designated language designated by the image processing device in accordance with the display language information and transmits the information on services through the service information transmitting unit; and
the image processing device operates to transmit the designated language by which information is displayed on the image processing device, to the information supply unit before the information on services is transmitted from the information supply unit to the image processing device, so as to obtain the information on services matching the designated language.

20. The image processing system according to claim 1, wherein the information processing device includes:
a list generation unit that generates a list of services specified by the upper level selection information provided by the service information transmitting unit; and
a list display unit that displays the list on a display of the image processing device, wherein the service determination unit operates to allow the user to select a service from the services in the list.

21. The image processing system according to claim 20, wherein the list generation unit generates the list so that the services in the list are different from each other.

22. The image processing system according to claim 20, wherein the list generation unit generates the list so that the services are sorted according to a predetermined rule.

23. The image processing system according to claim 20, wherein:
the image processing system includes a plurality of information supply units each of which functions as the information supply unit; and
the list generation unit generates the list according to the upper level selection information provided to one of the plurality of information supply units satisfying a predetermined generation condition.

24. The image processing system according to claim 20, wherein:
the image processing device includes a notification request unit which sends a request for the upper level selection information to the information supply unit; and
the information supply unit operates to supply the upper level selection information to the image processing device in response to the information supply unit receiving the request from the notification request unit.

25. The image processing system according to claim 1, wherein the image processing system includes:
a plurality of image processing devices each of which functions as the image processing device; and
a plurality of service supply units each of which functions as the service supply unit,
wherein each image processing device includes a history generation unit which generates history information concerning user operations for receiving services from the plurality of service supply units,
wherein the image processing system further includes:
a history acquisition unit which obtains the history information from each image processing device; and
an evaluation unit which performs an evaluation on the services of the plurality of service supply units based on the history information obtained by the history acquisition unit.

26. The image processing system according to claim 25, further comprising an evaluation result providing unit which sends an evaluation result made by the evaluation unit to each image processing device.

27. The image processing system according to claim 25, wherein the service information transmitting unit includes a list transmission unit which transmits service list information representing a list of services executable by the service supply units and an evaluation result made by the evaluation unit to an image processing device in response to the service information transmitting unit receiving a request signal requesting the list of services.

28. The image processing system according to claim 25, further comprising:
a list generation unit which generates service list information in which identification of the services is arranged in a predetermined rule and an evaluation result made by the evaluation unit is contained; and
a list transmission unit which transmits the service list information made by the list generation unit to one of the image processing devices in response to the list transmission unit receiving a request signal requesting the list of services from the one of the image processing devices.

29. The image processing system according to claim 25, wherein:
each image processing device is configured to transmit the history information to the history acquisition unit in response to a request for history information; and
the history acquisition unit sends the request for history information to each image processing device to obtain the history information from each image processing device.

30. The image processing system according to claim 25, wherein:
each image processing device is configured to transmit the history information to the history acquisition unit; and
the history acquisition unit is configured to receive the history information transmitted from each image processing device.

31. The image processing system according to claim 25, wherein:
the history generation unit includes a bookmark registration unit which generates bookmark information in which an identification of a registration target service is associated with destination information used for sending a request signal for a service to the service supply unit by which the registration target service is to be provided in response to a user command for service registration being input, and stores the bookmark information in a storage unit; and
each image processing device operates to transmit the bookmark information to the history acquisition unit as the history information, to obtain the destination information corresponding to the identification of a service requested by a user from the storage unit in response to receiving a usage command for the service from the user, to send a request for a service to the service supply unit corresponding to the service designated by the usage command.

32. The image processing system according to claim 25, wherein:
the history generation unit includes a usage count recording unit which generates usage count information representing the number of times that the image processing device requests a service and stores the usage count information in a storage unit thereof, the usage count information being generated for each service; and
each image processing device is configured to transmit the usage count information generated by the usage count recording unit to the history acquisition unit as the history information.

33. An image processing system, comprising:
an image processing device including at least one of an image reading unit which reads an image and generates image data representing the image and an image printing unit which prints an image represented by image data;
a service supply unit configured to execute a service regarding at least one of image data generated by the image reading unit and image data representing an image to be printed by the image printing unit, in response to a request from the image processing device; and a parameter setting information transmission unit that transmits to the image processing device parameter setting information for requesting parameters for execution of services, wherein the image processing device includes:

a service determination unit which allows a user to select a service and determines that the selected service is to be requested from the service supply unit;

a service requesting unit which requests the service supply unit to execute the service determined by the service determination unit;

a parameter setting unit that sets parameters using the parameter setting information; and a parameter transmission unit that transmits the parameters set by the parameter setting unit to the service supply unit, and wherein the service supply unit includes a service execution unit that executes the service requested by the image processing device in accordance with the parameters transmitted from the parameter transmission unit.

34. The image processing system according to claim 33, wherein:

the image processing device includes a parameter setting information request unit that requests the parameter setting information transmission unit to transmit the parameter setting information; and the parameter setting information transmission unit transmits the parameter setting information to the image processing device in response to the parameter setting information transmission unit being requested to transmit the parameter setting information by the image processing device.

35. The image processing system according to claim 34, wherein the parameter setting information request unit requests the parameter setting information from the parameter setting information transmission unit in response to the service requesting unit requesting the service supply unit to execute the service.

36. The image processing system according to claim 33, wherein the parameter setting unit sets the parameters by displaying the parameter setting information and accepting a user input for setting the parameters.

37. The image processing system according to claim 33, wherein the parameter setting information relates to setting parameters concerning one of the image reading unit and the image printing unit.

38. The image processing system according to claim 37, wherein the parameters requested through the parameter setting information are a part of parameters settable in the image processing device.

39. The image processing system according to claim 33, wherein:

the image processing device includes at least one of a sound input unit used to input sound and a sound output unit used to output sound; and the service supply unit is configured to execute a service regarding at least one of the sound inputted through the sound input unit and the sound to be outputted through the sound output unit.

40. The image processing system according to claim 33, comprising a plurality of image processing devices each of which functions as the image processing device, wherein at least a part of functions of the service supply unit are incorporated in a part of the plurality of image processing devices.

41. The image processing system according to claim 33, comprising a plurality of image processing devices each of which functions as the image processing device, wherein at least a part of functions of the parameter setting information transmission unit are incorporated in a part of the plurality of image processing devices.

42. The image processing system according to claim 33, further comprising an information supply unit which supplies the image processing device with information on services executable by the service supply unit, wherein the service determination unit presents the information on services transmitted from the information supply unit to a user, allows the user to select a service from the presented information, and determines that the selected service is to be requested from the service supply unit.

43. The image processing system according to claim 33, wherein the parameter setting information transmitted from the parameter setting information transmission unit to the image processing device has a data structure enabling the parameter setting information to be displayed on a display unit of the image processing device regardless of specifications of the display unit.

44. The image processing system according to claim 43, wherein the parameter setting information has a hierarchical structure in which items used for input of parameters are layered in a predetermined order.

45. The image processing system according to claim 43, wherein:

the information supply unit has display language information used to generate the information on services in one of a plurality of different languages;

the information supply unit generates the information on services corresponding to a designated language designated by the image processing device in accordance with the display language information and transmits the information on services through the service information transmitting unit; and the image processing device operates to transmit the designated language by which information is displayed on the image processing device, to the information supply unit before the information on services is transmitted from the information supply unit to the image processing device, so as to obtain the information on services matching the designated language.

46. The image processing system according to claim 33, further comprising a server including the parameter setting information transmission unit, wherein the server further includes a server side storage unit which stores the parameter setting information while associating the parameter setting information with grouping information, wherein the parameter setting information transmission unit transmits the parameter setting information along with the corresponding grouping information to the image processing device, wherein the image processing device includes:

a device side storage unit which stores the parameter setting information while associating the parameter setting information with the grouping information; and a device control unit which operates to judge whether required information is stored in the device side storage unit, to use the required information in the device side storage unit if the required information is stored in the device side storage unit, to request the requested information from the server if the requested information is not stored in the device side storage unit, and to store the requested information supplied by the server in the device side storage unit while associating the requested information with the corresponding grouping information, wherein the device control unit operates to judge whether an amount of stored information of the device side storage unit reaches a predetermined upper limit, to search the device side storage unit for information corresponding to the grouping information matching a predetermined condition, to delete the information corresponding to the grouping information matching the predetermined condition if the information is searched while storing information newly provided by the server in the device side storage unit while associating the newly provided information with corresponding grouping information, and to store the newly provided information in the device side storage unit without deleting information in the device side storage unit if the amount of stored information does not reach the predetermined upper limit.

47. The image processing system according to claim 46, wherein:

the grouping information is categorized into a first type grouping information and a second type grouping information;

the first type grouping information consists of main grouping information;

the second type grouping information includes the main grouping information and sub-grouping information;

the device control unit operates to judge whether information related to the second type grouping information having main grouping information equal to main grouping information of the first type grouping information judged to satisfy the predetermined condition in the searching is stored in the device side storage unit, to remove the first type grouping information from judgment conducted according to the predetermined condition, and to conduct the searching again.

48. The image processing system according to claim 46, wherein:

the device control unit operates to obtain time information when acquisition of information is required, to store the time information while associating the time information with the corresponding grouping information or the corresponding information, and to search for the information satisfying the predetermined condition using the time information as the predetermined condition.

49. The image processing system according to claim 46, wherein:

the device control unit operates to obtain frequency of occurrence of requests for information, store the frequency in the device side storage unit while associating the frequency with the corresponding information or the grouping information, and to search for the information satisfying the predetermined condition using the frequency as the predetermined condition.

50. An image processing device forming an image processing system, the image processing device including at least one of an image reading unit which reads an image and generates image data representing the image and an image printing unit which prints an image represented by image data, the image processing system including:
  a service supply unit configured to execute a service regarding at least one of image data generated by the image reading unit and image data representing an image to be printed by the image printing unit, in response to a request from the image processing device; and
  an information supply unit which supplies the image processing device with information on services executable by the service supply unit, wherein the information on services includes service selection information in which service items of the services are respectively associated with corresponding URLs and upper level selection information in which items of a plurality of pieces of service selection information are respectively associated with corresponding Ids of the plurality of service selection information, the image processing device comprising:
  a service determination unit which selects an item from among the items of the plurality of pieces of service selection based on the upper level selection information, requests the service selection information corresponding to the ID associated with the selected item from the information supply unit, and determines a service from the service supply unit; and
  a service requesting unit which requests the service supply unit to execute the service determined by the service determination unit by designating the URL associated with the service item determined by the service determination unit as a request target for the determined service.

51. An image processing device forming an image processing system, the image processing device including at least one of an image reading unit which reads an image and generates image data representing the image and an image printing unit which prints an image represented by image data, the image processing system including:
  a service supply unit configured to execute a service regarding at least one of image data generated by the image reading unit and image data representing an image to be printed by the image printing unit, in response to a request from the image processing device; and
  a parameter setting information transmission unit that transmits parameter setting information for requesting parameters for execution of services to the image processing device, the image processing device comprising:
  a service determination unit which allows a user to select a service and determines that the selected service is to be requested from the service supply unit;
  a service requesting unit which requests the service supply unit to execute the service determined by the service determination unit,
  a parameter setting unit that sets parameters using the parameter setting information; and
  a parameter transmission unit that transmits the parameters set by the parameter setting unit to the service supply unit.

52. A server forming an image processing system, the image processing system including:
  an image processing device including at least one of an image reading unit which reads an image and generates image data representing the image and an image printing unit which prints an image represented by image data; and an information supply unit which supplies the image processing device with information on services executable by the service supply unit, the server comprising:
a service supply unit configured to execute a service regarding at least one of image data generated by the image reading unit and image data representing an image to be printed by the image printing unit, in response to a request from the image processing device, wherein:
the information supply unit includes:
a service storage unit that stores service selection information in which service items of the services are respectively associated with corresponding URLs and upper level selection information in which items of a plurality of pieces of service selection information are respectively associated with corresponding IDs of the plurality of pieces of service selection information as the information on services executable by the service supply unit; and
a service information transmitting unit that transmits upper level to the image processing device, and transmits the service selection information to the image processing device in response to a request transmitted from the image processing device,
the image processing device includes:
a service determination unit that selects an item from among the items of the plurality of pieces of service selection information based on the upper level selection information, requests the service section information corresponding to the ID associated with the selected item from the information supply unit, and determines a service from among the service items based on the service selection information transmitted from the service supply unit; and
a service requesting unit which requests the service supply unit to execute the service determined by the service determination unit by designating the URL associated with the service item determined by the service determination unit as a request target for the determined service, and
wherein the service supply unit includes a service execution unit that executes the service requested by the image processing device.

53. A server forming an image processing system,
the image processing system including:
an image processing device including at least one of an image reading unit which reads an image and generates image data representing the image and an image printing unit which prints an image represented by image data; and
a service supply unit configured to execute a service regarding at least one of image data generated by the image reading unit and image data representing an image to be printed by the image printing unit, in response to a request from the image processing device,
the server comprising:
an information supply unit which supplies the image processing device with information on services executable by the service supply unit, wherein:
the information supply unit includes:
a service storage unit that stores service selection information in which service items of the services are respectively associated with corresponding URLs and upper level selection information in which items of a plurality of pieces of service selection information are respectively associated with corresponding IDs of the plurality of pieces of service selection information as the information on services executable by the service supply unit; and
a service information transmitting unit that transmits the information on services stored in the service storage unit to the image processing device,
the image processing device includes:
a service determination unit that selects an item from among the items of the plurality of pieces of service selection information based on the upper level selection information, requests the service selection information corresponding to the ID associated with the selected item from the information supply unit, and determines a transmitted from the service supply unit; and
a service requesting unit which requests the service supply unit to execute the service determined by the service determination unit by designating the URL associated with the service item determined by the service determination unit as a request target for the determined service, and
wherein the service supply unit includes a service execution unit that executes the service requested by the image processing device.

54. An image processing device forming an image processing system, the image processing device including at least one of an image reading unit which reads an image and generates image data representing the image and an image printing unit which prints an image represented by image data,
the image processing system including:
a service supply unit configured to execute a service regarding at least one of image data generated by the image reading unit and image data representing an image to be printed by the image printing unit, in response to a request from the image processing device; and
an information supply unit which supplies the image processing device with information on services executable by the service supply unit, wherein:
the image processing device comprising:
an environment notification unit that supplies the information supply unit with a usage environment of the image processing device;
a service determination unit which presents the information on services transmitted from the information supply unit to a user, allows the user to select a service from the presented information, and determines that the selected service is to be requested from the service supply unit;
a service requesting unit which requests the service supply unit to execute the service determined by the service determination unit; and
a function execution unit which executes a function of the image processing device in response to the image processing device receiving the service from the service supply unit, and
wherein the information on services provided by the information supply unit relates to services suitable for the usage environment of the image processing device.

55. A server forming an image processing system,
the image processing system including:
the image processing device having at least one of an image reading unit which reads an image and generates image data representing the image and an image printing unit which prints an image represented by image data; and a service supply unit configured to execute a service regarding at least one of image data generated by the image reading unit and image data representing an image to be printed by the image printing unit, in response to a request from the image processing device, the server comprising:

an environment selection unit that selects a service suitable for a usage environment of the image processing device from among the services executable by the service supply unit; and an information supply unit which supplies the image processing device with information on services executable by the service supply unit, wherein the information supplied by the information supply unit relates to the service selected by the environment selection unit.

56. An image processing device forming an image processing system, the image processing device including at least one of an image reading unit which reads an image and generates image data representing the image and an image printing unit which prints an image represented by image data, the image processing system including:

a service supply unit configured to execute a service regarding at least one of image data generated by the image reading unit and image data representing an image to be printed by the image printing unit, in response to a request from the image processing device; and an information supply unit which supplies the image processing device with information on services executable by the service supply unit, the information supply unit including:

a service storage unit that stores service selection information in which service items of the services are respectively associated with corresponding URLs and upper level selection information in which items of a plurality of pieces of service selection information are respectively associated with corresponding IDs of the plurality of pieces or service selection information as the information on services executable by the service supply unit; and a service information transmitting unit that transmits the upper level selection information to the image processing device, and transmits the service selection information to the image processing device in response to a request transmitted from the image processing device, the image processing device comprising:

a service determination unit that selects an item from among the items of the plurality of pieces of service selection information based on the upper level selection information, requests the service selection information corresponding to the ID associated with the selection item from the information supple unit, and determines a service from among the service items based on the service section information transmitted from the service supply unit; and a service requesting unit which requests the service supply unit to execute the service determined by the service determination unit by designating the URL associated with the service item determined by the service determination unit as a request target for the determined service, wherein the information on services transmitted from the service information transmitting unit to the image processing device has a data structure enabling the information to be displayed on a display unit of the image processing device regardless of specifications of the display unit.

57. A server forming an image processing system, the image processing system including:

the image processing device having at least one of an image reading unit which reads an image and generates image data representing the image and an image printing unit which prints an image represented by image data; and a service supply unit configured to execute a service regarding at least one of image data generated by the image reading unit and image data representing an image to be printed by the image printing unit, in response to a request from the image processing device, the server comprising:

an information supply unit which supplies the image processing device with information on services executable by the service supply unit, wherein the information on services includes service selection information in which service items of the services are respectively associated with corresponding URLs and upper level selection information in which items of a plurality of pieces of service selection information are respectively associated with corresponding IDs of the plurality of pieces of service selection information, wherein the information on services transmitted to the image processing device has a data structure enabling the information on services to be displayed on a display unit of the image processing device regardless of specifications of the display unit.

58. An image processing device forming an image processing system, the image processing device including at least one of an image reading unit which reads an image and generates image data representing the image and an image printing unit which prints an image represented by image data, the image processing system including:

a service supply unit configured to execute a service regarding at least one of image data generated by the image reading unit and image data representing an image to be printed by the image printing unit, in response to a request from the image processing device; and a server including a parameter setting information transmission unit that transmits parameter setting information for requesting parameters for execution of services to the image processing device, the image processing device including:

a device side storage unit which stores the parameter setting information while associating the parameter setting information with grouping information; and a device control unit which operates to judge whether required information is stored in the device side storage unit, to use the required information in the device side storage unit if the required information is stored in the device side storage unit, to request the requested information from the server if the requested information is not stored in the device side storage unit, and to store the requested information supplied by the server in the device side storage unit while associating the requested information with the corresponding grouping information, wherein the device control unit operates to judge whether an amount of stored information of the device side storage unit reaches a predetermined upper limit, to search the device side storage unit for information corresponding to the grouping information matching a predetermined condition, to delete the information corresponding to the grouping information matching the predetermined condition if the information is searched while storing information newly provided by the server in the device side storage unit while associating the newly provided information with corresponding grouping information, and to store the newly provided information in the device side storage unit without deleting information in the device side storage unit if the amount of stored information does not reach the predetermined upper limit.

* * * * *

UNITED STATES PATENT AND TRADEMARK OFFICE
CERTIFICATE OF CORRECTION

| | | |
|---|---|---|
| PATENT NO. | : 7,778,495 B2 | Page 1 of 1 |
| APPLICATION NO. | : 11/266586 | |
| DATED | : August 17, 2010 | |
| INVENTOR(S) | : Kazuma Aoki et al. | |

It is certified that error appears in the above-identified patent and that said Letters Patent is hereby corrected as shown below:

Column 92, Claim 50, Line 16:
  delete "Ids" and insert --IDs--

Column 92, Claim 50, Line 17:
  delete "plurality of service" and insert --plurality of pieces of service--

Column 92, Claim 50, Line 25:
  delete "from the service supply unit;" and insert --from among the service items based on the service selection information transmitted from the service supply unit;--

Signed and Sealed this
Twelfth Day of July, 2011

David J. Kappos
*Director of the United States Patent and Trademark Office*